(12) United States Patent
Bel Aiba et al.

(10) Patent No.: US 12,486,330 B2
(45) Date of Patent: Dec. 2, 2025

(54) FUSION PROTEINS SPECIFIC FOR CD137 AND GPC3

(71) Applicant: Pieris Pharmaceuticals GmbH, Hallbergmoos (DE)

(72) Inventors: Rachida Siham Bel Aiba, Munich (DE); Birgit Bossenmaier, Seefeld (DE); Thomas Jaquin, Erding (DE); Janet Peper-Gabriel, Freising (DE); Eva-Maria Hansbauer, Freising (DE); Corinna Schlosser, Freising (DE); Shane Olwill, Freising (DE)

(73) Assignee: Pieris Pharmaceuticals GmbH, Hallbergmoos (DE)

( * ) Notice: Subject to any disclaimer, the term of this patent is extended or adjusted under 35 U.S.C. 154(b) by 1122 days.

(21) Appl. No.: 17/433,155

(22) PCT Filed: Feb. 25, 2020

(86) PCT No.: PCT/EP2020/054821
§ 371 (c)(1),
(2) Date: Aug. 23, 2021

(87) PCT Pub. No.: WO2020/173897
PCT Pub. Date: Sep. 3, 2020

(65) Prior Publication Data
US 2022/0153864 A1    May 19, 2022

(30) Foreign Application Priority Data

Feb. 26, 2019 (EP) .................................. 19000100

(51) Int. Cl.
| | | |
|---|---|---|
| *C07K 16/30* | (2006.01) | |
| *A61P 35/00* | (2006.01) | |
| *C07K 14/47* | (2006.01) | |
| *A61K 39/00* | (2006.01) | |

(52) U.S. Cl.
CPC ............ *C07K 16/303* (2013.01); *A61P 35/00* (2018.01); *C07K 14/47* (2013.01); *A61K 2039/505* (2013.01); *C07K 2317/33* (2013.01); *C07K 2317/92* (2013.01); *C07K 2317/94* (2013.01); *C07K 2319/00* (2013.01)

(58) Field of Classification Search
None
See application file for complete search history.

(56) References Cited

U.S. PATENT DOCUMENTS

| | | | |
|---|---|---|---|
| 4,946,778 | A | 8/1990 | Ladner et al. |
| 5,591,828 | A | 1/1997 | Bosslet et al. |
| 5,728,553 | A | 3/1998 | Goodey et al. |
| 6,080,560 | A | 6/2000 | Russell et al. |
| 6,177,074 | B1 | 1/2001 | Glue et al. |
| 6,403,564 | B1 | 6/2002 | Ganguly et al. |
| 6,696,245 | B2 | 2/2004 | Winter et al. |
| 7,250,297 | B1 | 7/2007 | Beste et al. |
| 7,288,638 | B2 | 10/2007 | Jure-Kunkel et al. |
| 2003/0069395 | A1 | 4/2003 | Sato et al. |
| 2010/0239577 | A1* | 9/2010 | Igawa ..................... A61P 35/00 435/69.6 |
| 2016/0235844 | A1* | 8/2016 | Stagg ................. C07K 16/2863 |
| 2017/0267783 | A1 | 9/2017 | Nezu et al. |
| 2018/0148485 | A1 | 5/2018 | Hinner et al. |

FOREIGN PATENT DOCUMENTS

| | | | |
|---|---|---|---|
| EP | 0330451 | A2 | 8/1989 |
| EP | 0404097 | A2 | 12/1990 |
| EP | 0361991 | B1 | 12/1999 |
| WO | 1993011161 | A1 | 6/1993 |
| WO | 1999064016 | A1 | 12/1999 |
| WO | 2005019256 | A2 | 3/2005 |
| WO | WO 2005/035584 | A1 | 4/2005 |
| WO | 2006056464 | A2 | 6/2006 |
| WO | 2007038619 | A2 | 4/2007 |
| WO | WO 2007/107563 | A2 | 9/2007 |
| WO | WO 2008/015239 | A1 | 2/2008 |

(Continued)

OTHER PUBLICATIONS

Alavijeh, M., et al., "The pivotal role of drug metabolism and pharmacokinetics in the discovery and development of new medicines," IDrugs, vol. 7, No. 8, pp. 755-763, 2004.
Altschul, S., et al., "Basic Local Alignment Search Tool," Journal of Molecular Biology, vol. 215, pp. 403-410, 1990.
Altschul, S., et al., "Gapped BLAST and PSI-BLAST: a new generation of protein database search programs," Nucleic Acids Research, vol. 25, No. 17, pp. 3389-3402, 1997.
Altshuler, E.P., et al., "Generation of Recombinant Antibodies and Means for Increasing Their Affinity," Biochemistry, vol. 75, No. 13, pp. 1584-1605, 2010.
Aydin, O., et al., "Expression of Glypican 3 in low and high grade urothelial carcinomas," Diagnostic Pathology, vol. 10, No. 34, pp. 1-6, Apr. 21, 2015.

(Continued)

*Primary Examiner* — Brad Duffy
(74) *Attorney, Agent, or Firm* — Morgan, Lewis & Bockius LLP

(57) ABSTRACT

The disclosure provides fusion proteins specific for both CD137 and GPC3, which fusion protein can be used to co-stimulate lymphocyte activation in a GPC3-target-dependent manner. Such fusion proteins can be used in many pharmaceutical applications, for example, as anti-cancer agents and/or immune modulators for the treatment or prevention of human diseases such as a variety of tumors. The present disclosure also concerns methods of making the fusion proteins described herein as well as compositions comprising such fusion proteins. The present disclosure further relates to nucleic acid molecules encoding such fusion proteins and to methods for generation of such fusion proteins and nucleic acid molecules. In addition, the application discloses therapeutic and/or diagnostic uses of such fusion proteins as well as compositions comprising one or more of such fusion proteins.

Figure 1:
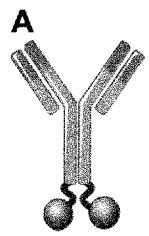
Figure 1:
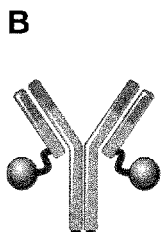
Figure 1:
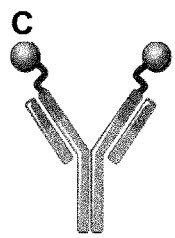
Figure 1:
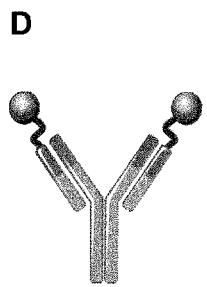
Figure 1:
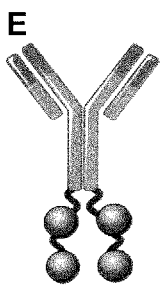
Figure 1:
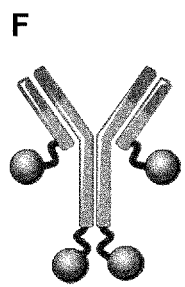
Figure 1:
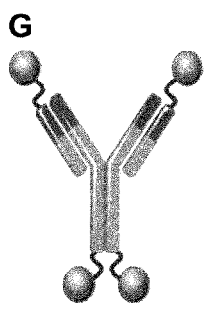
Figure 1:
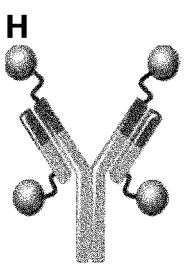
Figure 1:
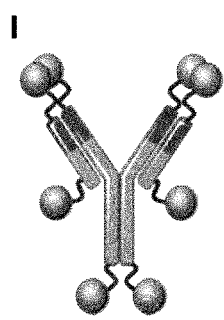
Figure 1:
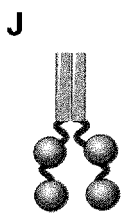

6 Claims, 17 Drawing Sheets
Specification includes a Sequence Listing.

(56) References Cited

FOREIGN PATENT DOCUMENTS

| WO | WO 2012/032433 A1 | 3/2012 | |
|----|-------------------|--------|---|
| WO | WO 2013/174783 A1 | 11/2013 | |
| WO | 2016177802 A1 | 11/2016 | |
| WO | WO 2016/184875 A1 | 11/2016 | |
| WO | WO-2016184882 A1 * | 11/2016 | .............. A61P 35/00 |
| WO | 2018087108 A1 | 5/2018 | |
| WO | WO 2018/129397 A1 | 7/2018 | |
| WO | 2018228442 A1 | 12/2018 | |

OTHER PUBLICATIONS

Breustedt, D., et al., "The 1.8-A Crystal Structure of Human Tear Lipocalin Reveals an Extended Branched Cavity with Capacity for Multiple Ligands," The Journal of Biological Chemistry, vol. 280, No. 1, pp. 484-493, Jan. 7, 2005.
Bruckdorfer, T. et al., "From Production of Peptides in Milligram Amounts for Research to Multi-Tons Quantities for Drugs of the Future," Current Pharmaceutical Biotechnology, vol. 5, pp. 29-43, 2004.
Bulliard, Y., et al., "Activating Fc gamme receptors contribute to the antitumor activities of immunoregulatory receptor-targeting antibodies," Journal of Experimental Medicine, vol. 210, No. 9, pp. 1685-1693, 2013.
Bulliard, Y., et al., "OX40 engagement depletes intratumoral Tregs via activating FcgammaRs, leading to antitumor efficacy," Immunology and Cell Biology, vol. 92, pp. 475-480, 2014.
Capurro, M., et al., "Glypican-3: A Novel Serum and Histochemical Marker for Hepatocellular Carcinoma," Gastroenterology, vol. 125, No. 1, pp. 89-97, 2003.
Chacon, J., et al., "Co-Stimulation through 4-1BB/CD137 Improves the Expansion and Function of CD8+ Melanoma Tumor-Infiltrating Lymphocytes for Adoptive T-Cell Therapy," PLOS One, vol. 8, No. 4, pp. 1-14, Apr. 1, 2013.
Cheng, W., et al., "Glypican-3-mediated oncogenesis involves the Insulin-like growth factor-signaling pathway," Carcinogenesis, vol. 29, No. 7, pp. 1319-1326, 2008.
Cole, S., et al., "A Strategy for the Production of Human Monoclonal Antibodies Reactive with Lung Tumor Cell Lines," Cancer Research, vol. 44, pp. 2750-2753, Jul. 1984.
Dall'Acqua, W., et al., "Properties of Human IgG1s Engineered for Enhanced Binding to the Neonatal Fc Receptor (FcRn)," The Journal of Biological Chemistry, vol. 281, No. 33, pp. 23514-23524, Aug. 18, 2006.
Dennis, M., et al., "Albumin Binding as a General Strategy for Improving the Pharmacokinetics of Proteins," The Journal of Biological Chemistry, vol. 277, No. 38, pp. 35035-35043, Sep. 20, 2002.
Ehrenmann, F., et al., "IMGT/3Dstructure-DB and IMGT/DomainGapAlign: a database and a tool for immunoglobulins or antibodies, T cell receptors, MHC, IgSF and MhcSF," Nucleic Acids Research, vol. 38, pp. D301-D307, 2010.
Feng, M., et al., "Glypican-3 antibodies: a new therapeutic target for liver cancer," FEBS Letters. Author Manuscipt, vol. 588, No. 2, pp. 377-382, Jan. 21, 2014.
Fisher, T., et al., "Targeting of 4-1BB by monoclonal antibody PF-05082566 enhances T-cell function and promotes anti-tumor activity," Cancer Immunology Immunotherapy, vol. 61, pp. 1721-1733, Mar. 11, 2012.
Flower, D., "Beyond the superfamily: the lipocalin receptors," Biochimica et Biophysica Acta, vol. 1482, pp. 327-336. 2000.
Flower, D., "The lipocalin protein family: structure and function," Biochemistry Journal, vol. 318, pp. 1-14, 1996.
Flower, D., et al., "The lipocalin protein family: structural and sequence overview," Biochimica et Biophysica Acta, vol. 1482, pp. 9-24, 2000.
Frese, K., et al., "An automated immunoassay for early specificity profiling of antibodies," mAbs, vol. 5, No. 2, pp. 279-287, Mar./Apr. 2013.

Fuertges, F., et al., "The Clinical Efficacy of Poly (Ethylene Glycol)-Modified Proteins," Journal of Controlled Release, vol. 11, pp. 139-148, 1990.
Gailey, M., et al., "Immunohistochemistry for the Novel Markers Glypican 3, PAX8, and p40 (DeltaNp63) in Squamous Cell and Urothelial Carcinoma," American Journal of Clinical Pathology, vol. 140, pp. 872-880, Nov. 8, 2013.
Glaesner, W., et al., "Engineering and characterization of the long-acting glucagon-like peptide-1 analogue LY2189265, an Fc fusion protein," Diabetes/Metabolism Research and Reviews, vol. 26, pp. 287-296, 2010.
Holliger, P., et al., "Diabodies: Small bivalent and bespecific antibody fragments," Proceedings of the National Academy of Sciences of the USA, vol. 90, pp. 6444-6448, 1993.
Holliger, P., et al., "Engineered antibody fragments and the rise of single domains," Nature Biotechnology, vol. 23, No. 9, pp. 1126-1136, Sep. 2005.
International Search Report and Written Opinion for PCT/EP2020/054821 issued on May 15, 2020 (13 pages).
Ishiguro, T., et al., "Anti-Glypican 3 Antibody as a Potential Antitumor Agent for Human Liver Cancer," Cancer Research, vol. 68, No. 23, pp. 9832-9838, 2008.
Jelic, S., et al., "Hepatocellular carcinoma: ESMO Clinical Practice Guidelines for diagnosis, treatment and follow-up," Annals of Oncology, vol. 21, suppl. 5, pp. v59-v64, 2010.
Johnson, G., et al., "Kabat Database and its applications: 30 years after the first variability plot," Nucleic Acids Research, vol. 28, No. 1, pp. 214-218, 2000.
Konig, T., et al., "Use of an albumin-binding domain for the selective immobilisation of recombinant capture antibody fragments on ELISA plates," Journal of Immunological Methods, vol. 218, pp. 73-83, 1998.
Kozbor, D., et al., "The production of monoclonal antibodies from human lymphocytes," Immunology, vol. 4, No. 3, pp. 72-79, 1983.
Lefranc, M., "The IMGT Unique Numbering for Immunoglobulins, T-Cell Receptors, and Ig-Like Domains," The Immunologist, vol. 7, No. 4, pp. 132-136, 1999.
Li, J., et al., "Human antibodies for immunotherapy development generated via a human B cell hybridoma technology," PNAS, vol. 103, No. 10, pp. 3557-3562, Mar. 7, 2006.
Li, S., et al., "Immunotherapy of melanoma with the immune costimulatory monoclonal antibodies targeting CD137," Clinical Pharmacology: Advances and Applications, vol. 5, suppl. 1, pp. 47-53, Aug. 30, 2013.
Lowman, H.B., "Bacteriophage Display and Discovery of Peptide Leads for Drug Development," Annual Review of Biophysics and Biomolecular Structure, vol. 26, pp. 401-424, 1997.
Martinet, O., et al., "T cell activation with systemic agonistic antibody versus local 4-1BB ligand gene delivery combined with interlukin-12 eradicate liver metastases of breast cancer," Gene Therapy, vol. 9, pp. 786-792, 2002.
Melero, I., et al., "Amplification of tumor immunity by gene transfer of the co-stimulatory 4-1BB ligand: synergy with the CD28 co-stimulatory pathway," European Journal of Immunology, vol. 28, pp. 1116-1121, 1998.
Midorikawa, Y., et al., "Glypican-3, Overexpressed in Hepatocellular Carcinoma, Modulates FGF2 and BMP-7 Signaling," International Journal of Cancer, vol. 103, pp. 455-465, 2003.
Montalbano, M., et al., "Transformation of primary human hepatocytes in hepatocellular carcinoma," International Journal of Oncology, vol. 48, pp. 1205-1217, 2016.
Nakano, K., et al., "Anti-glypican 3 antibodies cause ADCC against human hepatocellular carcinoma cells," Biochemical and Biophysical Research Communications, vol. 378, pp. 279-284, 2009.
Nakatsura, T., et al., "Glycipan-3, overexpressed specifically in human hepatocellular carcinoma, is a novel tumor marker," Biochemical and Biophysical Research Communications, vol. 306, pp. 16-25, 2003.
Nakatsura, T., et al., "Identification of Glypican-3 as a Novel Tumor Marker for Melanoma," Clinical Cancer Research, vol. 10, pp. 6612-6621, Oct. 1, 2004.
Osborn, B., et al., "Pharmacokinetic and Pharmacodynamic Studies of a Human Serum Albumin-Interferon-alpha Fusion Protein in

(56) References Cited

OTHER PUBLICATIONS

Cynomolgus Monkeys," The Journal of Pharmacology and Experimental Therapeutics, vol. 303, No. 2, pp. 540-548, 2002.
Pervaiz, S., et al., "Homology and structure-function correlations between alpha1-acid glycoprotein and serum retinol-binding protein and its relatives," FASEB Journal, vol. 1, pp. 209-214, 1987.
Pilia, G., et al., "Mutations in GPC3, a glypican gene, cause the Simpson-Golabi-Behmel overgrowth syndrome," Nature Genetica, vol. 12, pp. 241-247, Mar. 1996.
Rodi, D., et al., "Phage-display technology—finding a needle in a vast molecular haystack," Current Opinion Biotechnology, vol. 10, pp. 87-93, 1999.
Ryman, J., et al., "Pharmacokinetics of Monoclonal Antibodies," CPT Pharmacometrics and Systems Pharmacology, vol. 6, pp. 576-588, 2017.
Schmidt, T, et al., "Molecular Interaction Between the Strep-tag Affinity Peptide and its Cognate Target, Streptavidin," Journal of Molecular Biology, vol. 255, pp. 753-766, 1996.
Pakula A.A. et al., Genetic analysis of protein stability and function. Anna. Rev. Genet. 1989, v.23, p. 289-310.
Frankel A.E. et al., Characterization of diphtheria fusion proteins targeted to the human interleukin-3 receptor, Protein Eng., 2000, v.13, n.8, p. 575-581.
Tokuriki N. et al., Stability effects of mutations and protein evolvability, Curr. Opin. Struct. Biol., 2009, v. 19, n.5, p. 596-604.
Colman P. M., Effects of amino acid sequence changes on antibody-antigen interactions, Research in Immunology, 1994, v. 145, n. 1, p. 33-36.
Safdari Y. et al., Antibody humanization methods-a review and update, Biotechnology and Genetic Engineering Reviews, 2013, v. 29, n. 2, p. 175-186.
Arnau J. et al., Current strategies for the use of affinity tags and tag removal for the purification of recombinant proteins, Protein expression and purification, 2006, v. 48, n. 1, p. 1-13.
Muller S. et al., Spliceosomal peptide P140 for immunotherapy of systemic lupus erythematosus: results of an early phase II clinical trial, Arthritis & Rheumatism: Official Journal of the American College of Rheumatology, 2008, v. 58, n. 12, p. 3873-3883.
Delia Nelson et al., The "Trojan Horse" Approach to Tumor Immunotherapy: Targeting the Tumor Microenvironment, J. Immunol. Res., 2014, v.2014, art.789069, p. 1-14.
Sedykh, S., et al., "Bispecific antibodies: design, therapy, perspectives," Drug, Design, Development and Therapy, vol. 12, pp. 195-208, 2018.
Shields, R., et al., "High Resolution Mapping of the Binding Site on Human IgG1 for FcgammaRI, FcgammaRII, FcgammaRIII, and FcRn and Design of IgG1 Variants with Improved Binding to the FcgammaR," The Journal of Biological Chemistry, vol. 276, No. 9, pp. 6591-6604, Mar. 2, 2001.
Silva, J., et al., "The S228P Mutation Prevents in Vivo and in Vitro IgG4 Fab-arm Exchange as Demonstrated using a Combination of Novel Quantitative Immunoassays and Physiological Matrix Preparation," The Journal of Biological Chemistry, vol. 290, No. 9, pp. 5462-5469, Feb. 27, 2015.
Skerra, A., "Lipcalins as a scaffold", Biochimica et Biophysica Acta, vol. 1482, pp. 337-350, 2000.
Smith, T., et al., "Identification of Common Molecular Subsequences," Journal of Molecular Biology, vol. 147, pp. 195-197, 1981.
Snell, L. et al., "T-cell intrinsic effects of GITR and 4-1BB during viral infection and cancer immunotherapy," Immunological Reviews, vol. 244, pp. 197-217, 2011.

Song, H., et al., "OCI-5/Rat Glypican-3 Binds to Fibroblast Growth Factor-2 but not to Insulin-like Growth Factor-2," The Journal of Biological Chemistry, vol. 272, No. 12, pp. 7574-7577, Mar. 21, 1997.
Song, H., et al., "The Loss of Glypican-3 Induces Alterations in Wnt Signaling," The Journal of Biological Chemistry, vol. 280, No. 3, pp. 2116-2125, Jan. 21, 2005.
Spiess, C., et al., "Alternative molecular formats and therapeutic applications for bispecific antibodies," Molecular Immunology, vol. 67, pp. 95-106, 2015.
Sung, Y., et al., "Glypican-3 is overexpressed in human hepatocellular carcinoma," Cancer Science, vol. 94, No. 3, pp. 259-262, Mar. 2003.
Takai, H., et al., "Histopathological analyses of the antitumor activity of anti-glypican-3 antibody (GC33) in human liver cancer xenograft models: The essential role of macrophages," Cancer Biology & Therapy, vol. 8, No. 10, pp. 930-938, May 15, 2009.
Ushiku, T., et al., "Glypican 3-expressing gastric carcinoma: Distinct subgroup unifying hepatoid, clear-cell, and alpha-fetoprotein-producing gastric carcinomas," Cancer Science, vol. 100, No. 4, pp. 626-632, Feb. 19, 2009.
Vajo, Z., et al., "Genetically Engineered Insulin Analogs: Diabetes in the New Millenium," Pharmacological Reviews, vol. 52, No. 1, pp. 1-9, Mar. 2000.
Venturi, M. et al., "High Level Production of Functional Antibody Fab Fragments in an Oxidizing Bacterial Cytoplasm," Journal of Molecular Biology, vol. 315, pp. 1-8, 2002.
Ward, E., et al., "Binding activities of a repertoire of single immunoglobulin variable domains secreted from *Escherichia coli*," Nature, vol. 341, pp. 544-546, Oct. 12, 1989.
Wyzgol, A., et al., "Trimer Stabilization, Oligomerization, and Antibody-Mediated Cell Surface Immobilization Improve the Activity of Soluble Trimers of CD27L, CD40L, 41BBL, and Glucocorticoid-Induced TNF Receptor Ligand," The Journal of Immunology, vol. 183, pp. 1851-1861, Jul. 13, 2009.
Yamanaka, K., et al., "Immunohistochemical Study of Glypican 3 in Thyroid Cancer," Oncology, vol. 73, pp. 389-394, May 30, 2008.
Yamanaka, T., et al., "The Baseline Ratio of Neutrophils to Lymphocytes is Associated with Patient Prognosis in Advanced Gastric Cancer," Oncology, vol. 73, pp. 215-220, Apr. 17, 2008.
Yang, Y., et al., "Tumor Cells Expressing Anti-CD137 scFv Induce a Tumor-Destructive Environment," Cancer Research, vol. 67, No. 5, pp. 2339-2344, Mar. 1, 2007.
Yao, S., "Advances in targeting cells surface signalling molecules for immune modulation," Nature Reviews Drug Discovery. Author Manuscript, vol. 12, No. 2, pp. 130-146, Feb. 2013.
Ye, Q., et al., "CD137 Accurately Identifies and Enriches for Naturally Occurring Tumor-Reactive T Cells in Tumor," Clinical Cancer Research, vol. 20, No. 1, pp. 44-55, Sep. 17, 2013.
Ye, Z., et al., "Gene therapy for cancer using single-chain Fv fragments specific for 4-1BB," Nature Medicine, vol. 8, No. 4, pp. 343-348, Apr. 2002.
Zalevsky, J., et al., "Enhanced antibody half-life improves in vivo activity," Nature Biotechnology, vol. 28, No. 2, pp. 157-159, Feb. 2010.
Zhang, H., et al., "Antitumor efficacy of CD137 ligation is maximized by the use of a CD137 single-chain Fv-expressing whole-cell tumor vaccine compared with CD137-specific monoclonal antibody infusion," Molecular Cancer Therapy, vol. 5, vol. 1, pp. 149-155, Jan. 2006.
Zhu, Z-W, et al., "Enhanced glypican-3 expression differentiates the majority of hepatocellular carcinomas from benign hepatic disorders," Gut, vol. 48, pp. 558-564, 2001.
Zynger, D., et al., "Glypican 3: A Novel Marker in Testicular Germ Cell Tumors," American Journal of Surgical Pathology, vol. 30, No. 12, pp. 1570-1575, Dec. 2006.

\* cited by examiner

A

SEQ ID NOs: 87 and 82
SEQ ID NOs: 91 and 82
SEQ ID NOs: 95 and 82
SEQ ID NOs: 96 and 82

B

SEQ ID NOs: 81 and 89
SEQ ID NOs: 81 and 93

C

SEQ ID NOs: 88 and 82
SEQ ID NOs: 92 and 82

D

SEQ ID NOs: 81 and 90
SEQ ID NOs: 81 and 94

E

F

G

H

I

J

K

SEQ ID NO: 97
SEQ ID NO: 98

A. Binding to human GPC3

B. Binding to cynomolgus GPC3

A. GPC3 capture_CD137 detection

B. CD137 capture_GPC3 detection

A

A  HepG2

B  Hep3B

C  MKN-45

D  NCI-N87

- SEQ ID NOs: 81 and 82
- SEQ ID NOs: 87 and 82
- SEQ ID NO: 98
- SEQ ID NOs: 26 and 27
- SEQ ID NOs: 24 and 25

FUSION PROTEINS SPECIFIC FOR CD137 AND GPC3

I. BACKGROUND

Glypican-3 (GPC3, also called DGSX, GTR2-2, MXR7, OCI-5, SDYS, SGB, SGBS, and SGBS1) is an oncofetal antigen that belongs to the glypican family of glycosylphosphatidylinositol-anchored heparin sulfate proteoglycans. GPC3 is expressed in various tissues during development, playing significant roles in morphogenesis and growth through, e.g., fibroblast growth factor (FGF), noncanonical Wnt, or insulin-like growth factor signaling pathway (Cheng et al., Carcinogenesis, 2008, Song et al., *J Biol Chem*, 2005, Song et al., *J Biol Chem*, 1997). However, GPC3 expression is down-regulated or silenced in most normal adult tissues. Additionally, GPC3 may regulate cell growth positively and negatively depending on cell type. Loss-of-function mutations of GPC3 are responsible for the Simpson-Golabi-Behmel or Simpson dysmorphia syndrome (SGBS), a rare X chromosome-linked overgrowth disorder, and patients of SGBS have an increased risk of embryonal tumors (Pilia et al., *Nat Genet*, 1996), including Wilms' tumors.

GPC3 is expressed in various types of cancer including liver, gastric carcinoma, melanoma, high-grade urothelial carcinoma, testicular, and some uterine and vaginal cancers (Aydin et al., *Diagn Pathol*, 2015, Ushiku et al., *Cancer Sci*, 2009, Gailey and Bellizzi, *Am J Clin Pathol*, 2013, Yamanaka et al., *Oncology*, 2007, Nakatsura et al., *Clin Cancer Res*, 2004, Zynger et al., *Am J Surg Pathol*, 2006, Montalbano et al., *Int J Oncol*, 2016, Midorikawa et al., *Int J Cancer*, 2003). In particular, GPC3 is highly expressed in hepatocellular carcinoma (HCC) (Capurro et al., *Gastroenterology*, 2003, Nakatsura et al., *Biochem Biophys Res Commun*, 2003, Sung et al., *Cancer Sci*, 2003, Zhu et al., *Gut*, 2001), a major form of liver cancer which accounts for 90% of all liver cancers, and resulting in at least 500,000 deaths per year (Jelic et al., *Ann Oncol*, 2010). Extensive research has been carried out on GPC3 as a diagnostic biomarker and a therapeutic target for HCC and other cancer types. Several antibodies targeting GPC3, including humanized mouse antibodies YP7 and GC33 and human antibody HN3 and MDX-1414, have been generated, however, have not shown the ability to inhibit HCC cell proliferation or induce apoptosis (Feng and Ho, *FEBS Lett*, 2014). Exceptionally, GC33 is currently being evaluated in clinical trials for HCC. The mechanism of GC33 function includes antibody-dependent cell cytotoxicity (ADCC), but GC33 does not directly inhibit the proliferation of GPC3-positive tumor cells (Takai et al., *Cancer Biol Ther*, 2009, Nakano et al., *Biochem Biophys Res Commun*, 2009, Ishiguro et al., *Cancer Res*, 2008). However, while GC33 has been shown to exhibit tumor growth inhibition in vivo, it did not provide satisfactory clinical efficacy. Meanwhile, the knock-down and siRNA experimental results suggest GPC3 is not a lethal gene to HCC cells, which renders it uncertain whether anti-GPC3 antibodies can cause efficient tumor regression.

Cluster of differentiation 137 or CD137 (also known as 4-1 BB or TNFRS9) is a co-stimulatory immune receptor and a member of the tumor necrosis factor receptor (TNFR) super-family. It is primarily expressed on activated CD4+ and CD8+ T cells, activated B cells, and natural killer (NK) cells but can also be found on resting monocytes and dendritic cells (Li and Liu, *Clin Pharmacol*, 2013), or endothelial cells (Snell et al., *Immunol Rev*, 2011). CD137 plays an important role in regulation of the immune response and thus is a target for cancer immunotherapy. CD137 ligand (CD137L) is the only known natural ligand of CD137, and is constitutively expressed on several types of antigen presenting cells, such as activated B cells, monocytes, and splenic dendritic cells, and can be induced on T lymphocytes.

CD137L is a trimeric protein that exists as a membrane-bound form and as a soluble variant. The ability of soluble CD137L to activate CD137, e.g., on CD137-expressing lymphocytes is limited, however, and large concentrations are required to elicit an effect (Wyzgol et al., *J Immunol*, 2009). The natural way of activation of CD137 is via the engagement of a CD137-positive cell with a CD137L-positive cell. CD137 activation is then thought to be induced by clustering through CD137L on the opposing cell, leading to signaling via TRAF1, 2 and 3 (Yao et al., *Nat Rev Drug Discov*, 2013, Snell et al., *Immunol Rev*, 2011) and further concomitant downstream effects in the CD137-positive T-cell. In the case of T-cells activated by recognition of their respective cognate targets, the effects elicited by costimulation of CD137 are a further enhanced activation, enhanced survival and proliferation, the production of pro-inflammatory cytokines and an improved capacity to kill.

The benefit of CD137 costimulation for the elimination of cancer cells has been demonstrated in a number of in vivo models. The forced expression of CD137L on a tumor, for example, leads to tumor rejection (Melero et al., *Eur J Immunol*, 1998). Likewise, the forced expression of an anti-CD137 scFv on a tumor leads to a CD4+ T-cell and NK-cell dependent elimination of the tumor (Yang et al., *Cancer Res*, 2007, Zhang et al., *Mol Cancer Ther*, 2006, Ye et al., *Nat Med*, 2002). A systemically administered anti-CD137 antibody has also been demonstrated to lead to retardation of tumor growth (Martinet et al., *Gene Ther*, 2002).

It has been shown that CD137 is an excellent marker for naturally occurring tumor-reactive T cells in human tumors (Ye et al., *Clin Cancer Res*, 2014), and that anti-CD137 antibodies can be employed to improve the expansion and activity of CD8+ melanoma tumor-infiltrating lymphocytes for the application in adoptive T-cell therapy (Chacon et al., *PLoS One*, 2013).

The preclinical demonstration of the potential therapeutic benefit of CD137 costimulation has spurred the development of therapeutic antibodies targeting CD137, including BMS-663513 (described in U.S. Pat. No. 7,288,638) and PF-05082566 (Fisher et al., *Cancer Immunol Immunother*, 2012).

The present disclosure provides, among other things, novel approaches for simultaneously engaging CD137 and GPC3 via one or more fusion proteins having the properties of binding specificity for CD137 and binding specificity for GPC3.

II. DEFINITIONS

The following list defines terms, phrases, and abbreviations used throughout the instant specification. All terms listed and defined herein are intended to encompass all grammatical forms.

As used herein, unless otherwise specified, "CD137" means human CD137 (huCD137). Human CD137 means a full-length protein defined by UniProt Q07011, a fragment thereof, or a variant thereof. CD137 is also known as 4-1BB, tumor necrosis factor receptor superfamily member 9 (TNFRSF9), and induced by lymphocyte activation (ILA). In some particular embodiments, CD137 of non-human species, e.g., cynomolgus CD137 and mouse CD137, is used.

As used herein, unless otherwise specified, "Glypican-3" or "GPC3" means human GPC3 (huGPC3). Human GPC3 means a full-length protein defined by UniProt P51654, a fragment thereof, or a variant thereof. Human GPC3 is encoded by the GPC3 gene. GPC3 is also known as DGSX, GTR2-2, MXR7, OCI-5, SDYS, SGB, SGBS, or SGBS1. In some particular embodiments, GPC3 of non-human species, e.g., cynomolgus GPC3 and mouse GPC3, is used.

As used herein, "binding affinity" describes the ability of a biomolecule (e.g., a polypeptide or a protein) of the disclosure (e.g., a lipocalin mutein, an antibody, a fusion protein, or any other peptide or protein) to bind a selected target and form a complex. Binding affinity is measured by a number of methods known to those skilled in the art including, but are not limited to, fluorescence titration, enzyme-linked immunosorbent assay (ELISA)-based assays, including direct and competitive ELISA, calorimetric methods, such as isothermal titration calorimetry (ITC), and surface plasmon resonance (SPR). These methods are well-established in the art and some examples of such methods are further described herein. Binding affinity is thereby reported as a value of dissociation constant ($K_D$), half maximal effective concentration ($EC_{50}$), or half maximal inhibitory concentration ($IC_{50}$) measured using such these methods. A lower $K_D$, $EC_{50}$, or $IC_{50}$ value reflects better (higher) binding ability (affinity). Accordingly, the binding affinities of two biomolecules toward a selected target can be measured and compared. When comparing the binding affinities of two biomolecules toward the selected target, the term "about the same," "substantially the same" or "substantially similar" means one biomolecule has a binding affinity reported as a $K_D$, an $EC_{50}$, or an $IC_{50}$ value that is identical or similar to another molecule within the experimental variability of the binding affinity measurement. The experimental variability of the binding affinity measurement is dependent upon the specific method used and is known to those skilled in the art.

As used herein, the term "substantially" may also refer to the qualitative condition of exhibiting total or near-total extent or degree of a characteristic or property of interest. One of ordinary skill in the biological arts will understand that biological and chemical phenomena rarely, if ever, go to completion and/or proceed to completeness or achieve or avoid an absolute result. The term "substantially" is therefore used herein to capture the potential lack of completeness inherent in many biological and chemical phenomena.

As used herein, the term "detect," "detection," "detectable," or "detecting" is understood both on a quantitative and a qualitative level, as well as a combination thereof. It thus includes quantitative, semi-quantitative, and qualitative measurements performed on a biomolecule of the disclosure.

As used herein, "detectable affinity" generally means the binding ability between a biomolecule and its target, reported by a $K_D$, $EC_{50}$, or $IC_{50}$ value, is at most about $10^{-5}$ M or lower. A binding affinity, reported by a $K_D$, $EC_{50}$, or $IC_{50}$ value, higher than $10^{-5}$ M is generally no longer measurable with common methods such as ELISA and SPR and is therefore of secondary importance.

It is noted that the complex formation between the biomolecule of the disclosure and its target is influenced by many different factors such as the concentrations of the respective target, the presence of competitors, pH and the ionic strength of the buffer system used, the experimental method used for determination of the binding affinity (e.g., fluorescence titration, competitive ELISA (also called competition ELISA), and surface plasmon resonance), and even the mathematical algorithm used for evaluation of the experimental data. Therefore, it is clear to the skilled person that binding affinity reported by a $K_D$, $EC_{50}$, or $IC_{50}$ value may vary within a certain experimental range, depending on the method and experimental setup. This means that there may be a slight deviation in the measured $K_D$, $EC_{50}$, or $IC_{50}$ values or a tolerance range depending, for example, on whether such values were determined by ELISA (including direct or competition ELISA), by SPR, or by another method.

As used herein, "specific for," "specific binding," "specifically bind," or "binding specificity" relates to the ability of a biomolecule to discriminate between the desired target (for example, CD137 and GPC3) and one or more reference targets (for example, cellular receptor for neutrophil gelatinase-associated lipocalin). It is understood that such specificity is not an absolute but a relative property and can be determined, for example, in accordance with SPR, western blots, ELISA, fluorescence activated cell sorting (FACS), radioimmunoassay (RIA), electrochemiluminescence (ECL), immunoradiometric assay (IRMA), ImmunoHistoChemistry (IHC), and peptide scans.

When used herein in the context of the fusion protein of the present disclosure that bind to CD137 and GPC3, the term "specific for," "specific binding," "specifically bind," or "binding specificity" means that the fusion protein binds to, reacts with, or is directed against CD137 and GPC3, as described herein, but does not essentially bind another protein. The term "another protein" includes any proteins that are not CD137 or GPC3 or proteins closely related to or being homologous to CD137 or GPC3. However, CD137 or GPC3 from species other than human and fragments and/or variants of CD137 or GPC3 are not excluded by the term "another protein." The term "does not essentially bind" means that the fusion proteins of the present disclosure bind another protein with lower binding affinity than CD137 and/or GPC3, i.e., shows a cross-reactivity of less than 30%, preferably 20%, more preferably 10%, particularly preferably less than 9, 8, 7, 6, or 5%. Whether the fusion protein specifically reacts as defined herein above can easily be tested, inter alia, by comparing the reaction of a fusion protein of the present disclosure with CD137 and/or GPC3 and the reaction of said fusion protein with (an)other protein (s).

As used herein, the term "lipocalin" refers to a monomeric protein of approximately 18-20 kDa in weight, having a cylindrical β-pleated sheet supersecondary structural region comprising a plurality of β-strands (preferably eight β-strands designated A to H) connected pair-wise by a plurality of (preferably four) loops at one end to thereby comprise a ligand-binding pocket and define the entrance to the ligand-binding pocket. Preferably, the loops comprising the ligand-binding pocket used in the present invention are loops connecting the open ends of β-strands A and B, C and D, E and F, and G and H, and are designated loops AB, CD, EF, and GH. It is well-established that the diversity of the said loops in the otherwise rigid lipocalin scaffold gives rise to a variety of different binding modes among the lipocalin family members, each capable of accommodating targets of different sizes, shape, and chemical character (reviewed, e.g. in Skerra, *Biochim Biophys Acta,* 2000, Flower et al., *Biochim Biophys Acta,* 2000, Flower, *Biochem J,* 1996). It is understood that the lipocalin family of proteins has naturally evolved to bind a wide spectrum of ligands, sharing unusually low levels of overall sequence conservation (often with sequence identities of less than 20%) yet retaining a highly conserved overall folding pattern. The correspondence between positions in various lipocalins is also well-known to one of skill in the art (see, e.g., U.S. Pat. No. 7,250,297). Proteins fall in the definition of "lipocalin" as used herein include, but not limited to, human lipocalins including tear lipocalin (Tlc, Lcn1), Lipocalin-2 (Lcn2) or neutrophil gelatinase-associated lipocalin (NGAL), apolipoprotein D (ApoD), apolipoprotein M, $\alpha_1$-acid glycoprotein 1, $\alpha_1$-acid glycoprotein 2, $\alpha_1$-microglobulin, complement component 8$\gamma$, retinol-binding protein (RBP), the epididymal retinoic acid-binding protein, glycodelin, odorant-binding protein IIa, odorant-binding protein IIb, lipocalin-15 (Lcn15), and prostaglandin D synthase.

As used herein, unless otherwise specified, "tear lipocalin" refers to human tear lipocalin (hTlc) and further refers to mature human tear lipocalin. The term "mature" when used to characterize a protein means a protein essentially free from the signal peptide. A "mature hTlc" of the instant disclosure refers to the mature form of human tear lipocalin, which is free from the signal peptide. Mature hTlc is described by residues 19-176 of the sequence deposited with the SWISS-PROT Data Bank under Accession Number P31025, and the amino acid of which is indicated in SEQ ID NO: 1.

As used herein, "Lipocalin-2" or "neutrophil gelatinase-associated lipocalin" refers to human Lipocalin-2 (hLcn2) or human neutrophil gelatinase-associated lipocalin (hNGAL) and further refers to the mature human Lipocalin-2 or mature human neutrophil gelatinase-associated lipocalin. The term "mature" when used to characterize a protein means a protein essentially free from the signal peptide. A "mature hNGAL" of the instant disclosure refers to the mature form of human neutrophil gelatinase-associated lipocalin, which is free from the signal peptide. Mature hNGAL is described by residues 21-198 of the sequence deposited with the SWISS-PROT Data Bank under Accession Number P80188, and the amino acid of which is indicated in SEQ ID NO: 2.

As used herein, a "native sequence" refers to a protein or a polypeptide having a sequence that occurs in nature or having a wild-type sequence, regardless of its mode of preparation. Such native sequence protein or polypeptide can be isolated from nature or can be produced by other means, such as by recombinant or synthetic methods. The "native sequence lipocalin" refers to a lipocalin having the same amino acid sequence as the corresponding polypeptide derived from nature. Thus, a native sequence lipocalin can have the amino acid sequence of the respective naturally-occurring (wild-type) lipocalin from any organism, in particular, a mammal. The term "native sequence", when used in the context of a lipocalin specifically encompasses naturally-occurring truncated or secreted forms of the lipocalin, naturally-occurring variant forms such as alternatively spliced forms and naturally-occurring allelic variants of the lipocalin. The terms "native sequence lipocalin" and "wild-type lipocalin" are used interchangeably herein.

As used herein, a "mutein," a "mutated" entity (whether protein or nucleic acid), or "mutant" refers to the exchange, deletion, or insertion of one or more amino acids or nucleotides, compared to the naturally-occurring (wild-type) protein or nucleic acid. Said term also includes fragments of a mutein as described herein. The present disclosure explicitly encompasses lipocalin muteins, as described herein, having a cylindrical $\beta$-pleated sheet supersecondary structural region comprising eight $\beta$-strands connected pair-wise by four loops at one end to thereby comprise a ligand-binding pocket and define the entrance of the ligand-binding pocket, wherein at least one amino acid of each of at least three of said four loops has been mutated as compared to the native sequence lipocalin. Lipocalin muteins of the present invention thereof preferably have the function of binding CD137 as described herein.

As used herein, the term "fragment," in connection with the lipocalin muteins of the disclosure, refers to proteins or polypeptides derived from full-length mature hTlc or hNGAL or lipocalin muteins that are N-terminally and/or C-terminally truncated, i.e., lacking at least one of the N-terminal and/or C-terminal amino acids. Such fragments may include at least 10 or more, such as 20 or 30 or more consecutive amino acids of the primary sequence of mature hTlc or hNGAL or the lipocalin mutein it is derived and are usually detectable in an immunoassay of mature hTlc or hNGAL. Such a fragment may lack up to 2, up to 3, up to 4, up to 5, up to 10, up to 15, up to 20, up to 25, or up to 30 (including all numbers in between) of the N-terminal and/or C-terminal amino acids. As an illustrative example, such a fragment may lack the one, two, three, or four N-terminal (His-His-Leu-Leu) and/or one or two C-terminal amino acids (Ser-Asp) of mature hTlc. It is understood that the fragment is preferably a functional fragment of mature hTlc or hNGAL or the lipocalin mutein from which it is derived, which means that it preferably retains the binding specificity, preferably to CD137, of mature hTlc/hNGAL or lipocalin mutein it is derived from. As an illustrative example, such a functional fragment may comprise at least amino acids at positions 5-153, 5-150, 9-148, 12-140, 20-135, or 26-133 corresponding to the linear polypeptide sequence of mature hTlc. As another illustrative example, such a functional fragment may comprise at least amino acids at positions 13-157, 15-150, 18-141, 20-134, 25-134, or 28-134 corresponding to the linear polypeptide sequence of mature hNGAL.

A "fragment" with respect to the corresponding target CD137 or GPC3 of a fusion protein of the disclosure, refers to N-terminally and/or C-terminally truncated CD137 or GPC3 or protein domains of CD137 or GPC3. Fragments of CD137 or fragments of GPC3 as described herein retain the capability of the full-length CD137 or GPC3 to be recognized and/or bound by a fusion protein of the disclosure. As an illustrative example, the fragment may be an extracellular domain of CD137 or GPC3. As an illustrative example, such an extracellular domain may comprise amino acids of the extracellular subdomains of CD137, such as the individual or combined amino acid sequences of domain 1 (residues 24-45 of UniProt Q07011), domain 2 (residues 46-86), domain 3 (87-118) and domain 4 (residues 119-159).

As used herein, the term "variant" relates to derivatives of a protein or polypeptide that include mutations, for example by substitutions, deletions, insertions, and/or chemical modifications of an amino acid sequence or nucleotide sequence. In some embodiments, such mutations and/or chemical modifications do not reduce the functionality of the protein or peptide. Such substitutions may be conservative, i.e., an amino acid residue is replaced with a chemically similar amino acid residue. Examples of conservative substitutions are the replacements among the members of the following groups: 1) alanine, serine, threonine, and valine; 2) aspartic acid, glutamic acid, glutamine, and asparagine, and histidine; 3) arginine, lysine, glutamine, asparagine, and histidine; 4) isoleucine, leucine, methionine, valine, alanine, phenylalanine, threonine, and proline; and 5) isoleucine, leucine, methionine, phenylalanine, tyrosine, and tryptophan. Such variants include proteins or polypeptides, wherein one or more amino acids have been substituted by their respective D-stereoisomers or by amino acids other than the naturally occurring 20 amino acids, such as, for example, ornithine, hydroxyproline, citrulline, homoserine, hydroxylysine, norvaline. Such variants also include, for instance, proteins or polypeptides in which one or more amino acid residues are added or deleted at the N- and/or C-terminus. Generally, a variant has at least about 50%, 60%, 70%, 75%, 80%, 85%, 90%, 92%, 95% or at least about 98% amino acid sequence identity with the native sequence protein or polypeptide. A variant preferably retains the biological activity, e.g. binding the same target, of the protein or polypeptide it is derived.

The term "variant", as used herein with respect to the corresponding protein ligand CD137 or GPC3 of a fusion protein of the disclosure, relates to CD137 or GPC3 or fragment thereof, respectively, that has one or more such as 1, 2, 3, 4, 5, 6, 7, 8, 9, 10, 12, 14, 16, 18, 20, 22, 24, 26, 28, 30, 40, 50, 60, 70, 80 or more amino acid substitutions, deletions and/or insertions in comparison to the native sequence of CD137 or GPC3 (wild-type CD137 or GPC3), such as CD137 as deposited with UniProt Q07011 or GPC3 as deposited with UniProt P51654 as described herein. A CD137 variant or a GPC3 variant, respectively, has preferably an amino acid identity of at least 50%, 60%, 70%, 80%, 85%, 90% or 95% with a wild-type CD137 or GPC3. A CD137 variant or a GPC3 variant as described herein retains the ability to bind fusion proteins specific to CD137 and GPC3 disclosed in the instant invention.

The term "variant", as used herein with respect to a lipocalin mutein, relates to a lipocalin mutein or fragment thereof of the disclosure, wherein the sequence has mutations, including substitutions, deletions, and insertions, and/ or chemical modifications. A variant of lipocalin mutein as described herein retains the biological activity, e.g., binding to CD137, of the lipocalin mutein from which it is derived. Generally, a lipocalin mutein variant has at least about 50%, 60%, 70%, 75%, 80%, 85%, 90%, 92%, 95%, 98% amino acid sequence identity with the lipocalin mutein from which it is derived.

As used herein, the term "mutagenesis" refers to the introduction of mutations into a polynucleotide or amino acid sequence. Mutations are preferably introduced under experimental conditions such that the amino acid naturally occurring at a given position of the protein or polypeptide sequence of can be altered, for example substituted by at least one amino acid. The term "mutagenesis" also includes the (additional) modification of the length of sequence segments by deletion or insertion of one or more amino acids. Thus, it is within the scope of the disclosure that, for example, one amino acid at a chosen sequence position is replaced by a stretch of three amino acids, leading to an addition of two amino acid residues compared to the length of the respective segment of the native protein or polypeptide amino acid sequence. Such an insertion or deletion may be introduced independently from each other in any of the sequence segments that can be subjected to mutagenesis in the disclosure. In one exemplary embodiment of the disclosure, an insertion may be introduced into amino acid sequence segment corresponding to the loop AB of the native sequence lipocalin (cf. International Patent Publication No. WO 2005/019256, which is incorporated by reference in its entirety herein).

As used herein, the term "random mutagenesis" means that no predetermined mutation (alteration of amino acid) is present at a certain sequence position but that at least two amino acids can be incorporated with a certain probability at a predefined sequence position during mutagenesis.

As used herein, the term "sequence identity" or "identity" denotes a property of sequences that measures their similarity or relationship. The term "sequence identity" or "identity" as used in the present disclosure means the percentage of pair-wise identical residues—following (homologous) alignment of a sequence of a protein or polypeptide of the disclosure with a sequence in question—with respect to the number of residues in the longer of these two sequences. Sequence identity is measured by dividing the number of identical amino acid residues by the total number of residues and multiplying the product by 100.

As used herein, the term "sequence homology" or "homology" has its usual meaning and homologous amino acid includes identical amino acids as well as amino acids which are regarded to be conservative substitutions at equivalent positions in the linear amino acid sequence of a protein or polypeptide of the disclosure (e.g., any fusion proteins or lipocalin muteins of the disclosure).

A skilled artisan will recognize available computer programs, for example BLAST (Altschul et al., *Nucleic Acids Res*, 1997), BLAST2 (Altschul et al., *J Mol Biol*, 1990), and Smith-Waterman (Smith and Waterman, *J Mol Biol*, 1981), for determining sequence homology or sequence identity using standard parameters. The percentage of sequence homology or sequence identity can, for example, be determined herein using the program BLASTP, version 2.2.5, Nov. 16, 2002 (Altschul et al., *Nucleic Acids Res*, 1997). In this embodiment, the percentage of homology is based on the alignment of the entire protein or polypeptide sequences (matrix: BLOSUM 62; gap costs: 11.1; cutoff value set to $10^{-3}$) including the propeptide sequences, preferably using the wild-type protein scaffold as reference in a pairwise comparison. It is calculated as the percentage of numbers of "positives" (homologous amino acids) indicated as result in the BLASTP program output divided by the total number of amino acids selected by the program for the alignment.

Specifically, in order to determine whether an amino acid residue of the amino acid sequence of a lipocalin mutein is different from a wild-type lipocalin corresponding to a certain position in the amino acid sequence of a wild-type lipocalin, a skilled artisan can use means and methods well-known in the art, e.g., alignments, either manually or by using computer programs such as BLAST 2.0, which stands for Basic Local Alignment Search Tool, or ClustalW, or any other suitable program which is suitable to generate sequence alignments. Accordingly, a wild-type sequence of lipocalin can serve as "subject sequence" or "reference sequence," while the amino acid sequence of a lipocalin mutein different from the wild-type lipocalin described herein serves as "query sequence." The terms "wild-type sequence," "reference sequence," and "subject sequence" are used interchangeably herein. A preferred wild-type sequence of lipocalin is the sequence of hTLc as shown in SEQ ID NO: 1 or hNGAL as shown in SEQ ID NO: 2.

"Gaps" are spaces in an alignment that are the result of additions or deletions of amino acids. Thus, two copies of exactly the same sequence have 100% identity, but sequences that are less highly conserved, and have deletions, additions, or replacements, may have a lower degree of sequence identity.

As used herein, the term "position" means the position of either an amino acid within an amino acid sequence depicted herein or the position of a nucleotide within a nucleic acid sequence depicted herein. It is to be understood that when the term "correspond" or "corresponding" as used herein in the context of the amino acid sequence positions of one or more lipocalin muteins, a corresponding position is not only determined by the number of the preceding nucleotides or amino acids. Accordingly, the absolute position of a given amino acid in accordance with the disclosure may vary from the corresponding position due to deletion or addition of amino acids elsewhere in a (mutant or wild-type) lipocalin. Similarly, the absolute position of a given nucleotide in accordance with the present disclosure may vary from the corresponding position due to deletions or additional nucleotides elsewhere in a mutein or wild-type lipocalin 5'-untranslated region (UTR) including the promoter and/or any other regulatory sequences or gene (including exons and introns).

A "corresponding position" in accordance with the disclosure may be the sequence position that aligns to the sequence position it corresponds to in a pairwise or multiple sequence alignment according to the present disclosure. It is preferably to be understood that for a "corresponding position" in accordance with the disclosure, the absolute positions of nucleotides or amino acids may differ from adjacent nucleotides or amino acids but said adjacent nucleotides or amino acids which may have been exchanged, deleted, or added may be comprised by the same one or more "corresponding positions".

In addition, for a corresponding position in a lipocalin mutein based on a reference sequence in accordance with the disclosure, it is preferably to be understood that the positions of nucleotides or amino acids of a lipocalin mutein can structurally correspond to the positions elsewhere in a reference lipocalin (wild-type lipocalin) or another lipocalin mutein, even if they may differ in the absolute position numbers, as appreciated by the skilled in light of the highly-conserved overall folding pattern among lipocalins.

As used interchangeably herein, the terms "conjugate," "conjugation," "fuse," "fusion," or "linked" refer to the joining together of two or more subunits, through all forms of covalent or non-covalent linkage, by means including, but not limited to, genetic fusion, chemical conjugation, coupling through a linker or a cross-linking agent, and non-covalent association.

The term "fusion polypeptide" or "fusion protein" as used herein refers to a polypeptide or protein comprising two or more subunits. In some embodiments, a fusion protein as described herein comprises two or more subunits, at least one of these subunits being capable of specifically binding to CD137, and a further subunit capable of specifically binding to GPC3. Within the fusion protein, these subunits may be linked by covalent or non-covalent linkage. Preferably, the fusion protein is a translational fusion between the two or more subunits. The translational fusion may be generated by genetically engineering the coding sequence for one subunit in a reading frame with the coding sequence of a further subunit. Both subunits may be interspersed by a nucleotide sequence encoding a linker. However, the subunits of a fusion protein of the present disclosure may also be linked through chemical conjugation. The subunits forming the fusion protein are typically linked to each other C-terminus of one subunit to the N-terminus of another subunit, or C-terminus of one subunit to C-terminus of another subunit, or N-terminus of one subunit to N-terminus of another subunit, or N-terminus of one subunit to C-terminus of another subunit. The subunits of the fusion protein can be linked in any order and may include more than one of any of the constituent subunits. If one or more of the subunits is part of a protein (complex) that consists of more than one polypeptide chain, the term "fusion protein" may also refer to the protein comprising the fused sequences and all other polypeptide chain(s) of the protein (complex). As an illustrative example, where a full-length immunoglobulin is fused to a lipocalin mutein via a heavy or light chain of the immunoglobulin, the term "fusion protein" may refer to the single polypeptide chain comprising the lipocalin mutein and the heavy or light chain of the immunoglobulin. The term "fusion protein" may also refer to the entire immunoglobulin (both light and heavy chains) and the lipocalin mutein fused to one or both of its heavy and/or light chains.

As used herein, the term "subunit" of a fusion protein disclosed herein refers to a single protein or a separate polypeptide chain, which may form a stable folded structure by itself and define a unique function of providing binding motif towards a target. In some embodiments, a preferred subunit of the disclosure is a lipocalin mutein. In some other embodiments, a preferred subunit of the disclosure is a full-length immunoglobulin or an antigen-binding domain thereof.

A "linker" that may be comprised by a fusion protein of the present disclosure joins together two or more subunits of a fusion protein as described herein. The linkage can be covalent or non-covalent. A preferred covalent linkage is via a peptide bond, such as a peptide bond between amino acids. A preferred linker is a peptide linker. Accordingly, in a preferred embodiment, said linker comprises one or more amino acids, such as 1, 2, 3, 4, 5, 6, 7, 8, 9, 10, 11, 12, 13, 14, 15, 16, 17, 18, 19, 20 or more amino acids. Preferred peptide linkers are described herein, including glycine-serine (GS) linkers, glycosylated GS linkers, and proline-alanine-serine polymer (PAS) linkers. In some preferred embodiments, a GS linker is a $(G_4S)_3$ as described in SEQ ID NO: 13 is used to join together the subunits of a fusion protein. Other preferred linkers include chemical linkers.

As used herein, the term "albumin" includes all mammal albumins such as human serum albumin or bovine serum albumin or rat serum albumin.

As used herein, the term "organic molecule" or "small organic molecule" denotes an organic molecule comprising at least two carbon atoms, but preferably not more than 7 or 12 rotatable carbon bonds, having a molecular weight in the range between 100 and 2,000 daltons, preferably between 100 and 1,000 daltons, and optionally including one or two metal atoms.

A "sample" is defined as a biological sample taken from any subject. Biological samples include, but are not limited to, blood, serum, urine, feces, semen, or tissue, including tumor tissue.

A "subject" is a vertebrate, preferably a mammal, more preferably a human. The term "mammal" is used herein to refer to any animal classified as a mammal, including, without limitation, humans, domestic and farm animals, and zoo, sports, or pet animals, such as sheep, dogs, horses, cats, cows, rats, pigs, apes such as cynomolgus monkeys, to name only a few illustrative examples. Preferably, the "mammal" used herein is human.

An "effective amount" is an amount sufficient to yield beneficial or desired results. An effective amount can be administered in one or more individual administrations or doses.

As used herein, "antibody" includes whole antibodies or any antigen binding fragment (i.e., "antigen-binding portion") or single chain thereof. A whole antibody refers to a glycoprotein comprising at least two heavy chains (HCs) and two light chains (LCs) inter-connected by disulfide bonds. Each heavy chain is comprised of a heavy chain variable domain ($V_H$ or HCVR) and a heavy chain constant region ($C_H$). The heavy chain constant region is comprised of three domains, $C_{H1}$, $C_{H2}$ and $C_{H3}$. Each light chain is comprised of a light chain variable domain ($V_L$ or LCVR) and a light chain constant region ($C_L$). The light chain constant region is comprised of one domain, $C_L$. The $V_H$ and $V_L$ regions can be further subdivided into regions of hypervariability, termed complementarity determining regions (CDRs), interspersed with regions that are more conserved, termed framework regions (FRs). Each $V_H$ and $V_L$ is composed of three CsRs and four FRs, arranged in the following order from the amino-terminus to the carboxy-terminus: FR1, CDR1, FR2, CDR2, FR3, CDR3, FR4. The variable regions of the heavy and light chains contain a binding domain that interacts with an antigen (for example, GPC3). The constant regions of the antibodies may optionally mediate the binding of the immunoglobulin to host tissues or factors, including various cells of the immune system (e.g., effector cells) and the first component (C1q) of the classical complement system.

As used herein, "antigen binding fragment" of an antibody refers to one or more fragments of an antibody that retain the ability to specifically bind to an antigen (e.g., GPC3). It has been shown that the antigen-binding function of an antibody can be performed by fragments of a full-length antibody. Examples of binding fragments encompassed within the term "antigen-binding fragment" of an antibody include (i) a Fab fragment consisting of the $V_H$, $V_L$, $C_L$ and $C_{H1}$ domains; (ii) a F(ab')$_2$ fragment comprising two Fab fragments linked by a disulfide bridge at the hinge region; (iii) a Fab' fragment consisting of the $V_H$, $V_L$, $C_L$ and $C_{H1}$ domains and the region between $C_{H1}$ and $C_{H2}$ domains; (iv) a Fd fragment consisting of the $V_H$ and $C_{H1}$ domains; (v) a single-chain Fv fragment consisting of the $V_H$ and $V_L$ domains of a single arm of an antibody, (vi) a dAb fragment (Ward et al., Nature, 1989) consisting of a $V_H$ domain; and (vii) an isolated complementarity determining region (CDR) or a combination of two or more isolated CDRs which may optionally be joined by a synthetic linker; (viii) a "diabody" comprising the $V_H$ and $V_L$ connected in the same polypeptide chain using a short linker (see, e.g., patent documents EP 404,097; WO 93/11161; and Holliger et al., Proc Natl Acad Sci USA, 1993); (ix) a "domain antibody fragment" containing only the $V_H$ or $V_L$, where in some instances two or more $V_H$ regions are covalently joined.

Antibodies may be polyclonal or monoclonal; xenogeneic, allogeneic, or syngeneic; or modified forms thereof (e.g., humanized, chimeric, or multispecific). Antibodies may also be fully human.

As used herein, "framework" or "FR" refers to the variable domain residues other than the hypervariable region (CDR) residues.

"Fragment crystallizable region" or "Fc region" refers to the C-terminal region of an immunoglobulin heavy chain, including native-sequence Fc regions and variant Fc regions. Although the boundaries of the Fc region of an immunoglobulin heavy chain might vary, the human IgG heavy-chain Fc region is usually defined to stretch from an amino acid residue at position Cys226, or from Pro230, to the carboxyl-terminus thereof numbering according to EU index of Kabat (Johnson and Wu, Nucleic Acids Res, 2000). The C-terminal lysine (residue 447 according to EU index of Kabat) of the Fc region may be removed, for example, during production or purification of the antibody, or by recombinantly engineering the nucleic acid encoding a heavy chain of the antibody. Accordingly, a composition of intact antibodies may comprise antibody populations with all K447 residues removed, antibody populations with no K447 residues removed, and antibody populations having a mixture of antibodies with and without the K447 residue. Suitable native-sequence Fc regions for use in the antibodies of the invention include human IgG1, IgG2 (IgG2A, IgG2B), IgG3, and IgG4.

"Fc receptor" or "FcR" refers to a receptor that binds to the Fc region of an antibody.

As used herein, "isolated antibody" refers to an antibody that is substantially free of its natural environment. For instance, an isolated antibody is substantially free of cellular material and other proteins from the cell or tissue source from which it is derived. An "isolated antibody" further refers to an antibody that is substantially free of other antibodies having different antigenic specificities. In the present case, an isolated antibody that binds specifically GPC3 is substantially free of antibodies that specifically bind antigens other than GPC3. However, an isolated antibody that specifically binds GPC3 may have cross-reactivity to other antigens, such as GPC3 molecules from other species.

As used herein, "monoclonal antibody" refers to a preparation of antibody molecules of single molecular composition. A monoclonal antibody composition displays a single binding specificity and affinity for a particular epitope.

As used herein, "humanized antibody" refers to an antibody that consists of the CDR of antibodies derived from mammals other than human, and the FR region and the constant region of a human antibody or derived from a human antibody. In some embodiments a humanized antibody comprises a variable domain that has a variable region amino acid sequence which, analyzed as a whole, is closer to human than to other species as assessed using the Immunogenetics Information System (IMGT) DomainGapAlign tool, as described by Ehrenmann et al. (2010). In some embodiments, a humanized antibody may be useful as an effective component in a therapeutic agent due to the reduced antigenicity. The term "therapeutic agent" or "therapeutically active agent", as used herein, refers to an agent which is therapeutically useful. A therapeutic agent may be any agent for the prevention, amelioration, or treatment of a diseases, a physiological condition, a symptom, or for the evaluation or diagnosis thereof.

As used herein, "human antibody" includes antibodies having variable regions in which both the framework and CDR regions are derived from human germline immunoglobulin sequences. Furthermore, if the antibody contains a constant region, the constant region is also derived from human germline immunoglobulin sequences. The human antibodies of the invention may include amino acid residues not encoded by human germline immunoglobulin sequences (e.g., mutations introduced by random or site-specific mutagenesis in vitro or by somatic mutation in vivo). However, the term "human antibody", as used herein, is not intended to include antibodies in which CDR sequences derived from the germline of another mammalian species, such as a mouse, have been grafted onto human framework sequences.

III. DESCRIPTIONS OF FIGURES

FIG. 1: provides an overview over the design of the representative fusion proteins described in this application that are bispecific for the targets CD137 and GPC3. Representative fusion proteins were made based on an antibody specific for GPC3 (e.g. an antibody whereby heavy chain is provided by SEQ ID NO: 81, or comprise a heavy chain variable domain of SEQ ID NO: 78, or comprise the CDR sequences of GYTFTDYE (HCDR1, SEQ ID NO: 72), LDPKTGDT (HCDR2, SEQ ID NO: 73), and TRFYSYTY (HCDR3; SEQ ID NO: 74), and light chains are provided by SEQ ID NO: 82, or comprise a light chain variable domain of SEQ ID NO: 79, or comprise the CDR sequences of QSLVHSNRNTY (LCDR1, SEQ ID NO: 75), KVS (LCDR2, SEQ ID NO: 76), and SQNTHVPPT (LCDR3; SEQ ID NO: 77) and one or more lipocalin mutein specific for CD137 (e.g., the lipocalin mutein of SEQ ID NO: 40 or the lipocalin mutein having 97% sequence identity to SEQ ID NO: 49 and designated CD137Ac1). One or more lipocalin muteins were genetically fused to the C- and/or the N-terminus of either the heavy chain or the light chain of a GPC3 specific antibody as depicted in FIG. 1A-1I, resulting in the fusion proteins, e.g., SEQ ID NOs: 87 and 82, SEQ ID NOs: 88 and 82, SEQ ID NOs: 81 and 89, SEQ ID NOs: 81 and 90, and CD137Ac1-Fusion 1, CD137Ac1-Fusion 2, CD137Ac1-Fusion 3, CD137Ac1-Fusion 4, CD137Ac1-Fusion 5, CD137Ac1-Fusion 6, and CD137Ac1-Fusion 7 (fusion proteins having 97% sequence identity to SEQ ID NOs: 91 and 82, SEQ ID NOs: 92 and 82, SEQ ID NOs: 81 and 93, SEQ ID NOs: 81 and 94, SEQ ID NOs: 95 and 82, or SEQ ID NOs: 96 and 82). Additionally, the generated fusion proteins can be bivalent to CD137 (e.g., as depicted in FIG. 1A-1D), or tetravalent to CD137 (e.g., as depicted in FIG. 1E-1H), or have even higher valency to CD137 (e.g., as depicted in FIG. 1I). Additional monospecific fusion proteins were generated by fusing one or more GPC-3 specific lipocalin muteins or CD137 specific lipocalin muteins to the C-terminus of the Fc region of an antibody provided as described herein via a peptide linker (e.g., as depicted in FIG. 1J-1K). The resulting monospecific fusion proteins are provided in, e.g., SEQ ID NO: 97 and SEQ ID NO: 98.

Figure 2:
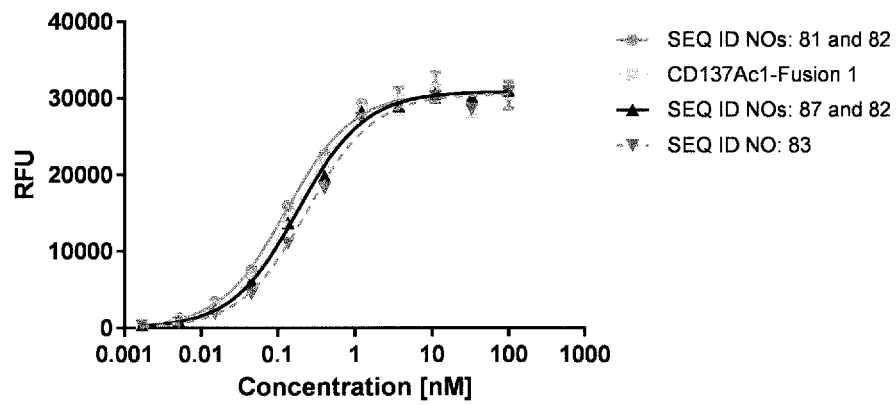
Figure 2:
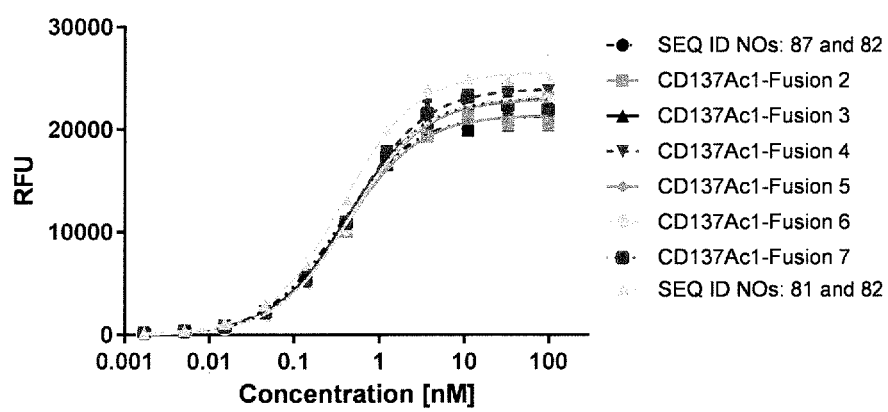
Figure 2:
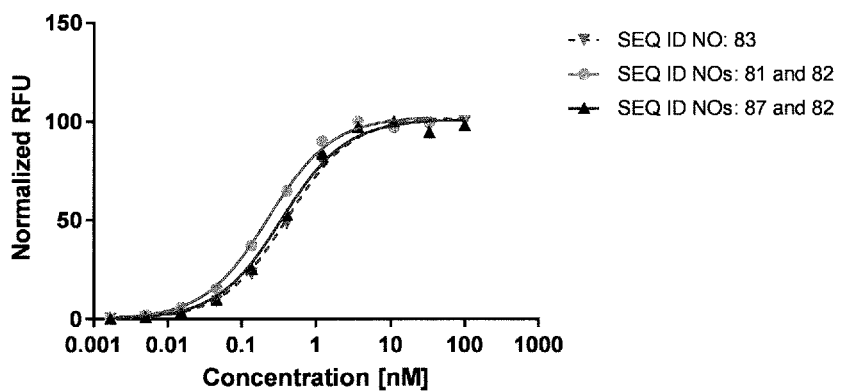
Figure 2:
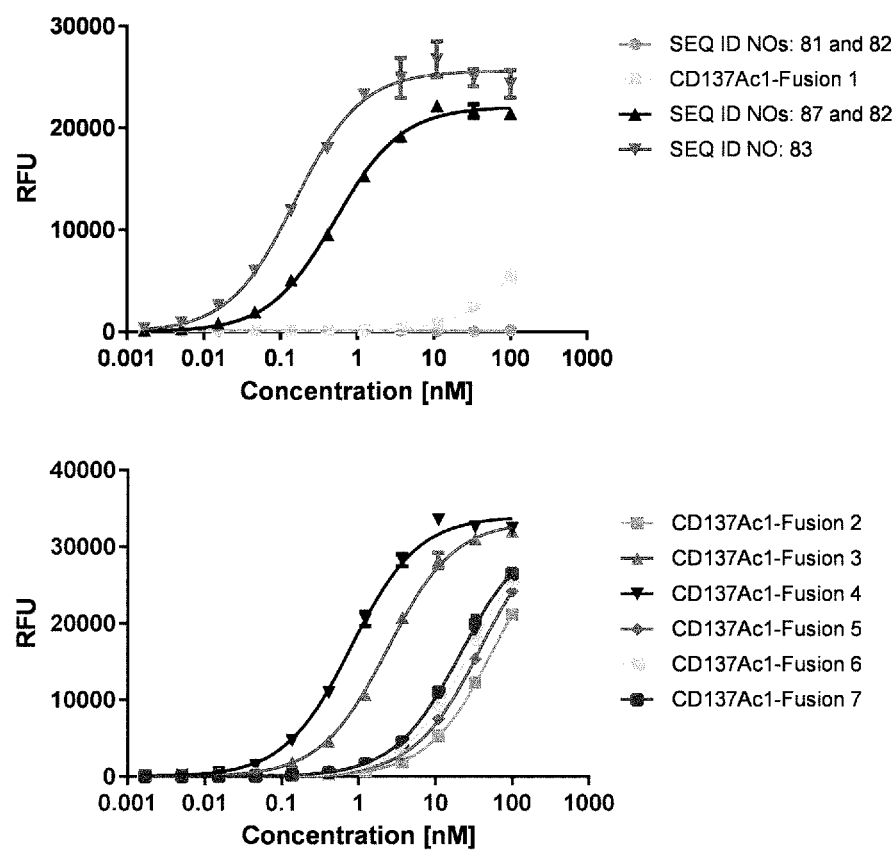

FIG. 2: shows the results of ELISA experiments in which the binding to human CPC3 (FIG. 2A), cynomolgus GPC3 (FIG. 2B), and human CD137 (FIG. 2C) of representative fusion proteins was determined as described in Example 3. GPC3 or C-terminal His-tagged CD137 was coated on a microtiter plate, and the tested agents were titrated starting with the highest concentration of 100 nM. Bound agents under study were detected via anti-human IgG Fc-horseradish peroxidase (HRP) or anti-NGAL-HRP respectively. The data was fit with a 1:1 binding model with $EC_{50}$ value and the maximum signal as free parameters, and a slope that was fixed to one. The resulting $EC_{50}$ values are provided in Table 4.

Figure 3:
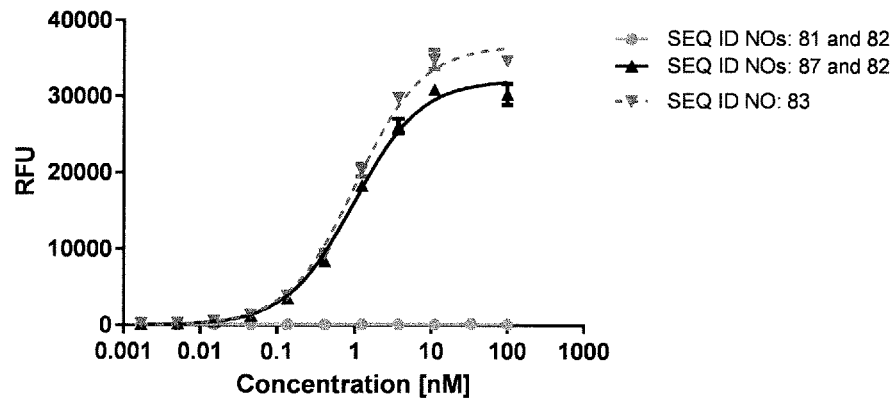
Figure 3:
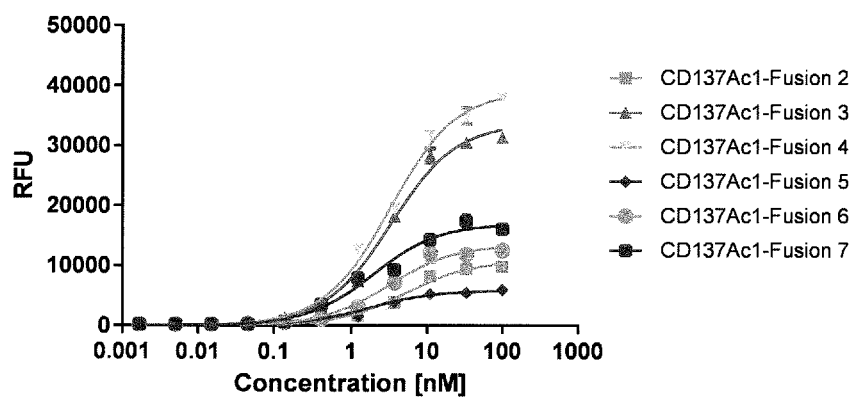
Figure 3:
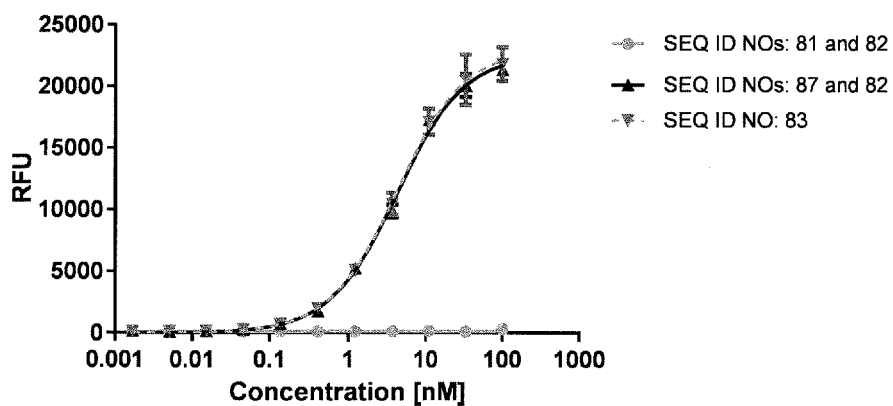

FIG. 3: illustrates the results of exemplary ELISA experiments in which the ability of representative fusion proteins to simultaneously bind both targets, GPC3 and CD137, was determined as described in Example 4. Recombinant huGPC3 (FIG. 3A) or huCD137-His (FIG. 3B) was coated on a microtiter plate, followed by a titration of the fusion proteins. Subsequently, a constant concentration of biotinylated huCD137-His (FIG. 3A) or biotinylated huGPC3 (FIG. 3B), respectively, was added, which was detected via ExtrAvidin-Peroxidase. The data was fitted with a 1:1 binding model with $EC_{50}$ value and the maximum signal as free parameters, and a slope that was fixed to unity. The resulting $EC_{50}$ values are provided in Table 3.

Figure 4:
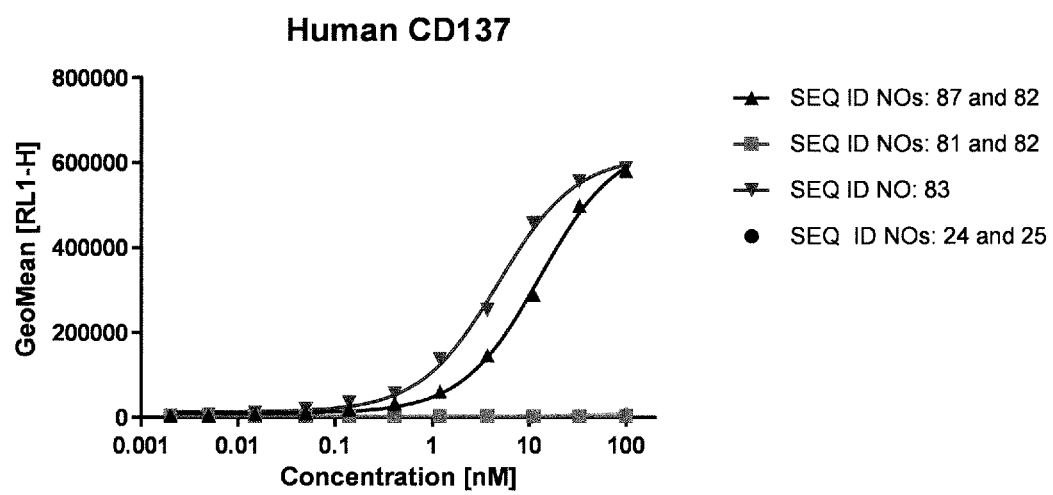
Figure 4:
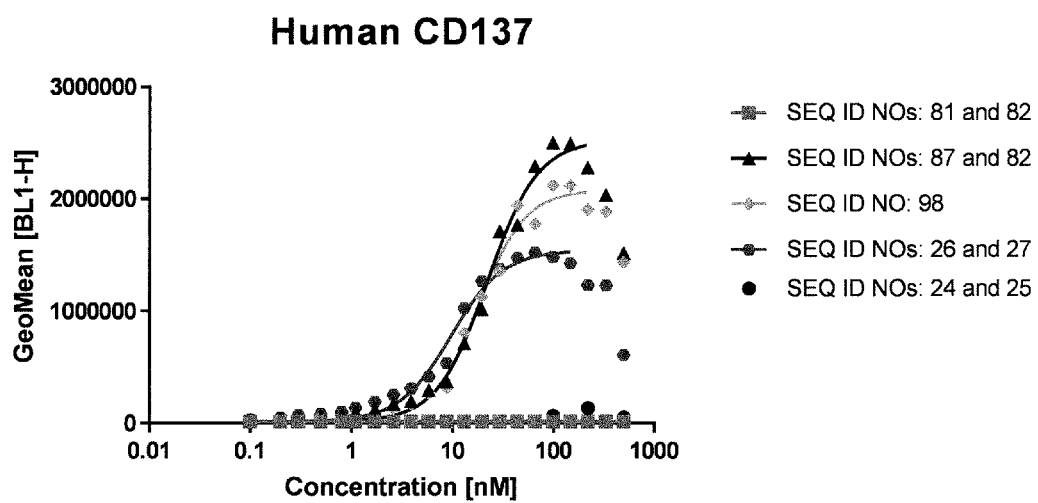
Figure 4:
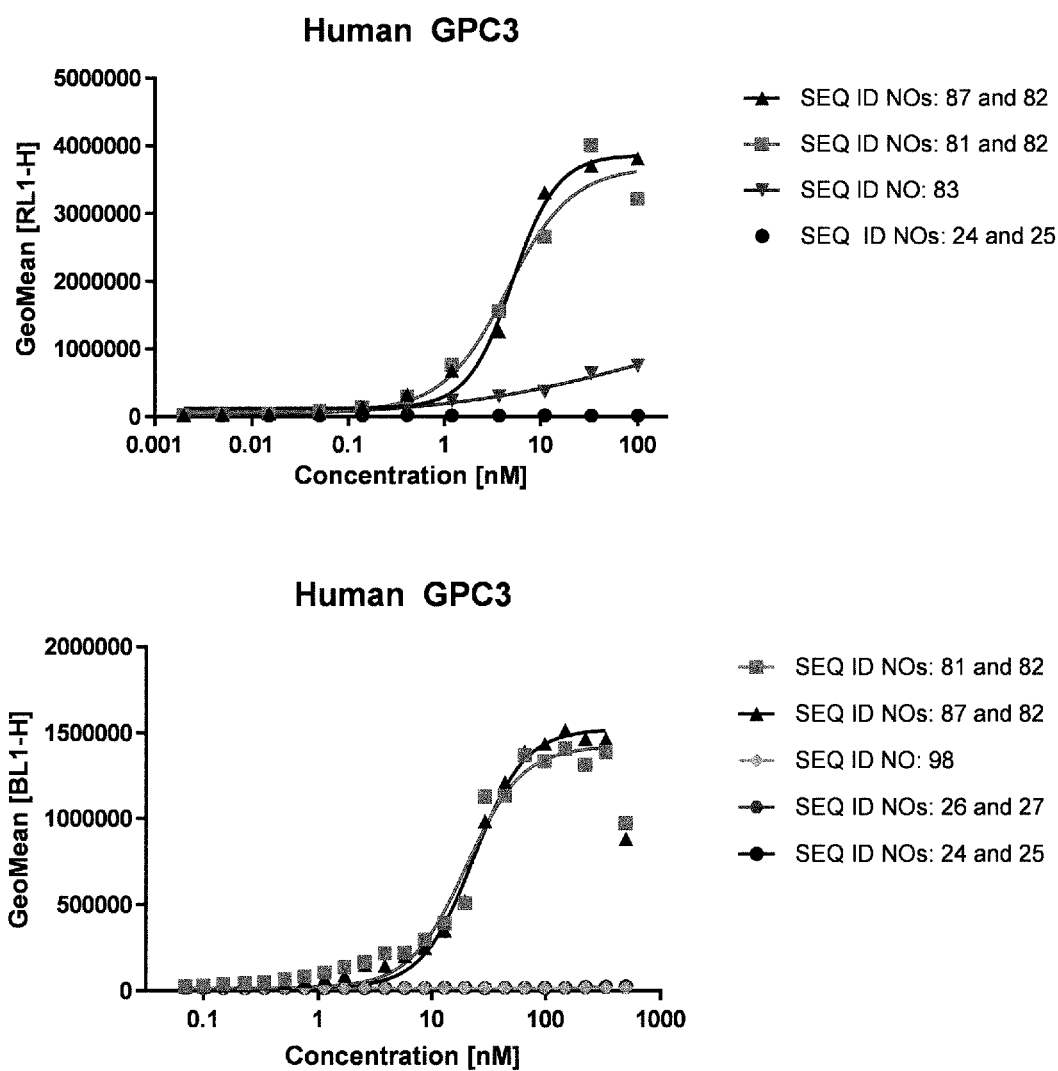

FIG. 4: shows the results of an assessment of the target binding of fusion proteins by flow cytometry using human-CD137 expressing CHO cells (FIG. 4A) as well as human GPC3-expressing SK-Hep1 (FIG. 4B) cells, as described in Example 6. No binding was observed when using mock transfected cells. The geometric means of the fluorescence intensity were used to calculate $EC_{50}$ values, which are provided in Table 6.

Figure 5:
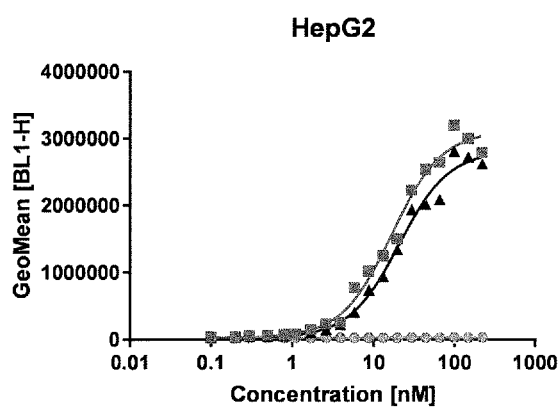
Figure 5:
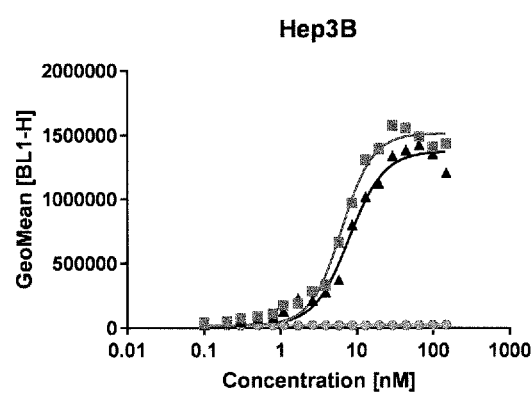
Figure 5:
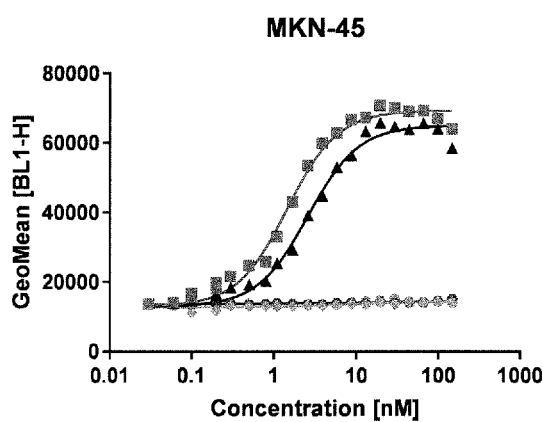
Figure 5:
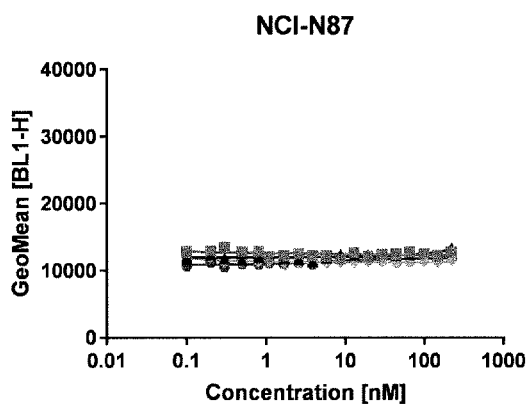

FIG. 5: shows the binding of fusion proteins to GPC3-positive tumor cells evaluated using flow cytometry. Tumor cell lines with different GPC3 expression levels (high to moderate expression: HepG2 (FIG. 5A)>Hep3B (FIG. 5B)>MKN-45 (FIG. 5C)) and the GPC3-negative cell line NCI-N87 (FIG. 5D) were incubated with different fusion proteins or controls as described in Example 7 and the corresponding binding affinities ($EC_{50}$s) are summarized in Table 7.

Figure 6:
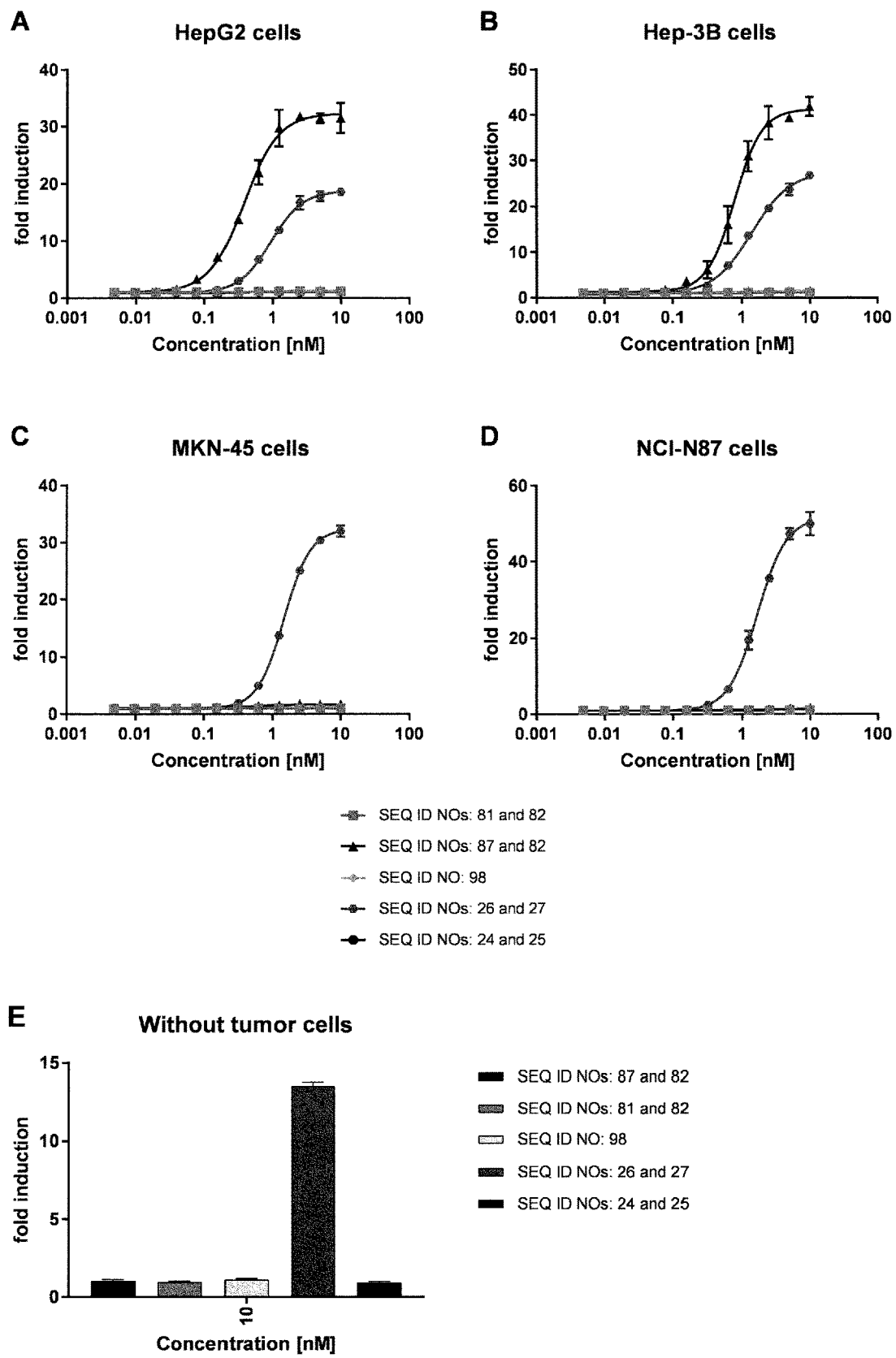

FIG. 6: shows the potential of representative fusion proteins to co-stimulate T-cell activation in a GPC3-target-dependent manner, assessed using a CD137 Bioassay. NFκB-luc2/CD137 Jurkat cells were co-cultured with the GPC3-expressing tumor cell lines (high to moderate expression: HepG2>Hep3B>MKN-45, GPC3 negative: NCI-N87, FIGS. 6A, 6B, 6C, and 6D, respectively) in the presence of various concentrations of the fusion proteins or controls. After 4 hours, luciferase assay reagent was added and luminescent signals were measured. Four-parameter logistic curve analysis was performed to calculate $EC_{50}$ values (see Table 7). The fusion proteins only co-stimulate T-cell activation in the abundance of GPC3 (FIGS. 6A and 6B) but not when there is insufficient or no GPC3 (FIGS. 6C and 6D). In contrast, the reference anti-CD137 mAb (SEQ ID NOs: 26 and 27) displays similar activation regardless of the level of GPC3 expression, in absence of GPC3-expressing cells, and in the absence of any tumor cells.

Figure 7:
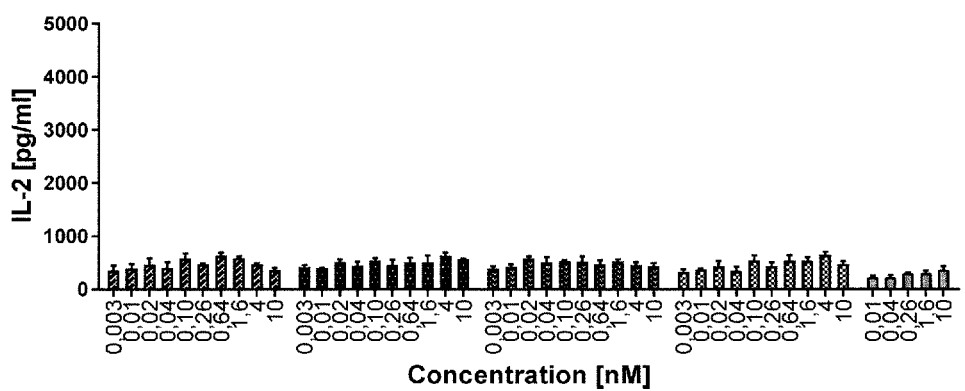
Figure 7:
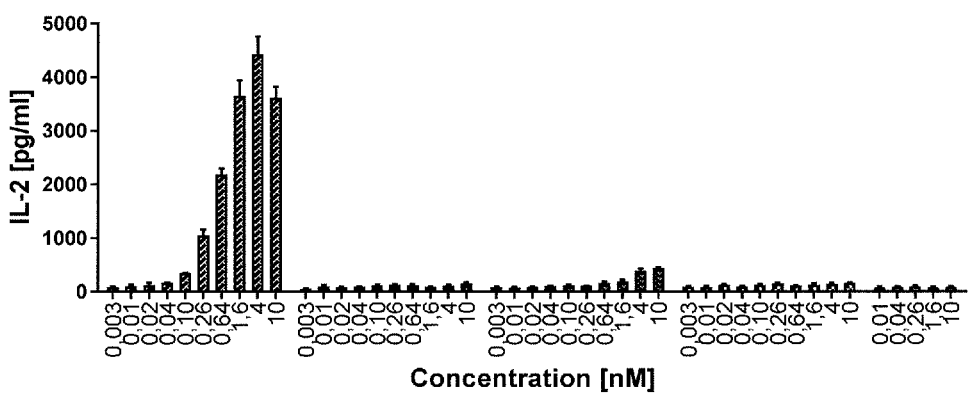
Figure 7:
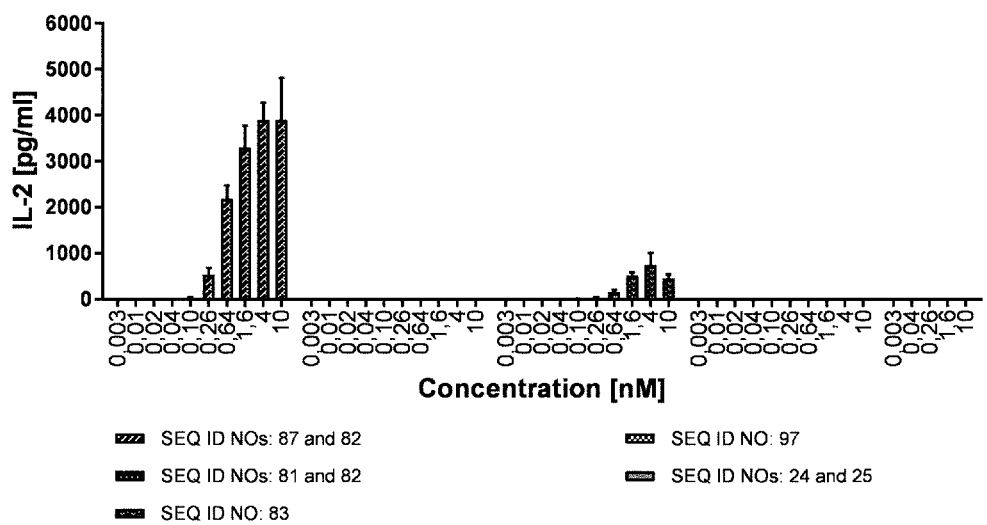
Figure 7:
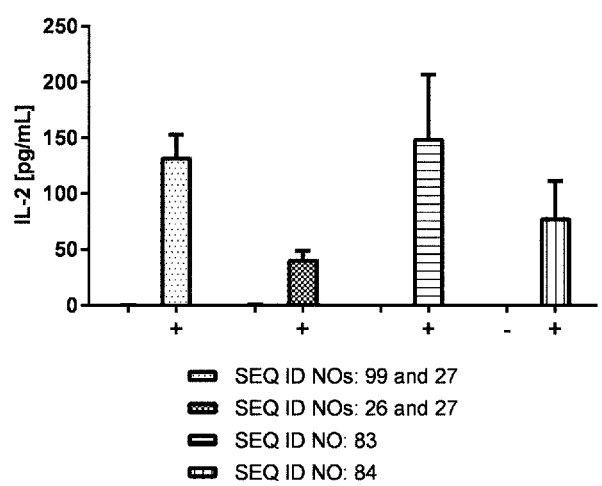

FIG. 7: demonstrates the ability of a representative fusion protein to co-stimulate T-cell activation in the presence of GPC3. The GPC3 antibody as included in the fusion protein (SEQ ID NOs: 81 and 82), a GPC3 specific lipocalin mutein (Fc fusion) (SEQ ID NO: 97), a previously known CD137/GPC3 bispecific fusion protein (SEQ ID NO: 83), and an isotype control (SEQ ID NOs: 24 and 25) were tested in parallel. SK-Hep1 cells either transfected with human GPC3 (FIG. 7A) or mock transfected (human GPC3 negative, FIG. 7B) or GPC3 (FIG. 7C) expressing Hep-G2 tumor cell line were seeded into anti-human anti-CD3 coated plates. Pan T cells as well as various concentrations of test molecules were added and incubated for three days. Levels of secreted IL-2 in the supernatant were determined by an electrochemoluminescence-based assay, as described in Example 9. The fusion protein SEQ ID NOs: 87 and 82 induces a strong dose-dependent increase in IL-2 secretion only in the presence of GPC3, more strongly than the previously known CD137/GPC3 bispecific fusion protein SEQ ID NO: 83.

Figure 8:
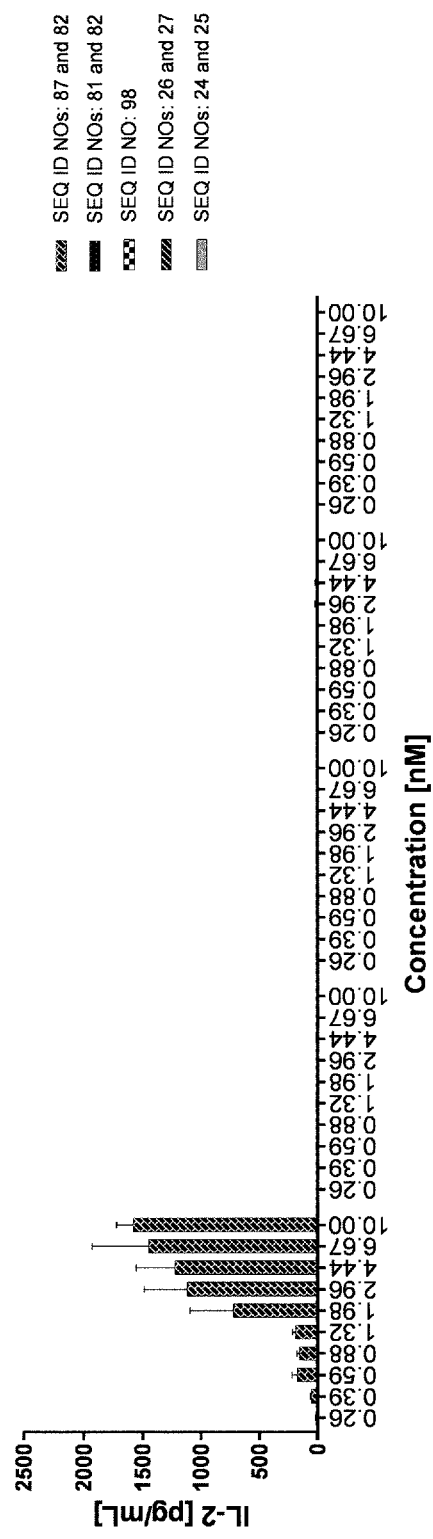
Figure 8:
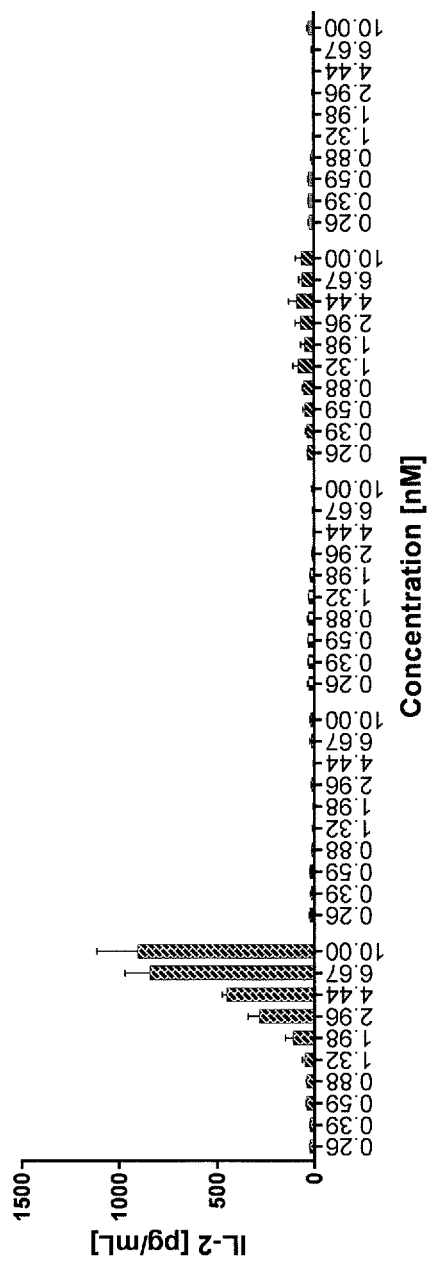
Figure 8:
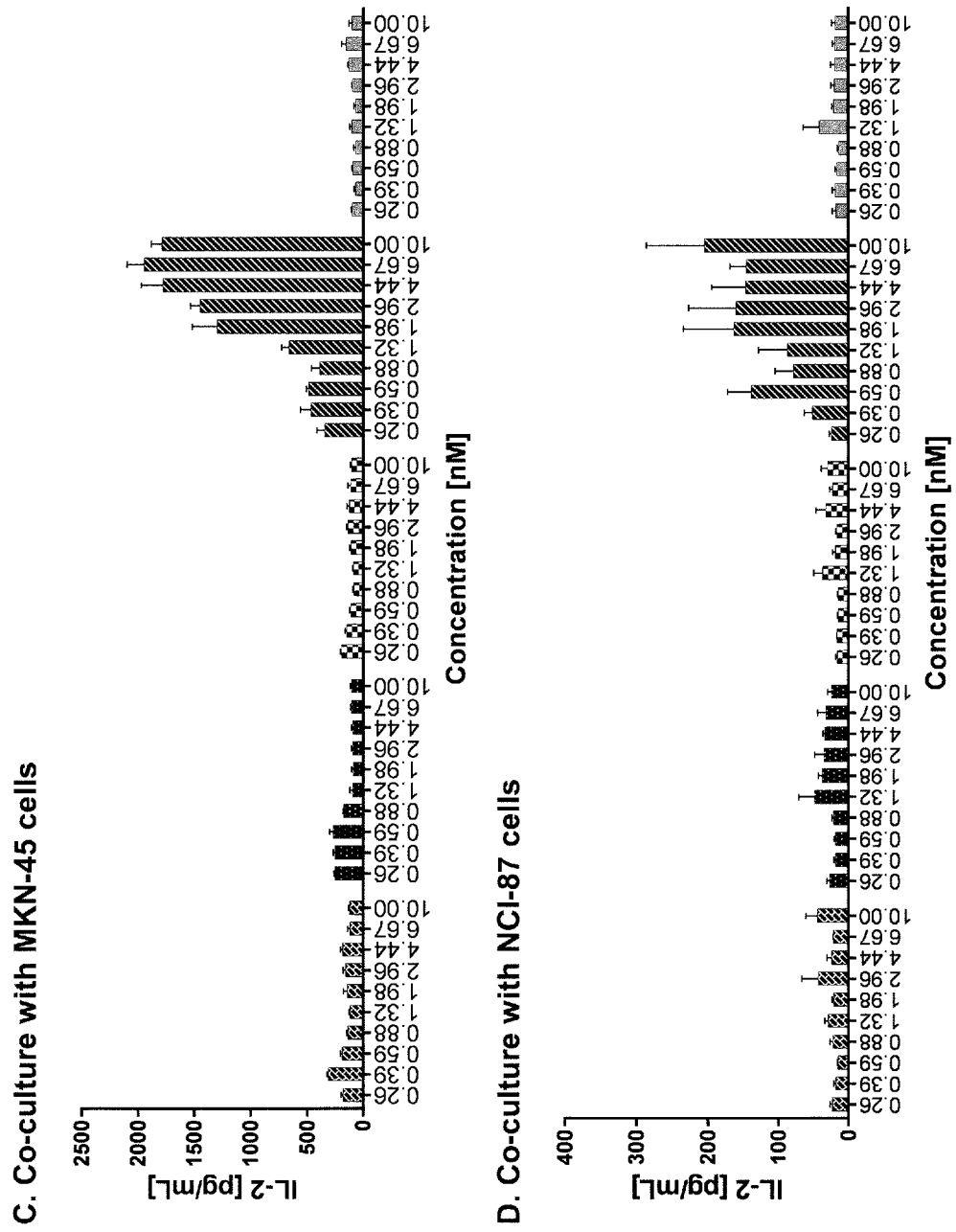

FIG. 8: shows the ability of representative fusion proteins to co-stimulate T-cell activation in a GPC3-target-dependent manner. Various tumor cell lines expressing different GPC3 levels (high to moderate expression: HepG2>Hep3B>MKN-45, FIGS. 8A, 8B, and 8C, respectively; GPC3 negative: NCI-N87, FIG. 8D) were seeded into anti-human CD3 coated plates. Pan T cells and various concentrations of fusion proteins and single building blocks were added and incubated for 3 days. Levels of secreted IL-2 were determined by an electrochemoluminescence-based assay, as described in Example 10. The fusion protein is capable of increasing IL-2 secretion in a GPC3 dependent manner. In contrast, the IL-2 secretion induced by a parallelly tested reference CD137 antibody (SEQ ID NOs: 26 and 27) is not GPC3 dependent.

Figure 9:
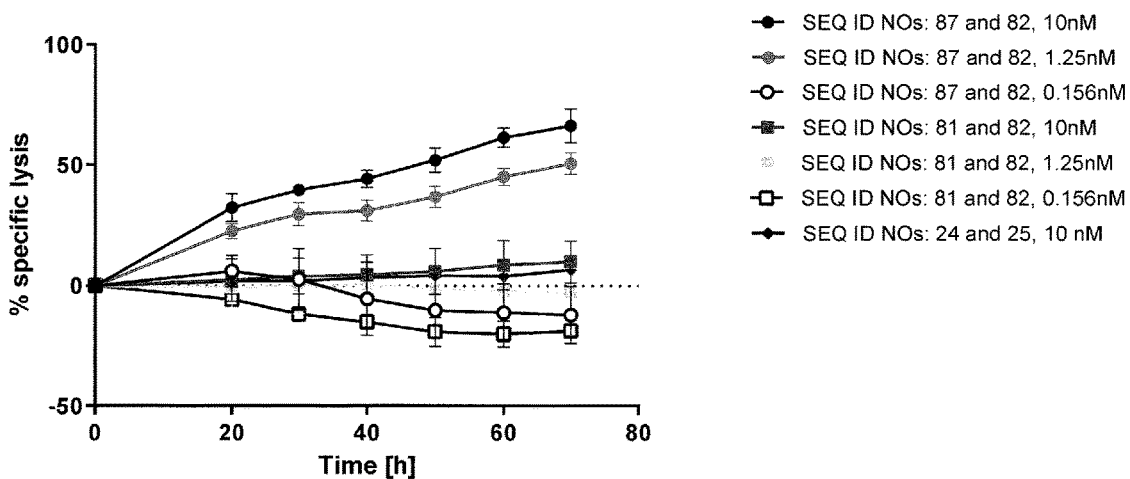
Figure 9:
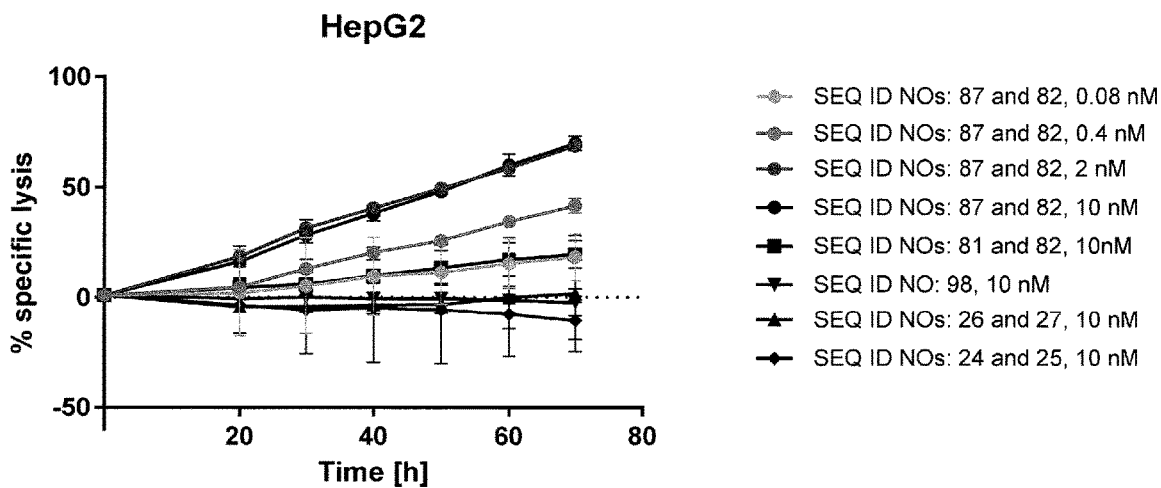
Figure 9:
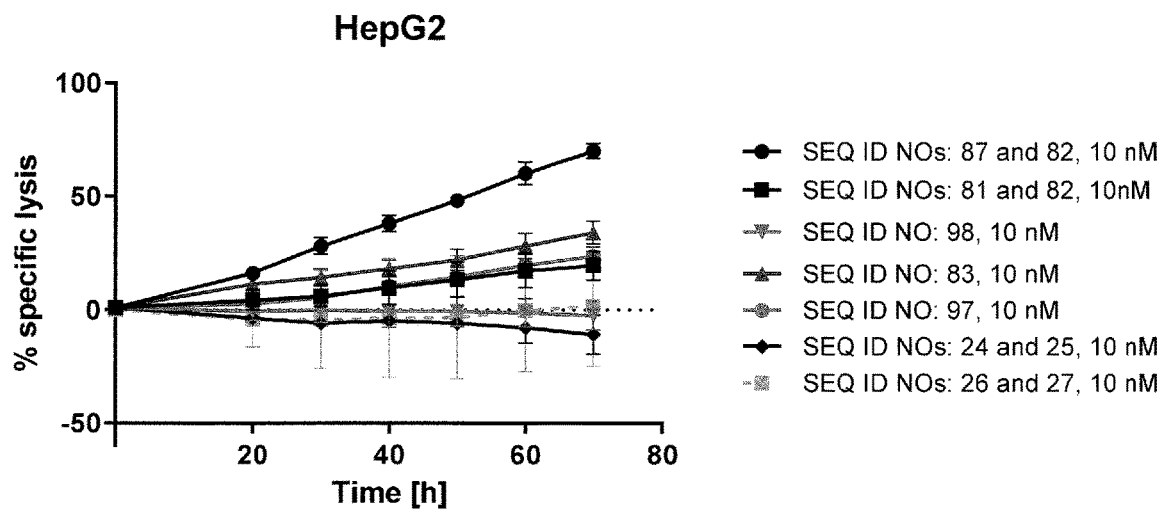
Figure 9:
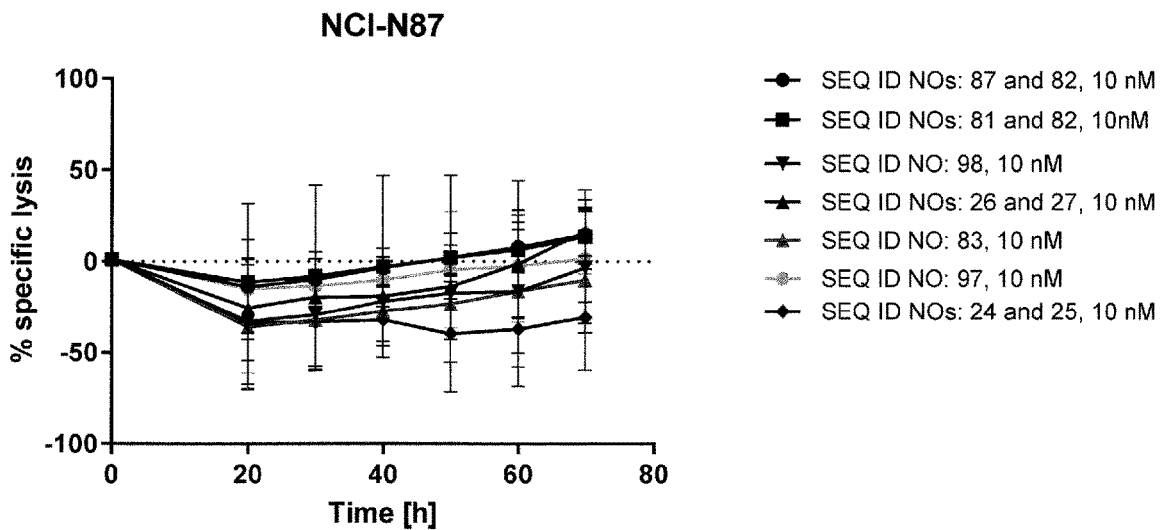
Figure 9:
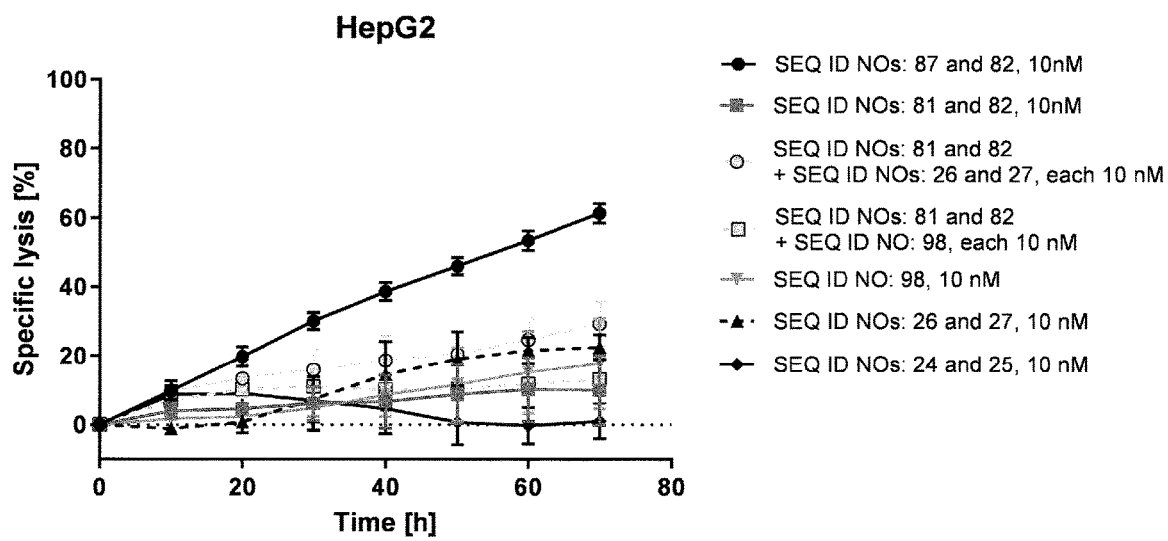

FIG. 9: shows the ability of representative fusion proteins to activate CD137 co-stimulatory signaling pathway and induce T-cell-mediated cytolysis of GPC3-expressing tumor cells, demonstrated in an impedance-based T-cell killing assay. GPC3 expressing HepG2 cells or GPC3 negative NCI-N87 cells were seeded and adhere to an electronic microtiter plate, followed by the addition of an anti-CD3 antibody, the test molecule, and non-adherent CD8+ T cells. The impedance was measured as the unitless "cell index (CI)" parameter every 15 minutes for three days, as described in Example 11. The fusion protein SEQ ID NOs: 87 and 82 is capable of activating CD137 pathway in a GPC3 dependent manner and inducing a dose dependent T cell-mediated lysis of GPC3 expressing tumor cells, at a higher level than a previously known CD137/GPC3 bispecific fusion protein SEQ ID NO: 83.

Figure 10:
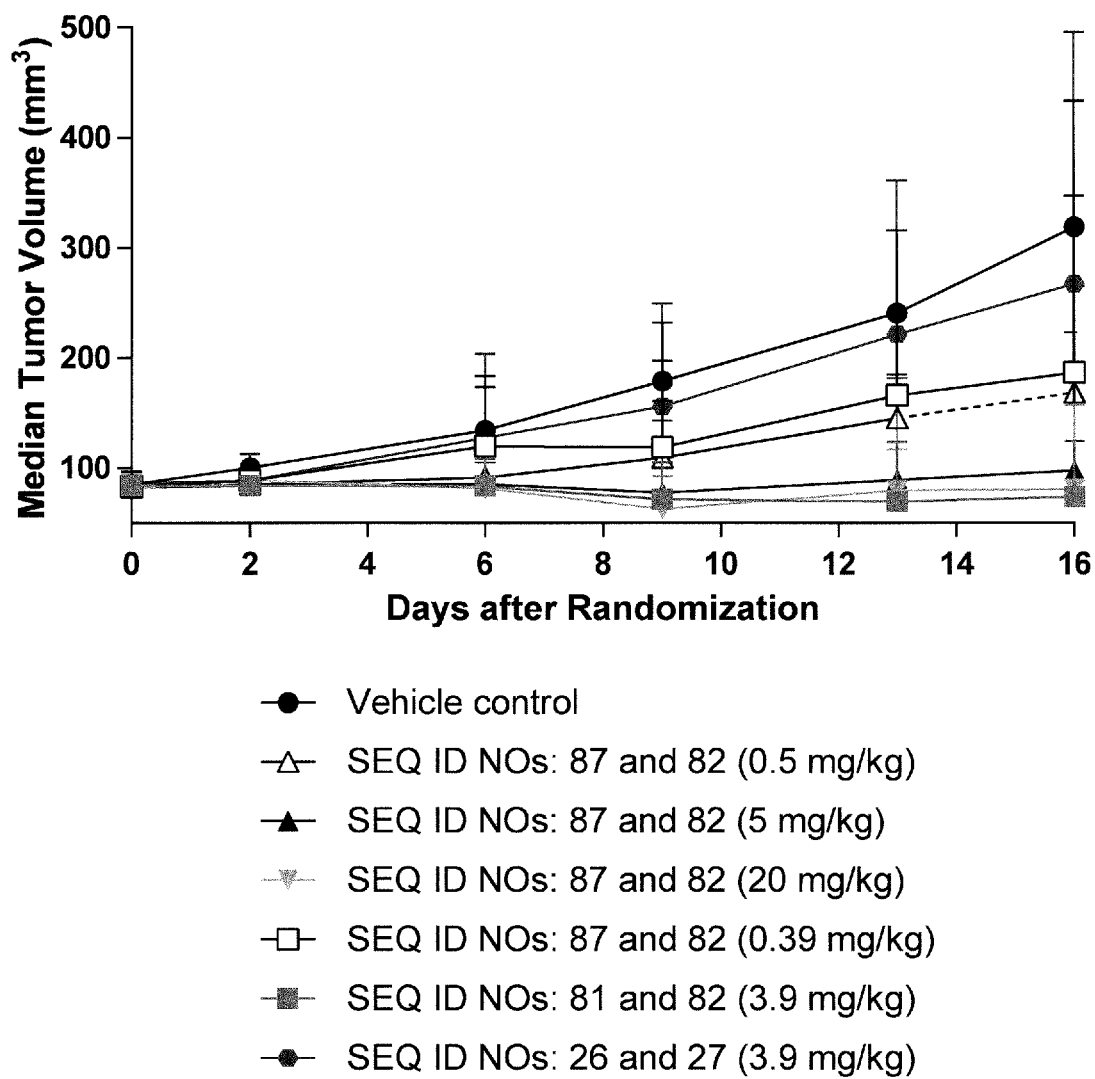

FIG. 10: shows the tumor volume over time after the treatment with 0.5, 5 and 20 mg/kg of an exemplary fusion protein, equimolar concentrations (0.39 and 3.9 mg/kg) of the GPC3 antibody as included in the fusion protein, an equimolar concentration (3.9 mg/kg) of a reference CD137 antibody, or vehicle control (PBS) in a humanized mouse tumor model, as described in Example 12. NOG mice were engrafted s.c. with HepG2 tumors that were allowed to grow to a size of 80-100 mm$^3$. Mice were then randomized into treatment (or control) groups and received 5×10$^6$ fresh human PBMCs intravenously and intraperitoneal injections of the testing molecules in the indicated doses on day 1, day 8, and day 15. Tumor growth was recorded every 3 to 4 days. Data are shown as median with error bars of interquartile range. Dashed line(s) indicates reduced number of animals per group compared to the previous days. The fusion protein completely inhibited the growth of tumor over the course of the study at higher dose levels (5 and 20 mg/kg), while having dose dependent but a minor effect on tumor growth at lower concentrations (0.5 or 0.39 mg/kg respectively).

Figure 11:
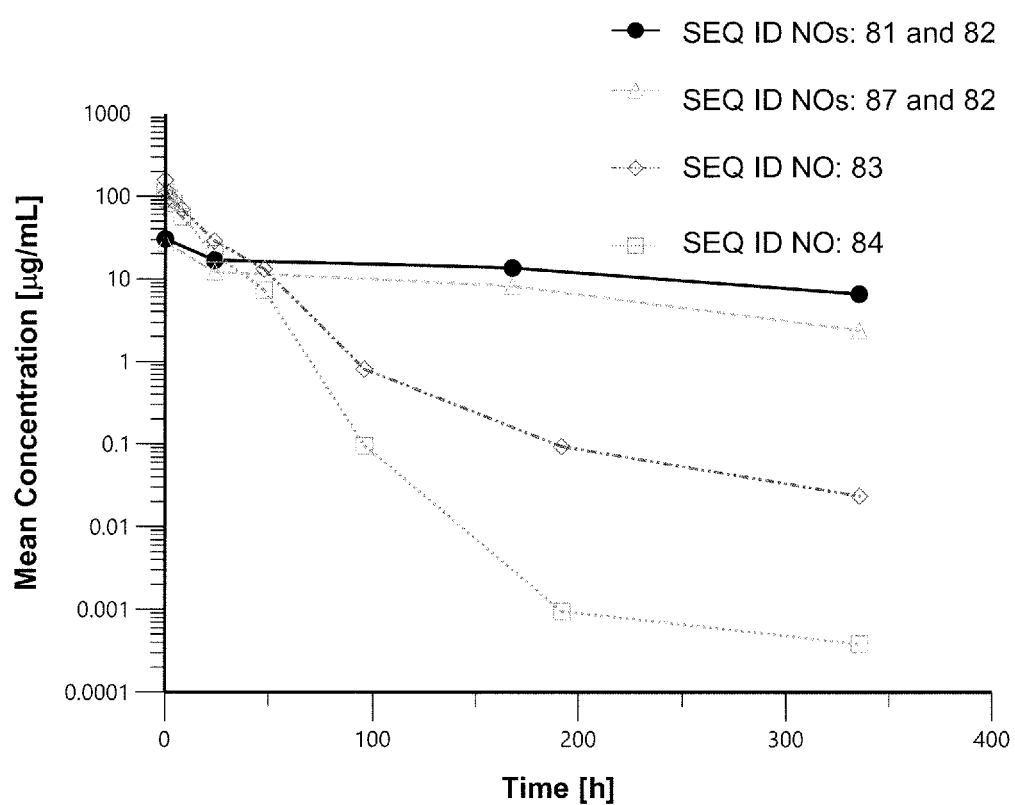

FIG. 11: provides the result of pharmacokinetic analyses in mice of an exemplary fusion protein and the GPC3 antibody as included in the fusion protein, compared to two previously known CD137/GPC3 bispecific fusion proteins (SEQ ID NO: 83 and SEQ ID NO: 84), as described in Example 13. Male CD-1 mice (2 mice per timepoint) were injected intravenously with fusion proteins at a dose of 2 mg/kg or 10 mg/kg. Drug levels were detected using a Sandwich ELISA detecting the full molecule via the target GPC3 and anti-human Fc or anti-NGAL. The fusion protein of the disclosure (SEQ ID NOs: 87 and 82) shows strongly enhanced pharmacokinetic behavior and extended half-lives as compared to the previously-known CD137/GPC3 bispecific fusion proteins (SEQ ID NO: 83 and SEQ ID NO: 84).

IV. DETAILED DESCRIPTION OF THE DISCLOSURE

As is described herein, the present disclosure encompasses the recognition that a bivalent CD137-binder, such as an antibody, may not be sufficient by itself to cluster CD137 on T cells or NK cells and lead to efficient activation. Besides, recent work around TNFR family members illustrates the mechanisms of anti-TNFR antibodies whereby the antibodies interact via their Fc regions with Fc-gamma receptors, engaging activating Fc-gamma receptor-expressing immune cells, and facilitate the subsequent anti-tumor activity (Bulliard et al., *Immunol Cell Biol*, 2014, Bulliard et al., *J Exp Med*, 2013). This, therefore, suggests an anti-CD137 antibody may trigger CD137 clustering depending on the abundance of Fc-gamma receptor-positive cells, which are not selectively tumor-localized but distributed throughout the body. Accordingly, the efficacy and target-specificity of anti-CD137 monotherapy may be of concerns. In fact, some anti-CD137 therapeutics under clinical studies, such as urelumab and utomilumab, show disappointing efficacy results with low-dose and/or reveal toxicity at high-dose or effective-dose (Bulliard et al., *Immunol Cell Biol*, 2014, Bulliard et al., *J Exp Med*, 2013). Thus, there is an unmet need for CD137-targeting therapeutics that are both effective and safe. An ideal CD137-targeting agent should lead to clustering of CD137, and do so in a tumor localized fashion on tumor-infiltrating lymphocytes. As described herein, to obtain such a CD137-targeting agent, bispecific agents may be designed to target CD137 on one end and a differentially expressed tumor target on the other end.

The present disclosure encompasses the recognition that a monospecific GPC3-targeting agent may not be potent enough for curative treatment of tumors such as HCC and that the anti-tumor activity of an anti-GPC3 agent that is able to recruit immune cells to the tumor site and/or directly inhibit cancer cell proliferation and/or survival may be of relevance. Therefore, there is unmet need for therapeutics targeting GPC3 with additive anti-tumor effects and that have the ability to provide enhanced anti-tumor activity as compared to a monospecific GPC3-target agent alone.

The present disclosure provides, among other things, novel approaches for simultaneously engaging CD137 and GPC3 via fusion proteins having binding specificity for CD137 and binding specificity for GPC3. To engage CD137 and GPC3, anti-GPC3 antibody-CD137 specific lipocalin mutein fusion proteins were described, in, e.g., WO2016/184882. However, it is still desirable for fusion proteins to induce GPC3-dependent T cell killing/immune response to suppress GPC3-expressing tumor growth with high efficiency and selectivity. Various aspects of the present disclosure provide fusion proteins that promote CD137 clustering by bridging CD137-positive T cells with GPC3 expressed in the tumor microenvironment, so that to combine CD137-induced T-cell activation and expansion with anti-GPC3 mediated cytotoxic killing of tumor cells. The present disclosure also provides fusion proteins that provide potentials of a combinatorial therapy in one molecule and at the same time allowing the localized induction of antigen-specific T cells in the tumor microenvironment, potentially reducing peripheral toxicity. In these regards, fusion proteins of the disclosure may provide enhanced IL-2 production, immune responses, T-cell-mediated cytolysis, and/or anti-tumor effects as compared to the monomeric CD137 or GPC3 therapy.

Additionally, as cynomolgus monkeys have been widely used in pharmacokinetic or drug-safety studies in the development of new therapies, including new biologics, and such studies may further be necessary pre-prerequisites to regulatory approval, it is desirable to have fusion proteins with a GPC3 binding moiety that is cross-reactive with both human and cynomolgus GPC3. No such fusion proteins with the GPC3 binding moiety having these cross-reactivity features have been previously described.

Furthermore, as bispecific or multispecific molecules may differ from their building blocks in certain properties including target affinity and specificity, stabilities, pharmacokinetics in blood, and mechanism of action (Spiess et al., *Mol Immunol*, 2015, Sedykh et al., *Drug Des Devel Ther*, 2018), as is provided herein, careful selection of the building blocks and optimization of manufacturing and other practices are, in some embodiments, provided to yield quality clinical candidates. For example, bispecific or multispecific molecules may lose, partially or completely, the target binding affinities and specificities of the building blocks, resulting in undesired off-target binding. Off-target binding can further affect the pharmacokinetics, tissue distribution, efficacy, and toxicity of such bispecific or multispecific molecules for therapeutic uses. Particularly, poor pharmacokinetic profiles can lead to difficulties in achieving the dose profile required for therapeutic efficacy and patient noncompliance (Alavijeh and Palmer, *IDrugs,* 2004), and favorable pharmacokinetics allow the dosage to be lowered, enable subcutaneous formulations to be developed and COGs to be reduced, and prolongs the dosing interval to such as once a week, every 2 weeks, every 3 week, or every 4 weeks (Ryman and Meibohm, *CPT Pharmacometrics Syst Pharmacol,* 2017). Pharmacokinetic properties are also affected by the isoelectric point (pl). Increases in pl may result in increased blood clearance and increased tissue retention with shorter half-life, whereas lower pl may decrease tissue uptake and lead to longer half-life. Although observations can be conflicting regarding correlation between protein clearance and pl, therapeutic antibodies often have pl values slightly above the physiological pH 7.4, as most cell surfaces are negatively charged. In these regards, various aspects of the present disclosure provide fusion proteins that are bispecific for CD137 and GPC3 with high affinity and specificity, enhanced stability, suitable pl, and favorable pharmacokinetic properties.

No such fusion proteins having these features attendant to the uses provided by present disclosure have been previously described. In contrast to fusion proteins provided herein, previously known fusion proteins targeting both CD137 and GPC3 suffered from one or more of poor PK, an unacceptable degree of off-target binding, an unacceptable degree of non-specific (e.g., GPC3 independent) activation of e.g., the immune system, and/or reduced or otherwise degraded ability to mediate T cell activation, proliferation, and/or infiltration.

A. Exemplary Fusion Proteins Specific for CD137 and GPC3 of the Disclosure.

In some embodiments, a provided fusion protein contains at least two subunits in any order: (1) a first subunit that comprises a full-length immunoglobulin or an antigen-binding domain thereof specific for GPC3, and (2) a second subunit that comprises a lipocalin mutein specific for CD137.

In some embodiments, a provided fusion protein comprises at least two subunits, wherein a first subunit comprises a full-length immunoglobulin or an antigen-binding domain thereof and is specific for GPC3, and wherein a second subunit comprises a lipocalin mutein and is specific for CD137, wherein the second subunit is linked at the N-terminus to the C-terminus of each heavy chain (HC) of the first subunit, optionally via a linker.

In some embodiments, a provided fusion protein comprises at least two subunits, wherein a first subunit comprises a full-length immunoglobulin or an antigen-binding domain thereof and is specific for GPC3, and wherein a second subunit comprises a lipocalin mutein and is specific for CD137, wherein the second subunit is linked at the C-terminus to the N-terminus of each HC of the first subunit, optionally via a linker.

In some embodiments, a provided fusion protein comprises at least two subunits, wherein a first subunit comprises a full-length immunoglobulin or an antigen-binding domain thereof and is specific for GPC3, and wherein a second subunit comprises a lipocalin mutein and is specific for CD137, wherein the second subunit is linked at the N-terminus to the C-terminus of each light chain (LC) of the first subunit, optionally via a linker.

In some embodiments, a provided fusion protein comprises at least two subunits, wherein a first subunit comprises a full-length immunoglobulin or an antigen-binding domain thereof and is specific for GPC3, and wherein a second subunit comprises a lipocalin mutein and is specific for CD137, wherein the second subunit is linked at the C-terminus to the N-terminus of each LC of the first subunit, optionally via a linker.

In some embodiments, a provided fusion protein comprises at least two subunits, wherein a first subunit comprises a full-length immunoglobulin or an antigen-binding domain thereof and is specific for GPC3, and wherein a second subunit comprises a lipocalin mutein and is specific for CD137, wherein the second subunit is linked at the N-terminus to the C-terminus of each heavy chain constant region (CH) of the first subunit, optionally via a linker.

In some embodiments, a provided fusion protein comprises at least two subunits, wherein a first subunit comprises a full-length immunoglobulin or an antigen-binding domain thereof and is specific for GPC3, and wherein a second subunit comprises a lipocalin mutein and is specific for CD137, wherein the second subunit is linked at the N-terminus to the C-terminus of each light chain constant region (CL) of the first subunit, optionally via a linker.

In some embodiments, a provided fusion protein also may contain at least one additional subunit, for example, a third subunit. For instance, a fusion protein may contain a third subunit specific for CD137. In some embodiments, a third subunit may be or comprise a lipocalin mutein specific for CD137. For example, two lipocalin muteins may be fused to a first immunoglobulin subunit, one at the C-terminus and one at the N-terminus of the immunoglobulin. In some embodiments, lipocalin muteins may be fused to the heavy chain or light chain of an immunoglobulin.

In some embodiments, provided fusion proteins may comprise one or more additional subunits (e.g., a fourth, fifth, or sixth subunit).

In some embodiments, at least one subunit may be fused at its N-terminus and/or its C-terminus to another subunit.

In some embodiments, at least one subunit can be linked to another subunit via a linker. In some further embodiments, a linker is a peptide linker, for example, an unstructured glycine-serine (GS) linker, a glycosylated GS linker, or a proline-alanine-serine polymer (PAS) linker. In some embodiments, a GS linker is a $(Gly_4Ser)_3$ linker $((G_4S)_3)$ as shown in SEQ ID NO: 13. Other exemplary linkers are shown in SEQ ID NOs: 14-23. In some embodiments, a peptide linker may have from 1 to 50 amino acids, such as 1, 2, 3, 4, 5, 10, 11, 12, 13, 14, 15, 16, 17, 18, 19, 20, 25, 30, 35, 40, 45 or 50 amino acids. For example, when a first subunit comprises a full-length immunoglobulin, a second subunit may be linked via a peptide linker between the N-terminus of the second subunit and the C-terminus of a heavy chain constant region (CH) of said immunoglobulin. In some further embodiments, a third subunit may be linked via a peptide linker between the N-terminus of the third subunit and the C-terminus of a light chain constant region (CL) of said immunoglobulin.

In some embodiments, one subunit can be linked to another subunit as essentially described in FIG. 1. Generally, one subunit may be fused at its N-terminus and/or its C-terminus to another subunit. For example, in some embodiments, a lipocalin mutein subunit can be fused at its N-terminus and/or its C-terminus to an immunoglobulin subunit, preferably via a peptide bond. For further examples, a lipocalin mutein subunit can be linked at its N-terminus to the C-terminus of the heavy chain domain (HC) of an immunoglobulin subunit (FIG. 1A), a lipocalin mutein subunit can be linked at its C-terminus to the N-terminus of the HC of an immunoglobulin subunit (FIG. 1C), a lipocalin mutein subunit can be linked at its N-terminus to the C-terminus of the light chain (LC) of an immunoglobulin subunit (FIG. 1B), and/or a lipocalin mutein subunit can be linked at its C-terminus to the N-terminus of the LC of an immunoglobulin subunit (FIG. 1D).

In some embodiments, a lipocalin mutein subunit can be fused at its N-terminus and/or its C-terminus to an immunoglobulin fragment. For example, in some embodiments, a lipocalin mutein subunit may be linked, preferably via a peptide linker, at its N-terminus to the C-terminus of a heavy chain constant region (CH) of an immunoglobulin subunit, or a lipocalin mutein subunit may be linked, preferably via a peptide linker, at its N-terminus to the C-terminus of a light chain constant region (CL) of an immunoglobulin subunit.

In some embodiments, when one subunit comprises a full-length immunoglobulin, a second subunit may be linked between the N-terminus of the second subunit and the C-terminus of a heavy chain constant region (CH) of said immunoglobulin.

In some embodiments, a third subunit may be linked between the N-terminus of the third subunit and the C-terminus of a light chain constant region (CL) of said immunoglobulin.

In some embodiments, with respect to a fusion protein of the disclosure, wherein at least one subunit may be or comprise a full-length immunoglobulin, the Fc function of the Fc region of the full-length immunoglobulin to Fc receptor-positive cell may be preserved at the same time while the fusion protein is simultaneously engaging CD137 and GPC3.

In some embodiments, wherein at least one subunit of a provided fusion protein may be or comprise a full-length immunoglobulin, the Fc function of the Fc region of the full-length immunoglobulin to Fc receptor-positive cell may be reduced or fully suppressed by protein engineering while the fusion protein is simultaneously engaging CD137 and GPC3. In some embodiments, this may be achieved, for example, by switching from the IgG1 backbone to IgG4, as IgG4 is known to display reduced Fc-gamma receptor interactions compared to IgG1. In some embodiments, to further reduce the residual binding to Fc-gamma receptors, mutations may be introduced into the IgG4 backbone such as F234A and L235A. In some embodiments, an S228P mutation may also be introduced into the IgG4 backbone to minimize the exchange of IgG4 half-antibody (Silva et al., *J Biol Chem*, 2015). In some embodiments, F234A and L235A mutations may be introduced for decreased ADCC and ADCP (Glaesner et al., *Diabetes Metab Res Rev*, 2010) and/or M428L and N434S mutations or M252Y, S254T, and T256E mutations for extended serum half-life (Dall'Acqua et al., *J Biol Chem*, 2006, Zalevsky et al., *Nat Biotechnol*, 2010). In some embodiments, an additional N297A mutation may be present in the immunoglobulin heavy chain of the fusion protein in order to remove the natural glycosylation motif.

In some embodiments, the Fc portion of an immunoglobulin included in a fusion protein of the disclosure may contribute to maintaining the serum levels of the fusion protein. For example, when the Fc portion binds to Fc receptors on endothelial cells and phagocytes, the fusion protein may become internalized and recycled back to the bloodstream, enhancing its half-life within the body.

In one aspect, fusion proteins of the disclosure bind CD137 with high affinity. In another aspect, provided fusion proteins bind GPC3 with high affinity. In some preferred embodiments, provided fusion proteins simultaneously bind CD137 and GPC3. In some embodiments, the simultaneous binding to CD137 and GPC3 allows provided fusion proteins to exhibit a durable anti-tumor or anti-infection response.

In some embodiments, a fusion protein of the disclosure may have an isoelectric point (pI) of about 6.5 or higher, such as about 6.8 or higher, about 7.1 or higher, about 7.4 or higher, about 7.5 or higher, about 7.7 or higher, about 8.0 or higher, about 8.5 or higher, or about 9.0 or even higher. In some embodiments, a fusion protein of the disclosure may have a pI higher than a previously known fusion protein that binds both CD137 and GPC3 comprising the amino acid sequences of SEQ ID NOs: 83.

In some embodiments, a fusion protein of the disclosure may be able to bind GPC3 with a $K_D$ value of at most about 2 nM or even lower, such as about 1.5 nM or lower, about 1 nM or lower, about 0.8 nM or lower, or about 0.7 nM or lower. In some embodiments, a fusion protein of the disclosure may be able to bind GPC3 with a $K_D$ value comparable to or lower than the $K_D$ value of the immunoglobulin specific for GPC3 as included in such fusion protein, such as the antibody having the heavy and light chains provided by SEQ ID NOs: 81 and 82. The $K_D$ values of provided fusion proteins may be measured, for example, in a surface-plasmon-resonance (SPR) assay, such as an SPR assay as essentially described in Example 2.

In some embodiments, a fusion protein of the disclosure may be able to bind GPC3 with an $EC_{50}$ value of at most about 1 nM or even lower, such as about 0.5 nM or lower, about 0.3 nM or lower, about 0.2 nM or lower, about 0.15 nM or lower, or about 0.1 nM or lower. In some embodiments, a fusion protein of the disclosure may be able to bind GPC3 with an $EC_{50}$ value comparable to or lower than the $EC_{50}$ value of the immunoglobulin specific for GPC3 that is included in a particular fusion protein, such as the antibody having the heavy and light chains provided by SEQ ID NOs: 81 and 82. The $EC_{50}$ values of provided fusion proteins may be measured, for example, in an enzyme-linked immunosorbent assay (ELISA) assay, such as an ELISA assay as essentially described in Example 3.

In some embodiments, a fusion protein of the disclosure may be able to bind CD137 with an $EC_{50}$ value of at most about 5 nM or even lower, such as about 3 nM or lower, about 2 nM or lower, about 1 nM or lower, about 0.5 nM or lower, about 0.2 nM or lower, or about 0.1 nM or lower. The $EC_{50}$ values of provided fusion proteins may be measured, for example, in an ELISA assay, such as an ELISA assay as essentially described in Example 3.

In some embodiments, a fusion protein of the disclosure may be cross-reactive with cynomolgus GPC3. In some embodiments, a provided fusion protein may be able to bind cynomolgus GPC3 with a $K_D$ value of at most about 2 nM or even lower, such as about 1.5 nM or lower, about 1 nM or lower, about 0.8 nM or lower, or about 0.7 nM or lower. In some embodiments, a fusion protein of the disclosure may be able to bind cynomolgus GPC3 with a $K_D$ value comparable to or lower than the $K_D$ value of the immunoglobulin specific for GPC3 as included in such fusion protein, such as the antibody having the heavy and light chains provided by SEQ ID NOs: 81 and 82. The $K_D$ values of provided fusion proteins may be measured, for example, in an SPR assay, such as an SPR assay as essentially described in Example 2. In some embodiments, a provided fusion protein may be able to bind cynomolgus GPC3 with an $EC_{50}$ value of at most about 1 nM or even lower, such as about 0.5 nM or lower, such as about 0.2 nM or lower, about 0.1 nM or lower. The $EC_{50}$ values of provided fusion proteins may be measured, for example, measured in an ELISA assay, such as an ELISA assay as essentially described in Example 3.

In some embodiments, a fusion protein of the disclosure may be able to simultaneously bind CD137 and GPC3. In some embodiments, a provided fusion protein may be able to simultaneously bind CD137 and GPC3, with an $EC_{50}$ value of at most about 10 nM or even lower, such as 5 nM or lower, 3 nM or lower, 2 nM or lower, 1 nM or lower, or 0.5 nM or lower. In some other embodiments, a provided fusion protein may be able to simultaneously bind CD137 and GPC3, with an $EC_{50}$ value of at most about 10 nM or even lower, such as 8 nM or lower, 5 nM or lower, 3 nM or lower, or 2 nM or lower. The simultaneous binding may be determined, for example, in and ELISA assay, such as an ELISA assay as essentially described in Example 4.

In some embodiments, a fusion protein of the disclosure may be able to bind CD137 expressed on a cell with an $EC_{50}$ value of at most about 50 nM or even lower, such as about 30 nM or even lower, about 25 nM or even lower, about 20 nM or lower, about 15 nM or lower, about 10 nM or lower, about 5 nM or lower, about 3 nM or lower, or about 1 nM or even lower. The $EC_{50}$ value of a provided fusion protein may be measured, for example, in a flow cytometric analysis as essentially described in Example 6. The cell expressing CD137 may be, for example, a CHO cell transfected with human CD137.

In some embodiments, a fusion protein of the disclosure may be able to bind GPC3 expressed on a cell with an $EC_{50}$ value of at most about 50 nM or even lower, such as about 30 nM or lower, about 25 nM or even lower, about 20 nM or lower, about 15 nM or lower, about 10 nM or lower, about 5 nM or lower, about 3 nM or lower, or about 1 or even lower. The $EC_{50}$ value of a provided fusion protein may be measured, for example, in a flow cytometric analysis as essentially described in Example 6. The cell expressing GPC3 may be, for example, be a SK-Hep1 cell transfected with human GPC3.

In some embodiments, fusion proteins of the disclosure may be able to bind GPC3 expressed on tumor cells. In some embodiments, a provided fusion protein may be able to bind GPC3 expressed on a tumor cell with an $EC_{50}$ value of at most about 50 nM or even lower, such as about 30 nM or lower, about 25 nM or even lower, about 20 nM or lower, about 15 nM or lower, about 10 nM or lower, about 5 nM or lower, about 3 nM or lower, or about 1 or even lower. The $EC_{50}$ value of a fusion protein to bind GPC3 expressing tumor cells may be measured, for example, in a flow cytometric analysis as essentially described in Example 7. The tumor cells expressing GPC3 may be, for example, HepG2, Hep3B, and MKN-45 cells.

In some embodiments, fusion proteins of the disclosure do not substantially bind targets other than CD137 or GPC3. In some embodiments, a provided fusion protein has reduced off-target binding to targets other than CD137 or GPC3 compared to a previously known fusion protein that binds both CD137 and GPC3 comprising the amino acid sequences of SEQ ID NOs: 83. Such evaluation of target-binding can be performed by an ELISA assay as described in Example 5.

In some embodiments, fusion proteins of the disclosure may be able to co-stimulate T-cell responses. In some embodiments, provided fusion proteins lead to comparable or stronger T-cell activation as compared the GPC3 antibody as included in the fusion protein having the heavy and light chains provided by SEQ ID NOs: 81 and 82, a reference CD137 antibody having the heavy and light chains provided by SEQ ID NOs: 26 and 27, or a previously known fusion protein that binds both CD137 and GPC3 comprising the amino acid sequence of SEQ ID NO: 83. In some embodiments, provided fusion proteins lead to T-cell activation with a comparable or better efficiency as compared to the GPC3 antibody as included in the fusion protein having the heavy and light chains provided by SEQ ID NOs: 81 and 82, a reference CD137 antibody having the heavy and light chains provided by SEQ ID NOs: 26 and 27, or a previously known fusion protein that binds both CD137 and GPC3 comprising the amino acid sequence of SEQ ID NOs: 83. The stimulated T-cell response or T-cell activation may be measured, for example, in a CD137 Bioassay as essentially described in Example 8, or in a functional T-cell activation assay as essentially described in Example 9, Example 10, and Example 11.

In some embodiments, fusion proteins of the disclosure may be able to induce increased IL-2 secretion. In some preferred embodiments, provided fusion proteins may be able to induce a concentration-dependent IL-2 secretion and/or demonstrate a tendency to induce enhanced IL-2 secretion at higher concentrations. In some embodiments, provided fusion proteins may lead to increased IL-2 secretion with a comparable or better efficiency as compared to the GPC3 antibody as included in the fusion protein having the heavy and light chains provided by SEQ ID NOs: 81 and 82, or a previously known fusion protein that binds both CD137 and GPC3 comprising the amino acid sequences of SEQ ID NOs: 83. IL-2 secretion may be measured, for example, in a functional T-cell activation assay as essentially described in Example 9 and Example 10.

In some embodiments, fusion proteins of the disclosure may be able to induce T cell-mediated cytotoxicity. In some embodiments, provided fusion proteins may lead to dose-dependent T cell-mediated cytolysis. In some embodiments, provided fusion proteins may induce cytotoxic T cell-activation with a comparable or better efficacy as compared to the GPC3 antibody as included in provided fusion proteins having the heavy and light chains provided by SEQ ID NOs: 81 and 82. In some embodiments, provided fusion proteins may induce cytotoxic T cell-activation with a comparable or better efficacy as compared to the a CD137 antibody having the heavy and light chains provided by SEQ ID NOs: 26 and 27, a reference CD137 antibody having the heavy and light chains provided by SEQ ID NOs: 26 and 27, or a previously known fusion protein that binds both CD137 and GPC3 comprising the amino acid sequence of SEQ ID NO: 83. The T cell-mediated cytotoxicity may be determined, for example, in an impedance-based T cell killing assay essentially described in Example 11.

In some embodiments, fusion proteins of the disclosure may be able to co-stimulate T-cell responses in a GPC3 dependent manner. In some embodiments, provided fusion proteins may lead to local induction of the IL-2 production by T-cells in the vicinity of GPC3-positive cells, such as GPC3 transfected cells or GPC3 expressing tumor cells. "In the vicinity of GPC3-positive cells" when used herein refers to a T-cell and a GPC3-positive cell are brought close to each other through a provided fusion protein which binds CD137 and GPC3 simultaneously. In some embodiments, provided fusion proteins may lead to localized T cell-mediated killing of GPC3 expressing tumor cells. The GPC3 dependent activation of T-cell by provided fusion proteins may be determined, for example, in a CD137 Bioassay essentially described in Example 8, or in a functional T-cell activation assay essentially described in Example 9, Example 10 and Example 11.

In some embodiments, provided fusion proteins are not able to co-stimulate T-cell responses in the absence of GPC3. In some embodiments, provided fusion proteins are not able to co-stimulate T-cell responses in the absence of GPC3 expressing cells. In some embodiments, a provided fusion protein may be able to discern the presence of GPC3 and lead to corresponding T-cell activation better than a CD137 antibody having the heavy and light chains provided by SEQ ID NOs: 26 and 27. The GPC3 dependent action of the fusion proteins may be determined, for example, in a CD137 Bioassay essentially described in Example 8, or in a functional T-cell activation assay essentially described in Example 9, Example 10, and Example 11.

In some embodiments, provided fusion proteins may lead to anti-tumor activities. In some embodiments, provided fusion proteins may inhibit tumor growth of hepatocellular carcinoma HepG2 cells. In some embodiments, provided fusion proteins may inhibit tumor growth of hepatocellular carcinoma HepG2 cells with comparable or better efficacy as compare to the GPC3 antibody included in the fusion proteins having the heavy and light chains provided by SEQ ID NOs: 81 and 82. Such anti-tumor activities may be determined, for example, using a HepG2 xenograft model essentially as descried in Example 12.

In some embodiments, provided fusion proteins may elevate levels of tumor infiltrating lymphocytes. In some embodiments, provided fusion proteins may lead to increased intratumoral filtration of CD3, CD4 or CD8 T cells, as compared to the GPC3 antibody included in the fusion proteins having the heavy and light chains provided by SEQ ID NOs: 81 and 82. Tumor infiltrating lymphocytes may be analyzed, for example, as descried in Example 13.

In some embodiments, provided fusion proteins have favorable stability and pharmacokinetics profiles. In some embodiments, a provided fusion protein has comparable pharmacokinetics profile as the GPC3 antibody included in the fusion protein having the heavy and light chains provided by SEQ ID NOs: 81 and 82. In some embodiments, a provided fusion protein has antibody-like pharmacokinetics. In some embodiments, a provided fusion protein has a terminal half-life of about 50 hours or longer, 75 hours or longer, 100 hours or longer, 125 hours or longer, about 150 hours or longer, about 175 hours or longer, about 200 hours or longer, about 250 hours or longer, or even longer. In some embodiments, a provided fusion protein has a terminal half-life in mice of about 50 hours or longer, 75 hours or longer, 100 hours or longer, 125 hours or longer, about 150 hours or longer, about 175 hours or longer, about 200 hours or longer, about 250 hours or longer, or even longer. Pharmacokinetics profiles of provided fusion proteins may be analyzed as described in Example 13.

In some embodiments, a provided fusion protein comprises an amino acid sequence shown in any one of SEQ ID NOs: 87-96.

In some embodiments, a provided fusion protein comprises an amino acid sequence having at least 70%, at least 75%, at least 80%, at least 85%, at least 90%, at least 92%, at least 95%, at least 97%, at least 98%, or even higher sequence identity to the amino acid sequences shown in any one of SEQ ID NOs: 87-96.

In some embodiments, a provided fusion protein comprises the amino acids shown in SEQ ID NOs: 87 and 82, SEQ ID NOs: 88 and 82, SEQ ID NOs: 81 and 89, SEQ ID NOs: 81 and 90, SEQ ID NOs: 91 and 82, SEQ ID NOs: 92 and 82, SEQ ID NOs: 81 and 93, SEQ ID NOs: 81 and 94, SEQ ID NOs: 95 and 82, or SEQ ID NOs: 96 and 82.

In some embodiments, a provided fusion protein comprises the amino acid sequences having at least 70%, at least 75%, at least 80%, at least 85%, at least 90%, at least 92%, at least 95%, at least 97%, at least 98%, or even higher sequence identity to the amino acid sequences shown in SEQ ID NOs: 87 and 82, SEQ ID NOs: 88 and 82, SEQ ID NOs: 81 and 89, SEQ ID NOs: 81 and 90, SEQ ID NOs: 91 and 82, SEQ ID NOs: 92 and 82, SEQ ID NOs: 81 and 93, SEQ ID NOs: 81 and 94, SEQ ID NOs: 95 and 82, or SEQ ID NOs: 96 and 82.

B. Exemplary Immunoglobulins as Included in the Fusion Proteins.

In some embodiments, with respect to a provided fusion protein, a first subunit may be or comprise a full-length immunoglobulin or an antigen-binding domain thereof specific for GPC3. In some embodiments, an immunoglobulin, for example, may be IgG1, IgG2 or IgG4. In some embodiments, an immunoglobulin is or comprises IgG4. In some embodiments, an immunoglobulin is a monoclonal antibody against GPC3.

Illustrative examples of GPC3-binding antibodies of the disclosure may comprise an antigen-binding region which cross-blocks or binds to the same epitope as a GPC3-binding antibody comprising the heavy chain variable domain ($V_H$) and light chain variable domain ($V_L$) regions of a known antibody such as codrituzumab (also known as GC33 or RO5137382), YP7 (including humanized YP7), HN3, and HS20. In some embodiments, a GPC3-binding antibody of the disclosure may comprise an antigen-binding region, such as any one of the three heavy chain complementarity determining regions (CDRs) (HCDR1, HCDR2 and HCDR3) and the three light chain CDRs (LCDR1, LCDR2 and LCDR3) from an antibody selected from the group consisting of codrituzumab, YP7, HN3, and HS20.

In some embodiments, a provided GPC3 antibody or antigen-binding domain thereof may have a heavy chain variable region (HCVR) selected from the group consisting of SEQ ID NOs: 78, 114, 119, 126, and 129, and/or a light chain variable region (LCVR) selected from the group consisting of SEQ ID NOs: 79, 115, and 127.

In some embodiments, the heavy chain and light chain pair of a provided GPC3 antibody or antigen-binding domain thereof are or comprise a HCVR and LCVR, respectively, as follows: SEQ ID NOs: 78 and 79, SEQ ID NO: 129 and 79, SEQ ID NOs: 114 and 115, or SEQ ID NOs: 126 and 127.

In some embodiments, the heavy chain and light chain pair of a provided GPC3 antibody or antigen-binding domain thereof are or comprise a HCVR and LCVR, respectively, that have a sequence having at least 70%, at least 75%, at least 80%, at least 85%, at least 90%, at least 92%, at least 95%, at least 97%, at least 98%, or higher sequence identity to the amino acid sequences shown in SEQ ID NOs: 78 and 79, SEQ ID NOs: 129 and 79, SEQ ID NOs: 114 and 115, or SEQ ID NOs: 126 and 127.

In some embodiments, a provided GPC3 antibody or antigen-binding domain thereof may have a heavy chain that is any one of SEQ ID NOs: 80 and 81, and/or a light chain that is SEQ ID NO: 82.

In some embodiments, the heavy chain and light chain pair of a provided GPC3 antibody are or comprise the amino acid sequences as shown in SEQ ID NOs: 80 and 82 or SEQ ID NO: 81 and 82.

In some embodiments, the heavy chain and light chain pair of a provided GPC3 antibody are or comprise a heavy chain and a light chain that have a sequence having at least 70%, at least 75%, at least 80%, at least 85%, at least 90%, at least 92%, at least 95%, at least 97%, at least 98%, or higher sequence identity to the amino acid sequences as shown in SEQ ID NOs: 80 and 82 or SEQ ID NO: 81 and 82.

In some embodiments, a provided GPC3 antibody or antigen-binding domain thereof may have a HCVR with at least 70%, at least 75%, at least 80%, at least 85%, at least 90%, at least 92%, at least 95%, at least 97%, at least 98%, or even higher sequence identity to an amino acid sequence selected from the group consisting of SEQ ID NOs: 78, 114, 119, 126, and 129, and/or a LCVR with at least 70%, at least 75%, at least 80%, at least 85%, at least 90%, at least 92%, at least 95%, at least 97%, at least 98%, or even higher sequence identity to an amino acid sequence selected from the group consisting of SEQ ID NOs: 79, 115, and 127. In other embodiments, a provided GPC3 antibody or antigen-binding domain thereof may have a heavy chain with at least 70%, at least 75%, at least 80%, at least 85%, at least 90%, at least 92%, at least 95%, at least 97%, at least 98%, or even higher sequence identity to an amino acid sequence selected from the group consisting of SEQ ID NOs: 80 and 81, and/or a light chain with at least 70%, at least 75%, at least 80%, at least 85%, at least 90%, at least 92%, at least 95%, at least 97%, at least 98%, or even higher sequence identity to the amino acid sequence of SEQ ID NO: 82.

In some embodiments, the heavy chain variable region of a provided GPC3 antibody or antigen-binding domain thereof may have the three CDRs having following sequences: GYTFTDYE (HCDR1, SEQ ID NO: 72), LDPKTGDT (HCDR2, SEQ ID NO: 73), TRFYSYTY (HCDR3; SEQ ID NO: 74). In some embodiments, the heavy chain variable region of a provided GPC3 antibody or antigen-binding domain thereof may have the three CDRs having following sequences: GFTFNKNA (HCDR1, SEQ ID NO: 108), IRNKTNNYAT (HCDR2, SEQ ID NO: 109), VAGNSFAY (HCDR3; SEQ ID NO: 110). In some embodiments, the heavy chain variable region of a provided GPC3 antibody or antigen-binding domain thereof may have the three CDRs having following sequences: YFDFDSYE (HCDR1, SEQ ID NO: 116), IYHSGST (HCDR2, SEQ ID NO: 117), ARVNMDRFDY (HCDR3; SEQ ID NO: 118). In some embodiments, the heavy chain variable region of a provided GPC3 antibody or antigen-binding domain thereof may have the three CDRs having following sequences: GFTFSSYA (HCDR1, SEQ ID NO: 120), IQKQGLPT (HCDR2, SEQ ID NO: 121), AKNRAKFDY (HCDR3; SEQ ID NO: 122).

In some embodiments the light chain variable region of a provided GPC3 antibody or antigen-binding domain thereof may have the three CDRs having following sequences: QSLVHSNRNTY (LCDR1, SEQ ID NO: 75), KVS (LCDR2), SQNTHVPPT (LCDR3; SEQ ID NO: 77). In some embodiments the light chain variable region of a provided GPC3 antibody or antigen-binding domain thereof may have the three CDRs having following sequences: QSLLYSSNQKNY (LCDR1, SEQ ID NO: 111), WAS (LCDR2), QQYYNYPLT (LCDR3; SEQ ID NO: 113). In some embodiments the light chain variable region of a provided GPC3 antibody or antigen-binding domain thereof may have the three CDRs having following sequences: QSISSY (LCDR1, SEQ ID NO: 123), NAS (LCDR2), QQNRGFPLT (LCDR3; SEQ ID NO: 125).

In some embodiments, a provided GPC3 antibody or antigen-binding domain thereof comprises a heavy chain variably region that has the three CDRs having following sequences: GYTFTDYE (HCDR1, SEQ ID NO: 72), LDPKTGDT (HCDR2, SEQ ID NO: 73), TRFYSYTY (HCDR3; SEQ ID NO: 74), and a light chain variable region that has the three CDRs having following sequences: QSLVHSNRNTY (LCDR1, SEQ ID NO: 75), KVS (LCDR2), SQNTHVPPT (LCDR3; SEQ ID NO: 77). In some embodiments, a provided GPC3 antibody or antigen-binding domain thereof comprises a heavy chain variably region that has the three CDRs having following sequences: GFTFNKNA (HCDR1, SEQ ID NO: 108), IRNKTNNYAT (HCDR2, SEQ ID NO: 109), VAGNSFAY (HCDR3; SEQ ID NO: 110), and a light chain variable region that has the three CDRs having following sequences: QSLLYSSNQKNY (LCDR1, SEQ ID NO: 111), WAS (LCDR2), QQYYNYPLT (LCDR3; SEQ ID NO: 113). In some embodiments, a provided GPC3 antibody or antigen-binding domain thereof comprises a heavy chain variably region that has the three CDRs having following sequences: GFTFSSYA (HCDR1, SEQ ID NO: 120), IQKQGLPT (HCDR2, SEQ ID NO: 121), AKNRAKFDY (HCDR3; SEQ ID NO: 122), and a light chain variable region that has the three CDRs having following sequences: QSISSY (LCDR1, SEQ ID NO: 123), NAS (LCDR2), QQNRGFPLT (LCDR3; SEQ ID NO: 125).

Unless otherwise indicated, all CDR sequences disclosed herein are defined according to the IMGT method as described in Lefranc, M.-P., The Immunologist, 7, 132-136 (1999). CDR1 consists of positions 27 to 38, CDR2 consists of positions 56 to 65, CDR3 for germline V-genes consists of positions 105 to 116, CDR3 for rearranged V-J-genes or V-D-J-genes consists of positions 105 to 117 (position preceding J-PHE or J-TRP 118) with gaps at the top of the loop for rearranged CDR3-IMGT with less than 13 amino acids, or with additional positions 112.1, 111.1, 112.2, 111.2, etc. for rearranged CDR3-IMGT with more than 13 amino acids. The positions given in this paragraph are according to the IMGT numbering described in Lefranc, M.-P., The Immunologist, 7, 132-136 (1999).

Antibodies specifically binding to GPC3 as included in fusion proteins of the disclosure may comprise an Fc part which allows for extending the in vivo half-life of the bispecific binding molecule of the disclosure. In some embodiments, such Fc part is preferably from human origin, more preferably a human Fc part of an IgG1 or IgG4 antibody, even more preferably an engineered human Fc part of an IgG1 or IgG4 with activating or silencing effector functions. In some embodiments, silencing effector functions may be preferred over activating effector functions. In some embodiments, such an Fc part is an engineered to silence effector functions with mutation(s) at positions 234 and/or 235, numbering according to EU index of Kabat (Johnson and Wu, *Nucleic Acids Res,* 2000). In some embodiments, mutations in positions F234 and L235 of a provided anti-GPC3 antibody may be introduced to silence effector functions. In other embodiments, mutations in positions D265 and P329 of a provided anti-GPC3 antibody may be introduced, to silence effector function. Numbering for both sets of these potential mutations is according to the EU index of Kabat (Shields et al., *J Biol Chem,* 2001).

Various techniques for the production of antibodies and fragments thereof are well known in the art and described, e.g., in Altshuler et al. (2010). Thus, for example, polyclonal antibodies can be obtained from the blood of an animal following immunization with an antigen in mixture with additives and adjuvants and monoclonal antibodies can be produced by any technique which provides antibodies produced by continuous cell line cultures. Examples of such techniques are described, e.g., Harlow and Lane (1999), (1988), and include the hybridoma technique originally described by Köhler and Milstein, 1975, the trioma technique, the human B cell hybridoma technique (see e.g. Li et al., *Proc Natl Acad Sci USA*, 2006, Kozbor and Roder, *Immunol Today*, 1983) and the EBV-hybridoma technique to produce human monoclonal antibodies (Cole et al., *Cancer Res*, 1984). Furthermore, recombinant antibodies may be obtained from monoclonal antibodies or can be prepared de novo using various display methods such as phage, ribosomal, mRNA, or cell display. In some embodiments, a suitable system for the expression of the recombinant (humanized) antibodies or fragments thereof may be selected from, for example, bacteria, yeast, insects, mammalian cell lines or transgenic animals or plants (see, e.g., U.S. Pat. No. 6,080,560; Holliger and Hudson, *Nat Biotechnol*, 2005). Further, techniques described for the production of single chain antibodies (see, inter alia, U.S. Pat. No. 4,946,778) can be adapted to produce single chain antibodies specific for the target of this invention. Surface plasmon resonance as employed in the BIAcore system can be used to increase the efficiency of phage antibodies.

C. Exemplary Lipocalin Muteins of the Disclosure.

Lipocalins are proteinaceous binding molecules that have naturally evolved to bind ligands. Lipocalins occur in many organisms, including vertebrates, insects, plants, and bacteria. The members of the lipocalin protein family (Pervaiz and Brew, *FASEB J*, 1987) are typically small, secreted proteins and have a single polypeptide chain. They are characterized by a range of different molecular-recognition properties: their binding to various, principally hydrophobic small molecules (such as retinoids, fatty acids, cholesterols, prostaglandins, biliverdins, pheromones, tastants, and odorants), and their binding to specific cell-surface receptors and their formation of macromolecular complexes. Although they have, in the past, been classified primarily as transport proteins, it is now clear that the lipocalins fulfill a variety of physiological functions. These include roles in retinol transport, olfaction, pheromone signaling, and the synthesis of prostaglandins. Lipocalins have also been implicated in the regulation of the immune response and the mediation of cell homeostasis (reviewed, e.g., in Flower et al., *Biochim Biophys Acta*, 2000, Flower, *Biochem J*, 1996).

Lipocalins share unusually low levels of overall sequence conservation, often with sequence identities of less than 20%. In strong contrast, their overall folding pattern is highly conserved. The central part of the lipocalin structure consists of a single eight-stranded anti-parallel β-sheet closed back on itself to form a continuously hydrogen-bonded β-barrel. This β-barrel forms a central cavity. One end of the barrel is sterically blocked by the N-terminal peptide segment that runs across its bottom as well as three peptide loops connecting the β-strands. The other end of the β-barrel is open to the solvent and encompasses a target-binding site, which is formed by four flexible peptide loops (AB, CD, EF, and GH). It is the diversity of the loops in the otherwise rigid lipocalin scaffold that gives rise to a variety of different binding modes each capable of accommodating targets of different size, shape, and chemical character (reviewed, e.g., in Skerra, *Biochim Biophys Acta*, 2000, Flower et al., *Biochim Biophys Acta*, 2000, Flower, *Biochem J*, 1996).

A lipocalin mutein according to the present disclosure may be a mutein of any lipocalin. Examples of suitable lipocalins (also sometimes designated as "reference lipocalin," "wild-type lipocalin," "reference protein scaffolds," or simply "scaffolds") of which a mutein may be used include, but are not limited to, tear lipocalin (lipocalin-1, Tlc, or von Ebner's gland protein), retinol binding protein, neutrophil lipocalin-type prostaglandin D-synthase, β-lactoglobulin, bilin-binding protein (BBP), apolipoprotein D (APOD), neutrophil gelatinase-associated lipocalin (NGAL), α2-microglobulin-related protein (A2m), 24p3/uterocalin (24p3), von Ebner's gland protein 1 (VEGP 1), von Ebner's gland protein 2 (VEGP 2), and Major allergen Can f 1 (ALL-1). In related embodiments, a lipocalin mutein is derived from the lipocalin group consisting of human tear lipocalin (hTlc), human neutrophil gelatinase-associated lipocalin (hNGAL), human apolipoprotein D (hAPOD) and the bilin-binding protein of *Pieris brassicae*.

The amino acid sequence of a lipocalin mutein according to the disclosure may have a high sequence identity as compared to the reference (or wild-type) lipocalin from which it is derived, for example, hTlc or hNGAL, when compared to sequence identities with another lipocalin (see also above). In this general context the amino acid sequence of a lipocalin mutein according to the disclosure is at least substantially similar to the amino acid sequence of the corresponding reference (wild-type) lipocalin, with the proviso that there may be gaps (as defined herein) in an alignment that are the result of additions or deletions of amino acids. A respective sequence of a lipocalin mutein of the disclosure, being substantially similar to the sequences of the corresponding reference (wild-type) lipocalin, has, in some embodiments, at least 60%, at least 65%, at least 70%, at least 75%, at least 80%, at least 82%, at least 85%, at least 87%, at least 90% identity, including at least 95% identity to the sequence of the corresponding lipocalin. In this regard, a lipocalin mutein of the disclosure of course may contain substitutions as described herein which renders the lipocalin mutein capable of binding to CD137.

Typically, a lipocalin mutein contains one or more mutated amino acid residues—relative to the amino acid sequence of the wild-type or reference lipocalin, for example, hTlc and hNGAL—in the four loops at the open end that comprise a ligand-binding pocket and define the entrance of ligand-binding pocket (cf. above). As explained above, these regions are essential in determining the binding specificity of a lipocalin mutein for the desired target. In some embodiments, a lipocalin mutein of the disclosure may also contain mutated amino acid residues regions outside of the four loops. In some embodiments, a lipocalin mutein of the disclosure may contain one or more mutated amino acid residues in one or more of the three peptide loops (designated BC, DE, and FG) connecting the β-strands at the closed end of the lipocalin. In some embodiments, a mutein derived from of tear lipocalin, NGAL lipocalin or a homologue thereof, may have 1, 2, 3, 4, or more mutated amino acid residues at any sequence position in the N-terminal region and/or in the three peptide loops BC, DE, and FG arranged at the end of the β-barrel structure that is located opposite to the natural lipocalin binding pocket. In some embodiments, a mutein derived from tear lipocalin, NGAL lipocalin or a homologue thereof, may have no mutated amino acid residues in peptide loop DE arranged at the end of the β-barrel structure, compared to wild-type sequence of tear lipocalin.

In some embodiments, a lipocalin mutein according to the disclosure may include one or more, such as 2, 3, 4, 5, 6, 7, 8, 9, 10, 11, 12, 13, 14, 15, 16, 17, 18, 19, 20 or even more mutated amino acid residues in comparison to the amino acid sequence of a corresponding reference (wild-type) lipocalin, provided that such a lipocalin mutein should be capable of binding to CD137. In some embodiments, a lipocalin mutein of the disclosure includes at least two, including 2, 3, 4, 5, or even more, mutated amino acid residues, where a native amino acid residue of the corresponding reference (wild-type) lipocalin is substituted by an arginine residue.

Any types and numbers of mutations, including substitutions, deletions, and insertions, are envisaged as long as a provided lipocalin mutein retains its capability to bind CD137, and/or it has a sequence identity that it is at least 60%, such as at least 65%, at least 70%, at least 75%, at least 80%, at least 85% or higher identity to the amino acid sequence of the reference (wild-type) lipocalin, for example, mature hTlc or mature hNGAL.

In some embodiments, a substitution is a conservative substitution. In some embodiments, a substitution is a non-conservative substitution or one or more from the exemplary substitutions below—

Specifically, in order to determine whether an amino acid residue of the amino acid sequence of a lipocalin mutein is different from a reference (wild-type) lipocalin corresponds to a certain position in the amino acid sequence of the reference (wild-type) lipocalin, a skilled artisan can use means and methods well-known in the art, e.g., alignments, either manually or by using computer programs such as BLAST2.0, which stands for Basic Local Alignment Search Tool or ClustalW or any other suitable program which is suitable to generate sequence alignments. Accordingly, the amino acid sequence of a reference (wild-type) lipocalin can serve as "subject sequence" or "reference sequence", while the amino acid sequence of a lipocalin mutein serves as "query sequence" (see also above).

Conservative substitutions are generally the following substitutions, listed according to the amino acid to be mutated, each followed by one or more replacement(s) that can be taken to be conservative: Ala→Ser, Thr, or Val; Arg→Lys, Gln, Asn, or His; Asn→Gln, Giu, Asp, or His; Asp→Giu, Gln, Asn, or His; Gln→Asn, Asp, Giu, or His; Giu→Asp, Asn, Gln, or His; His→Arg, Lys, Asn, Gln, Asp, or Giu; Ile→Thr, Leu, Met, Phe, Val, Trp, Tyr, Ala, or Pro; Leu→Thr, Ile, Val, Met, Ala, Phe, Pro, Tyr, or Trp; Lys→Arg, His, Gln, or Asn; Met→Thr, Leu, Tyr, Ile, Phe, Val, Ala, Pro, or Trp; Phe→Thr, Met, Leu, Tyr, Ile, Pro, Trp, Val, or Ala; Ser→Thr, Ala, or Val; Thr→Ser, Ala, Val, Ile, Met, Val, Phe, Pro, or Leu; Trp→Tyr, Phe, Met, Ile, or Leu; Tyr→Trp, Phe, Ile, Leu, or Met; Val→Thr, Ile, Leu, Met, Phe, Ala, Ser, or Pro. Other substitutions are also permissible and can be determined empirically or in accord with other known conservative or non-conservative substitutions. As a further orientation, the following groups each contain amino acids that can typically be taken to define conservative substitutions for one another:
 (a) Alanine (Ala), Serine (Ser), Threonine (Thr), Valine (Val)
 (b) Aspartic acid (Asp), Glutamic acid (Glu), Glutamine (Gln), Asparagine (Asn), Histidine (His)
 (c) Arginine (Arg), Lysine (Lys), Glutamine (Gln), Asparagine (Asn), Histidine (His)
 (d) Isoleucine (lie), Leucine (Leu), Methionine (Met), Valine (Val), Alanine (Ala), Phenylalanine (Phe), Threonine (Thr), Proline (Pro)
 (e) Isoleucine (Ile), Leucine (Leu), Methionine (Met), Phenylalanine (Phe), Tyrosine (Tyr), Tryptophan (Trp)

If such conservative substitutions result in a change in biological activity, then more substantial changes, such as the following, or as further described below in reference to amino acid classes, may be introduced and the products screened for a desired characteristic. Examples of such more substantial changes are: Ala→Leu or Phe; Arg→Giu; Asn→Ile, Val, or Trp; Asp→Met; Cys→Pro; Gln→Phe; Giu→Arg; His→Gly; Ile→Lys, Giu, or Gln; Leu→Lys or Ser; Lys→Tyr; Met→Giu; Phe→Giu, Gln, or Asp; Trp→Cys; Tyr→Giu or Asp; Val→Lys, Arg, His.

In some embodiments, substantial modifications in the physical and biological properties of the iipocalin (mutein) are accomplished by selecting substitutions that differ significantly in their effect on maintaining (a) the structure of the polypeptide backbone in the area of the substitution, for example, as a sheet or helical conformation, (b) the charge or hydrophobicity of the molecule at the target site, or (c) the bulk of the side chain.

Naturally occurring residues are divided into groups based on common side-chain properties: (1) hydrophobic: methionine, alanine, valine, ieucine, iso-ieucine; (2) neutral hydrophilic: cysteine, serine, threonine, asparagine, glutamine; (3) acidic: aspartic acid, glutamic acid; (4) basic: histidine, lysine, arginine; (5) residues that influence chain orientation: glycine, proline; and (6) aromatic: tryptophan, tyrosine, phenylalanine. In some embodiments. substitutions may entail exchanging a member of one of these classes for another class.

Any cysteine residue not involved in maintaining the proper conformation of the respective iipocalin also may be substituted, generally with serine, to improve the oxidative stability of the molecule and prevent aberrant crosslinking. Conversely, cysteine bond (s) may be added to the iipocalin to improve its stability.

D. Exemplary CD137-Specific Lipocalin Muteins of the Disclosure.

As noted above, a lipocalin is a polypeptide defined by its supersecondary structure, namely cylindrical β-pleated sheet supersecondary structural region comprising eight β-strands connected pair-wise by four loops at one end to define thereby a binding pocket. The present disclosure is not limited to lipocalin muteins specifically disclosed herein. In this regard, the disclosure relates to a lipocalin mutein having a cylindrical β-pleated sheet supersecondary structural region comprising eight β-strands connected pair-wise by four loops at one end to define thereby a binding pocket, wherein at least one amino acid of each of at least three of said four loops has been mutated and wherein said lipocalin is effective to bind CD137 with detectable affinity.

In some embodiments, lipocalin muteins disclosed herein may be or comprise a mutein of mature human tear lipocalin (hTlc). A mutein of mature hTlc may be designated herein as an "hTlc mutein". In some other embodiments, a lipocalin mutein disclosed herein is a mutein of mature human neutrophil gelatinase-associated lipocalin (hNGAL). A mutein of mature hNGAL may be designated herein as an "hNGAL mutein".

In one aspect, the present disclosure includes any number of lipocalin muteins derived from a reference (wild-type) lipocalin, preferably derived from mature hTlc or mature hNGAL, that bind CD137 with detectable affinity. In a related aspect, the disclosure includes various lipocalin muteins that are capable of activating the downstream signaling pathways of CD137 by binding to CD137. In this sense, CD137 can be regarded as a non-natural target of the reference (wild-type) lipocalin, preferably hTlc or hNGAL, where "non-natural target" refers to a substance that does not bind to the reference (wild-type) lipocalins under physiological conditions. By engineering reference (wild-type) lipocalins with one or more mutations at certain sequence positions, the present inventors have demonstrated that high affinity and high specificity for the non-natural target, CD137, is possible. In some embodiments, at 1, 2, 3, 4, 5, 6, 7, 8, 9, 10, 11, 12 or even more nucleotide triplet(s)

encoding certain sequence positions on wild-type lipocalins, a random mutagenesis may be carried out through substitution at these positions by a subset of nucleotide triplets, with the aim of generating a lipocalin mutein which is capable of binding CD137.

In some embodiments, lipocalin muteins of the disclosure may have mutated, including substituted, deleted and inserted, amino acid residue(s) at one or more sequence positions corresponding to the linear polypeptide sequence of a reference lipocalin, preferably hTlc or hNGAL. In some embodiments, the number of amino acid residues of a lipocalin mutein of the disclosure that is mutated in comparison with the amino acid sequence of the reference lipocalin, preferably hTlc or hNGAL, is 1, 2, 3, 4, 5, 6, 7, 8, 9, 10, 11, 12, 13, 14, 15, 16, 17, 18, 19, 20 or more such as 25, 30, 35, 40, 45 or 50, with 1, 2, 3, 4, 5, 6, 7, 8, 9, 10, or 11 being preferred and 9, 10 or 11 being even more preferred. However, it is preferred that a lipocalin mutein of the disclosure is still capable of binding CD137.

In some embodiments, a lipocalin mutein of the present disclosure may lack 1, 2, 3, 4 or more amino acids at its N-terminal end and/or 1, 2 or more amino acids at its C-terminal end, in comparison to the respective reference (wild-type) lipocalin; for example, SEQ ID NOs: 32-38. In some embodiments, the present disclosure encompasses hTlc muteins as defined above, in which the first four one, two, three, or N-terminal amino acid residues of the sequence of mature hTlc (His-His-Leu-Leu; positions 1-4) and/or the last one or two C-terminal amino acid residues (Ser-Asp; positions 157-158) of the linear polypeptide sequence of the mature hTlc have been deleted (e.g., SEQ ID NOs: 32-38). In some embodiments, the present disclosure encompasses hNGAL muteins as defined above, in which amino acid residues (Lys-Asp-Pro, positions 46-48) of the linear polypeptide sequence of the mature hNGAL have be deleted (SEQ ID NO: 43). Further, a lipocalin mutein of the disclosure may include the wild-type (natural) amino acid sequence of the reference (wild-type) lipocalin, preferably hTlc or hNGAL, outside the mutated amino acid sequence positions.

In some embodiments, one or more mutated amino acid residues incorporated into a lipocalin mutein of the disclosure does do not substantially hamper or not interfere with the binding activity to the designated target and the folding of the mutein. Such mutations, including substitution, deletion and insertion, can be accomplished at the DNA level using established standard methods (Sambrook and Russell, 2001, Molecular cloning: a laboratory manual). In some embodiments, a mutated amino acid residue(s) at one or more sequence positions corresponding to the linear polypeptide sequence of the reference (wild-type) lipocalin, preferably hTlc or hNGAL, is introduced through random mutagenesis by substituting the nucleotide triplet(s) encoding the corresponding sequence positions of the reference lipocalin with a subset of nucleotide triplets.

In some embodiments, a provided lipocalin mutein that binds CD137 with detectable affinity may include at least one amino acid substitution of a native cysteine residue by another amino acid, for example, a serine residue. In some embodiments, a lipocalin mutein that binds CD137 with detectable affinity may include one or more non-native cysteine residues substituting one or more amino acids of a reference (wild-type) lipocalin, preferably hTlc or hNGAL. In some embodiments, a lipocalin mutein according to the disclosure includes at least two amino acid substitutions of a native amino acid by a cysteine residue, hereby to form one or more cysteine bridges. In some embodiments, said cysteine bridge may connect at least two loop regions. The definition of these regions is used herein in accordance with (*Biochim Biophys Acta,* 2000), Flower (1996) and Breustedt et al. (2005).

Generally, a lipocalin mutein of the disclosure may have about at least 70%, including at least about 80%, such as at least about 85% amino acid sequence identity, with the amino acid sequence of the mature hTlc (SEQ ID NO: 1) or mature hNGAL (SEQ ID NO: 2).

In some aspects, the present disclosure provides CD137-binding hTlc muteins. In this regard, the disclosure provides one or more hTlc muteins that are capable of binding CD137 with an affinity measured by a $K_D$ of about 300 nM, 200 nM, 150 nM, 100 nM, or lower. In some embodiments, provided hTlc muteins are capable of binding CD137 with an $EC_{50}$ value of about 250 nM, 150 nM, 100 nM, 50 nM, 20 nM, or even lower. In some other embodiments, the CD137-binding hTlc muteins may be cross-reactive with cynomolgus CD137 (cyCD137).

In some embodiments, an hTlc mutein of the disclosure may interfere with the binding of CD137L to CD137.

In some embodiments, provided hTlc muteins may comprise a mutated amino acid residue at one or more positions corresponding to positions 5, 26-31, 33-34, 42, 46, 52, 56, 58, 60-61, 65, 71, 85, 94, 101, 104-106, 108, 111, 114, 121, 133, 148, 150, and 153 of the linear polypeptide sequence of mature hTlc (SEQ ID NO: 1).

In some embodiments, provided hTlc muteins may comprise a mutated amino acid residue at one or more positions corresponding to positions 26-34, 55-58, 60-61, 65, 104-106, and 108 of the linear polypeptide sequence of mature hTlc (SEQ ID NO: 1).

In some embodiments, provided hTlc muteins may further comprise a mutated amino acid residue at one or more positions corresponding to positions 101, 111, 114 and 153 of the linear polypeptide sequence of mature hTlc (SEQ ID NO: 1).

In some embodiments, provided hTlc muteins may comprise a mutated amino acid residue at 1, 2, 3, 4, 5, 6, 7, 8, 9, 10, 11, 12, 13, 14, 15, 16, 17, 18, 19, 20, 21, 22, 23, 24, 25, 26, or even more positions corresponding to positions 5, 26-31, 33-34, 42, 46, 52, 56, 58, 60-61, 65, 71, 85, 94, 101, 104-106, 108, 111, 114, 121, 133, 148, 150 and 153 of the linear polypeptide sequence of mature hTlc (SEQ ID NO: 1). In some preferred embodiments, the provided hTlc muteins are capable of binding CD137, in particular human CD137.

In some embodiments, provided hTlc muteins may comprise a mutated amino acid residue at 1, 2, 3, 4, 5, 6, 7, 8, 9, 10, 11, 12, or even more positions corresponding to positions 26-34, 55-58, 60-61, 65, 104-106 and 108 of the linear polypeptide sequence of mature hTlc (SEQ ID NO: 1). In some preferred embodiments, the provided hTlc muteins are capable of binding CD137, in particular human CD137.

In some embodiments, a lipocalin mutein according to the disclosure may include at least one amino acid substitution of a native cysteine residue by, e.g., a serine residue. In some embodiments, an hTlc mutein according to the disclosure includes an amino acid substitution of a native cysteine residue at positions corresponding to positions 61 and/or 153 of the linear polypeptide sequence of mature hTlc (SEQ ID NO:1) by another amino acid, such as a serine residue. In this context it is noted that it has been found that removal of the structural disulfide bond (on the level of a respective naïve nucleic acid library) of wild-type hTlc that is formed by the cysteine residues 61 and 153 (cf. Breustedt et al., *J Biol Chem,* 2005) may provide hTlc muteins that are not only stably folded but are also able to bind a given non-natural target with high affinity. In some embodiments, the elimination of the structural disulfide bond may provide the further advantage of allowing for the generation or deliberate introduction of non-natural disulfide bonds into muteins of the disclosure, thereby, increasing the stability of the muteins. However, hTlc muteins that bind CD137 and that have the disulfide bridge formed between Cys 61 and Cys 153 are also part of the present disclosure.

In some particular embodiments, an hTlc mutein of the disclosure may include one or more of the amino acid substitutions Cys 61→Ala, Phe, Lys, Arg, Thr, Asn, Gly, Gln, Asp, Asn, Leu, Tyr, Met, Ser, Pro or Trp and/or Cys 153→Ser or Ala, at positions corresponding to positions 61 and/or 153 of the linear polypeptide sequence of mature hTlc (SEQ ID NO:1).

In some embodiments, either two or all three of the cysteine codons at positions corresponding to positions 61, 101 and 153 of the linear polypeptide sequence of mature hTlc (SEQ ID NO:1) are replaced by a codon of another amino acid. Further, in some embodiments, an hTlc mutein according to the disclosure includes an amino acid substitution of a native cysteine residue at the position corresponding to position 101 of the linear polypeptide sequence of mature hTlc (SEQ ID NO:1) by a serine residue or a histidine residue.

In some embodiments, a mutein according to the disclosure comprises an amino acid substitution of a native amino acid by a cysteine residue at positions corresponding to positions 28 or 105 of the linear polypeptide sequence of mature hTlc (SEQ ID NO: 1). Further, in some embodiments, a mutein according to the disclosure comprises an amino acid substitution of a native arginine residue at the position corresponding to position 111 of the linear polypeptide sequence of mature hTlc (SEQ ID NO:1) by a proline residue. Further, in some embodiments, a mutein according to the disclosure comprises an amino acid substitution of a native lysine residue at the position corresponding to position 114 of the linear polypeptide sequence of mature hTlc (SEQ ID NO:1) by a tryptophan residue or a glutamic acid.

In some embodiments, provided CD137-binding hTlc muteins may comprise, at one or more positions corresponding to positions 5, 26-31, 33-34, 42, 46, 52, 56, 58, 60-61, 65, 71, 85, 94, 101, 104-106, 108, 111, 114, 121, 133, 148, 150, and 153 of the linear polypeptide sequence of mature hTlc (SEQ ID NO: 1), one or more of the following mutated amino acid residues: Ala 5→Val or Thr; Arg 26→Glu; Glu 27→Gly; Phe 28→Cys; Pro 29→Arg; Glu 30→Pro; Met 31→Trp; Leu 33→Ile; Glu 34→Phe; Thr 42→Ser; Gly 46→Asp; Lys 52→Glu; Leu 56→Ala; Ser 58→Asp; Arg 60→Pro; Cys 61→Ala; Lys 65→Arg or Asn; Thr 71→Ala; Val 85→Asp; Lys 94→Arg or Glu; Cys 101→Ser; Glu 104→Val; Leu 105→Cys; His 106→Asp; Lys 108→Ser; Arg 111→Pro; Lys 114→Trp; Lys 121→Glu; Ala 133→Thr; Arg 148→Ser; Ser 150→Ile; and Cys 153→Ser. In some embodiments, an hTlc mutein of the disclosure comprises two or more, such as 3, 4, 5, 6, 7, 8, 9, 10, 11, 12, 13, 14, 15, 16, 17, 18, 19, 20, 21, 22, 23, 24, 25, 26, or more, or even all mutated amino acid residues at these sequence positions of mature hTlc (SEQ ID NO: 1).

In some embodiments, provided CD137-binding hTlc muteins may comprise one of the following sets of mutated amino acid residues in comparison with the linear polypeptide sequence of mature hTlc (SEQ ID NO: 1):

(a) Arg 26→Glu; Glu 27→Gly; Phe 28→Cys; Pro 29→Arg; Glu 30→Pro; Met 31→Trp; Leu 33→Ile; Glu 34→Phe; Leu 56→Ala; Ser 58→Asp; Arg 60→Pro; Cys 61→Ala; Cys 101→Ser; Glu 104→Val; Leu 105→Cys; His 106→Asp; Lys 108→Ser; Arg 111→Pro; Lys 114→Trp; and Cys 153→Ser;

(b) Ala 5→Thr; Arg 26→Glu; Glu 27→Gly; Phe 28→Cys; Pro 29→Arg; Glu 30→Pro; Met 31→Trp; Leu 33→Ile; Glu 34→Phe; Leu 56→Ala; Ser 58→Asp; Arg 60→Pro; Cys 61→Ala; Lys 65→Arg; Val 85→Asp; Cys 101→Ser; Glu 104→Val; Leu 105→Cys; His 106→Asp; Lys 108→Ser; Arg 111→Pro; Lys 114→Trp; Lys 121→Glu; Ala 133→Thr; and Cys 153→Ser;

(c) Arg 26→Glu; Glu 27→Gly; Phe 28→Cys; Pro 29→Arg; Glu 30→Pro; Met 31→Trp; Leu 33→Ile; Glu 34→Phe; Leu 56→Ala; Ser 58→Asp; Arg 60→Pro; Cys 61→Ala; Lys 65→Asn; Lys 94→Arg; Cys 101→Ser; Glu 104→Val; Leu 105→Cys; His 106→Asp; Lys 108→Ser; Arg 111→Pro; Lys 114→Trp; Lys 121→Glu; Ala 133→Thr; and Cys 153→Ser;

(d) Ala 5→Val; Arg 26→Glu; Glu 27→Gly; Phe 28→Cys; Pro 29→Arg; Glu 30→Pro; Met 31→Trp; Leu 33→Ile; Glu 34→Phe; Leu 56→Ala; Ser 58→Asp; Arg 60→Pro; Cys 61→Ala; Lys 65→Arg; Lys 94→Glu; Cys 101→Ser; Glu 104→Val; Leu 105→Cys; His 106→Asp; Lys 108→Ser; Arg 111→Pro; Lys 114→Trp; Lys 121→Glu; Ala 133→Thr; and Cys 153→Ser;

(e) Arg 26→Glu; Glu 27→Gly; Phe 28→Cys; Pro 29→Arg; Glu 30→Pro; Met 31→Trp; Leu 33→Ile; Glu 34→Phe; Thr 42→Ser; Leu 56→Ala; Ser 58→Asp; Arg 60→Pro; Cys 61→Ala; Cys 101→Ser; Glu 104→Val; Leu 105→Cys; His 106→Asp; Lys 108→Ser; Arg 111→Pro; Lys 114→Trp; Ser 150→Ile; and Cys 153→Ser;

(f) Arg 26→Glu; Glu 27→Gly; Phe 28→Cys; Pro 29→Arg; Glu 30→Pro; Met 31→Trp; Leu 33→Ile; Glu 34→Phe; Lys 52→Glu; Leu 56→Ala; Ser 58→Asp; Arg 60→Pro; Cys 61→Ala; Thr 71→Ala; Cys 101→Ser; Glu 104→Val; Leu 105→Cys; His 106→Asp; Lys 108→Ser; Arg 111→Pro; Lys 114→Trp; Ala 133→Thr; Arg 148→Ser; Ser 150→Ile; and Cys 153→Ser; and (g) Ala 5→Thr; Arg 26→Glu; Glu 27→Gly; Phe 28→Cys; Pro 29→Arg; Glu 30→Pro; Met 31→Trp; Leu 33→Ile; Glu 34→Phe; Gly 46→Asp; Leu 56→Ala; Ser 58→Asp; Arg 60→Pro; Cys 61→Ala; Thr 71→Ala; Cys 101→Ser; Glu 104→Val; Leu 105→Cys; His 106→Asp; Lys 108→Ser; Arg 111→Pro; Lys 114→Trp; Ser 150→Ile; and Cys 153→Ser.

In some embodiments, the residual region, i.e. the region differing from positions corresponding to positions 5, 26-31, 33-34, 42, 46, 52, 56, 58, 60-61, 65, 71, 85, 94, 101, 104-106, 108, 111, 114, 121, 133, 148, 150, and 153 of the linear polypeptide sequence of mature hTlc (SEQ ID NO: 1), of an hTlc mutein of the disclosure may comprise the wild-type (natural) amino acid sequence of the linear polypeptide sequence of mature hTlc outside the mutated amino acid sequence positions.

In some embodiments, an hTlc mutein of the disclosure has at least 70% sequence identity or at least 70% sequence homology to the sequence of mature hTlc (SEQ ID NO: 1). As an illustrative example, the mutein of the SEQ ID NO: 32 has an amino acid sequence identity or a sequence homology of approximately 84% with the amino acid sequence of the mature hTlc.

In some embodiments, an hTlc mutein of the disclosure comprises an amino acid sequence as set forth in any one of SEQ ID NOs: 32-38 or a fragment or variant thereof.

In some embodiments, an hTlc mutein of the disclosure has at least 75%, at least 80%, at least 85%, at least 90%, at least 95%, at least 98%, or higher sequence identity to an amino acid sequence selected from the group consisting of SEQ ID NOs: 32-38.

The present disclosure also includes structural homologues of an hTlc mutein having an amino acid sequence selected from the group consisting of SEQ ID NOs: 32-38, which structural homologues have an amino acid sequence homology or sequence identity of more than about 60%, preferably more than 65%, more than 70%, more than 75%, more than 80%, more than 85%, more than 90%, more than 92% and most preferably more than 95% in relation to said hTlc mutein.

In some aspects, the present disclosure provides CD137-binding hNGAL muteins. In this regard, the disclosure provides one or more hNGAL muteins that are capable of binding CD137 with an affinity measured by a $K_D$ of about 800 nM, 700 nM, 200 nM, 140 nM, 100 nM or lower, preferably about 70 nM, 50 nM, 30 nM, 10 nM, 5 nM, 2 nM, or even lower. In some embodiments, provided hNGAL muteins are capable of binding CD137 with an $EC_{50}$ value of about 1000 nM, 500 nM, 100 nM, 80 nM, 50 nM, 25 nM, 18 nM, 15 nM, 10 nM, 5 nM, or lower.

In some embodiments, provided CD137-binding hNGAL muteins may be cross-reactive with cynomolgus CD137. In some embodiments, provided hNGAL muteins are capable of binding cynomolgus CD137 with an affinity measured by a $K_D$ of about 50 nM, 20 nM, 10 nM, 5 nM, 2 nM, or even lower. In some embodiments, provided hNGAL muteins are capable of binding cynomolgus CD137 with an $EC_{50}$ value of about 100 nM, 80 nM, 50 nM, 30 nM, or even lower.

In some embodiments, an hNGAL mutein of the disclosure may interfere or compete with the binding of CD137L to CD137. In some other embodiments, an hNGAL mutein of the disclosure may be capable of binding CD137 in the presence of CD137L and/or binding CD137/CD137L complex.

In some embodiments, provided hNGAL muteins may comprise a mutated amino acid residue at one or more positions corresponding to positions 28, 36, 40-41, 49, 52, 65, 68, 70, 72-73, 77, 79, 81, 83, 87, 94, 96, 100, 103, 106, 125, 127, 132 and 134 of the linear polypeptide sequence of mature hNGAL (SEQ ID NO: 2).

In some embodiments, provided hNGAL muteins may comprise a mutated amino acid residue at 1, 2, 3, 4, 5, 6, 7, 8, 9, 10, 11, 12, 13, 14, 15, 16, 17, 18, 19, 20, 21, or even more positions corresponding to position 28, 36, 40-41, 49, 52, 65, 68, 70, 72-73, 77, 79, 81, 83, 87, 94, 96, 100, 103, 106, 125, 127, 132, and 134 of the linear polypeptide sequence of mature hNGAL (SEQ ID NO: 2). In some preferred embodiments, the provided hNGAL muteins are capable of binding CD137, in particular human CD137.

In some embodiments, provided hNGAL muteins may comprise a mutated amino acid residue at one or more positions corresponding to positions 28, 36, 40-41, 49, 52, 65, 68, 70, 72-73, 77, 79, 81, 87, 96, 100, 103, 106, 125, 127, 132 and 134 of the linear polypeptide sequence of mature hNGAL (SEQ ID NO: 2) In some preferred embodiments, the provided hNGAL muteins are capable of binding CD137, in particular human CD137.

In some embodiments, provided hNGAL muteins may comprise a mutated amino acid residue at one or more positions corresponding to positions 36, 87, and 96 of the linear polypeptide sequence of mature hNGAL (SEQ ID NO: 2) and at one or more positions corresponding to positions 28, 40-41, 49, 52, 65, 68, 70, 72-73, 77, 79, 81, 83, 94, 100, 103, 106, 125, 127, 132, and 134 of the linear polypeptide sequence of mature hNGAL (SEQ ID NO: 2).

In other some embodiments, provided hNGAL muteins may comprise a mutated amino acid residue at one or more positions corresponding to positions 20, 25, 28, 33, 36, 40-41, 44, 49, 52, 59, 68, 70-73, 77-82, 87, 92, 96, 98, 100, 101, 103, 122, 125, 127, 132, and 134 of the linear polypeptide sequence of mature hNGAL (SEQ ID NO: 2).

In other embodiments, provided hNGAL muteins may comprise a mutated amino acid residue at one or more positions corresponding to positions 36, 40, 41, 49, 52, 68, 70, 72, 73, 77, 79, 81, 96, 100, 103, 125, 127, 132, and 134 of the linear polypeptide sequence of mature hNGAL (SEQ ID NO: 2) and at one or more positions corresponding to positions 20, 25, 33, 44, 59, 71, 78, 80, 82, 87, 92, 98, 101, and 122 of the linear polypeptide sequence of mature hNGAL (SEQ ID NO: 2).

In some embodiments, a lipocalin mutein according to the disclosure may comprise at least one amino acid substitution of a native cysteine residue by, e.g., a serine residue. In some embodiments, an hNGAL mutein according to the disclosure may comprise an amino acid substitution of a native cysteine residue at positions corresponding to positions 76 and/or 175 of the linear polypeptide sequence of mature hNGAL (SEQ ID NO: 2) by another amino acid, such as a serine residue. In this context, it is noted that it has been found that removal of the structural disulfide bond (on the level of a respective naïve nucleic acid library) of wild-type hNGAL that is formed by the cysteine residues 76 and 175 (cf. Breustedt et al., *J Biol Chem*, 2005) may provide hNGAL muteins that are not only stably folded but are also able to bind a given non-natural target with high affinity. In some embodiments, the elimination of the structural disulfide bond may provide the further advantage of allowing for the generation or deliberate introduction of non-natural disulfide bonds into muteins of the disclosure, thereby, increasing the stability of the muteins. However, hNGAL muteins that bind CD137 and that have the disulfide bridge formed between Cys 76 and Cys 175 are also part of the present disclosure.

In some embodiments, provided CD137-binding hNGAL muteins may comprise, at one or more positions corresponding to positions 28, 36, 40-41, 49, 52, 65, 68, 70, 72-73, 77, 79, 81, 83, 87, 94, 96, 100, 103, 106, 125, 127, 132 and 134 of the linear polypeptide sequence of mature hNGAL (SEQ ID NO: 2), one or more of the following mutated amino acid residues: Gln 28→His; Leu 36→Gln; Ala 40→Ile; Ile 41→Arg or Lys; Gln 49→Val, Ile, His, Ser or Asn; Tyr 52→Met; Asn 65→Asp; Ser 68→Met, Ala or Gly; Leu 70→Ala, Lys, Ser or Thr; Arg 72→Asp; Lys 73→Asp; Asp 77→Met, Arg, Thr or Asn; Trp 79→Ala or Asp; Arg 81→Met, Trp or Ser; Phe 83→Leu; Cys 87→Ser; Leu 94→Phe; Asn 96→Lys; Tyr 100→Phe; Leu 103→His; Tyr 106→Ser; Lys 125→Phe; Ser 127→Phe; Tyr 132→Glu and Lys 134→Tyr. In some embodiments, an hNGAL mutein of the disclosure comprises two or more, such as 3, 4, 5, 6, 7, 8, 9, 10, 11, 12, even more such as 13, 14, 15, 16, 17, 18, 19, 20, 21, 22, 23, 24, or all mutated amino acid residues at these sequence positions of mature hNGAL (SEQ ID NO: 2).

In some embodiments, provided CD137-binding hNGAL muteins may comprise, at one or more positions corresponding to positions 20, 25, 28, 33, 36, 40-41, 44, 49, 52, 59, 68, 70-73, 77-82, 87, 92, 96, 98, 100, 101, 103, 122, 125, 127, 132, and 134 of the linear polypeptide sequence of mature hNGAL (SEQ ID NO: 2), one or more of the following mutated amino acid residues: Gln 20→Arg; Asn 25→Tyr or Asp; Gln 28→His; Val 33→Ile; Leu 36→Met; Ala 40→Asn; Ile 41→Leu; Glu 44→Val or Asp; Gln 49→His; Tyr 52→Ser or Gly; Lys 59→Asn; Ser 68→Asp; Leu 70→Met; Phe 71→Leu; Arg 72→Leu; Lys 73→Asp; Asp 77→Gln or His; Tyr 78→His; Trp 79→Ile; Ile 80→Asn; Arg 81→Trp or Gln; Thr 82→Pro; Cys 87→Ser; Phe 92→Leu or Ser; Asn 96→Phe; Lys 98→Arg; Tyr 100→Asp; Pro 101→Leu; Leu 103→His or Pro; Phe 122→Tyr; Lys 125→Ser; Ser 127→Ile; Tyr 132→Trp; and Lys 134→Gly. In some embodiments, an hNGAL mutein of the disclosure comprises two or more, such as 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, or 34 mutated amino acid residues at these sequence positions of mature hNGAL (SEQ ID NO: 2).

In some embodiments, provided CD137-binding hNGAL muteins may comprise, at one or more, such as 2, 3, 4, 5, 6, 7, 8, 9, 10, 11, 12, 13, 14, 15, 16, 17, 18, 19, positions corresponding to positions 36, 40, 41, 49, 52, 68, 70, 72, 73, 77, 79, 81, 96, 100, 103, 125, 127, 132, and 134 of the linear polypeptide sequence of mature hNGAL (SEQ ID NO: 2), one or more of the following mutated amino acid residues: Leu 36→Met; Ala 40→Asn; Ile 41→Leu; Gln 49→His; Tyr 52→Ser or Gly; Ser 68→Asp; Leu 70→Met; Arg 72→Leu; Lys 73→Asp; Asp 77→Gln or His; Trp 79→Ile; Arg 81→Trp or Gln; Asn 96→Phe; Tyr 100→Asp; Leu 103→His or Pro; Lys 125→Ser; Ser 127→Ile; Tyr 132→Trp; and Lys 134→Gly. In some embodiments, provided CD137-binding hNGAL muteins may further comprise, at one or more, such as 2, 3, 4, 5, 6, 7, 8, 9, 10, 11, 12, 13, 14, positions corresponding to positions 20, 25, 33, 44, 59, 71, 78, 80, 82, 87, 92, 98, 101, and 122 of the linear polypeptide sequence of mature hNGAL (SEQ ID NO: 2), one or more of the following mutated amino acid residues: Gln 20→Arg; Asn 25→Tyr or Asp; Val 33→Ile; Glu 44→Val or Asp; Lys 59→Asn; Phe 71→Leu; Tyr 78→His; Ile 80→Asn; Thr 82→Pro; Phe 92→Leu or Ser; Lys 98→Arg; Pro 101→Leu; and Phe 122→Tyr.

In some embodiments, provided CD137-binding hNGAL muteins may comprise one of the following sets of mutated amino acid residues in comparison with the linear polypeptide sequence of mature hNGAL (SEQ ID NO: 2):

(a) Gln 28→His; Leu 36→Gln; Ala 40→Ile; Ile 41→Lys; Gln 49→Asn; Tyr 52→Met; Ser 68→Gly; Leu 70→Thr; Arg 72→Asp; Lys 73→Asp; Asp 77→Thr; Trp 79→Ala; Arg 81→Ser; Cys 87→Ser; Asn 96→Lys; Tyr 100→Phe; Leu 103→His; Tyr 106→Ser; Lys 125→Phe; Ser 127→Phe; Tyr 132→Giu; and Lys 134→Tyr;

(b) Gln 28→His; Leu 36→Gln; Ala 40→Ile; Ile 41→Arg; Gln 49→Ile; Tyr 52→Met; Asn 65→Asp; Ser 68→Met; Leu 70→Lys; Arg 72→Asp; Lys 73→Asp; Asp 77 Met; Trp 79→Asp; Arg 81→Trp; Cys 87→Ser; Asn 96→Lys; Tyr 100→Phe; Leu 103→His; Tyr 106→Ser; Lys 125→Phe; Ser 127→Phe; Tyr 132→Giu; and Lys 134→Tyr;

(c) Gln 28→His; Leu 36→Gln; Ala 40→Ile; Ile 41→Arg; Gln 49→Asn; Tyr 52→Met; Asn 65→Asp; Ser 68→Ala; Leu 70→Ala; Arg 72→Asp; Lys 73→Asp; Asp 77→Thr; Trp 79→Asp; Arg 81→Trp; Cys 87→Ser; Asn 96→Lys; Tyr 100→Phe; Leu 103→His; Tyr 106→Ser; Lys 125→Phe; Ser 127→Phe; Tyr 132→Giu; and Lys 134→Tyr;

(d) Gln 28→His; Leu 36→Gln; Ala 40→Ile; Ile 41→Lys; Gln 49→Asn; Tyr 52→Met; Asn 65→Asp; Ser 68→Ala; Leu 70→Ala; Arg 72→Asp; Lys 73→Asp; Asp 77→Thr; Trp 79→Asp; Arg 81→Trp; Cys 87→Ser; Asn 96→Lys; Tyr 100→Phe; Leu 103→His; Tyr 106→Ser; Lys 125→Phe; Ser 127→Phe; Tyr 132→Giu; and Lys 134→Tyr;

(e) Gln 28→His; Leu 36→Gln; Ala 40→Ile; Ile 41→Lys; Gln 49→Ser; Tyr 52→Met; Asn 65→Asp; Ser 68→Gly; Leu 70→Ser; Arg 72→Asp; Lys 73→Asp; Asp 77→Thr; Trp 79→Ala; Arg 81→Met; Cys 87→Ser; Asn 96→Lys; Tyr 100→Phe; Leu 103→His; Tyr 106→Ser; Lys 125→Phe; Ser 127→Phe; Tyr 132→Giu; and Lys 134→Tyr;

(f) Gln 28→His; Leu 36→Gln; Ala 40→Ile; Ile 41→Lys; Gln 49→Val; Tyr 52→Met; Asn 65→Asp; Ser 68→Gly; Leu 70→Thr; Arg 72→Asp; Lys 73→Asp; Asp 77→Arg; Trp 79→Asp; Arg 81→Ser; Cys 87→Ser; Leu 94→Phe; Asn 96→Lys; Tyr 100→Phe; Leu 103→His; Tyr 106→Ser; Lys 125→Phe; Ser 127→Phe; Tyr 132→Glu; and Lys 134→Tyr;

(g) Gln 28→His; Leu 36→Gln; Ala 40→Ile; Ile 41→Arg; Gln 49→His; Tyr 52→Met; Asn 65→Asp; Ser 68→Gly; Leu 70→Thr; Arg 72→Asp; Lys 73→Asp; Asp 77→Thr; Trp 79→Ala; Arg 81→Ser; Cys 87→Ser; Asn 96→Lys; Tyr 100→Phe; Leu 103→His; Tyr 106→Ser; Lys 125→Phe; Ser 127→Phe; Tyr 132→Glu; and Lys 134→Tyr;

(h) Gln 28→His; Leu 36→Gln; Ala 40→Ile; Ile 41→Lys; Gln 49→Asn; Tyr 52→Met; Asn 65→Asp; Ser 68→Gly; Leu 70→Thr; Arg 72→Asp; Lys 73→Asp; Asp 77→Thr; Trp 79→Ala; Arg 81→Ser; Phe 83→Leu; Cys 87→Ser; Leu 94→Phe; Asn 96→Lys; Tyr 100→Phe; Leu 103→His; Tyr 106→Ser; Lys 125→Phe; Ser 127→Phe; Tyr 132→Glu; and Lys 134→Tyr; or (i) Gln 28→His; Leu 36→Gln; Ala 40→Ile; Ile 41→Arg; Gln 49→Ser; Tyr 52→Met; Asn 65→Asp; Ser 68→Ala; Leu 70→Thr; Arg 72→Asp; Lys 73→Asp; Asp 77→Asn; Trp 79→Ala; Arg 81→Ser; Cys 87→Ser; Asn 96→Lys; Tyr 100→Phe; Leu 103→His; Tyr 106→Ser; Lys 125→Phe; Ser 127→Phe; Tyr 132→Glu; and Lys 134→Tyr.

In some further embodiments, in the residual region, i.e. the region differing from positions 28, 36, 40-41, 49, 52, 65, 68, 70, 72-73, 77, 79, 81, 83, 87, 94, 96, 100, 103, 106, 125, 127, 132 and 134 of the linear polypeptide sequence of mature hNGAL (SEQ ID NO: 2), an hNGAL mutein of the disclosure may include the wild-type (natural) amino acid sequence of mature hNGAL outside the mutated amino acid sequence positions.

In some other embodiments, provided CD137-binding hNGAL muteins may comprise one of the following sets of mutated amino acid residues in comparison with the linear polypeptide sequence of mature hNGAL (SEQ ID NO: 2):

(a) Leu 36→Met; Ala 40→Asn; Ile 41→Leu; Gln 49→His; Tyr 52→Ser; Ser 68→Asp; Leu 70→Met; Arg 72→Leu; Lys 73→Asp; Asp 77→Gln; Trp 79→Ile; Arg 81→Trp; Asn 96→Phe; Tyr 100→Asp; Leu 103→His; Lys 125→Ser; Ser 127→Ile; Tyr 132→Trp; and Lys 134→Gly;

(b) Leu 36→Met; Ala 40→Asn; Ile 41→Leu; Gln 49→His; Tyr 52→Ser; Ser 68→Asp; Leu 70→Met; Arg 72→Leu; Lys 73→Asp; Asp 77→Gln; Trp 79→Ile; Arg 81→Trp; Phe 92→Leu; Asn 96→Phe; Lys 98→Arg; Tyr 100→Asp; Pro 101→Leu; Leu 103→His; Lys 125→Ser; Ser 127→Ile; Tyr 132→Trp; and Lys 134→Gly;

(c) Asn 25→Tyr; Leu 36→Met; Ala 40→Asn; Ile 41→Leu; Gln 49→His; Tyr 52→Gly; Ser 68→Asp; Leu 70→Met; Phe 71→Leu; Arg 72→Leu; Lys

73→Asp; Asp 77→Gln; Trp 79→Ile; Arg 81→Gln; Phe 92→Ser; Asn 96→Phe; Tyr 100→Asp; Leu 103→His; Lys 125→Ser; Ser 127→Ile; Tyr 132→Trp; and Lys 134→Gly;

(d) Leu 36→Met; Ala 40→Asn; Ile 41→Leu; Gln 49→His; Tyr 52→Gly; Ser 68→Asp; Leu 70→Met; Arg 72→Leu; Lys 73→Asp; Asp 77→Gln; Tyr 78→His; Trp 79→Ile; Arg 81→Trp; Phe 92→Leu; Asn 96→Phe; Tyr 100→Asp; Leu 103→His; Lys 125→Ser; Ser 127→Ile; Tyr 132→Trp; and Lys 134→Gly;

(e) Asn 25→Asp; Leu 36→Met; Ala 40→Asn; Ile 41→Leu; Gln 49→His; Tyr 52→Gly; Ser 68→Asp; Leu 70→Met; Arg 72→Leu; Lys 73→Asp; Asp 77→Gln; Trp 79→Ile; Arg 81→Trp; Phe 92→Leu; Asn 96→Phe; Tyr 100→Asp; Leu 103→His; Lys 125→Ser; Ser 127→Ile; Tyr 132→Trp; and Lys 134→Gly;

(f) Val 33→Ile; Leu 36→Met; Ala 40→Asn; Ile 41→Leu; Gln 49→His; Tyr 52→Gly; Ser 68→Asp; Leu 70→Met; Arg 72→Leu; Lys 73→Asp; Asp 77→Gln; Trp 79→Ile; Arg 81→Trp; Phe 92→Leu; Asn 96→Phe; Tyr 100→Asp; Leu 103→His; Lys 125→Ser; Ser 127→Ile; Tyr 132→Trp; and Lys 134→Gly;

(g) Gln 20→Arg; Leu 36→Met; Ala 40→Asn; Ile 41→Leu; Glu 44→Val; Gln 49→His; Tyr 52→Gly; Ser 68→Asp; Leu 70→Met; Arg 72→Leu; Lys 73→Asp; Asp 77→Gln; Trp 79→Ile; Arg 81→Trp; Phe 92→Leu; Asn 96→Phe; Tyr 100→Asp; Leu 103→His; Phe 122→Tyr; Lys 125→Ser; Ser 127→Ile; Tyr 132→Trp; and Lys 134→Gly;

(h) Leu 36→Met; Ala 40→Asn; Ile 41→Leu; Gln 49→His; Tyr 52→Ser; Ser 68→Asp; Leu 70→Met; Arg 72→Leu; Lys 73→Asp; Asp 77→Gln; Trp 79→Ile; Ile 80→Asn; Arg 81→Trp; Thr 82→Pro; Asn 96→Phe; Tyr 100→Asp; Pro 101→Leu; Leu 103→Pro; Lys 125→Ser; Ser 127→Ile; Tyr 132→Trp; and Lys 134→Gly;

(i) Leu 36→Met; Ala 40→Asn; Ile 41→Leu; Gln 49→His; Tyr 52→Gly; Lys 59→Asn; Ser 68→Asp; Leu 70→Met; Arg 72→Leu; Lys 73→Asp; Asp 77→Gln; Trp 79→Ile; Arg 81→Trp; Phe 92→Leu; Asn 96→Phe; Tyr 100→Asp; Leu 103→His; Lys 125→Ser; Ser 127→Ile; Tyr 132→Trp; and Lys 134→Gly; and (j) Leu 36→Met; Ala 40→Asn; Ile 41→Leu; Glu 44→Asp; Gln 49→His; Tyr 52→Ser; Ser 68→Asp; Leu 70→Met; Phe 71→Leu; Arg 72→Leu; Lys 73→Asp; Asp 77→His; Trp 79→Ile; Arg 81→Trp; Phe 92→Leu; Asn 96→Phe; Tyr 100→Asp; Leu 103→His; Lys 125→Ser; Ser 127→Ile; Tyr 132→Trp; and Lys 134→Gly.

In some embodiments, provided CD137-binding hNGAL mutein may comprise the following set of mutated amino acid residues in comparison with the linear polypeptide sequence of mature hNGAL (SEQ ID NO: 2) Gln 28→His; Leu 36→Gln; Ala 40→Ile; Ile 41→Arg; Gln 49→Ile; Tyr 52→Met; Asn 65→Asp; Ser 68→Met; Leu 70→Lys; Arg 72→Asp; Lys 73→Asp; Asp 77→Met; Trp 79→Asp; Arg 81→Trp; Cys 87→Ser; Asn 96→Lys; Tyr 100→Phe; Leu 103→His; Tyr 106→Ser; Lys 125→Phe; Ser 127→Phe; Tyr 132→Glu; and Lys 134→Tyr and/or provided mutein may have at least 75%, at least 80%, at least 85%, at least 90%, at least 95%, at least 98%, or higher sequence identity to the amino acid sequence of SEQ ID NO: 40.

In some embodiments, in the residual region, i.e. the region differing from positions 20, 25, 28, 33, 36, 40-41, 44, 49, 52, 59, 68, 70-73, 77-82, 87, 92, 96, 98, 100, 101, 103, 122, 125, 127, 132, and 134 of the linear polypeptide sequence of mature hNGAL (SEQ ID NO: 2), of an hNGAL mutein of the disclosure may include the wild-type (natural) amino acid sequence of mature hNGAL outside the mutated amino acid sequence positions.

In some embodiments, an hNGAL mutein of the disclosure has at least 70% sequence identity or at least 70% sequence homology to the sequence of mature hNGAL (SEQ ID NO: 2). As an illustrative example, the mutein of the SEQ ID NO: 40 has an amino acid sequence identity or a sequence homology of approximately 87% with the amino acid sequence of the mature hNGAL.

In some embodiments, an hNGAL mutein of the disclosure comprises an amino acid sequence as set forth in any one of SEQ ID NOs: 39-57 or a fragment or variant thereof.

In some embodiments, an hNGAL mutein of the disclosure has at least 75%, at least 80%, at least 85%, at least 90%, at least 95%, at least 98%, or higher sequence identity to an amino acid sequence selected from the group consisting of SEQ ID NOs: 39-57.

The present disclosure also includes structural homologues of an hNGAL mutein having an amino acid sequence selected from the group consisting of SEQ ID NOs: 39-57, which structural homologues have an amino acid sequence homology or sequence identity of more than about 60%, preferably more than 65%, more than 70%, more than 75%, more than 80%, more than 85%, more than 90%, more than 92% and most preferably more than 95% in relation to said hNGAL mutein.

In some embodiments, the present disclosure provides a lipocalin mutein that binds CD137 with an affinity measured by a $K_D$ of about 5 nM or lower, wherein the lipocalin mutein has at least 75%, at least 80%, at least 85%, at least 90%, at least 95%, at least 98%, or higher sequence identity to the amino acid sequence of SEQ ID NO: 40.

In some embodiments, the present disclosure provides a lipocalin mutein that binds CD137 with an affinity measured by a $K_D$ of about 5 nM or lower, wherein the lipocalin mutein has at least 75%, at least 80%, at least 85%, at least 90%, at least 95%, at least 98%, or higher sequence identity to the amino acid sequence of SEQ ID NO: 49.

In some embodiments, a lipocalin mutein of the present disclosure can comprise a heterologous amino acid sequence at its N- or C-Terminus, preferably C-terminus, such as a Strep II tag (SEQ ID NO: 12) or a cleavage site sequence for certain restriction enzymes, without affecting the biological activity (binding to its target, e.g., CD137) of the lipocalin mutein.

In some embodiments, further modifications of a lipocalin mutein may be introduced in order to modulate certain characteristics of the mutein, such as to improve folding stability, serum stability, protein resistance or water solubility or to reduce aggregation tendency, or to introduce new characteristics to the mutein. In some embodiments, modification(s) may result in two or more (e.g., 2, 3, 4, 5, 6, 7, 8, 9, or 10) characteristics of a provided mutein being modulated.

For example, it is possible to mutate one or more amino acid sequence positions of a lipocalin mutein to introduce new reactive groups, for example, for the conjugation to other compounds, such as polyethylene glycol (PEG), hydroxyethyl starch (HES), biotin, peptides or proteins, or for the formation of non-naturally occurring disulphide linkages. The conjugated compound, for example, PEG and HES, can in some cases increase the serum half-life of the corresponding lipocalin mutein.

In some embodiments, a reactive group of a lipocalin mutein may occur naturally in its amino acid sequence, such as naturally occurring cysteine residues in said amino acid sequence. In some other embodiments, such reactive group may be introduced via mutagenesis. In case a reactive group is introduced via mutagenesis, one possibility is the mutation of an amino acid at the appropriate position by a cysteine residue. Exemplary possibilities of such a mutation to introduce a cysteine residue into the amino acid sequence of an hTlc mutein include the substitutions Thr 40→Cys, Glu 73→Cys, Arg 90→Cys, Asp 95→Cys, and Glu 131→Cys of the wild-type sequence of hTlc (SEQ ID NO: 1). Exemplary possibilities of such a mutation to introduce a cysteine residue into the amino acid sequence of an hNGAL mutein include the introduction of a cysteine residue at one or more of the sequence positions that correspond to sequence positions 14, 21, 60, 84, 88, 116, 141, 145, 143, 146 or 158 of the wild-type sequence of hNGAL (SEQ ID NO: 2). The generated thiol moiety may be used to PEGylate or HESylate the mutein, for example, in order to increase the serum half-life of a respective lipocalin mutein In some embodiments, in order to provide suitable amino acid side chains as new reactive groups for conjugating one of the above compounds to a lipocalin mutein, artificial amino acids may be introduced to the amino acid sequence of a lipocalin mutein. Generally, such artificial amino acids are designed to be more reactive and thus to facilitate the conjugation to the desired compound. Such artificial amino acids may be introduced by mutagenesis, for example, using an artificial tRNA is para-acetyl-phenylalanine.

In some embodiments, a lipocalin mutein of the disclosure is fused at its N-terminus or its C-terminus to a protein, a protein domain or a peptide, for instance, an antibody, a signal sequence and/or an affinity tag. In some other embodiments, a lipocalin mutein of the disclosure is conjugated at its N-terminus or its C-terminus to a partner, which is a protein, a protein domain or a peptide; for instance, an antibody, a signal sequence and/or an affinity tag.

Affinity tags such as the Strep-tag or Strep-tag II (Schmidt et al., *J Mol Biol,* 1996), the c-myc-tag, the FLAG-tag, the His-tag or the HA-tag or proteins such as glutathione-S-transferase, which allow easy detection and/or purification of recombinant proteins, are examples of suitable fusion partners. Proteins with chromogenic or fluorescent properties such as the green fluorescent protein (GFP) or the yellow fluorescent protein (YFP) are suitable fusion partners for lipocalin muteins of the disclosure as well. In general, it is possible to label the lipocalin muteins of the disclosure with any appropriate chemical substance or enzyme, which directly or indirectly generates a detectable compound or signal in a chemical, physical, optical, or enzymatic reaction. For example, a fluorescent or radioactive label can be conjugated to a lipocalin mutein to generate fluorescence or x-rays as detectable signal. Alkaline phosphatase, horseradish peroxidase and β-galactosidase are examples of enzyme labels (and at the same time optical labels) which catalyze the formation of chromogenic reaction products. In general, all labels commonly used for antibodies (except those exclusively used with the sugar moiety in the Fc part of immunoglobulins) can also be used for conjugation to the lipocalin muteins of the disclosure.

In some embodiments, a lipocalin mutein of the disclosure may be fused or conjugated to a moiety that extends the serum half-life of the mutein (in this regard see also International Patent Publication No. WO 2006/056464, where such strategies are described with reference to muteins of human neutrophil gelatinase-associated lipocalin (hNGAL) with binding affinity for CTLA-4). The moiety that extends the serum half-life may be a PEG molecule, a HES molecule, a fatty acid molecule, such as palmitic acid (Vajo and Duckworth, *Pharmacol Rev,* 2000), an Fc part of an immunoglobulin, a $C_{H3}$ domain of an immunoglobulin, a $C_{H4}$ domain of an immunoglobulin, an albumin binding peptide, an albumin binding protein, or a transferrin, to name only a few.

In some embodiments, if PEG is used as a conjugation partner, the PEG molecule can be substituted, unsubstituted, linear, or branched. It can also be an activated polyethylene derivative. Examples of suitable compounds are PEG molecules as described in International Patent Publication No. WO 1999/64016, in U.S. Pat. No. 6,177,074, or in U.S. Pat. No. 6,403,564 in relation to interferon, or as described for other proteins such as PEG-modified asparaginase, PEG-adenosine deaminase (PEG-ADA) or PEG-superoxide dismutase (Fuertges and Abuchowski, *Journal of Controlled Release,* 1990). The molecular weight of such a polymer, such as polyethylene glycol, may range from about 300 to about 70,000 daltons, including, for example, polyethylene glycol with a molecular weight of about 10,000, of about 20,000, of about 30,000 or of about 40,000 daltons. Moreover, as e.g., described in U.S. Pat. No. 6,500,930 or 6,620,413, carbohydrate oligomers and polymers such as HES can be conjugated to a mutein of the disclosure for the purpose of serum half-life extension.

In some embodiments, if an Fc part of an immunoglobulin is used for the purpose to prolong the serum half-life of the lipocalin muteins of the disclosure, the SynFusion™ technology, commercially available from Syntonix Pharmaceuticals, Inc. (MA, USA), may be used. The use of this Fc-fusion technology allows the creation of longer-acting biopharmaceuticals and may, for example, consist of two copies of the mutein linked to the Fc region of an antibody to improve pharmacokinetics, solubility, and production efficiency.

Examples of albumin binding peptides that can be used to extend the serum half-life of a lipocalin mutein are, for instance, those having a Cys-Xaa$_1$-Xaa$_2$-Xaa$_3$-Xaa$_4$-Cys consensus sequence, wherein Xaa$_1$ is Asp, Asn, Ser, Thr, or Trp; Xaa$_2$ is Asn, Gln, His, Ile, Leu, or Lys; Xaa$_3$ is Ala, Asp, Phe, Trp, or Tyr; and Xaa$_4$ is Asp, Gly, Leu, Phe, Ser, or Thr as described in U.S. Patent Publication No. 20030069395 or Dennis et al. (2002). The albumin binding protein fused or conjugated to a lipocalin mutein to extend serum half-life may be a bacterial albumin binding protein, an antibody, an antibody fragment including domain antibodies (see U.S. Pat. No. 6,696,245, for example), or a lipocalin mutein with binding activity for albumin. Examples of bacterial albumin binding proteins include streptococcal protein G (Konig and Skerra, *J Immunol Methods,* 1998).

In some embodiments, if the albumin-binding protein is an antibody fragment it may be a domain antibody. Domain Antibodies (dAbs) are engineered to allow precise control over biophysical properties and in vivo half-life to create the optimal safety and efficacy product profile. Domain Antibodies are for example commercially available from Domantis Ltd. (Cambridge, UK, and MA, USA).

In some embodiments, albumin itself (Osborn et al., *J Pharmacol Exp Ther,* 2002), or a biologically active fragment of albumin can be used as a partner of a lipocalin mutein of the disclosure to extend serum half-life. The term "albumin" includes all mammal albumins such as human serum albumin or bovine serum albumin or rat albumin. The albumin or fragment thereof can be recombinantly produced as described in U.S. Pat. No. 5,728,553 or European Patent Publication Nos. EP0330451 and EP0361991. Accordingly, recombinant human albumin (e.g., Recombumin® from Novozymes Delta Ltd., Nottingham, UK) can be conjugated or fused to a lipocalin mutein of the disclosure.

In some embodiments, if a transferrin is used as a partner to extend the serum half-life of the lipocalin muteins of the disclosure, the muteins can be genetically fused to the N or C terminus, or both, of non-glycosylated transferrin. Non-glycosylated transferrin has a half-life of 14-17 days, and a transferrin fusion protein will similarly have an extended half-life. The transferrin carrier also provides high bioavailability, biodistribution and circulating stability. This technology is commercially available from BioRexis (BioRexis Pharmaceutical Corporation, PA, USA). Recombinant human transferrin (DeltaFerrin™) for use as a protein stabilizer/half-life extension partner is also commercially available from Novozymes Delta Ltd. (Nottingham, UK).

Yet another alternative to prolong the half-life of the lipocalin muteins of the disclosure is to fuse to the N- or C-terminus of a mutein a long, unstructured, flexible glycine-rich sequences (for example poly-glycine with about 20 to 80 consecutive glycine residues). This approach disclosed in International Patent Publication No. WO2007/038619, for example, has also been term "rPEG" (recombinant PEG).

E. Exemplary Uses and Applications of Fusion Proteins Specific for CD137 and GPC3

In some embodiments, fusion proteins of the disclosure may produce synergistic effect through dual-targeting of CD137 and GPC3. In some embodiments, fusion proteins of the disclosure may produce localized anti-tumor effect through dual-targeting of CD137 and GPC3. Numerous possible applications for the fusion proteins of the disclosure, therefore, exist in medicine.

In some embodiments, the present disclosure encompasses the use of one or more fusion proteins disclosed herein or of one or more compositions comprising such fusion proteins for simultaneously binding of CD137 and GPC3.

The present disclosure also involves the use of one or more fusion proteins as described for complex formation with CD137 and/or GPC3.

Therefore, in one aspect of the disclosure, provided fusion proteins may be used for the detection of CD137 and GPC3. Such use may include the steps of contacting one or more said fusion proteins, under suitable conditions, with a sample suspected of containing CD137 and/or GPC3, thereby allowing formation of a complex between the fusion proteins and CD137 and/or GPC3, and detecting the complex by a suitable signal. The detectable signal can be caused by a label, as explained above, or by a change of physical properties due to the binding, i.e., the complex formation, itself. One example is surface plasmon resonance, the value of which is changed during binding of binding partners from which one is immobilized on a surface such as a gold foil.

Fusion proteins of the disclosure may also be used for the separation of CD137 and/or GPC3. Such use may include the steps of contacting one or more said fusion proteins, under suitable conditions, with a sample supposed to contain CD137 and/or GPC3, thereby allowing the formation of a complex between the fusion proteins and CD137 and/or GPC3 and separating the complex from the sample.

In some embodiments, the present disclosure provides diagnostic and/or analytical kits comprising one or more fusion proteins according to the disclosure.

In addition to their use in diagnostics, in yet another aspect, the disclosure contemplates pharmaceutical compositions comprising one or more fusion proteins of the disclosure and a pharmaceutically acceptable excipient.

Furthermore, in some embodiments, the present disclosure provides fusion proteins that simultaneously bind CD137 and/or GPC3 for use such as anti-tumor and/or anti-infection agents, and immune modulators. In some embodiments, fusion proteins of the present disclosure are envisaged to be used in a method of prevention, amelioration, or treatment of human diseases, such as a variety of cancers, including GPC3-positive cancers such as hepatocellular carcinoma (HCC), melanoma, Merkel cell carcinoma, Wilm's tumor, and hepatoblastoma. Accordingly, also provided are methods of preventing, ameliorating, or treating human diseases such as a variety of cancers, including GPC3-positive cancer, such as hepatocellular carcinoma (HCC), melanoma, Merkel cell carcinoma, in a subject in need thereof, comprising administering to said subject a therapeutically effective amount of one or more fusion proteins of the disclosure.

Other examples of cancers that may be treated using the fusion proteins of the disclosure, include liver cancer, bone cancer, pancreatic cancer, skin cancer, head and neck cancer, breast cancer, lung cancer, cutaneous or intraocular malignant melanoma, renal cancer, uterine cancer, ovarian cancer, colorectal cancer, colon cancer, rectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, non-Hodgkin's lymphoma, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, solid tumors of childhood, lymphocytic lymphoma, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, environmentally induced cancers including those induced by asbestos, hematologic malignancies including, for example, multiple myeloma, B cell lymphoma, Hodgkin lymphoma/primary mediastinal B-cell lymphoma, non-Hodgkin's lymphomas, acute myeloid lymphoma, chronic myelogenous leukemia, chronic lymphoid leukemia, follicular lymphoma, diffuse large B-cell lymphoma, Burkitt's lymphoma, immunoblastic large cell lymphoma, precursor B-lymphoblastic lymphoma, mantle cell lymphoma, acute lymphoblastic leukemia, mycosis fungoides, anaplastic large cell lymphoma, T cell lymphoma, and precursor T-lymphoblastic lymphoma, and any combinations of said cancers. In some embodiments, the present invention is also applicable to the treatment of metastatic cancers.

In some embodiments, fusion proteins of the disclosure may simultaneously target tumor cells where GPC3 is expressed, such as HCC, melanoma, Merkel cell carcinoma, Wilm's tumor, and hepatoblastoma, and activate lymphocytes of the host immune system adjacent to such tumor cells. In some embodiments, fusion proteins of the disclosure may increase targeted anti-tumor T cells activity, enhance anti-tumor immunity, induce T-cell mediated cytolysis, and/or have a direct inhibiting effect on tumor growth, thereby produce anti-tumor results. In some embodiments, fusion proteins of the disclosure may activate immune responses in a tumor microenvironment. In some embodiments, fusion proteins of the disclosure may reduce side effects of effector lymphocytes towards healthy cells, i.e. off-target toxicity, for example, via locally inhibiting oncogene activity and inducing cell-mediated cytotoxicity by NK cells and/or T-cells.

In some embodiments, the present disclosure encompasses the use of a fusion protein of the disclosure, or a composition comprising a provided fusion protein, for inducing a localized lymphocyte response in the vicinity of GPC3-positive tumor cells, such as HCC, melanoma, Merkel cell carcinoma, Wilm's tumor, and hepatoblastoma. Accordingly, in some embodiments, the present disclosure provides methods of inducing a localized lymphocyte response in the vicinity of GPC3-positive tumor cells, such as HCC, melanoma, Merkel cell carcinoma, Wilm's tumor, and hepatoblastoma, comprising applying one or more fusion proteins of the disclosure or of one or more compositions comprising such fusion proteins. "Localized" means that upon simultaneous binding T-cells via CD137 and engaging GPC3-positive tumor cells, T-cells produce cytokines, particularly IL-2 and/or IFN gamma in vicinity of the GPC3-positive cells. Such cytokines reflect activation of T-cells which may then be able to kill GPC3-positive cells, either directly or indirectly by activating other killer cells, such as T-cells or NK cells.

In some embodiments, the present disclosure encompasses the use of a fusion protein of the disclosure, or a composition comprising such fusion protein, for co-stimulating T-cells, and/or activating downstream signaling pathways of CD137. Preferably, a provided fusion protein co-stimulates T-cells and/or activating downstream signaling pathways of CD137 when engaging tumor cells where GPC3 is expressed. Accordingly, the present disclosure provides methods of inducing T lymphocyte proliferation and/or activating downstream signaling pathways of CD137, preferably when engaging tumor cells where GPC3 is expressed, such as HCC, melanoma, Merkel cell carcinoma, Wilm's tumor, and hepatoblastoma, comprising applying one or more fusion proteins of the disclosure and/or one or more compositions comprising such fusion proteins.

In some embodiments, the present disclosure encompasses the use of a fusion protein of the disclosure, or a composition comprising such fusion protein, for inducing CD137 clustering and activation on T-cells and directing such T-cells to tumor cells where GPC3 is expressed, such as HCC, melanoma, Merkel cell carcinoma, Wilm's tumor, and hepatoblastoma.

Additional objects, advantages, and features of this disclosure will become apparent to those skilled in the art upon examination of the following Examples and the attached Figures thereof, which are not intended to be limiting. Thus, it should be understood that although the present disclosure is specifically disclosed by exemplary embodiments and optional features, modification and variation of the disclosures embodied therein herein disclosed may be resorted to by those skilled in the art and that such modifications and variations are considered to be within the scope of this disclosure.

F. Production of Exemplary Provided Fusion Proteins Specific for CD137 and GPC3.

In some embodiments, the present disclosure provides nucleic acid molecules (DNA and RNA) that include nucleotide sequences encoding provided fusion proteins. In some embodiments, the disclosure encompasses a host cell containing a provided nucleic acid molecule. Since the degeneracy of the genetic code permits substitutions of certain codons by other codons specifying the same amino acid, the disclosure is not limited to a specific nucleic acid molecule encoding a fusion protein as described herein, rather, encompassing all nucleic acid molecules that include nucleotide sequences encoding a functional fusion protein. In this regard, the present disclosure also relates to nucleotide sequences encoding provided fusion proteins.

A nucleic acid molecule, such as DNA, is referred to as "capable of expressing a nucleic acid molecule" or "able to allow expression of a nucleotide sequence" if it includes sequence elements that contain information regarding to transcriptional and/or translational regulation, and such sequences are "operably linked" to the nucleotide sequence encoding the protein. An operable linkage is a linkage in which the regulatory sequence elements and the sequence to be expressed are connected in a way that enables gene expression. The precise nature of the regulatory regions necessary for gene expression may vary among species, but in general these regions include a promoter, which, in prokaryotes, contains both the promoter per se, i.e., DNA elements directing the initiation of transcription, as well as DNA elements which, when transcribed into RNA, will signal the initiation of translation. Such promoter regions normally include 5' non-coding sequences involved in initiation of transcription and translation, such as the −35/−10 boxes and the Shine-Dalgarno element in prokaryotes or the TATA box, CAAT sequences, and 5'-capping elements in eukaryotes. These regions can also include enhancer or repressor elements as well as translated signal and leader sequences for targeting the native protein to a specific compartment of a host cell.

In addition, 3' non-coding sequences may contain regulatory elements involved in transcriptional termination, polyadenylation or the like. If, however, these termination sequences are not satisfactorily functional in a particular host cell, then they may be substituted with signals functional in that cell.

Therefore, a nucleic acid molecule of the disclosure may be "operably linked" to one or more regulatory sequences, such as a promoter sequence, to allow expression of this nucleic acid molecule. In some embodiments, a nucleic acid molecule of the disclosure includes a promoter sequence and a transcriptional termination sequence. Suitable prokaryotic promoters are, for example, the tet promoter, the lacUV5 promoter or the T7 promoter. Examples of promoters useful for expression in eukaryotic cells are the SV40 promoter or the CMV promoter.

In some embodiments, a nucleic acid molecule encoding a lipocalin mutein disclosed in this application may be "operably linked" to another nucleic acid molecule encoding an immunoglobulin of the disclosure to allow expression of a fusion protein disclosed herein.

In some embodiments, provided methods may include subjecting at least one nucleic acid molecule encoding mature hTlc to mutagenesis at nucleotide triplets coding for one or more positions corresponding to positions 5, 26-31, 33-34, 42, 46, 52, 56, 58, 60-61, 65, 71, 85, 94, 101, 104-106, 108, 111, 114, 121, 133, 148, 150 and 153 of the linear polypeptide sequence of hTlc (SEQ ID NO: 1), to obtain lipocalin muteins as included in provided fusion proteins. In some embodiments, provided methods may include subjecting at least one nucleic acid molecule encoding mature hNGAL to mutagenesis at nucleotide triplets coding for one or more positions corresponding to positions 28, 36, 40-41, 49, 52, 65, 68, 70, 72-73, 77, 79, 81, 83, 87, 94, 96, 100, 103, 106, 125, 127, 132 and 134 of the linear polypeptide sequence of hNGAL (SEQ ID NO: 2), to obtain lipocalin muteins as included in provided fusion proteins. In some embodiments, a provided method may include subjecting at least one nucleic acid molecule encoding mature hNGAL to mutagenesis at nucleotide triplets coding for one or more positions corresponding to positions 20, 25, 28, 33, 36, 40-41, 44, 49, 52, 59, 68, 70-73, 77-82, 87, 92, 96, 98, 100, 101, 103, 122, 125, 127, 132, and 134 of the linear polypeptide sequence of hNGAL (SEQ ID NO: 2), to obtain lipocalin muteins as included in provided fusion proteins.

In addition, with respect to hTlc muteins or hNGAL muteins of the disclosure as included in the fusion proteins, in some embodiments, the naturally occurring disulfide bond between Cys 61 and Cys 153 or Cys 76 and Cys 175, respectively, may be removed. Accordingly, such muteins can be produced in a cell compartment having a reducing redox milieu, for example, in the cytoplasm of Gram-negative bacteria.

With further respect to provided hTlc muteins or hNGAL muteins of the disclosure as included in the fusion proteins, the disclosure also includes nucleic acid molecules encoding such muteins which, in some embodiments, may include one or more additional mutations outside the indicated sequence positions of experimental mutagenesis. Such mutations are often tolerated or can even prove to be advantageous, for example, if they contribute to an improved folding efficiency, serum stability, thermal stability or ligand binding affinity of the lipocalin muteins and/or the fusion proteins.

In some embodiments, provided nucleic acid molecules can also be part of a vector or any other kind of cloning vehicle, such as a plasmid, a phagemid, a phage, a baculovirus, a cosmid or an artificial chromosome.

In some embodiments, a provided nucleic acid molecule may be included in a phagemid. As used in this context, a phagemid vector denotes a vector encoding the intergenic region of a temperate phage, such as M13 or f1, or a functional part thereof fused to the cDNA of interest. For example, in some embodiments, after superinfection of bacterial host cells with such a provided phagemid vector and an appropriate helper phage (e.g., M13K07, VCS-M13 or R408) intact phage particles are produced, thereby enabling physical coupling of the encoded heterologous cDNA to its corresponding polypeptide displayed on the phage surface (Lowman, *Annu Rev Biophys Biomol Struct,* 1997, Rodi and Makowski, *Curr Opin Biotechnol,* 1999).

In accordance with various embodiments, cloning vehicles can include, aside from the regulatory sequences described above and a nucleic acid sequence encoding a fusion protein as described herein, replication and control sequences derived from a species compatible with the host cell that is used for expression as well as selection markers conferring a selectable phenotype on transformed or transfected cells. Large numbers of suitable cloning vectors are known in the art and are commercially available.

The disclosure also relates, in some embodiments, to methods for the production of fusion proteins of the disclosure starting from a nucleic acid coding for a fusion protein or any subunits therein using genetic engineering methods. In some embodiments, a provided method can be carried out in vivo, wherein a provided fusion protein can, for example, be produced in a bacterial or eukaryotic host organism, and then isolated from this host organism or its culture. It is also possible to produce a fusion protein of the disclosure in vitro, for example, using an in vitro translation system.

When producing a fusion protein in vivo, a nucleic acid encoding such fusion protein may be introduced into a suitable bacterial or eukaryotic host organism using recombinant DNA technology well known in the art. In some embodiments, a DNA molecule encoding a fusion protein as described herein, and in particular a cloning vector containing the coding sequence of such a fusion protein can be transformed into a host cell capable of expressing the gene. Transformation can be performed using standard techniques. Thus, the disclosure is also directed to host cells containing a nucleic acid molecule as disclosed herein.

In some embodiments, transformed host cells may be cultured under conditions suitable for expression of the nucleotide sequence encoding a fusion protein of the disclosure. In some embodiments, host cells can be prokaryotic, such as *Escherichia coli* (*E. coli*) or *Bacillus subtilis*, or eukaryotic, such as *Saccharomyces cerevisiae, Pichia pastoris,* SF9 or High5 insect cells, immortalized mammalian cell lines (e.g., HeLa cells or CHO cells) or primary mammalian cells.

In some embodiments, where a lipocalin mutein of the disclosure, including as comprised in a fusion protein disclosed herein, includes intramolecular disulfide bonds, it may be preferred to direct the nascent protein to a cell compartment having an oxidizing redox milieu using an appropriate signal sequence. Such an oxidizing environment may be provided by the periplasm of Gram-negative bacteria such as *E. coli,* in the extracellular milieu of Gram-positive bacteria or the lumen of the endoplasmic reticulum of eukaryotic cells and usually favors the formation of structural disulfide bonds.

In some embodiments, it is also possible to produce a fusion protein of the disclosure in the cytosol of a host cell, preferably *E. coli.* In this case, a provided fusion protein can either be directly obtained in a soluble and folded state or recovered in the form of inclusion bodies, followed by renaturation in vitro. A further option is the use of specific host strains having an oxidizing intracellular milieu, which may thus allow the formation of disulfide bonds in the cytosol (Venturi et al., *J Mol Biol,* 2002).

In some embodiments, a fusion protein of the disclosure as described herein may be not necessarily generated or produced, in whole or in part, via use of genetic engineering. Rather, such protein can also be obtained by any of the many conventional and well-known techniques such as plain organic synthesis strategies, solid phase-assisted synthesis techniques, commercially available automated synthesizers, or by in vitro transcription and translation. It is, for example, possible that promising fusion proteins or lipocalin muteins included in such fusion proteins are identified using molecular modeling, synthesized in vitro, and investigated for the binding activity for the target(s) of interest. Methods for the solid phase and/or solution phase synthesis of proteins are well known in the art (see e.g. Bruckdorfer et al., *Curr Pharm Biotechnol,* 2004).

In some embodiments, a fusion protein of the disclosure may be produced by in vitro transcription/translation employing well-established methods known to those skilled in the art.

In some further embodiments, fusion proteins as described herein may also be prepared by conventional recombinant techniques alone or in combination with conventional synthetic techniques.

Moreover, in some embodiments, a fusion protein according to the present disclosure may be obtained by conjugating together individual subunits, e.g., immunoglobulins and muteins as included in the fusion protein. Such conjugation can be, for example, achieved through all forms of covalent or non-covalent linkage using conventional methods.

The skilled worker will appreciate methods useful to prepare fusion proteins contemplated by the present disclosure but whose protein or nucleic acid sequences are not explicitly disclosed herein. As an overview, such modifications of the amino acid sequence include, e.g., directed mutagenesis of single amino acid positions to simplify sub-cloning of a protein gene or its parts by incorporating cleavage sites for certain restriction enzymes. Also, these mutations can be incorporated to further improve the affinity of a fusion protein for its targets (e.g., CD137 and GPC3). Furthermore, mutations can be introduced to modulate one or more characteristics of the protein such as to improve folding stability, serum stability, protein resistance or water solubility or to reduce aggregation tendency, if necessary.

The invention may further be characterized by following items.

Item 1. A fusion protein that is capable of binding both CD137 and GPC3, wherein the fusion protein comprises at least two subunits in any order, wherein a first subunit comprises a full-length immunoglobulin or an antigen-binding domain thereof and is specific for GPC3, and wherein a second subunit comprises a lipocalin mutein and is specific for CD137.

Item 2. A fusion protein, wherein the fusion protein comprises at least two subunits, wherein a first subunit comprises a full-length immunoglobulin or an antigen-binding domain thereof and is specific for GPC3, and wherein a second subunit comprises a lipocalin mutein and is specific for CD137, wherein the second subunit is linked at the N-terminus to the C-terminus of each heavy chain of the first subunit, optionally via a linker.

Item 3. A fusion protein, wherein the fusion protein comprises at least two subunits, wherein a first subunit comprises a full-length immunoglobulin or an antigen-binding domain thereof and is specific for GPC3, and wherein a second subunit comprises a lipocalin mutein and is specific for CD137, wherein the second subunit is linked at the C-terminus to the N-terminus of each heavy chain of the first subunit, optionally via a linker.

Item 4. A fusion protein, wherein the fusion protein comprises at least two subunits, wherein a first subunit comprises a full-length immunoglobulin or an antigen-binding domain thereof and is specific for GPC3, and wherein a second subunit comprises a lipocalin mutein and is specific for CD137, wherein the second subunit is linked at the N-terminus to the C-terminus of each light chain of the first subunit, optionally via a linker.

Item 5. A fusion protein, wherein the fusion protein comprises at least two subunits, wherein a first subunit comprises a full-length immunoglobulin or an antigen-binding domain thereof and is specific for GPC3, and wherein a second subunit comprises a lipocalin mutein and is specific for CD137, wherein the second subunit is linked at the C-terminus to the N-terminus of each light chain of the first subunit, optionally via a linker.

Item 6. The fusion protein of any one of items 1-5, wherein the fusion protein is capable of binding GPC3 with a $K_D$ value of at most about 1 nM or comparable to or lower than the $K_D$ value of the immunoglobulin or an antigen-binding domain thereof that is included in the first subunit alone.

Item 7. The fusion protein of item 6, wherein the $K_D$ value is determined by a surface-plasmon-resonance (SPR) assay.

Item 8. The fusion protein of any one of items 1-7, wherein the fusion protein is capable of binding GPC3 with an $EC_{50}$ value of at most about 0.5 nM or comparable to or lower than the $EC_{50}$ value of the immunoglobulin or an antigen-binding domain thereof that is included in the first subunit alone.

Item 9. The fusion protein of any one of items 1-8, wherein the fusion protein is capable of binding CD137 with an $EC_{50}$ value of at most about 3 nM or comparable to or lower than the $EC_{50}$ value of the lipocalin mutein specific for CD137 that is included in the second subunit alone.

Item 10. The fusion protein of any one of items 8-9, wherein the $EC_{50}$ value is determined by an enzyme-linked immunosorbent assay (ELISA) assay.

Item 11. The fusion protein of any one of items 1-10, wherein the fusion protein is cross-reactive with cynomolgus GPC3.

Item 12. The fusion protein of any one of items 1-11, wherein the fusion protein is capable of simultaneously binding CD137 and GPC3 with an $EC_{50}$ values of at most about 10 nM, when said fusion protein is measured in an ELISA assay.

Item 13. The fusion protein of any one of items 1-12, wherein the fusion protein is capable of binding CD137 expressed on a cell with an $EC_{50}$ values of at most about 30 nM, when said fusion protein is measured in a flow cytometric analysis.

Item 14. The fusion protein of any one of items 1-13, wherein the fusion protein is capable of binding GPC3 expressed on a cell with an $EC_{50}$ values of at most about 30 nM, when said fusion protein is measured in a flow cytometric analysis.

Item 15. The fusion protein of any one of items 1-14, wherein the fusion protein is capable of binding GPC3 expressing tumor cells.

Item 16. The fusion protein of any one of items 1-15, wherein the fusion protein is capable of stimulating T-cell responses.

Item 17. The fusion protein of any one of items 1-16, wherein the fusion protein is capable of inducing increased secretion of IL-2.

Item 18. The fusion protein of any one of items 1-17, wherein the fusion protein is capable of inducing increased IL-2 secretion to a higher level than SEQ ID NO: 83 and/or with a better efficiency as compared to SEQ ID NO: 83.

Item 19. The fusion protein of any one of items 1-18, wherein the fusion protein is capable of inducing lymphocyte-mediated cytotoxicity.

Item 20. The fusion protein of any one of items 1-19, wherein the fusion protein is capable of inducing enhanced killing of GPC3 expressing tumor cells mediated by T cells than SEQ ID NO: 83 and/or inducing cytotoxic T cell-activation with a better efficacy as compared to SEQ ID NO: 83.

Item 21. The fusion protein of any one of items 1-20, wherein the fusion protein is capable of co-stimulating T-cell responses in a GPC3-dependent manner.

Item 22. The fusion protein of any one of items 1-21, wherein the fusion protein is capable of co-stimulating T-cell responses in a tumor microenvironment.

Item 23. The fusion protein of any one of items 1-22, wherein the fusion protein does not co-stimulate T-cell responses in the absence of GPC3.

Item 24. The fusion protein of any one of items 1-23, wherein the fusion protein has antibody-like pharmacokinetic profile.

Item 25. The fusion protein of any one of items 1-24, wherein the fusion protein has a half-life in mice of at least 50 hours, at least 75 hours, at least 100 hours, at least 125 hours, at least 150 hours, at least 175 hours, at least 200 hours, at least 250 hours, or even longer, and/or wherein the fusion protein has a half-life in mice that is longer than that of SEQ ID NO: 83.

Item 26. The fusion protein of any one of items 1-25, wherein the fusion protein has an isoelectric point of at least 6.5, at least 6.8, at least 7.1, at least 7.4, at least 7.5, at least 7.7, or even higher, and/or wherein the fusion protein has an isoelectric point higher than that of SEQ ID NO: 83.

Item 27. The fusion protein of any one of items 1-26, wherein the lipocalin mutein comprises one or more mutated amino acid residues at positions corresponding to positions 5, 26-31, 33-34, 42, 46, 52, 56, 58, 60-61, 65, 71, 85, 94, 101, 104-106, 108, 111, 114, 121, 133, 148, 150 and 153 of the linear polypeptide sequence of mature human tear lipocalin (SEQ ID NO: 1).

Item 28. The fusion protein of any one of items 1-27, wherein the amino acid sequence of the lipocalin mutein comprises, at one or more positions corresponding to positions 5, 26-31, 33-34, 42, 46, 52, 56, 58, 60-61, 65, 71, 85, 94, 101, 104-106, 108, 111, 114, 121, 133, 148, 150, and 153 of the linear polypeptide sequence of mature hTlc (SEQ ID NO: 1), one or more of the following mutated amino acid residues: Ala 5→Val or Thr; Arg 26→Glu; Glu 27→Gly; Phe 28→Cys; Pro 29→Arg; Glu 30→Pro; Met 31→Trp; Leu 33→Ile; Glu 34→Phe; Thr 42→Ser; Gly 46→Asp; Lys 52→Glu; Leu 56→Ala; Ser 58→Asp; Arg 60→Pro; Cys 61→Ala; Lys 65→Arg or Asn; Thr 71→Ala; Val 85→Asp; Lys 94→Arg or Glu; Cys 101→Ser; Glu 104→Val; Leu 105→Cys; His 106→Asp; Lys 108→Ser; Arg 111→Pro; Lys 114→Trp; Lys 121→Glu; Ala 133→Thr; Arg 148→Ser; Ser 150→Ile and Cys 153→Ser.

Item 29. The fusion protein of any one of items 1-28, wherein the amino acid sequence of the lipocalin mutein comprises one of the following sets of mutated amino acid residues in comparison with the linear polypeptide sequence of mature human tear lipocalin (SEQ ID NO: 1):

(a) Arg 26→Glu; Glu 27→Gly; Phe 28→Cys; Pro 29→Arg; Glu 30→Pro; Met 31→Trp; Leu 33→Ile; Glu 34→Phe; Leu 56→Ala; Ser 58→Asp; Arg 60→Pro; Cys 61→Ala; Cys 101→Ser; Glu 104→Val; Leu 105→Cys; His 106→Asp; Lys 108→Ser; Arg 111→Pro; Lys 114→Trp; and Cys 153→Ser;

(b) Ala 5→Thr; Arg 26→Glu; Glu 27→Gly; Phe 28→Cys; Pro 29→Arg; Glu 30→Pro; Met 31→Trp; Leu 33→Ile; Glu 34→Phe; Leu 56→Ala; Ser 58→Asp; Arg 60→Pro; Cys 61→Ala; Lys 65→Arg; Val 85→Asp; Cys 101→Ser; Glu 104→Val; Leu 105→Cys; His 106→Asp; Lys 108→Ser; Arg 111→Pro; Lys 114→Trp; Lys 121→Glu; Ala 133→Thr; and Cys 153→Ser;

(c) Arg 26→Glu; Glu 27→Gly; Phe 28→Cys; Pro 29→Arg; Glu 30→Pro; Met 31→Trp; Leu 33→Ile; Glu 34→Phe; Leu 56→Ala; Ser 58→Asp; Arg 60→Pro; Cys 61→Ala; Lys 65→Asn; Lys 94→Arg; Cys 101→Ser; Glu 104→Val; Leu 105→Cys; His 106→Asp; Lys 108→Ser; Arg 111→Pro; Lys 114→Trp; Lys 121→Glu; Ala 133→Thr; and Cys 153→Ser;

(d) Ala 5→Val; Arg 26→Glu; Glu 27→Gly; Phe 28→Cys; Pro 29→Arg; Glu 30→Pro; Met 31→Trp; Leu 33→Ile; Glu 34→Phe; Leu 56→Ala; Ser 58→Asp; Arg 60→Pro; Cys 61→Ala; Lys 65→Arg; Lys 94→Glu; Cys 101→Ser; Glu 104→Val; Leu 105→Cys; His 106→Asp; Lys 108→Ser; Arg 111→Pro; Lys 114→Trp; Lys 121→Glu; Ala 133→Thr; and Cys 153→Ser;

(e) Arg 26→Glu; Glu 27→Gly; Phe 28→Cys; Pro 29→Arg; Glu 30→Pro; Met 31→Trp; Leu 33→Ile; Glu 34→Phe; Thr 42→Ser; Leu 56→Ala; Ser 58→Asp; Arg 60→Pro; Cys 61→Ala; Cys 101→Ser; Glu 104→Val; Leu 105→Cys; His 106→Asp; Lys 108→Ser; Arg 111→Pro; Lys 114→Trp; Ser 150→Ile; and Cys 153→Ser;

(f) Arg 26→Glu; Glu 27→Gly; Phe 28→Cys; Pro 29→Arg; Glu 30→Pro; Met 31→Trp; Leu 33→Ile; Glu 34→Phe; Lys 52→Glu; Leu 56→Ala; Ser 58→Asp; Arg 60→Pro; Cys 61→Ala; Thr 71→Ala; Cys 101→Ser; Glu 104→Val; Leu 105→Cys; His 106→Asp; Lys 108→Ser; Arg 111→Pro; Lys 114→Trp; Ala 133→Thr; Arg 148→Ser; Ser 150→Ile; and Cys 153→Ser; and (g) Ala 5→Thr; Arg 26→Glu; Glu 27→Gly; Phe 28→Cys; Pro 29→Arg; Glu 30→Pro; Met 31→Trp; Leu 33→Ile; Glu 34→Phe; Gly 46→Asp; Leu 56→Ala; Ser 58→Asp; Arg 60→Pro; Cys 61→Ala; Thr 71→Ala; Cys 101→Ser; Glu 104→Val; Leu 105→Cys; His 106→Asp; Lys 108→Ser; Arg 111→Pro; Lys 114→Trp; Ser 150→Ile; and Cys 153→Ser.

Item 30. The fusion protein of any one of item 1-29, wherein the amino acid sequence of the lipocalin mutein comprises an amino acid sequence selected from the group consisting of SEQ ID NOs: 32-38 or of a fragment or variant thereof.

Item 31. The fusion protein of any one of item 1-30, wherein the amino acid sequence of the lipocalin mutein has at least 85% sequence identity to an amino acid sequence selected from the group consisting of SEQ ID NOs: 32-38.

Item 32. The fusion protein of any one of items 1-26, wherein the lipocalin mutein comprises one or more mutated amino acid residues at positions corresponding to positions 28, 36, 40-41, 49, 52, 65, 68, 70, 72-73, 77, 79, 81, 83, 87, 94, 96, 100, 103, 106, 125, 127, 132 and 134 of the linear polypeptide sequence of mature human neutrophil gelatinase-associated lipocalin (hNGAL) (SEQ ID NO: 2).

Item 33. The fusion protein of any one of items 1-26 and 32, wherein the amino acid sequence of the lipocalin mutein comprises, at positions corresponding to positions 28, 36, 40-41, 49, 52, 65, 68, 70, 72-73, 77, 79, 81, 83, 87, 94, 96, 100, 103, 106, 125, 127, 132 and 134 of the linear polypeptide sequence of mature human neutrophil gelatinase-associated lipocalin (hNGAL) (SEQ ID NO: 2), one or more of the following mutated amino acid residues: Gln 28→His; Leu 36→Gln; Ala 40→Ile; Ile 41→Arg or Lys; Gln 49→Val, Ile, His, Ser or Asn; Tyr 52→Met; Asn 65→Asp; Ser 68→Met, Ala or Gly; Leu 70→Ala, Lys, Ser or Thr; Arg 72→Asp; Lys 73→Asp; Asp 77→Met, Arg, Thr or Asn; Trp 79→Ala or Asp; Arg 81→Met, Trp or Ser; Phe 83→Leu; Cys 87→Ser; Leu 94→Phe; Asn 96→Lys; Tyr 100→Phe; Leu 103→His; Tyr 106→Ser; Lys 125→Phe; Ser 127→Phe; Tyr 132→Glu and Lys 134→Tyr.

Item 34. The fusion protein of any one of items 1-26 and 33, wherein the lipocalin mutein comprises one or more mutated amino acid residues at positions corresponding to positions 20, 25, 28, 33, 36, 40-41, 44, 49, 52, 59, 68, 70-73, 77-82, 87, 92, 96, 98, 100, 101, 103, 122, 125, 127, 132, and 134 of the linear polypeptide sequence of mature human neutrophil gelatinase-associated lipocalin (hNGAL) (SEQ ID NO: 2).

Item 35. The fusion protein of any one of items 1-26 and 34, wherein the amino acid sequence of the lipocalin mutein comprises, at positions corresponding to positions 20, 25, 28, 33, 36, 40-41, 44, 49, 52, 59, 68, 70-73, 77-82, 87, 92, 96, 98, 100, 101, 103, 122, 125, 127, 132, and 134 of the linear polypeptide sequence of mature hNGAL (SEQ ID NO: 2), one or more of the following mutated amino acid residues: Gln 20→Arg; Asn 25→Tyr or Asp; Gln 28→His; Val 33→Ile; Leu 36→Met; Ala 40→Asn; Ile 41→Leu; Glu 44→Val or Asp; Gln 49→His; Tyr 52→Ser or Gly; Lys 59→Asn; Ser 68→Asp; Leu 70→Met; Phe 71→Leu; Arg 72→Leu; Lys 73→Asp; Asp 77→Gln or His; Tyr 78→His; Trp 79→Ile; Ile 80→Asn; Arg 81→Trp or Gln; Thr 82→Pro; Cys 87→Ser; Phe 92→Leu or Ser; Asn 96→Phe; Lys 98→Arg; Tyr 100→Asp; Pro 101→Leu; Leu 103→His or Pro; Phe 122→Tyr; Lys 125→Ser; Ser 127→Ile; Tyr 132→Trp; and Lys 134→Gly.

Item 36. The fusion protein of any one of items 1-26 and 32-35, wherein the amino acid sequence of the lipocalin mutein comprises one of the following sets of mutated amino acid residues in comparison with the linear polypeptide sequence of mature hNGAL (SEQ ID NO: 2):

(a) Gln 28→His; Leu 36→Gln; Ala 40→Ile; Ile 41→Lys; Gln 49→Asn; Tyr 52→Met; Ser 68→Gly; Leu 70→Thr; Arg 72→Asp; Lys 73→Asp; Asp 77→Thr; Trp 79→Ala; Arg 81→Ser; Cys 87→Ser; Asn 96→Lys; Tyr 100→Phe; Leu 103→His; Tyr 106→Ser; Lys 125→Phe; Ser 127→Phe; Tyr 132→Glu; and Lys 134→Tyr;

(b) Gln 28→His; Leu 36→Gln; Ala 40→Ile; Ile 41→Arg; Gln 49→Ile; Tyr 52→Met; Asn 65→Asp; Ser 68→Met; Leu 70→Lys; Arg 72→Asp; Lys 73→Asp; Asp 77→Met; Trp 79→Asp; Arg 81→Trp; Cys 87→Ser; Asn 96→Lys; Tyr 100→Phe; Leu 103→His; Tyr 106→Ser; Lys 125→Phe; Ser 127→Phe; Tyr 132→Glu; and Lys 134→Tyr;

(c) Gln 28→His; Leu 36→Gln; Ala 40→Ile; Ile 41→Arg; Gln 49→Asn; Tyr 52→Met; Asn 65→Asp; Ser 68→Ala; Leu 70→Ala; Arg 72→Asp; Lys 73→Asp; Asp 77→Thr; Trp 79→Asp; Arg 81→Trp; Cys 87→Ser; Asn 96→Lys; Tyr 100→Phe; Leu 103→His; Tyr 106→Ser; Lys 125→Phe; Ser 127→Phe; Tyr 132→Glu; and Lys 134→Tyr;

(d) Gln 28→His; Leu 36→Gln; Ala 40→Ile; Ile 41→Lys; Gln 49→Asn; Tyr 52→Met; Asn 65→Asp; Ser 68→Ala; Leu 70→Ala; Arg 72→Asp; Lys 73→Asp; Asp 77→Thr; Trp 79→Asp; Arg 81→Trp; Cys 87→Ser; Asn 96→Lys; Tyr 100→Phe; Leu 103→His; Tyr 106→Ser; Lys 125→Phe; Ser 127→Phe; Tyr 132→Glu; and Lys 134→Tyr;

(e) Gln 28→His; Leu 36→Gln; Ala 40→Ile; Ile 41→Lys; Gln 49→Ser; Tyr 52→Met; Asn 65→Asp; Ser 68→Gly; Leu 70→Ser; Arg 72→Asp; Lys 73→Asp; Asp 77→Thr; Trp 79→Ala; Arg 81→Met; Cys 87→Ser; Asn 96→Lys; Tyr 100→Phe; Leu 103→His; Tyr 106→Ser; Lys 125→Phe; Ser 127→Phe; Tyr 132→Glu; and Lys 134→Tyr;

(f) Gln 28→His; Leu 36→Gln; Ala 40→Ile; Ile 41→Lys; Gln 49→Val; Tyr 52→Met; Asn 65→Asp; Ser 68→Gly; Leu 70→Thr; Arg 72→Asp; Lys 73→Asp; Asp 77→Arg; Trp 79→Asp; Arg 81→Ser; Cys 87→Ser; Leu 94→Phe; Asn 96→Lys; Tyr 100→Phe; Leu 103→His; Tyr 106→Ser; Lys 125→Phe; Ser 127→Phe; Tyr 132→Glu; and Lys 134→Tyr;

(g) Gln 28→His; Leu 36→Gln; Ala 40→Ile; Ile 41→Arg; Gln 49→His; Tyr 52→Met; Asn 65→Asp; Ser 68→Gly; Leu 70→Thr; Arg 72→Asp; Lys 73→Asp; Asp 77→Thr; Trp 79→Ala; Arg 81→Ser; Cys 87→Ser; Asn 96→Lys; Tyr 100→Phe; Leu 103→His; Tyr 106→Ser; Lys 125→Phe; Ser 127→Phe; Tyr 132→Glu; and Lys 134→Tyr;

(h) Gln 28→His; Leu 36→Gln; Ala 40→Ile; Ile 41→Lys; Gln 49→Asn; Tyr 52→Met; Asn 65→Asp; Ser 68→Gly; Leu 70→Thr; Arg 72→Asp; Lys 73→Asp; Asp 77→Thr; Trp 79→Ala; Arg 81→Ser; Phe 83→Leu; Cys 87→Ser; Leu 94→Phe; Asn 96→Lys; Tyr 100→Phe; Leu 103→His; Tyr 106→Ser; Lys 125→Phe; Ser 127→Phe; Tyr 132→Glu; and Lys 134→Tyr;

(i) Gln 28→His; Leu 36→Gln; Ala 40→Ile; Ile 41→Arg; Gln 49→Ser; Tyr 52→Met; Asn 65→Asp; Ser 68→Ala; Leu 70→Thr; Arg 72→Asp; Lys 73→Asp; Asp 77→Asn; Trp 79→Ala; Arg 81→Ser; Cys 87→Ser; Asn 96→Lys; Tyr 100→Phe; Leu 103→His; Tyr 106→Ser; Lys 125→Phe; Ser 127→Phe; Tyr 132→Glu; and Lys 134→Tyr.

(j) Leu 36→Met; Ala 40→Asn; Ile 41→Leu; Gln 49→His; Tyr 52→Ser; Ser 68→Asp; Leu 70→Met; Arg 72→Leu; Lys 73→Asp; Asp 77→Gln; Trp 79→Ile; Arg 81→Trp; Asn 96→Phe; Tyr 100→Asp; Leu 103→His; Lys 125→Ser; Ser 127→Ile; Tyr 132→Trp; and Lys 134→Gly;

(k) Leu 36→Met; Ala 40→Asn; Ile 41→Leu; Gln 49→His; Tyr 52→Ser; Ser 68→Asp; Leu 70→Met; Arg 72→Leu; Lys 73→Asp; Asp 77→Gln; Trp 79→Ile; Arg 81→Trp; Phe 92→Leu; Asn 96→Phe; Lys 98→Arg; Tyr 100→Asp; Pro 101→Leu; Leu 103→His; Lys 125→Ser; Ser 127→Ile; Tyr 132→Trp; and Lys 134→Gly;

(l) Asn 25→Tyr; Leu 36→Met; Ala 40→Asn; Ile 41→Leu; Gln 49→His; Tyr 52→Gly; Ser 68→Asp; Leu 70→Met; Phe 71→Leu; Arg 72→Leu; Lys 73→Asp; Asp 77→Gln; Trp 79→Ile; Arg 81→Gln; Phe 92→Ser; Asn 96→Phe; Tyr 100→Asp; Leu 103→His; Lys 125→Ser; Ser 127→Ile; Tyr 132→Trp; and Lys 134→Gly;

(m) Leu 36→Met; Ala 40→Asn; Ile 41→Leu; Gln 49→His; Tyr 52→Gly; Ser 68→Asp; Leu 70→Met; Arg 72→Leu; Lys 73→Asp; Asp 77→Gln; Tyr 78→His; Trp 79→Ile; Arg 81→Trp; Phe 92→Leu; Asn 96→Phe; Tyr 100→Asp; Leu 103→His; Lys 125→Ser; Ser 127→Ile; Tyr 132→Trp; and Lys 134→Gly;

(n) Asn 25→Asp; Leu 36→Met; Ala 40→Asn; Ile 41→Leu; Gln 49→His; Tyr 52→Gly; Ser 68→Asp; Leu 70→Met; Arg 72→Leu; Lys 73→Asp; Asp 77→Gln; Trp 79→Ile; Arg 81→Trp; Phe 92→Leu; Asn 96→Phe; Tyr 100→Asp; Leu 103→His; Lys 125→Ser; Ser 127→Ile; Tyr 132→Trp; and Lys 134→Gly;

(o) Val 33→Ile; Leu 36→Met; Ala 40→Asn; Ile 41→Leu; Gln 49→His; Tyr 52→Gly; Ser 68→Asp; Leu 70→Met; Arg 72→Leu; Lys 73→Asp; Asp 77→Gln; Trp 79→Ile; Arg 81→Trp; Phe 92→Leu; Asn 96→Phe; Tyr 100→Asp; Leu 103→His; Lys 125→Ser; Ser 127→Ile; Tyr 132→Trp; and Lys 134→Gly;

(p) Gln 20→Arg; Leu 36→Met; Ala 40→Asn; Ile 41→Leu; Giu 44→Val; Gln 49→His; Tyr 52→Gly; Ser 68→Asp; Leu 70→Met; Arg 72→Leu; Lys 73→Asp; Asp 77→Gln; Trp 79→Ile; Arg 81→Trp; Phe 92→Leu; Asn 96→Phe; Tyr 100→Asp; Leu 103→His; Phe 122→Tyr; Lys 125→Ser; Ser 127→Ile; Tyr 132→Trp; and Lys 134→Gly;

(q) Leu 36→Met; Ala 40→Asn; Ile 41→Leu; Gln 49→His; Tyr 52→Ser; Ser 68→Asp; Leu 70→Met; Arg 72→Leu; Lys 73→Asp; Asp 77→Gln; Trp 79→Ile; Ile 80→Asn; Arg 81→Trp; Thr 82→Pro; Asn 96→Phe; Tyr 100→Asp; Pro 101→Leu; Leu 103→Pro; Lys 125→Ser; Ser 127→Ile; Tyr 132→Trp; and Lys 134→Gly;

(r) Leu 36→Met; Ala 40→Asn; Ile 41→Leu; Gln 49→His; Tyr 52→Gly; Lys 59→Asn; Ser 68→Asp; Leu 70→Met; Arg 72→Leu; Lys 73→Asp; Asp 77→Gln; Trp 79→Ile; Arg 81→Trp; Phe 92→Leu; Asn

96→Phe; Tyr 100→Asp; Leu 103→His; Lys 125→Ser; Ser 127→Ile; Tyr 132→Trp; and Lys 134→Gly; and (s) Leu 36→Met; Ala 40→Asn; Ile 41→Leu; Giu 44→Asp; Gln 49→His; Tyr 52→Ser; Ser 68→Asp; Leu 70→Met; Phe 71→Leu; Arg 72→Leu; Lys 73→Asp; Asp 77→His; Trp 79→Ile; Arg 81→Trp; Phe 92→Leu; Asn 96→Phe; Tyr 100→Asp; Leu 103→His; Lys 125→Ser; Ser 127→Ile; Tyr 132→Trp; and Lys 134→Gly.

Item 37. The fusion protein of any one of items 1-26 and 32-36, wherein the amino acid sequence of the lipocalin mutein comprises an amino acid sequence selected from the group consisting of SEQ ID NOs: 39-57 or of a fragment or variant thereof.

Item 38. The fusion protein of any one of items 1-26 and 32-36, wherein the amino acid sequence of the lipocalin mutein has at least 85% sequence identity to an amino acid sequence selected from the group consisting of SEQ ID NOs: 39-57.

Item 39. The fusion protein of any one of items 1-26 and 32-38 wherein the wherein the amino acid sequence of the lipocalin mutein comprises the following set of mutated amino acid residues in comparison with the linear polypeptide sequence of mature hNGAL (SEQ ID NO: 2) Gln 28→His; Leu 36→Gln; Ala 40→Ile; Ile 41→Arg; Gln 49→Ile; Tyr 52→Met; Asn 65→Asp; Ser 68→Met; Leu 70→Lys; Arg 72→Asp; Lys 73→Asp; Asp 77→Met; Trp 79→Asp; Arg 81→Trp; Cys 87→Ser; Asn 96→Lys; Tyr 100→Phe; Leu 103→His; Tyr 106→Ser; Lys 125→Phe; Ser 127→Phe; Tyr 132→Glu; and Lys 134→Tyr and/or wherein the lipocalin mutein has at least 85% sequence identity to the amino acid sequence of SEQ ID NO: 40.

Item 40. The fusion protein of any one of items 1-39, wherein one subunit is linked to another subunit via a linker.

Item 41. The fusion protein of any one of items 1-40, wherein the second subunit is linked at the N-terminus via a linker to the N- or C-terminus of each heavy chain constant region (CH) of the first subunit or the N- or C-terminus of each light chain constant region (CL) of the first subunit.

Item 42. The fusion protein of any one of items 1-41, wherein the third subunit is linked at the N-terminus via a linker to the N- or C-terminus of each heavy chain constant region (CH) of the first subunit, the N- or C-terminus of each light chain constant region (CL) of the first subunit, or the C-terminus of each second subunit.

Item 43. The fusion protein of any one of items 40-42, wherein the linker is an unstructured (Gly-Gly-Gly-Gly-Ser)$_3$ linker (SEQ ID NO: 13).

Item 44. The fusion protein of any one of items 40-43, wherein the liker is an unstructured glycine-serine linker, a polyproline linker, a proline-alanine-serine polymer, or a linker selected from the group consisting of SEQ ID NOs: 13-23.

Item 45. The fusion protein of any one of items 1-44, wherein the first subunit is an antibody.

Item 46. The fusion protein of any one of items 1-45, wherein the heavy chain variable region of the antibody is selected from a group consisting of SEQ ID NOs: 78, 114, 119, 126, and 129 or a sequence having at least 70%, at least 75%, at least 80%, at least 85%, at least 90%, at least 92%, at least 95%, at least 97%, at least 98%, or higher sequence identity to the amino acid sequences shown in SEQ ID NOs: 78, 114, 119, 126, and 129, and wherein the light chain variable region of the antibody is selected from a group consisting of SEQ ID NOs: 79, 115, and 127 or a sequence having at least 70%, at least 75%, at least 80%, at least 85%, at least 90%, at least 92%, at least 95%, at least 97%, at least 98%, or higher sequence identity to the amino acid sequences shown in SEQ ID NOs: 79, 115, and 127.

Item 47. The fusion protein of any one of items 1-46, wherein the antibody comprises a heavy chain that is any one of SEQ ID NOs: 80 or 81 or a sequence having at least 70%, at least 75%, at least 80%, at least 85%, at least 90%, at least 92%, at least 95%, at least 97%, at least 98%, or higher sequence identity to the amino acid sequences shown in SEQ ID NOs: 80 or 81, and a light chain of SEQ ID NO: 82 or a sequence having at least 70%, at least 75%, at least 80%, at least 85%, at least 90%, at least 92%, at least 95%, at least 97%, at least 98%, or higher sequence identity to the amino acid sequences shown in SEQ ID NO: 82.

Item 48. The fusion protein of any one of items 1-47, wherein the antibody comprises a heavy chain variable region and a light chain variable region, respectively, as follows: SEQ ID NOs: 78 and 79, SEQ ID NOs: 129 and 79, SEQ ID NOs: 114 and 115, or SEQ ID NOs: 126 and 127, or heavy chain variable region and a light chain variable region that have a sequence having at least 70%, at least 75%, at least 80%, at least 85%, at least 90%, at least 92%, at least 95%, at least 97%, at least 98%, or higher sequence identity to the amino acid sequences shown in SEQ ID NOs: 78 and 79, SEQ ID NOs: 129 and 79, SEQ ID NOs: 114 and 115, or SEQ ID NOs: 126 and 127.

Item 49. The fusion protein of any one of items 1-48, wherein the antibody comprises a heavy chain and a light chain, respectively, as follows: SEQ ID NOs: 80 and 82, or SEQ ID NOs: 81 and 82, or a heavy chain and a light chain that have a sequence having at least 70%, at least 75%, at least 80%, at least 85%, at least 90%, at least 92%, at least 95%, at least 97%, at least 98%, or higher sequence identity to the amino acid sequences shown in SEQ ID NOs: 80 and 82, or SEQ ID NOs: 81 and 82.

Item 50. The fusion protein of item 36, wherein the heavy chain of the antibody comprises one of the following sets of CDR sequences:

(a) GYTFTDYE (HCDR1, SEQ ID NO: 72), LDPKTGDT (HCDR2, SEQ ID NO: 73), TRFYSYTY (HCDR3; SEQ ID NO: 74);

(b) GFTFNKNA (HCDR1, SEQ ID NO: 108), IRNKTNNYAT (HCDR2, SEQ ID NO: 109), VAGNSFAY (HCDR3, SEQ ID NO: 110);

(c) YFDFDSYE (HCDR1, SEQ ID NO: 116), IYHSGST (HCDR2, SEQ ID NO: 117), ARVNMDRFDY (HCDR3, SEQ ID NO: 108); or (d) GFTFSSYA (HCDR1, SEQ ID NO: 120), IQKQGLPT (HCDR2, SEQ ID NO: 121), AKNRAKFDY (HCDR3, SEQ ID NO: 122).

Item 51. The fusion protein of any one of items 1-50, wherein the light chain of the antibody comprises one of the following sets of CDR sequences:

(a) QSLVHSNRNTY (LCDR1, SEQ ID NO: 75), KVS (LCDR2), SQNTHVPPT (LCDR3; SEQ ID NO: 77);

(b) QSLLYSSNQKNY (LCDR1, SEQ ID NO: 111), WAS (LCDR2), QQYYNYPLT (LCDR3, SEQ ID NO: 113); or (c) QSISSY (LCDR1, SEQ ID NO: 123), NAS (LCDR2), QQNRGFPLT (LCDR3, SEQ ID NO: 125).

Item 52. The fusion protein of any one of items 1-51, wherein the heavy chain of the antibody comprises the following set of CDR sequences: GYTFTDYE (HCDR1, SEQ ID NO: 72), LDPKTGDT (HCDR2, SEQ ID NO: 73), TRFYSYTY (HCDR3; SEQ ID NO: 74), and the light chain of the antibody comprises the following set of CDR sequences: of QSLVHSNRNTY (LCDR1, SEQ ID NO: 75), KVS (LCDR2), SQNTHVPPT (LCDR3; SEQ ID NO: 77).

Item 53. The fusion protein of any one of items 1-51, wherein the antibody comprises the following set of CDR sequences:
(a) GFTFNKNA (HCDR1, SEQ ID NOs: 108), IRNKTN-NYAT (HCDR2, SEQ ID NOs: 109), VAGNSFAY (HCDR3, SEQ ID NOs: 110), QSLLYSSNQKNY (LCDR1, SEQ ID NO: 111), WAS (LCDR2), QQYYNYPLT (LCDR3, SEQ ID NOs: 113); or
(b) GFTFSSYA (HCDR1, SEQ ID NOs: 120), IQKQGLPT (HCDR2, SEQ ID NOs: 121), AKN-RAKFDY (HCDR3, SEQ ID NOs: 122), QSISSY (LCDR1, SEQ ID NO: 123), NAS (LCDR2), QQNRGFPLT (LCDR3, SEQ ID NO: 125).

Item 54. The fusion protein of any one of items 1-53, wherein the antibody has an IgG4 backbone.

Item 55. The fusion protein of item 54, wherein the IgG4 backbone has one or more of the following mutations: S228P, N297A, F234A, L235A, M428L, N434S, M252Y, S254T, and T256E.

Item 56. The fusion protein of any one of items 1-55, wherein the fusion protein comprises an amino acid sequence shown in any one of SEQ ID NOs: 87-96, or wherein the fusion protein comprises an amino acid sequence having at least 70%, at least 75%, at least 80%, at least 85%, at least 90%, at least 92%, at least 95%, at least 97%, at least 98%, or higher sequence identity to the amino acid sequences shown in any one of SEQ ID NOs: 87-96.

Item 57. The fusion protein of any one of items 1-56, wherein the fusion protein comprises the amino acids shown in SEQ ID NOs: 87 and 82, the amino acids shown in SEQ ID NOs: 88 and 82, the amino acids shown in SEQ ID NOs: 81 and 89, the amino acids shown in SEQ ID NOs: 81 and 90, the amino acids shown in SEQ ID NOs: 91 and 82, the amino acids shown in SEQ ID NOs: 92 and 82, the amino acids shown in SEQ ID NOs: 81 and 93, the amino acids shown in SEQ ID NOs: 81 and 94, the amino acids shown in SEQ ID NOs: 95 and 82, or the amino acids shown in SEQ ID NOs: 96 and 82.

Item 58. The fusion protein of any one of items 1-57, wherein the fusion protein comprises the amino acid sequences having at least 70%, at least 75%, at least 80%, at least 85%, at least 90%, at least 92%, at least 95%, at least 97%, at least 98%, or higher sequence identity to the amino acid sequences shown in SEQ ID NOs: 87 and 82, SEQ ID NOs: 88 and 82, SEQ ID NOs: 81 and 89, SEQ ID NOs: 81 and 90, SEQ ID NOs: 91 and 82, SEQ ID NOs: 92 and 82, SEQ ID NOs: 81 and 93, SEQ ID NOs: 81 and 94, SEQ ID NOs: 95 and 82, or SEQ ID NOs: 96 and 82.

Item 59. A nucleic acid molecule comprising a nucleotide sequence encoding the fusion protein of any one of items 1-58.

Item 60. The nucleic acid molecule of item 59, wherein the nucleic acid molecule is operably linked to a regulatory sequence to allow expression of said nucleic acid molecule.

Item 61. The nucleic acid molecule of item 59 or 60, wherein the nucleic acid molecule is comprised in a vector or in a phagemid vector.

Item 62. A host cell containing a nucleic acid molecule of any one of items 59-61.

Item 63. A method of producing the fusion protein according to any one of items 1-58, wherein the fusion protein is produced starting from the nucleic acid coding for the fusion protein.

Item 64. The method of item 63, wherein the fusion protein is produced in a bacterial or eukaryotic host organism and is isolated from this host organism or its culture.

Item 65. A use of the fusion protein according to any one of items 1-58 or a composition comprising such fusion protein for simultaneously activating downstream signaling pathways of CD137 and engaging GPC3-positive tumor cells.

Item 66. A method of simultaneously activating downstream signaling pathways of CD137 and engaging GPC3-positive tumor cells, comprising applying one or more fusion proteins of any one of items 1-58 or one or more compositions comprising such fusion protein to a tissue comprising a tumor.

Item 67. A method of simultaneously co-stimulating T-cells and engaging GPC3-positive tumor cells, comprising applying one or more fusion proteins of any one of items 1-58 or one or more compositions comprising such fusion protein to a tissue comprising a tumor.

Item 68. A method of simultaneously inducing lymphocyte activity and engaging GPC3-positive tumor cells, comprising applying one or more fusion proteins of any one of items 1-58 or one or more compositions comprising such fusion protein to a tissue comprising a tumor.

Item 69. A method of inducing CD137 clustering and activation on T-cells and directing said T cells to GPC3-positive tumor cells, comprising applying one or more fusion proteins of any one of items 1-58 or one or more compositions comprising such fusion protein to a tissue comprising a tumor.

Item 70. A method of inducing a localized lymphocyte response in the vicinity of GPC3-positive tumor cells, comprising applying one or more fusion proteins of any one of items 1-58 or one or more compositions comprising such fusion protein to a tissue comprising a tumor.

Item 71. A method of inducing increased IL-2 secretion by T-cells in the vicinity of GPC3-positive tumor cells, comprising applying one or more fusion proteins of any one of items 1-58 or one or more compositions comprising such fusion protein to a tissue comprising a tumor.

Item 72. A method of inducing increased lymphocyte-mediated cytolysis of GPC3-positive tumor cells, comprising applying one or more fusion proteins of any one of items 1-58 or one or more compositions comprising such fusion protein to a tissue comprising a tumor.

Item 73. A pharmaceutical composition comprising one or more fusion proteins of any one of items 1-58.

Item 74. A method of preventing, ameliorating, or treating GPC3-positive cancers, comprising applying the fusion protein of any one items 1-58 or one or more a composition comprising such fusion protein to a tissue comprising a tumor.

Item 75. A method of preventing, ameliorating, or treating hepatocellular carcinoma, comprising applying the fusion protein of any one items 1-58 or one or more a composition comprising such fusion protein to a tissue comprising a tumor.

Item 76. The fusion protein of any one of items 1-58 for use in a therapy.

Item 77. The fusion protein for use of item 76, wherein the use is in the treatment of cancer.

Item 78. Use of a fusion protein of any one of items 1-58 for the manufacture of a medicament.

Item 79. The use of item 78, wherein the medicament is for the treatment of cancer.

V. EXAMPLES

Example 1: Expression and Analysis of Representative Fusion Proteins

In this Example, representative antibody-lipocalin mutein fusion proteins were generated by fusing together a GPC3 specific antibody having the heavy chain provided by SEQ ID NO: 81, or comprise a heavy chain variable domain of SEQ ID NO: 78, or comprising the CDRs of GYTFTDYE (HCDR1, SEQ ID NO: 72), LDPKTGDT (HCDR2, SEQ ID NO: 73), and TRFYSYTY (HCDR3; SEQ ID NO: 74), and light chains provided by SEQ ID NO: 82, or comprise a heavy chain variable domain of SEQ ID NO: 79, or comprising the CDRs of QSLVHSNRNTY (LCDR1, SEQ ID NO: 75), KVS (LCDR2, SEQ ID NO: 76), and SQNTHVPPT (LCDR3; SEQ ID NO: 77), and the CD137 specific lipocalin mutein of SEQ ID NO: 40 or the CD137 specific lipocalin having 97% sequence identity to SEQ ID NO: 49 and designated CD137Ac1, via a linker, such as an unstructured $(G_4S)_3$ linker of SEQ ID NO: 13, to engage GPC3 and CD137 at the same time. The different formats that were generated are depicted in FIG. 1. For example, such fusion proteins, e.g., SEQ ID NOs: 87 and 82, SEQ ID NOs: 88 and 82, SEQ ID NOs: 81 and 89, SEQ ID NOs: 81 and 90, and CD137Ac1-Fusion 1, CD137Ac1-Fusion 2, CD137Ac1-Fusion 3, CD137Ac1-Fusion 4, CD137Ac1-Fusion 5, CD137Ac1-Fusion 6, and CD137Ac1-Fusion 7 (fusion proteins having 97% sequence identity to SEQ ID NOs: 91 and 82, SEQ ID NOs: 92 and 82, SEQ ID NOs: 81 and 93, SEQ ID NOs: 81 and 94, SEQ ID NOs: 95 and 82, or SEQ ID NOs: 96 and 82), were generated via fusing the one or more of lipocalin mutein of SEQ ID NO: 40 or having 97% sequence identity to SEQ ID NO: 49 to either one or more of the four termini of an antibody comprising of the heavy chain provided by the heavy chain provided by SEQ ID NO: 81, or comprise a heavy chain variable domain of SEQ ID NO: 78, or comprising the CDRs of GYTFTDYE (HCDR1, SEQ ID NO: 72), LDPKTGDT (HCDR2, SEQ ID NO: 73), and TRFYSYTY (HCDR3; SEQ ID NO: 74), and light chains provided by SEQ ID NO: 82, or comprise a heavy chain variable domain of SEQ ID NO: 79, or comprising the CDRs of QSLVHSNRNTY (LCDR1, SEQ ID NO: 75), KVS (LCDR2, SEQ ID NO: 76), and SQNTHVPPT (LCDR3; SEQ ID NO: 77). The generated fusion proteins can be bivalent to CD137 (e.g., as depicted in FIG. 1A-1D) or tetravalent to CD137 (e.g., as depicted in FIG. 1E-1H), or have even higher valency to CD137 (e.g., as depicted in FIG. 1I).

The GPC3 specific antibodies as well as all antibody lipocalin mutein fusion proteins described in this Example had an engineered IgG4 backbone, which contained a S228P mutation to minimize IgG4 half-antibody exchange in-vitro and in-vivo (Silva et al., *J Biol Chem*, 2015). Additional mutations in the IgG4 backbones may also exist in all antibodies and fusion proteins described here, including any one or more of mutations F234A, L235A, M428L, N434S, M252Y, S254T, and T256E. F234A and L235A mutations may be introduced to decrease ADCC and ADCP (Glaesner et al., *Diabetes Metab Res Rev*, 2010). M428L and N434S mutations or M252Y, S254T, and T256E mutations may be introduced for extended serum half-life (Dall'Acqua et al., *J Biol Chem*, 2006, Zalevsky et al., *Nat Biotechnol*, 2010). All antibodies were expressed without the carboxy-terminal lysine to avoid heterogeneity.

In addition, monospecific lipocalin mutein Fc fusions were generated by fusing one or more of the CD137 specific lipocalin mutein of SEQ ID NO: 40 or the GPC3 specific lipocalin of SEQ ID NO: 64, via a linker, e.g., an unstructured $(G_4S)_3$ linker of SEQ ID NO: 13, to the C-terminus of the Fc region of an antibody provided in SEQ ID NO: 28 as depicted in FIG. 1J-1K. The resulting constructs are provided in SEQ ID NO: 98.

The present invention also embodies asymmetrical antibody-lipocalin mutein fusion formats where, for example, one light chain of the antibody may be fused with a lipocalin mutein while the other is not.

The constructs of the fusion proteins were generated by gene synthesis and cloned into a mammalian expression vector. They were then transiently expressed in Expi293F™ cells (Life Technologies). The concentration of fusion proteins in the cell culture medium was measured by HPLC (Agilent Technologies) employing a POROS® protein A affinity column (Applied Biosystems). The titers of the fusion proteins were summarized in Table 1.

The fusion proteins were purified using Protein A chromatography followed by size-exclusion chromatography (SEC) in phosphate-buffered saline (PBS). After SEC purification, the fractions containing monomeric protein are pooled and analyzed again using analytical SEC and the percentages of monomeric content.

The monomeric protein contents of exemplary fusion proteins after SEC purification are summarized in Table 1, as well as the isoelectric points (pIs). The pI of provided fusion proteins (SEQ ID NOs: 87 and 82) have been increased as compared to a certain previously known CD137/GPC3 bispecific fusion protein SEQ ID NO: 83.

TABLE 1

Transient expression titers

| | Monomeric protein content [%] | Determined pI |
|---|---|---|
| SEQ ID NOs: 87 and 82 | 99.9 | 7.5 |
| CD137Ac1-Fusion 2 | 98.3 | — |
| SEQ ID NOs: 81 and 82 | 99.0 | — |
| SEQ ID NO: 83 | 100.0 | 6.2 |

Example 2: Binding of Fusion Proteins Towards GPC3 Determined by Surface Plasmon Resonance (SPR)

The binding kinetics and affinity of exemplary fusion proteins to recombinant human GPC3 (huGPC3) and cynomolgus GPC3 (cyGPC3) (R&D Systems) were determined by surface plasmon resonance (SPR) using a Biacore T200 instrument (GE Healthcare).

The anti-human IgG Fc antibody (GE Healthcare) was immobilized on a CM5 sensor chip using standard amine chemistry: the carboxyl groups on the chip were activated using 1-ethyl-3-(3-dimethylaminopropyl)-carbodiimide (EDC) and N-hydroxysuccinimide (NHS). Subsequently, anti-human IgG Fc antibody solution (GE Healthcare) at a concentration of 25 μg/mL in 10 mM sodium acetate (pH 5.0) was applied at a flow rate of 5 μL/min until an immobilization level of 6000-10000 resonance units (RU) was achieved. Residual non-reacted NHS-esters were blocked by passing a solution of 1M ethanolamine across the surface. The reference channel was treated in an analogous manner. Subsequently, testing fusion proteins (SEQ ID NOs: 87 and 82 and CD137Ac1-Fusion 1) or the GPC3 antibody as included in the fusion protein (SEQ ID NOs: 81 and 82) at 0.2 μg/ml in HBS-EP+ buffer was captured by the anti-human IgG-Fc antibody at the chip surface for 180 s at a flow rate of 10 μL/min. After each capture step, the needle was washed.

For affinity determination, dilutions (100 nM, 25 nM, 6.25 nM and 1.56 nM) of huGPC3 or cyGPC3 were prepared in HBS-EP+ buffer (GE Healthcare) and applied to the prepared chip surface. The binding assay was carried out with a contact time of 180 s, a dissociation time of 900 s, and a flow rate of 30 µL/min. After each injection, the needle was cleaned with 40 mM NaOH+20% isopropanol. All measurements were performed at 25° C. Regeneration of the chip surface was achieved with injections of 3 M $MgCl_2$ for 120 s. Prior to the protein measurements, three startup cycles were performed for conditioning purposes. Data were evaluated with Biacore T200 Evaluation software (v2.0). Double referencing was used and the 1:1 binding model was used to fit the raw data.

The values determined for $k_{on}$, $k_{off}$ and the resulting equilibrium dissociation constant ($K_D$) for exemplary fusion proteins are summarized in Table 2. The tested fusion proteins (SEQ ID NOs: 87 and 82 and CD137Ac1-Fusion 1) bind huGPC3 as well as cyGPC3 with subnanomolar affinities, comparable to the GPC3 antibody as included in the fusion proteins and a certain previously known CD137/GPC3 bispecific fusion protein (SEQ ID NO: 83).

minal polyhistidine tag, R&D Systems) was instead coated on a microtiter plate. The testing agents were similarly titrated and bound agents were detected via anti-NGAL-HRP.

Exemplary results are depicted in FIG. 2A-2D, together with the fit curves resulting from a 1:1 binding sigmoidal fit, where the $EC_{50}$ value and the maximum signal were free parameters, and the slope was fixed to unity. The resulting $EC_{50}$ values are provided in Table 3.

The observed $EC_{50}$ values toward the human GPC3 of provided fusion proteins (SEQ ID NOs: 87 and 82 and CD137Ac1-Fusion 1 to 7) were very similar or comparable to a previously known CD137/GPC3 bispecific fusion protein (SEQ ID NOs: 83) and/or the GPC3 antibody as included in the fusion proteins (SEQ ID NOs: 81 and 82). Some tested fusion proteins (SEQ ID NOs: 87 and 82, CD137Ac1-Fusion 3, and CD137Ac1-Fusion 4) retain strong binding affinities to human CD137. Additionally, certain tested fusion protein (SEQ ID NOs: 87 and 82) also shows cross-reactivity to cynomolgus GPC3 at a comparable level to human GPC3, i.e, bind cynomolgus GPC3 with $EC_{50}$ values in the same range as the corresponding $EC_{50}$s for human GPC3.

TABLE 2

Kinetic constants and affinities of fusion proteins determined by SPR

| | huGPC3 | | | cyGPC3 | | |
|---|---|---|---|---|---|---|
| | $k_{on}$ [$M^{-1} \times s^{-1}$] | $k_{off}$ [$s^{-1}$] | $K_D$ [nM] | $k_{on}$ [$M^{-1} \times s^{-1}$] | $k_{off}$ [$s^{-1}$] | $K_D$ [nM] |
| SEQ ID NOs: 87 and 82 | 4.09E+05 | 2.69E−04 | 6.57E−10 | 2.93E+05 | 2.75E−04 | 9.36E−10 |
| CD137Ac1-Fusion 1 | 3.81E+05 | 2.54E−04 | 6.66E−10 | 2.61E+05 | 2.67E−04 | 1.02E−09 |
| SEQ ID NOs: 81 and 82 | 3.61E+05 | 2.48E−04 | 6.86E−10 | 2.05E+05 | 1.51E−04 | 7.37E−10 |
| SEQ ID NO: 83 | 2.05E+05 | 1.51E−04 | 7.37E−10 | 2.11E+05 | 1.41E−04 | 6.69E−10 |

Example 3. Binding of Fusion Proteins Towards GPC3 or CD137 in Enzyme-Linked Immunosorbent Assay (ELISA)

An enzyme-linked immunosorbent assay (ELISA) was employed to determine the binding potency of exemplary fusion proteins to GPC3 and CD137.

Recombinant huGPC3 (R&D Systems) at the concentration of 1 µg/mL in PBS was coated overnight on microtiter plates at 4° C. After five washes with 100 µL PBS-0.05% T (PBS supplemented with 0.05% (v/v) Tween 20), the plates were blocked with 2% BSA (w/v) in PBS-0.1% T (PBS-0.1% T-2% BSA) for 1 h at room temperature. After washing with 100 µL PBS-0.05% T (PBS supplemented with 0.05% (v/v) Tween 20) five times, exemplary fusion proteins (SEQ ID NOs: 87 and 92 and CD137Ac1-Fusion 1 to 7) or the GPC3 antibody as include in the fusion proteins (SEQ ID NOs: 81 and 82) at different concentrations were added to the wells and incubated for 1 h at room temperature, followed by another wash step. Bound molecules under study were detected by incubation with 1:5000 diluted anti-human IgG Fc-HRP (Jackson Laboratory) in PBS-0.1% T-2% BSA. After an additional wash step, fluorogenic HRP substrate (QuantaBlu, Thermo) was added to each well and the fluorescence intensity was detected using a fluorescence microplate reader.

The same ELISA setup was also employed to determine the binding potency of fusion proteins to cynomolgus GPC3 and huCD137, where recombinant cyGPC3 (R&D Systems) or huCD137-His (recombinant human CD137 with C-ter-

TABLE 3

ELISA data for GPC3 or CD137 binding

| | $EC_{50}$ [nM] Binding to huGPC3 | $EC_{50}$ [nM] Binding to cyGPC3 | $EC_{50}$ [nM] Binding to huCD137 |
|---|---|---|---|
| SEQ ID NOs: 87 and 82 | 0.19 | 0.34 | 0.52 |
| CD137Ac1-Fusion 1 | 0.16 | — | — |
| CD137Ac1-Fusion 2 | 0.4 | — | — |
| CD137Ac1-Fusion 3 | 0.43 | — | 2.4 |
| CD137Ac1-Fusion 4 | 0.46 | — | 0.81 |
| CD137Ac1-Fusion 5 | 0.46 | — | — |
| CD137Ac1-Fusion 6 | 0.47 | — | — |
| CD137Ac1-Fusion 7 | 0.43 | — | — |
| SEQ ID NOs: 81 and 82 | 0.13 | 0.23 | — |
| SEQ ID NO: 83 | 0.24 | 0.41 | 0.15 |

Example 4. Simultaneous Binding of Fusion Proteins to GPC3 and CD137 in ELISA

In order to demonstrate the simultaneous binding of exemplary fusion proteins to GPC3 and CD137, a dual-binding ELISA format was used.

Recombinant huCD137-His (R&D Systems) in PBS (1 µg/mL) was coated overnight on microtiter plates at 4° C. The plates were washed five times after each incubation step with 100 µL PBS-0.05% T. The plates were blocked with PBS-0.1% T-2% BSA for 1 h at room temperature and subsequently washed again. Different concentrations of tested fusion proteins were added to the wells and incubated for 1 h at room temperature, followed by a wash step. Subsequently, biotinylated huGPC3 was added at a constant concentration of 1 µg/mL in PBS-0.1% T-2% BSA for 1 h. After washing, a 1:5000 dilution of ExtrAvidin-HRP (Sigma-Aldrich) in PBS-0.1% T-2% BSA was added to the wells and incubated for 1 h. After an additional wash step, fluorogenic HRP substrate (QuantaBlu, Thermo) was added to each well, and the fluorescence intensity was detected using a fluorescence microplate reader.

The dual binding of fusion proteins was also tested with a reverse set-up where recombinant huGPC3 (R&D Systems) was coated on microtiter plates at 1 µg/ml and the bound fusion proteins were detected via the addition of 5 µg/mL biotinylated huCD137-His.

Exemplary dual binding data are shown in FIG. 3, together with the fit curves resulting from a 1:1 sigmoidal binding fit, where the $EC_{50}$ value and the maximum signal were free parameters, and the slope was fixed to unity. The $EC_{50}$ values are summarized in Table 4. The fusion proteins (SEQ ID NOs:87 and 82 and CD137Ac1-Fusion 1 to 7) show clear binding signals, demonstrating that they can engage GPC3 and CD137 simultaneously. Most of such fusion proteins are able to simultaneously engage GPC3 and CD137 at a comparable level to a previously known CD137/GPC3 bispecific fusion protein SEQ ID NOs: 83.

TABLE 4

ELISA data for simultaneous target binding of both GPC3 and CD37

|  | $EC_{50}$ [nM] GPC3 capture_CD137 detection | $EC_{50}$ [nM] CD137 capture_GPC3 detection |
|---|---|---|
| SEQ ID NOs: 87 and 82 | 0.98 | 4.2 |
| CD137Ac1-Fusion 2 | 5.3 | — |
| CD137Ac1-Fusion 3 | 3.3 | — |
| CD137Ac1-Fusion 4 | 3.2 | — |
| CD137Ac1-Fusion 5 | 1.7 | — |
| CD137Ac1-Fusion 6 | 3.1 | — |
| CD137Ac1-Fusion 7 | 1.9 | — |
| SEQ ID NOs: 81 and 82 | — | — |
| SEQ ID NO: 83 | 1.0 | 4.2 |

Example 5. Off-Target Binding of Fusion Proteins Analyzed by ELISA

An ELISA-based assay was employed to assess the off-target binding of fusion proteins toward 32 different targets including GPC3, GPC5, and other TNF receptor proteins (Frese et al., MAbs, 2013). Targets at the concentration of 5 µg/mL in PBS were coated overnight on microtiter plates at 4° C. After washing with PBS-0.05% T, the plates were blocked with PBS-0.1% T-2% BSA for 1 h at room temperature. After washing with 100 µL PBS-0.05% T five times, testing fusion proteins at 100 nM or 10 nM were added to the wells and incubated for 1 h at room temperature, followed by another wash step. Bound antibodies under study were detected by incubation with 1:5000 diluted goat anti-human IgG Fc HRP (Jackson Laboratory) in PBS-0.1% T-2% BSA. After an additional wash step, fluorogenic HRP substrate (QuantaBlu, Thermo) was added to each well and incubated for 1 h. The fluorescence intensity was detected using a fluorescence microplate reader and normalized to the signal of a control antibody (SEQ ID NOs: 106 and 107). The normalized signals of each testing molecule binding to the 32 targets were summed up to yield the cumulated binding ratio for the antibody at a given concentration, i.e., 100 nM or 10 nM. The cumulated binding ratios at 100 nM and 10 nM for each testing molecule were further summed to yield the sum of cumulated binding ratios. For example, the control antibody (SEQ ID NOs: 106 and 107), to which the fluorescence intensity resulting from binding to each of the 32 targets was normalized, has a cumulated binding ratio of 32 when tested at either 100 nM or 10 nM and a sum of cumulated binding ratios of 64. The results are shown in Table 5. Higher cumulated binding ratio correlates to stronger off-target binding.

Provided fusion protein of SEQ ID NOs: 87 and 82 shows no or negligible off-target binding (sum of cumulative binding rations <150), as well as the GPC3 antibody and the CD137 specific lipocalin mutein (Fc fusion) as included in the fusion protein (SEQ ID NOs: 81 and 82 and SEQ ID NO: 98, respectively), while certain previously known CD137/GPC3 bispecific fusion protein (SEQ ID NO: 83) shows undesired off-target binding (sum of cumulative binding rations >250).

TABLE 5

Off-target binding of the fusion proteins.

|  | Molecules |  | Cumulative binding ratio | Sum of cumulative binding ratios |
|---|---|---|---|---|
| Normalized fluorescence intensity | SEQ ID NOs: 87 and 82 | 100 nM | 64 | 109 |
|  |  | 10 nM | 45 |  |
|  | SEQ ID NOs: 81 and 82 | 100 nM | 81 | 129 |
|  |  | 10 nM | 48 |  |
|  | SEQ ID NO: 98 | 100 nM | 38 | 70 |
|  |  | 10 nM | 32 |  |
|  | SEQ ID NO: 83 | 100 nM | 207 | 352 |
|  |  | 10 nM | 144 |  |

Example 6. Flow Cytometric Analysis of Fusion Proteins Binding to Cells Expressing CD137 or GPC3

Target specific binding of exemplary fusion proteins to human CD137-expressing cells and human GPC3-expressing cells was assessed by flow cytometry.

CHO cells were stably transfected with human CD137 or a mock control using the Flp-In system (Life technologies) according to the manufacturer's instructions. SK-Hep1 cells were stably transfected with human GPC3 or a mock control using Lipofectamine2000 (Invitrogen) according to the manufacturer's instructions. Transfected CHO cells were maintained in Ham's F12 medium (Gibco) supplemented with 10% Fetal Calf Serum (Sigma-Aldrich) and 500 µg/mL Hygromycin B (Roth). Transfected SK-Hep1 cells were cultured in RPMI 1640+GlutaMAX medium (Gibco) supplemented with 20% Fetal Calf Serum (Sigma-Aldrich) and 500 µg/mL G418 (Gibco). Cells were cultured in cell culture flasks according to manufacturer's instruction (37° C., 5% $CO_2$ atmosphere).

For flow cytometric analysis, respective cell lines were incubated with an exemplary fusion protein (SEQ ID NOs: 87 and 82), the GPC3 antibody or the CD137 specific lipocalin mutein (Fc fusion) as included in the fusion protein (SEQ ID NOs: 81 and 82 and SEQ ID NO: 98, respectively), a reference CD137 antibody SEQ ID NOs: 26 and 27, or an isotype control (SEQ ID NOs: 24 and 25) and detected using a fluorescently labeled anti-human IgG antibody in FACS analysis as described in the following:

$5 \times 10^4$ cells per well were incubated for 1 h in ice-cold PBS containing 5% fetal calf serum (PBS-FCS). A dilution series of the testing molecule were added to the cells and incubated for 1 h on ice. Cells were washed twice with PBS and then incubated with a goat anti-hIgG Alexa647-labeled antibody or goat anti-hIgG Alexa488-labeled antibody for 30 min on ice. Cells were subsequently washed and analyzed using iQue Flow cytometer (Intellicyte Screener). Mean geometric fluorescent signals were plotted and fitted with Graphpad software. The geometric means of the fluorescence intensity were used to calculate $EC_{50}$ values using a four-parameter logistic regression with bottom fixed to background.

The ability of the tested molecules to bind human GPC3 and CD137 is depicted in FIG. 4. The binding affinities ($EC_{50}$s) of the fusion protein SEQ ID NOs: 87 and 82 to human GPC3 and human CD137 expressing cells is in the low nanomolar, comparable to the GPC3 antibody (SEQ ID NOs: 81 and 82) and the CD137 specific lipocalin mutein (SEQ ID NO: 98) or antibody (SEQ ID NOs: 26 and 27), respectively (summarized in Table 6). A certain previously known CD137/GPC3 bispecific fusion protein (SEQ ID NO: 83), however, shows limited dose-dependent binding to GPC3 expressing cells as the binding curve did not reach a plateau at concentrations up to 100 nM (FIG. 4B). None of the tested molecules bind to mock transfected cells (data not shown).

TABLE 6

Binding affinities of the fusion proteins to cells expressing GPC3 or CD137

| | $EC_{50}$ [nM] Flp-In-CHO::huCD137 | $EC_{50}$ [nM] SK-Hep1::huGPC3 |
|---|---|---|
| SEQ ID NOs: 87 and 82 | 13.09 | 23.22 |
| SEQ ID NOs: 81 and 82 | — | 19.92 |
| SEQ ID NO: 98 | 18.03 | — |
| SEQ ID NOs: 26 and 27 | 9.61 | — |
| SEQ ID NO: 83 | 4.68 | — |

Example 7. Binding Affinities of the Fusion Proteins to GPC3-Positive Tumor Cells Binding of fusion proteins to tumor cells expressing different levels of GPC3→HepG2, Hep3B, MKN-45, and NCI-N87—was assessed by flow cytometry.

The HepG2 cell line was cultured in Dulbecco's Modified Eagle's Medium (DMSO, Pan Biotech) supplemented with 10% Fetal Calf Serum (Sigma-Aldrich). The Hep3B cell line was cultured in Minimum Essential Medium (with Earle's salts) (Gibco) supplemented with 10% Fetal Calf Serum (Sigma-Aldrich) and 2 mM L-glutamine (Gibco). MKN-45 and NCI-N87 cell lines were cultured in RPMI-1640 Medium+GlutaMAX (Gibco) supplemented with 20% or 10% Fetal Calf Serum (Sigma-Aldrich), respectively. All tumor cell lines were cultured in cell culture flasks according to manufacturer's instruction (37° C., 5% $CO_2$ atmosphere).

For flow cytometric analysis, tumor cell lines with different GPC3 expression levels (high to moderate expression: HepG2>Hep3B>MKN-45) and GPC3 negative cell line NCI-N87 were incubated with an exemplary fusion protein SEQ ID NOs: 87 and 82, the GPC3 antibody or the CD137 specific lipocalin mutein (Fc fusion) as included in the fusion protein (SEQ ID NOs: 81 and 82 and SEQ ID NO: 98, respectively), a reference CD137 antibody SEQ ID NOs: 26 and 27, or an isotype control (SEQ ID NO: 24 and 25), and detected using a fluorescently labeled anti-human IgG antibody as described in Example 6.

The ability of the fusion protein SEQ ID NOs: 87 and 82 to bind GPC3-positive tumor cells is depicted in FIG. 5 and the corresponding binding affinities ($EC_{50}$s) are summarized in Table 7. Binding affinities of the fusion protein to GPC3-expressing tumor cells were in the low nanomolar range, comparable to the GPC3 antibody included in the fusion proteins (SEQ ID NOs: 81 and 82). The results additionally suggest that the fusion protein does not bind to tumor cells negative of GPC3.

TABLE 7

Binding affinities of the fusion proteins to GPC3-positive tumor cells

| | $EC_{50}$ [nM] HepG2 | $EC_{50}$ [nM] Hep3B | $EC_{50}$ [nM] MKN-45 | $EC_{50}$ [nM] NCI-N87 |
|---|---|---|---|---|
| SEQ ID NOs: 87 and 82 | 20.56 | 7.92 | 2.59 | — |
| SEQ ID NOs: 81 and 82 | 16.68 | 6.35 | 1.46 | — |
| SEQ ID NO: 98 | — | — | — | — |
| SEQ ID NOs: 26 and 27 | — | — | — | — |

Example 8. GPC3 Dependent T-Cell Co-Stimulation Using a CD137 Bioassay

The potential of selected fusion proteins to induce activation of CD137 signaling pathway in a GPC3 dependent manner was assessed using a commercially available double stable transfected Jurkat cell line expressing CD137 and the luc2 gene (humanized version of firefly luciferase) whereas luc2 expression is driven by a NFκB-responsive element. In this bioassay, CD137 engagement results in CD137 intracellular signaling, leading to NFκB-mediated luminescence.

Hepatocellular cancer cell lines HepG2 and Hep3B which express high level of GPC3, and gastric cancer cell lines MKN-45, which expresses moderate level of GPC3, and NCI-N87, which is GPC3 negative, were cultured as described in Example 7. One day prior to the assay, respective tumor cells were plated at $6.25 \times 10^3$ cells per well and allowed to adhere overnight at 37° C. in a humidified 5% $CO_2$ atmosphere.

The next day, $3.75 \times 10^4$ NF-kB-Luc2/CD137 Jurkat cells were added to each well, followed by the addition of various concentration, typically ranging from 0.00488 nM to 10 nM, of an exemplary fusion protein (SEQ ID NOs: 87 and 82), the GPC3 antibody or the CD137 specific lipocalin mutein (Fc fusion) as included in the fusion protein (SEQ ID NOs: 81 and 82 and SEQ ID NO: 98, respectively), a reference CD137 antibody SEQ ID NOs: 26 and 27, or an isotype control (SEQ ID NOs: 24 and 25). Plates were covered with a gas permeable seal and incubated at 37° C. in a humidified 5% $CO_2$ atmosphere. After 4 h, 30 µL Bio-Glo™ Reagent was added to each well and the bioluminescent signal was quantified using a luminometer (PHERAstar). Four-parameter logistic curve analysis was performed with GraphPad Prism® to calculate $EC_{50}$ values (shared bottom) which are summarized in Table 8. To demonstrate the GPC3 dependency of CD137 engagement by fusion proteins, the same experiment was performed in parallel in the absence of tumor cells using the highest concentration of the testing molecules. The assay was performed in triplicates.

The results of a representative experiment are depicted in FIG. 6. The data shown in FIGS. 6A and 6B demonstrate that the exemplary fusion protein SEQ ID NOs: 87 and 82 induced a strong CD137 mediated T-cell co-stimulation in the presence of tumor cell line with high GPC3 expression level. FIG. 6C-6E show that the activation of CD137 by the fusion protein is GPC3 dependent, because no activation of the NF-kB-Luc2/CD137 Jurkat cells was detected in the presence of tumor cells with moderate or low GPC3 expression or in absence of GPC3 expressing tumor cells. In contrast, the reference anti-CD137 mAb (SEQ ID NOs: 26 and 27) showed CD137 mediated T-cell co-stimulation regardless of the level of GPC3 expression and in absence of target cells.

TABLE 8

Assessment of T-cell activation using a CD137 Bioassay

| | $EC_{50}$ [nM] HepG2 | $EC_{50}$ [nM] Hep3B | $EC_{50}$ [nM] MKN-45 | $EC_{50}$ [nM] NCI-N87 |
|---|---|---|---|---|
| SEQ ID NOs: 87 and 82 | 0.38 | 0.78 | — | — |
| SEQ ID NOs: 81 and 82 | — | — | — | — |
| SEQ ID NO: 98 | — | — | — | — |
| SEQ ID NOs: 26 and 27 | 0.94 | 1.39 | 1.47 | 1.67 |

Example 9. Assessment of GPC3 Dependent T-Cell Activation Induced by the Fusion Proteins The GPC3 target dependent T-cell costimulation by the fusion proteins was analyzed using a T-cell activation assay. Fusion proteins were applied at different concentrations to anti-CD3 stimulated T cells, co-cultured with human GPC3 transfected or mock transfected SK-Hep1 cells or GPC3 positive tumor cell line HepG2. IL-2 secretion levels were measured in the supernatants.

PBMCs from healthy volunteer donors were isolated from buffy coats by centrifugation through a polysucrose density gradient (Biocoll, 1.077 g/mL, Biochrom), following Biochrom's protocols. T lymphocytes were further purified from PBMC by magnetic cell sorting using a Pan T cell purification Kit (Miltenyi Biotec GmbH) following the manufacturer's instructions. Purified Pan T cells were resuspended in a buffer consisting of 90% FCS and 10% DMSO, immediately frozen down and stored in liquid nitrogen until further use. For the assay, T cells were thawed and rested in culture media (RPMI-1640 Medium+GlutaMAX, Gibco) supplemented with 10% Fetal Calf Serum (Sigma-Aldrich) and 1% Penicillin-Streptomycin (Gibco) for overnight at 37° C. in a humidified 5% $CO_2$ atmosphere. SK-Hep1 and HepG2 cells were cultured as described in Example 6 and Example 7, respectively.

The following procedure was performed using triplicates for each experimental condition: flat-bottom tissue culture plates were pre-coated with 0.25 µg/mL anti-CD3 antibody for 2 h at 37° C. and then washed twice with PBS. SK-Hep1 cells, transfected with human GPC3 or mock transfected, and GPC3 positive tumor cells HepG2 were treated for 30 min with 30 µg/ml mitomycin C (Sigma Aldrich) in order to block proliferation. Mitomycin treated cells were then washed twice with PBS and plated at $1.0 \times 10^4$ cells per well in culture medium to allow adhesion overnight at 37° C. in a humidified 5% $CO_2$ atmosphere. The target expressing cells had before been grown under standard conditions, detached using Accutase (PAA Laboratories), and resuspended in culture media.

On the next days, after washing the plates twice with PBS, $2.5 \times 10^4$ T cells per well were added. A dilution series of fusion proteins (SEQ ID NOs:87 and 82), the GPC3 antibody as included in the fusion protein (SEQ ID NOs: 81 and 82), a previously known CD137/GPC3 bispecific fusion protein (SEQ ID NO: 83), a GPC3 specific lipocalin mutein (Fc fusion) (SEQ ID NOs: 97), a reference CD137 antibody (SEQ ID NOs: 26 and 27), or an isotype control (SEQ ID NOs: 24 and 25), typically ranging from 0.003 nM to 10 nM, were added to corresponding wells. Plates were covered with a gas permeable seal and incubated at 37° C. in a humidified 5% $CO_2$ atmosphere for 3 days. IL-2 levels in the supernatant were assessed using the human IL-2 DuoSet kit (R&D Systems) as described in the following procedures.

384 well plates were coated for 2 h at room temperature with 1 µg/mL "Human IL-2 Capture Antibody" in PBS. Subsequently, wells were washed 5 times with 80 µl PBS-0.05% T. After 1 h blocking in PBS-0.05% T containing 1% casein (w/w), assay supernatants and a concentration series of IL-2 standard diluted in culture medium was transferred to respective wells and incubated overnight at 4° C. The next day, a mixture of 100 ng/mL goat anti-hIL-2-Bio detection antibody (R&D Systems) and 1 µg/mL Sulfotag-labelled streptavidin (Mesoscale Discovery) in PBS-0.05% T containing 0.5% casein were added and incubated at room temperature for 1 h. After washing, 25 µL reading buffer (Mesoscale Discovery) was added to each well and the resulting electrochemiluminescence (ECL) signal was detected by a Mesoscale Discovery reader. Analysis and quantification were performed using Mesoscale Discovery software.

The T-cell activation assay was also employed in a similar manner to assess the ability of additional previously known CD137/GPC3 bispecific fusion proteins SEQ ID NOs: 99 and 27, SEQ ID NO: 83, and SEQ ID NO: 84 to co-stimulate T-cell responses. In the experiment, tissue culture plates were pre-coated for 1 h at 37° C. using 200 µL of 0.25 µg/mL anti-CD3 antibody and washed twice with PBS. $1.25 \times 10^4$ HepG2 tumor cells per well were plated, allowed to adhere overnight at 37° C. in a humidified 5% $CO_2$ atmosphere, and treated for 2 hours at 37° C. with 10 µg/mL mitomycin C. Plates were washed twice with PBS, and $5 \times 10^4$ T cells and the test molecules at a concentration of 1 µg/mL were added to each well. Plates were covered with a gas permeable seal and incubated at 37° C. in a humidified 5% $CO_2$ atmosphere for 3 days. Subsequently, IL-2 concentration in the supernatant were assessed.

Exemplary data are shown in FIG. 7. Co-culturing of Pan T cells with SK-Hep1 cells transfected with human GPC3 (FIG. 7B) or GPC-3 expressing HepG2 tumor cells (FIG. 7C) in presence of the fusion protein (SEQ ID NOs: 87 and 82) led to strong dose-dependent IL-2 secretion compared to the isotype control and is much stronger than that of the GPC3 antibody (SEQ ID NOs: 81 and 82, the GPC3 specific lipocalin mutein (SEQ ID NO: 129), or a previously known CD137/GPC3 bispecific fusion protein (SEQ ID NOs: 83), where no increase of IL-2 or slight increase of IL-2 secretion at high dose levels was observed. When co-culturing with mock-transfected SK-Hep1 cells (GPC3 negative), no testing molecule displays dose-dependent increase in IL-2 secretion. The results illustrate that the activation of T cells by provided fusion proteins is GPC3 dependent.

Example 10. Assessment of T-Cell Activation in the Presence of Tumor Cells Expressing Different Level of GPC3

A further T cell assay was employed to assess the ability of exemplary fusion proteins to co-stimulate T-cell activation in a GPC3 target dependent manner. Fusion proteins were applied at different concentrations to anti-CD3 stimulated T cells, in the presence of tumor cell lines with different GPC3 expression levels. Tested tumor cell lines include HepG2, Hep3B, MKN-45 and NCI-N87 (high to moderate: expression: HepG2>Hep3B>MKN-45, GPC3 negative: NCI-N87). IL-2 secretion levels were measured in the supernatants.

PBMC from healthy volunteer donors were isolated from buffy coats as and lymphocytes were purified from PBMC described in Example 9.

For the assay, T cells were thawed and rested in culture media RPMI-1640 Medium+GlutaMAX, Gibco), supplemented with 10% Fetal Calf Serum (Sigma-Aldrich) and 1% Penicillin-Streptomycin (Gibco) for 16 h at 37° C. in a humidified 5% $CO_2$ atmosphere.

The following procedure was performed using triplicates for each experimental condition: flat-bottom tissue culture plates were pre-coated with 0.25 µg/mL anti-CD3 antibody for 2 h at 37° C. and then washed twice with PBS. Tumor cell line HepG2, Hep3B, MKN-45 or NIC-N87 were treated for 30 min with 30 µg/ml mitomycin C (Sigma Aldrich) in order to block proliferation. Mitomycin treated tumor cells were then washed twice with PBS and plated at $8.3 \times 10^3$ cells per well in culture medium to allow adhesion overnight at 37° C. in a humidified 5% $CO_2$ atmosphere. The target cells had before been grown under standard conditions, detached using Accutase (PAA Laboratories), and resuspended in culture media.

On the next days, after washing the plates twice with PBS, $2.5 \times 10^4$ T cells per well were added to the tumor cells. A dilution series of an exemplary fusion protein (SEQ ID NOs: 87 and 82), the GPC3 antibody or the CD137 specific lipocalin mutein (Fc fusion) as included in the fusion protein (SEQ ID NOs: 81 and 82 and SEQ ID NO: 98, respectively), a reference CD137 antibody (SEQ ID NOs: 26 and 27), or an isotype control (SEQ ID NOs: 24 and 25), typically ranging from 0.26 nM to 10 nM, were added to corresponding wells. Plates were covered with a gas permeable seal and incubated at 37° C. in a humidified 5% $CO_2$ atmosphere for 3 days.

After 3 days of co-culturing, IL-2 level in the supernatant were assessed as described in Example 9.

Exemplary data are shown in FIG. 8. Co-culturing of Pan T cells with HepG2 and Hep3B cells, expressing high levels of GPC3, in presence of the fusion protein SEQ ID NOs: 87 and 82 leads to a clear increase in IL-2 secretion compared to hIgG4 isotype control. Additionally, co-culturing with MKN-45 (GPC3 moderate) or NIC-N87 (GPC3 negative) did no increase IL-2 secretion levels with the fusion protein. The data indicate that the functional activity of fusion proteins, measured by their ability to activate T cells or increase IL-2 secretion, is GPC3 dependent. In contrast, the T-cell activation or IL-2 secretion induced by the reference CD137 antibody (SEQ ID NOs: 26 and 27), is not necessarily GPC3 dependent and hard to predict.

Example 11. Assessment of T Cell-Mediated Cytolysis of GPC3 Expressing Tumor Cells Induced by Fusion Proteins An impedance-based T cell killing assay was employed to assess the ability of the fusion proteins to activate the CD137 co-stimulatory signaling pathway and induce T cell-mediated cytolysis of GPC3 expressing tumor cells. For this purpose, adherent tumor cells were seeded in the wells of an electronic microtiter plate (E plate). Adhesion of the cells to the gold microelectrodes impedes the flow of electric current between the electrodes. This impedance is measured as the unitless "cell index" parameter. The cell index (CI) increases as cells attach and then proliferate over time. Non-adherent CD8+ T cells, an anti-CD3 antibody which activates T cell antigens independently, and testing molecules at different concentrations were added to the HepG2 cells. The addition itself did not cause impedance changes. If the testing molecule co-stimulates cytotoxic T cells by activating the CD137 signaling pathway, T-cell-mediated cytolysis of target cells would increase and the destruction of the adherent tumor cells by the effector cells could be detected as a decreasing CI, enabling the generation of a real-time killing curve.

PBMCs from healthy volunteer donors were isolated from buffy coats. CD8+ T cells were isolated from those PBMCs and stored in liquid nitrogen until further use. For the assay, CD8+ T cells were thawed and rested in assay medium consisting of RPMI 1640 medium supplemented with 10% FBS and 1% Penicillin-Streptomycin for 24 h at 37° C. in a humidified 5% $CO_2$ atmosphere.

The following procedure was performed using triplicates for each experimental condition. Tumor cell lines HepG2 (hepatocellular carcinoma cell line, GPC3-expressing) or NCI-N87 (gastric carcinoma cell line, GPC3-negative) were plated in an E plate in assay medium and incubated for 24 h at 37° C. in a humidified 5% $CO_2$ atmosphere to allow cell adhesion and proliferation.

The following day, an anti-CD3 antibody was added to the tumor cells, followed by dilution series of the exemplary fusion protein (SEQ ID NO: 87 and 82), the GPC3 antibody or the CD137 specific lipocalin mutein (Fc fusion) as included in the fusion protein (SEQ ID NO: 81 and 82 and SEQ ID NO: 98, respectively), a reference CD137 antibody (SEQ ID NOs: 26 and 27), a certain previously known CD137/GPC3 bispecific fusion protein (SEQ ID NO: 83), a GPC3 specific lipocalin mutein (Fc fusion) (SEQ ID NOs: 97), or an isotype control (SEQ ID NOs: 24 and 25). Rested CD8+ T cells were then added to the tumor cells in a ratio of 5:1. Plates were covered with a gas permeable seal and incubated for 3 days, during which the impedance was periodically measured.

The CI values were plotted as a function of time using the RTCA HT Software V 1.0.1 (ACEA Biosciences). The normalized CI was calculated as the CI at a given time point (20 h, 30 h, 40 h, 50 h, 60 h, 70 h after addition of effector cells) divided by the CI at the normalization time point (first measurement after addition of effector cells). For each triplicate the mean normalized CI value and the corresponding SD value were used to calculate the specific killing value using following formula: 100−(normalized mean CI of the testing molecule/normalized mean CI of target cells and effector cells)×100. Specific killing values were exported to GraphPad Prism v7 and plotted with the respective SD values against the time intervals of interest in a XY graph.

Results of exemplary experiments are depicted in FIG. 9. The data show the fusion protein SEQ ID NOs: 87 and 82 induced a dose dependent T cell-mediated lysis of GPC3 expressing HepG2 cells (FIG. 9A-9C), whereas no specific lysis of target negative NCI-N87 cells was observed (FIG. 9D), demonstrating that the fusion protein-induced activation of the CD137 pathway, leading to T cell mediated killing, is GPC3 dependent. The provided fusion protein SEQ ID NOs: 87 and 82 induced a much higher level of GPC3 positive target cell killing by cytotoxic T cells compared to an equimolar of the previously known CD137/GPC3 bispecific fusion protein (SEQ ID NO: 83), the GPC3 antibody (SEQ ID NOs: 81 and 82), or the GPC3 specific lipocalin mutein (Fc fusion) (SEQ ID NO: 97) (FIG. 9C). Additionally, the CD137 specific lipocalin mutein (Fc fusion) (SEQ ID NO: 98), the reference CD137 antibody (SEQ ID NOs: 26 and 27), and the hIgG4 isotype control (SEQ ID NOs: 24 and 25) did not induce CD8+ T cell mediated killing (FIG. 9C).

A further experiment was conducted to demonstrate that the strong T cell-mediated lysis of HepG2 cells by the CD137/GPC3 bispecific fusion protein (SEQ ID NOs: 87 and 82) is dependent on its bispecific design rather than by the combination of anti-GPC3 and anti-CD137 only. The experiment was conducted essentially as described above, but all constructs were added at 10 nM and were compared to a cocktail of the GPC3 antibody (SEQ ID NO: 81 and 82) and the reference CD137 antibody (SEQ ID NOs: 26 and 27) as well as a cocktail of the GPC3 antibody (SEQ ID NO: 81 and 82) and the CD137 specific lipocalin mutein (Fc fusion) (SEQ ID NOs: 98). While again a strong T-cell mediated lysis was detected for the fusion protein SEQ ID NOs: 87 and 82, the specific lysis mediated by both cocktails was only moderate, demonstrating the benefit of this bispecific format to achieve T-cell mediated lysis.

Example 12. Assessment of Functional In Vivo Activity in a Xenograft Mouse Model Engrafted with Human PBMCs In order to investigate the in vivo activity of provided fusion proteins, immune deficient NOG mice engrafted with human HepG2 tumor cells and human PBMC were employed.

4 to 6 week-old NOG mice were subcutaneously (s.c.) injected with $5 \times 10^6$ HepG2 cells in a matrigel/PBS (1:1) solution. Tumors were allowed to grow to a size of 80-100 mm$^3$, at which time point was defined as day 0 of experiment. Mice were randomized on day 0 into treatment (or control) groups according to tumor size and animal weight. Mice were given 5×106 fresh human PBMC intravenously (i.v.) via tail vein injection. Mice received treatment or control (PBS) via intraperitoneal (i.p.) injection after the i.v. PBMC injection on day 1, and again received treatment or control on day 8 and day 15. The molecules under study included an exemplary fusion protein SEQ ID NOs: 87 and 82 (0.5, 5 or 20 mg/kg), the GPC3 antibody as included in the fusion protein (SEQ ID NOs: 81 and 82) (0.39 or 3.9 mg/kg, equimolar concentration to the 0.5 or 5 mg/kg treatment with the fusion protein), and a reference CD137 antibody (SEQ ID NOs: 26 and 27) (3.9 mg/kg, equimolar concentration to the 5 mg/kg treatment with the fusion protein). Tumor growth was recorded every 3-4 days. Animals without drug exposure were excluded from data analyses.

At the study end (day 16), mice were sacrificed, and tumors were formalin fixed and paraffin embedded (FFPE). Histological and immunohistochemical analysis of tumors was performed at BioSiteHisto. FFPE xenograft tumor tissue was sectioned and stained with H&E or for the T cell markers CD3, CD4 or CD8. Stained slides were imaged and digitalized using 3D Histech Pannoramic MIDI instrumentation with 20× objective. CaseViewer 2.2 was used for microscoping of digital slides and Image J was used for tumor area-based analysis. Percentage of tumor infiltrating lymphocytes (TILs) per tumor area minus necrotic area was calculated.

FIG. 10 reflects the change in tumor volume as measured on day 2, day 6, day 9, day 13, and day 16 of the study. Tumor growth inhibition was achieved by the fusion protein SEQ ID NOs: 87 and 82 and the GPC3 antibody as included in the fusion protein SEQ ID NOs: 81 and 82. Both the fusion protein and the GPC3 antibody (at a concentration of 5 or 3.9 mg/kg respectively) completely inhibited the growth of tumor over the course of the study. The effects of the fusion protein and the GPC3 antibody were dose dependent as the lower concentrations (0.5 or 0.39 mg/kg) had a minor effect on tumor growth. Only limited effect on tumor growth was achieved by the treatment with the reference CD137 antibody (SEQ ID NOs: 26 and 27).

Table 9 summarizes the data achieved by the histological and immunohistochemical analysis of the tumor infiltrating lymphocytes. Intratumoral CD3, CD4 or CD8 T cell infiltration is shown as % TILs per (tumor area-necrotic area). Treatment with the fusion protein led to T cell infiltration up to 10% of (tumor area-necrotic area) (all treatment groups). No intratumoral T cell infiltration was induced by the treatment with the GPC3 antibody or the reference CD137 antibody as compared to vehicle control.

TABLE 9

Percentage of tumor infiltrating lymphocytes (TILs) per tumor area minus necrotic area

| | % CD3 T cells | % CD4 T cells | % CD8 T cells |
|---|---|---|---|
| Vehicle | 0.78 | 0.67 | 0.41 |
| SEQ ID NOs: 87 and 82 0.5 mg/kg | 6.19 | 4.65 | 4.52 |
| SEQ ID NOs: 87 and 82 5 mg/kg | 4.07 | 3.27 | 3.00 |
| SEQ ID NOs: 87 and 82 20 mg/kg | 10.7 | 4.86 | 7.29 |
| SEQ ID NOs: 81 and 82 0.39 mg/kg | 1.57 | 1.28 | 0.72 |
| SEQ ID NOs: 81 and 82 3.9 mg/kg | 0.75 | 0.6 | 0.49 |
| SEQ ID NOs: 26 and 27 3.9 mg/kg | 0.84 | 0.68 | 0.22 |

Example 13. Pharmacokinetics of Fusion Proteins in Mice

Analyses of the pharmacokinetics of a representative fusion protein (SEQ ID NOs: 87 and 82) and the GPC3 antibody as included in the fusion protein (SEQ ID NOs: 81 and 82) were performed in mice and compared to those of two previously known CD137/GPC3 bispecific fusion proteins (SEQ ID NO: 83 and SEQ ID NO: 84). Male CD-1 mice approximately 5 weeks of age (2 mice per timepoint; Charles River Laboratories) were injected into a tail vein with the respective construct at a dose of either 2 mg/kg (SEQ ID NOs: 87 and 82, SEQ ID NOs: 81 and 82) or 10 mg/kg (SEQ ID NO: 83, SEQ ID NO: 84). Plasma samples from the mice were obtained at the timepoints of 5 min, 24 h, 168 h, and 336 h for antibody based constructs and at 5 min, 2 h, 4 h, 8 h, 24 h, 2 d, 3 d, 4 d, 7 d, 9 d, 11 d, 14 d and 21 d. Sufficient whole blood—taken under isoflurane anaesthesia—was collected to obtain at least 30-50 µL Li-Heparin plasma per animal and time. Plasma drug levels were then analyzed with ELISA.

For SEQ ID NOs: 87 and 82 or SEQ ID NOs: 81 and 82, the following protocol was used: human GPC3 was dissolved in PBS (1 µg/mL) and coated overnight on microtiter plates at 4° C. The plates were washed after each incubation step with 80 µL PBS-0.05% T five times. The plates were blocked with PBS-0.1% T-2% BSA for 1 h at room temperature and subsequently washed. Plasma samples were diluted in PBS-0.1% T-2% BSA to 20% plasma concentration, added to the wells, and incubated for 1 h at room temperature. Another wash step followed. Bound agents under study were detected after 1 h incubation with SULFO-TAG Anti-Human Antibody (Mesoscale Discovery) or anti-NGAL affinity purified polyclonal antiserum at 1 µg/mL diluted in PBS-0.1% T-2% BSA. After an additional wash step, 25 µL reading buffer was added to each well and the electrochemiluminescence (ECL) signal of every well was read using a Mesoscale Discovery reader.

For SEQ ID NO: 83 or SEQ ID NO: 84 the following protocol was used: human CD137 was dissolved in PBS (1 µg/mL) and coated overnight on microtiter plates at 4° C. The plates were washed after each incubation step with 80 µL PBS-0.05% T. The plates were blocked with PBS-0.1% T-2% BSA for 1 h at room temperature and subsequently washed. Plasma samples were diluted in PBS-0.1% T-2% BSA to 20% plasma concentration, added to the wells, and incubated for 1 h at room temperature. Another wash step followed. Bound agents under study were detected after 1 h incubation with human Glypican-bio and Streptavidin SULFO-tag at 1 µg/mL each diluted in PBS-0.1% T-2% BSA. After an additional wash step, 25 µL reading buffer was added to each well and the ECL signal of every well was read using a Mesoscale Discovery reader.

For data analyses and quantification, a calibration curve with standard protein dilutions was also prepared. The plasma concentration over time for the testing molecules in an exemplary experiment was plotted in FIG. 12. A non-compartmental analysis was applied to the data using Phoenix WinNonlin version 8.1, and the results are summarized in Table 10.

The data demonstrate that the provided fusion protein SEQ ID NOs: 87 and 82 shows typical antibody pharmacokinetics, while the previously known CD137/GPC3 bispecific fusion proteins SEQ ID NO: 83 and SEQ ID NO: 84 show significantly impaired pharmacokinetics profiles.

TABLE 10

Pharmacokinetics in mice

| SEQ ID NO | Terminal half-life [h] | Cmax [µg/mL]/dose | AUClast [h * (µg/mL)] | Clearance [ml/kg/h] |
|---|---|---|---|---|
| SEQ ID NOs: 87 and 82 | 131.53 | 13.67 | 2834.55 | 0.00061 |
| SEQ ID NOs: 81 and 82 | 228.12 | 15.15 | 4461.79 | 0.0003 |
| SEQ ID NO: 83 | 20.04 | 15.76 | 2430.17 | 0.00411 |
| SEQ ID NO: 84 | 11.42 | 11.26 | 1771.88 | 0.00564 |

Example 14: Thermal Stability Assessment of Fusion Proteins

To determine the melting temperatures ($T_m$s) of the fusion proteins, which is a general indicator for overall stability, testing molecules at a protein concentration of 1 mg/mL in PBS (Gibco) were scanned (25-100° C.) at 1° C./min using a capillary nanoDSC instrument (CSC 6300, TA Instruments). The $T_m$s were calculated from the displayed thermogram using the integrated Nano Analyze software.

The resulting maximum melting temperatures as well as the onset temperature of melting for exemplary fusion proteins are listed in Table 11 below. Fusion proteins SEQ ID NOs: 72 and 82 and CD137Ac1-Fusion 2 have improved thermostability as compared to certain previously known CD137/GPC3 bispecific fusion proteins SEQ ID NO: 83, SEQ ID NO: 84, and SEQ ID NOs: 26 and 102.

TABLE 11

$T_m$ and onset melting temperature as determined by nanoDSC

| | Onset of melting [° C.] | $T_m$ [° C.] |
|---|---|---|
| SEQ ID NOs: 87 and 82 | 60.0 | 66.6/71.1 |
| CD137Ac1-Fusion 2 | 60.0 | 66.6/70.9 |
| SEQ ID NOs: 81 and 82 | 60.0 | 66.6/71.1 |
| SEQ ID NO:83 | 57.5 | 67.3/71.7 |
| SEQ ID NO: 84 | 59.0 | 67.6/70.7 |
| SEQ ID NOs: 26 and 102 | 46.0 | 56.9/70.8 |

Embodiments illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present embodiments have been specifically disclosed by preferred embodiments and optional features, modification and variations thereof may be resorted to by those skilled in the art, and that such modifications and variations are considered to be within the scope of this invention. All patents, patent applications, textbooks and peer-reviewed publications described herein are hereby incorporated by reference in their entirety. Furthermore, where a definition or use of a term in a reference, which is incorporated by reference herein is inconsistent or contrary to the definition of that term provided herein, the definition of that term provided herein applies and the definition of that term in the reference does not apply. Each of the narrower species and subgeneric groupings falling within the generic disclosure also forms part of the invention. This includes the generic description of the invention with a proviso or negative limitation removing any subject matter from the genus, regardless of whether or not the excised material is specifically recited herein. In addition, where features are described in terms of Markush groups, those skilled in the art will recognize that the disclosure is also thereby described in terms of any individual member or subgroup of members of the Markush group. Further embodiments will become apparent from the following claims.

Equivalents: Those skilled in the art will recognize, or be able to ascertain using no more than routine experimentation, many equivalents to the specific embodiments of the invention described herein. Such equivalents are intended to be encompassed by the following claims. All publications, patents and patent applications mentioned in this specification are herein incorporated by reference into the specification to the same extent as if each individual publication, patent or patent application was specifically and individually indicated to be incorporated herein by reference.

VI. NON-PATENT REFERENCES

1. CHENG, W., TSENG, C. J., LIN, T. T., CHENG, I., PAN, H. W., HSU, H. C. & LEE, Y. M. 2008. Glypican-3-mediated oncogenesis involves the Insulin-like growth factor-signaling pathway. *Carcinogenesis,* 29, 1319-26.
2. SONG, H. H., SHI, W., XIANG, Y. Y. & FILMUS, J. 2005. The loss of glypican-3 induces alterations in Wnt signaling. *J Biol Chem,* 280, 2116-25.
3. SONG, H. H., SHI, W. & FILMUS, J. 1997. OCI-5/rat glypican-3 binds to fibroblast growth factor-2 but not to insulin-like growth factor-2. *J Biol Chem,* 272, 7574-7.
4. PILIA, G., HUGHES-BENZIE, R. M., MACKENZIE, A., BAYBAYAN, P., CHEN, E. Y., HUBER, R., NERI, G., CAO, A., FORABOSCO, A. & SCHLESSINGER, D. 1996. Mutations in GPC3, a glypican gene, cause the Simpson-Golabi-Behmel overgrowth syndrome. *Nat Genet,* 12, 241-7.
5. AYDIN, O., YILDIZ, L., BARIS, S., DUNDAR, C. & KARAGOZ, F. 2015. Expression of Glypican 3 in low and high grade urothelial carcinomas. *Diagn Pathol,* 10, 34.
6. USHIKU, T., UOZAKI, H., SHINOZAKI, A., OTA, S., MATSUZAKA, K., NOMURA, S., KAMINISHI, M., ABURATANI, H., KODAMA, T. & FUKAYAMA, M. 2009. Glypican 3-expressing gastric carcinoma: distinct subgroup unifying hepatoid, clear-cell, and alpha-fetoprotein-producing gastric carcinomas. *Cancer Sci,* 100, 626-32.
7. GAILEY, M. P. & BELLIZZI, A. M. 2013. Immunohistochemistry for the novel markers glypican 3, PAX8, and p40 (DeltaNp63) in squamous cell and urothelial carcinoma. *Am J Clin Pathol,* 140, 872-80.
8. YAMANAKA, K., ITO, Y., OKUYAMA, N., NODA, K., MATSUMOTO, H., YOSHIDA, H., MIYAUCHI, A., CAPURRO, M., FILMUS, J. & MIYOSHI, E. 2007. Immunohistochemical study of glypican 3 in thyroid cancer. *Oncology,* 73, 389-94.
9. NAKATSURA, T., KAGESHITA, T., ITO, S., WAKAMATSU, K., MONJI, M., IKUTA, Y., SENJU, S., ONO, T. & NISHIMURA, Y. 2004. Identification of glypican-3 as a novel tumor marker for melanoma. *Clin Cancer Res,* 10, 6612-21.
10. ZYNGER, D. L., DIMOV, N. D., LUAN, C., TEH, B. T. & YANG, X. J. 2006. Glypican 3: a novel marker in testicular germ cell tumors. *Am J Surg Pathol,* 30, 1570-5.
11. MONTALBANO, M., RASTELLINI, C., WANG, X., CORSELLO, T., ELTORKY, M. A., VENTO, R. & CICALESE, L. 2016. Transformation of primary human hepatocytes in hepatocellular carcinoma. *Int J Oncol,* 48, 1205-17.
12. MIDORIKAWA, Y., ISHIKAWA, S., IWANARI, H., IMAMURA, T., SAKAMOTO, H., MIYAZONO, K., KODAMA, T., MAKUUCHI, M. & ABURATANI, H. 2003. Glypican-3, overexpressed in hepatocellular carcinoma, modulates FGF2 and BMP-7 signaling. *Int J Cancer,* 103, 455-65.
13. CAPURRO, M., WANLESS, I. R., SHERMAN, M., DEBOER, G., SHI, W., MIYOSHI, E. & FILMUS, J. 2003. Glypican-3: a novel serum and histochemical marker for hepatocellular carcinoma. *Gastroenterology,* 125, 89-97.
14. NAKATSURA, T., YOSHITAKE, Y., SENJU, S., MONJI, M., KOMORI, H., MOTOMURA, Y., HOSAKA, S., BEPPU, T., ISHIKO, T., KAMOHARA, H., ASHIHARA, H., KATAGIRI, T., FURUKAWA, Y., FUJIYAMA, S., OGAWA, M., NAKAMURA, Y. & NISHIMURA, Y. 2003. Glypican-3, overexpressed specifically in human hepatocellular carcinoma, is a novel tumor marker. *Biochem Biophys Res Commun,* 306, 16-25.
15. SUNG, Y. K., HWANG, S. Y., PARK, M. K., FAROOQ, M., HAN, I. S., BAE, H. I., KIM, J. C. & KIM, M. 2003. Glypican-3 is overexpressed in human hepatocellular carcinoma. *Cancer Sci,* 94, 259-62.
16. ZHU, Z. W., FRIESS, H., WANG, L., ABOU-SHADY, M., ZIMMERMANN, A., LANDER, A. D., KORC, M., KLEEFF, J. & BUCHLER, M. W. 2001. Enhanced glypican-3 expression differentiates the majority of hepatocellular carcinomas from benign hepatic disorders. *Gut,* 48, 558-64.
17. JELIC, S., SOTIROPOULOS, G. C. & GROUP, E. G. W. 2010. Hepatocellular carcinoma: ESMO Clinical Practice Guidelines for diagnosis, treatment and follow-up. *Ann Oncol,* 21 Suppl 5, v59-64.
18. FENG, M. & HO, M. 2014. Glypican-3 antibodies: a new therapeutic target for liver cancer. *FEBS Lett,* 588, 377-82.
19. TAKAI, H., KATO, A., KINOSHITA, Y., ISHIGURO, T., TAKAI, Y., OHTANI, Y., SUGIMOTO, M. & SUZUKI, M. 2009. Histopathological analyses of the antitumor activity of anti-glypican-3 antibody (GC33) in human liver cancer xenograft models: The contribution of macrophages. *Cancer Biol Ther,* 8, 930-8.
20. NAKANO, K., ORITA, T., NEZU, J., YOSHINO, T., OHIZUMI, I., SUGIMOTO, M., FURUGAKI, K., KINOSHITA, Y., ISHIGURO, T., HAMAKUBO, T., KODAMA, T., ABURATANI, H., YAMADA-OKABE, H. & TSUCHIYA, M. 2009. Anti-glypican 3 antibodies cause ADCC against human hepatocellular carcinoma cells. *Biochem Biophys Res Commun,* 378, 279-84.
21. ISHIGURO, T., SUGIMOTO, M., KINOSHITA, Y., MIYAZAKI, Y., NAKANO, K., TSUNODA, H., SUGO, I., OHIZUMI, I., ABURATANI, H., HAMAKUBO, T., KODAMA, T., TSUCHIYA, M. & YAMADA-OKABE, H. 2008. Anti-glypican 3 antibody as a potential antitumor agent for human liver cancer. *Cancer Res,* 68, 9832-8.
22. LI, S. Y. & LIU, Y. 2013. Immunotherapy of melanoma with the immune costimulatory monoclonal antibodies targeting CD137. *Clin Pharmacol,* 5, 47-53.
23. SNELL, L. M., LIN, G. H., MCPHERSON, A. J., MORAES, T. J. & WATTS, T. H. 2011. T-cell intrinsic effects of GITR and 4-1BB during viral infection and cancer immunotherapy. *Immunol Rev,* 244, 197-217.
24. WYZGOL, A., MULLER, N., FICK, A., MUNKEL, S., GRIGOLEIT, G. U., PFIZENMAIER, K. & WAJANT, H. 2009. Trimer stabilization, oligomerization, and antibody-mediated cell surface immobilization improve the activity of soluble trimers of CD27L, CD40L, 41BBL, and glucocorticoid-induced TNF receptor ligand. *J Immunol,* 183, 1851-61.
25. YAO, S., ZHU, Y. & CHEN, L. 2013. Advances in targeting cell surface signalling molecules for immune modulation. *Nat Rev Drug Discov,* 12, 130-46.
26. MELERO, I., BACH, N., HELLSTROM, K. E., ARUFFO, A., MITTLER, R. S. & CHEN, L. 1998. Amplification of tumor immunity by gene transfer of the co-stimulatory 4-1BB ligand: synergy with the CD28 co-stimulatory pathway. *Eur J Immunol,* 28, 1116-21.
27. YANG, Y., YANG, S., YE, Z., JAFFAR, J., ZHOU, Y., CUTTER, E., LIEBER, A., HELLSTROM, I. & HELL- 27. STROM, K. E. 2007. Tumor cells expressing anti-CD137 scFv induce a tumor-destructive environment. *Cancer Res,* 67, 2339-44.
28. ZHANG, H., KNUTSON, K. L., HELLSTROM, K. E., DISIS, M. L. & HELLSTROM, I. 2006. Antitumor efficacy of CD137 ligation is maximized by the use of a CD137 single-chain Fv-expressing whole-cell tumor vaccine compared with CD137-specific monoclonal antibody infusion. *Mol Cancer Ther,* 5, 149-55.
29. YE, Z., HELLSTROM, I., HAYDEN-LEDBETTER, M., DAHLIN, A., LEDBETTER, J. A. & HELLSTROM, K. E. 2002. Gene therapy for cancer using single-chain Fv fragments specific for 4-1BB. *Nat Med,* 8, 343-8.
30. MARTINET, O., DIVINO, C. M., ZANG, Y., GAN, Y., MANDELI, J., THUNG, S., PAN, P. Y. & CHEN, S. H. 2002. T cell activation with systemic agonistic antibody versus local 4-1BB ligand gene delivery combined with interleukin-12 eradicate liver metastases of breast cancer. *Gene Ther,* 9, 786-92.
31. YE, Q., SONG, D. G., POUSSIN, M., YAMAMOTO, T., BEST, A., LI, C., COUKOS, G. & POWELL, D. J., J R. 2014. CD137 accurately identifies and enriches for naturally occurring tumor-reactive T cells in tumor. *Clin Cancer Res,* 20, 44-55.
32. CHACON, J. A., WU, R. C., SUKHUMALCHANDRA, P., MOLLDREM, J. J., SARNAIK, A., PILON-THOMAS, S., WEBER, J., HWU, P. & RADVANYI, L. 2013. Co-stimulation through 4-1BB/CD137 improves the expansion and function of CD8(+) melanoma tumor-infiltrating lymphocytes for adoptive T-cell therapy. *PLoS One,* 8, e60031.
33. FISHER, T. S., KAMPERSCHROER, C., OLIPHANT, T., LOVE, V. A., LIRA, P. D., DOYONNAS, R., BERGQVIST, S., BAXI, S. M., ROHNER, A., SHEN, A. C., HUANG, C., SOKOLOWSKI, S. A. & SHARP, L. L. 2012. Targeting of 4-1BB by monoclonal antibody PF-05082566 enhances T-cell function and promotes antitumor activity. Cancer *Immunol Immunother,* 61, 1721-33.
34. SKERRA, A. 2000. Lipocalins as a scaffold. *Biochim BiophysActa,* 1482, 337-50.
35. FLOWER, D. R., NORTH, A. C. & SANSOM, C. E. 2000. The lipocalin protein family: structural and sequence overview. *Biochim Biophys Acta,* 1482, 9-24.
36. FLOWER, D. R. 1996. The lipocalin protein family: structure and function. *Biochem J,* 318 (Pt 1), 1-14.
37. ALTSCHUL, S. F., MADDEN, T. L., SCHAFFER, A. A., ZHANG, J., ZHANG, Z., MILLER, W. & LIPMAN, D. J. 1997. Gapped BLAST and PSI-BLAST: a new generation of protein database search programs. *Nucleic Acids Res,* 25, 3389-402.
38. ALTSCHUL, S. F., GISH, W., MILLER, W., MYERS, E. W. & LIPMAN, D. J. 1990. Basic local alignment search tool. *J Mol Biol,* 215, 403-10.
39. SMITH, T. F. & WATERMAN, M. S. 1981. Identification of common molecular subsequences. *J Mol Biol,* 147, 195-7.
40. WARD, E. S., GUSSOW, D., GRIFFITHS, A. D., JONES, P. T. & WINTER, G. 1989. Binding activities of a repertoire of single immunoglobulin variable domains secreted from *Escherichia coli. Nature,* 341, 544-6.
41. HOLLIGER, P., PROSPERO, T. & WINTER, G. 1993. "Diabodies": small bivalent and bispecific antibody fragments. *Proc Natl Acad Sci USA,* 90, 6444-8.
42. JOHNSON, G. & WU, T. T. 2000. Kabat database and its applications: 30 years after the first variability plot. *Nucleic Acids Res,* 28, 214-8.
43. EHRENMANN, F., KAAS, Q. & LEFRANC, M. P. 2010. IMGT/3Dstructure-DB and IMGT/DomainGapAlign: a database and a tool for immunoglobulins or antibodies, T cell receptors, MHC, IgSF and MhcSF. *Nucleic Acids Res,* 38, D301-7.
44. BULLIARD, Y., JOLICOEUR, R., ZHANG, J., DRANOFF, G., WILSON, N. S. & BROGDON, J. L. 2014. OX40 engagement depletes intratumoral Tregs via activating FcgammaRs, leading to antitumor efficacy. *Immunol Cell Biol,* 92, 475-80.
45. BULLIARD, Y., JOLICOEUR, R., WINDMAN, M., RUE, S. M., ETTENBERG, S., KNEE, D. A., WILSON, N. S., DRANOFF, G. & BROGDON, J. L. 2013. Activating Fc gamma receptors contribute to the antitumor activities of immunoregulatory receptor-targeting antibodies. *J Exp Med,* 210, 1685-93.
46. SPIESS, C., ZHAI, Q. & CARTER, P. J. 2015. Alternative molecular formats and therapeutic applications for bispecific antibodies. *Mol Immunol,* 67, 95-106.
47. SEDYKH, S. E., PRINZ, V. V., BUNEVA, V. N. & NEVINSKY, G. A. 2018. Bispecific antibodies: design, therapy, perspectives. *Drug Des Devel Ther,* 12, 195-208.
48. ALAVIJEH, M. S. & PALMER, A. M. 2004. The pivotal role of drug metabolism and pharmacokinetics in the discovery and development of new medicines. *IDrugs,* 7, 755-63.
49. RYMAN, J. T. & MEIBOHM, B. 2017. Pharmacokinetics of Monoclonal Antibodies. *CPT Pharmacometrics Syst Pharmacol,* 6, 576-588.
50. SILVA, J. P., VETTERLEIN, O., JOSE, J., PETERS, S. & KIRBY, H. 2015. The S228P mutation prevents in vivo and in vitro IgG4 Fab-arm exchange as demonstrated using a combination of novel quantitative immunoassays and physiological matrix preparation. *J Biol Chem,* 290, 5462-9.
51. GLAESNER, W., VICK, A. M., MILLICAN, R., ELLIS, B., TSCHANG, S. H., TIAN, Y., BOKVIST, K., BRENNER, M., KOESTER, A., PORKSEN, N., ETGEN, G. & BUMOL, T. 2010. Engineering and characterization of the long-acting glucagon-like peptide-1 analogue LY2189265, an Fc fusion protein. *Diabetes Metab Res Rev,* 26, 287-96.
52. DALL'ACQUA, W. F., KIENER, P. A. & WU, H. 2006. Properties of human IgG1s engineered for enhanced binding to the neonatal Fc receptor (FcRn). *J Biol Chem,* 281, 23514-24.
53. ZALEVSKY, J., CHAMBERLAIN, A. K., HORTON, H. M., KARKI, S., LEUNG, I. W., SPROULE, T. J., LAZAR, G. A., ROOPENIAN, D. C. & DESJARLAIS, J. R. 2010. Enhanced antibody half-life improves in vivo activity. *Nat Biotechnol,* 28, 157-9.
54. SHIELDS, R. L., NAMENUK, A. K., HONG, K., MENG, Y. G., RAE, J., BRIGGS, J., XIE, D., LAI, J., STADLEN, A., LI, B., FOX, J. A. & PRESTA, L. G. 2001. High resolution mapping of the binding site on human IgG1 for Fc gamma RI, Fc gamma RII, Fc gamma RIII, and FcRn and design of IgG1 variants with improved binding to the Fc gamma R. *J Biol Chem,* 276, 6591-604.
55. ALTSHULER, E. P., SEREBRYANAYA, D. V. & KATRUKHA, A. G. 2010. Generation of recombinant antibodies and means for increasing their affinity. *Biochemistry (Mosc),* 75, 1584-605.
56. HARLOW, E. & LANE, D. 1999. *Using antibodies: a laboratory manual,* Cold Spring Harbor, N.Y., Cold Spring Harbor Laboratory Press.

57. HARLOW, E. & LANE, D. 1988. *Antibodies: a laboratory manual*, Cold Spring Harbor, NY, Cold Spring Harbor Laboratory.
58. LI, J., SAI, T., BERGER, M., CHAO, Q., DAVIDSON, D., DESHMUKH, G., DROZDOWSKI, B., EBEL, W., HARLEY, S., HENRY, M., JACOB, S., KLINE, B., LAZO, E., ROTELLA, F., ROUTHIER, E., RUDOLPH, K., SAGE, J., SIMON, P., YAO, J., ZHOU, Y., KAVURU, M., BONFIELD, T., THOMASSEN, M. J., SASS, P. M., NICOLAIDES, N. C. & GRASSO, L. 2006. Human antibodies for immunotherapy development generated via a human B cell hybridoma technology. *Proc Natl Acad Sci USA*, 103, 3557-62.
59. KOZBOR, D. & RODER, J. C. 1983. The production of monoclonal antibodies from human lymphocytes. *Immunol Today*, 4, 72-9.
60. COLE, S. P., CAMPLING, B. G., LOUWMAN, I. H., KOZBOR, D. & RODER, J. C. 1984. A strategy for the production of human monoclonal antibodies reactive with lung tumor cell lines. *Cancer Res*, 44, 2750-3.
61. HOLLIGER, P. & HUDSON, P. J. 2005. Engineered antibody fragments and the rise of single domains. *Nat Biotechnol*, 23, 1126-36.
62. PERVAIZ, S. & BREW, K. 1987. Homology and structure-function correlations between alpha 1-acid glycoprotein and serum retinol-binding protein and its relatives. *FASEBJ*, 1, 209-14.
63. SAMBROOK, J. & RUSSELL, D. W. 2001. *Molecular cloning: a laboratory manual*, Cold Spring Harbor, N.Y., Cold Spring Harbor Laboratory Press.
64. FLOWER, D. R. 2000. Beyond the superfamily: the lipocalin receptors. *Biochim BiophysActa*, 1482, 327-36.
65. BREUSTEDT, D. A., KORNDORFER, I. P., REDL, B. & SKERRA, A. 2005. The 1.8-A crystal structure of human tear lipocalin reveals an extended branched cavity with capacity for multiple ligands. *J Biol Chem*, 280, 484-93.
66. SCHMIDT, T. G., KOEPKE, J., FRANK, R. & SKERRA, A. 1996. Molecular interaction between the Strep-tag affinity peptide and its cognate target, streptavidin. *J Mol Biol*, 255, 753-66.
67. VAJO, Z. & DUCKWORTH, W. C. 2000. Genetically engineered insulin analogs: diabetes in the new millenium. *Pharmacol Rev*, 52, 1-9.
68. FUERTGES, F. & ABUCHOWSKI, A. 1990. The clinical efficacy of poly(ethylene glycol)-modified proteins. *Journal of Controlled Release*, 11, 139-148.
69. DENNIS, M. S., ZHANG, M., MENG, Y. G., KADKHODAYAN, M., KIRCHHOFER, D., COMBS, D. & DAMICO, L. A. 2002. Albumin binding as a general strategy for improving the pharmacokinetics of proteins. *J Biol Chem*, 277, 35035-43.
70. KONIG, T. & SKERRA, A. 1998. Use of an albumin-binding domain for the selective immobilisation of recombinant capture antibody fragments on ELISA plates. *J Immunol Methods*, 218, 73-83.
71. OSBORN, B. L., OLSEN, H. S., NARDELLI, B., MURRAY, J. H., ZHOU, J. X., GARCIA, A., MOODY, G., ZARITSKAYA, L. S. & SUNG, C. 2002. Pharmacokinetic and pharmacodynamic studies of a human serum albumin-interferon-alpha fusion protein in cynomolgus monkeys. *J Pharmacol Exp Ther*, 303, 540-8.
72. LOWMAN, H. B. 1997. Bacteriophage display and discovery of peptide leads for drug development. *Annu Rev Biophys Biomol Struct*, 26, 401-24.
73. RODI, D. J. & MAKOWSKI, L. 1999. Phage-display technology—finding a needle in a vast molecular haystack. *Curr Opin Biotechnol*, 10, 87-93.
74. VENTURI, M., SEIFERT, C. & HUNTE, C. 2002. High level production of functional antibody Fab fragments in an oxidizing bacterial cytoplasm. *J Mol Biol*, 315, 1-8.
75. BRUCKDORFER, T., MARDER, O. & ALBERICIO, F. 2004. From production of peptides in milligram amounts for research to multi-tons quantities for drugs of the future. *Curr Pharm Biotechnol*, 5, 29-43.
76. FRESE, K., EISENMANN, M., OSTENDORP, R., BROCKS, B. & PABST, S. 2013. An automated immunoassay for early specificity profiling of antibodies. *MAbs*, 5, 279-87.

The invention claimed is:

1. A fusion protein that is capable of binding both CD137 and GPC3, wherein the fusion protein comprises at least two subunits, wherein a first subunit comprises a full-length immunoglobulin and is specific for GPC3, and wherein a second subunit comprises a lipocalin mutein and is specific for CD137, wherein the second subunit is linked at the N-terminus to the C-terminus of the first subunit via a peptide linker, and wherein the fusion protein comprises the amino acid sequences of SEQ ID NOs: 87 and 82.

2. The fusion protein of claim 1,
(a) wherein the fusion protein is capable of binding GPC3 with a KD value of at most about 1 nM or comparable to or lower than the KD value of the immunoglobulin or an antigen-binding domain thereof that is included in the first subunit alone;
(b) wherein the fusion protein is capable of binding CD137 with an $EC_{50}$ value of at most about 3 nM or comparable to or lower than the $EC_{50}$ value of the lipocalin mutein specific for CD137 that is included in the second subunit alone;
(c) wherein the fusion protein is cross-reactive with cynomolgus GPC3;
(d) wherein the fusion protein is capable of simultaneously binding CD137 and GPC3 with an EC so value of at most about 10 nM, when said fusion protein is measured in an ELISA assay;
(e) wherein the fusion protein is capable of binding GPC3 expressing tumor cells;
(f) wherein the fusion protein is capable of inducing increased secretion of IL-2;
(g) wherein the fusion protein is capable of inducing increased IL-2 secretion to a higher level than SEQ ID NO: 83 and/or with a better efficiency as compared to SEQ ID NO: 83;
(h) wherein the fusion protein is capable of inducing lymphocyte-mediated cytotoxicity;
(i) wherein the fusion protein is capable of inducing enhanced killing of GPC3 expressing tumor cells mediated by T cells than SEQ ID NO: 83 and/or inducing cytotoxic T cell-activation with a better efficacy as compared to SEQ ID NO: 83;
(j) wherein the fusion protein is capable of co-stimulating T-cell responses in a GPC3-dependent manner; or
(k) wherein the fusion protein is capable of co-stimulating T-cell responses in a tumor microenvironment.

3. The fusion protein of claim 1, wherein the fusion protein has a half-life in mice of at least 50 hours, at least 75 hours, at least 100 hours, at least 125 hours, at least 150 hours, at least 175 hours, at least 200 hours, at least 250 hours, or even longer, and/or wherein the fusion protein has a half-life in mice that is longer than that of SEQ ID NO: 83.

4. The fusion protein of claim 1, wherein the fusion protein has an isoelectric point of at least 6.5, at least 6.8, at least 7.1, at least 7.4, at least 7.5, at least 7.7, or even higher, and/or wherein the fusion protein has an isoelectric point higher than that of SEQ ID NO: 83.

5. A nucleic acid molecule comprising a nucleotide sequence encoding the fusion protein of claim 1.

6. A pharmaceutical composition comprising one or more fusion proteins of claim 1.

* * * * *

SEQUENCE LISTING

```
<160> NUMBER OF SEQ ID NOS: 129

<210> SEQ ID NO 1
<211> LENGTH: 158
<212> TYPE: PRT
<213> ORGANISM: human

<400> SEQUENCE: 1

His His Leu Leu Ala Ser Asp Glu Glu Ile Gln Asp Val Ser Gly Thr
1               5                   10                  15

Trp Tyr Leu Lys Ala Met Thr Val Asp Arg Glu Phe Pro Glu Met Asn
            20                  25                  30

Leu Glu Ser Val Thr Pro Met Thr Leu Thr Thr Leu Glu Gly Gly Asn
        35                  40                  45

Leu Glu Ala Lys Val Thr Met Leu Ile Ser Gly Arg Cys Gln Glu Val
    50                  55                  60

Lys Ala Val Leu Glu Lys Thr Asp Glu Pro Gly Lys Tyr Thr Ala Asp
65                  70                  75                  80

Gly Gly Lys His Val Ala Tyr Ile Ile Arg Ser His Val Lys Asp His
                85                  90                  95

Tyr Ile Phe Tyr Cys Glu Gly Glu Leu His Gly Lys Pro Val Arg Gly
```

```
                100             105              110
Val Lys Leu Val Gly Arg Asp Pro Lys Asn Asn Leu Glu Ala Leu Glu
            115                 120                 125

Asp Phe Glu Lys Ala Ala Gly Ala Arg Gly Leu Ser Thr Glu Ser Ile
            130                 135                 140

Leu Ile Pro Arg Gln Ser Glu Thr Cys Ser Pro Gly Ser Asp
145                 150                 155

<210> SEQ ID NO 2
<211> LENGTH: 178
<212> TYPE: PRT
<213> ORGANISM: human

<400> SEQUENCE: 2

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
            20                  25                  30

Val Val Gly Leu Ala Gly Asn Ala Ile Leu Arg Glu Asp Lys Asp Pro
        35                  40                  45

Gln Lys Met Tyr Ala Thr Ile Tyr Glu Leu Lys Glu Asp Lys Ser Tyr
50                  55                  60

Asn Val Thr Ser Val Leu Phe Arg Lys Lys Lys Cys Asp Tyr Trp Ile
65                  70                  75                  80

Arg Thr Phe Val Pro Gly Cys Gln Pro Gly Glu Phe Thr Leu Gly Asn
                85                  90                  95

Ile Lys Ser Tyr Pro Gly Leu Thr Ser Tyr Leu Val Arg Val Val Ser
            100                 105                 110

Thr Asn Tyr Asn Gln His Ala Met Val Phe Phe Lys Lys Val Ser Gln
            115                 120                 125

Asn Arg Glu Tyr Phe Lys Ile Thr Leu Tyr Gly Arg Thr Lys Glu Leu
        130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 3
<211> LENGTH: 178
<212> TYPE: PRT
<213> ORGANISM: Artificial Sequence
<220> FEATURE:
<223> OTHER INFORMATION: lipocalin mutein

<400> SEQUENCE: 3

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe His Gly Lys Trp Tyr
            20                  25                  30

Val Val Gly Leu Ala Gly Asn Ala Ile Leu Arg Glu Asp Lys Asp Pro
        35                  40                  45

Gln Lys Met Tyr Ala Thr Ile Tyr Glu Leu Lys Glu Asp Lys Ser Tyr
50                  55                  60

Asn Val Thr Ser Val Leu Phe Arg Lys Lys Lys Cys Asp Tyr Trp Ile
65                  70                  75                  80
```

```
Arg Thr Phe Val Pro Gly Ser Gln Pro Gly Glu Phe Thr Leu Gly Asn
                85                  90                  95
Ile Lys Ser Tyr Pro Gly Leu Thr Ser Tyr Leu Val Arg Val Val Ser
                100                 105                 110
Thr Asn Tyr Asn Gln His Ala Met Val Phe Phe Lys Lys Val Ser Gln
                115                 120                 125
Asn Arg Glu Tyr Phe Lys Ile Thr Leu Tyr Gly Arg Thr Lys Glu Leu
                130                 135                 140
Thr Ser Glu Leu Lys Glu Asn Phe Ile Arg Phe Ser Lys Ser Leu Gly
145                 150                 155                 160
Leu Pro Glu Asn His Ile Val Phe Pro Val Pro Ile Asp Gln Cys Ile
                165                 170                 175
Asp Gly

<210> SEQ ID NO 4
<211> LENGTH: 152
<212> TYPE: PRT
<213> ORGANISM: Artificial Sequence
<220> FEATURE:
<223> OTHER INFORMATION: lipocalin mutein

<400> SEQUENCE: 4

Ala Ser Asp Glu Glu Ile Gln Asp Val Ser Gly Thr Trp Tyr Leu Lys
1               5                   10                  15
Ala Met Thr Val Asp Arg Glu Cys Pro Glu Met Asn Leu Glu Ser Val
                20                  25                  30
Thr Pro Met Thr Leu Thr Thr Leu Glu Gly Gly Asn Leu Glu Ala Lys
                35                  40                  45
Val Thr Met Leu Ile Ser Gly Arg Ser Gln Glu Val Lys Ala Val Leu
                50                  55                  60
Glu Lys Thr Asp Glu Pro Gly Lys Tyr Thr Ala Asp Gly Gly Lys His
65                  70                  75                  80
Val Ala Tyr Ile Ile Arg Ser His Val Lys Asp His Tyr Ile Phe Tyr
                85                  90                  95
Ser Glu Gly Glu Cys His Gly Lys Pro Val Pro Gly Val Trp Leu Val
                100                 105                 110
Gly Arg Asp Pro Lys Asn Asn Leu Glu Ala Leu Glu Asp Phe Glu Lys
                115                 120                 125
Ala Ala Gly Ala Arg Gly Leu Ser Thr Glu Ser Ile Leu Ile Pro Arg
                130                 135                 140
Gln Ser Glu Thr Ser Ser Pro Gly
145                 150

<210> SEQ ID NO 5
<211> LENGTH: 4
<212> TYPE: PRT
<213> ORGANISM: human

<400> SEQUENCE: 5

His His Leu Leu
1

<210> SEQ ID NO 6
<211> LENGTH: 535
<212> TYPE: PRT
<213> ORGANISM: human

<400> SEQUENCE: 6
```

```
Gln Pro Pro Pro Pro Pro Asp Ala Thr Cys His Gln Val Arg Ser
 1               5                  10                  15

Phe Phe Gln Arg Leu Gln Pro Gly Leu Lys Trp Val Pro Glu Thr Pro
            20                  25                  30

Val Pro Gly Ser Asp Leu Gln Val Cys Leu Pro Lys Gly Pro Thr Cys
            35                  40                  45

Cys Ser Arg Lys Met Glu Glu Lys Tyr Gln Leu Thr Ala Arg Leu Asn
        50                  55                  60

Met Glu Gln Leu Leu Gln Ser Ala Ser Met Glu Leu Lys Phe Leu Ile
 65                  70                  75                  80

Ile Gln Asn Ala Ala Val Phe Gln Glu Ala Phe Glu Ile Val Val Arg
                85                  90                  95

His Ala Lys Asn Tyr Thr Asn Ala Met Phe Lys Asn Asn Tyr Pro Ser
            100                 105                 110

Leu Thr Pro Gln Ala Phe Glu Phe Val Gly Glu Phe Phe Thr Asp Val
            115                 120                 125

Ser Leu Tyr Ile Leu Gly Ser Asp Ile Asn Val Asp Asp Met Val Asn
            130                 135                 140

Glu Leu Phe Asp Ser Leu Phe Pro Val Ile Tyr Thr Gln Leu Met Asn
145                 150                 155                 160

Pro Gly Leu Pro Asp Ser Ala Leu Asp Ile Asn Glu Cys Leu Arg Gly
                165                 170                 175

Ala Arg Arg Asp Leu Lys Val Phe Gly Asn Phe Pro Lys Leu Ile Met
            180                 185                 190

Thr Gln Val Ser Lys Ser Leu Gln Val Thr Arg Ile Phe Leu Gln Ala
            195                 200                 205

Leu Asn Leu Gly Ile Glu Val Ile Asn Thr Thr Asp His Leu Lys Phe
            210                 215                 220

Ser Lys Asp Cys Gly Arg Met Leu Thr Arg Met Trp Tyr Cys Ser Tyr
225                 230                 235                 240

Cys Gln Gly Leu Met Met Val Lys Pro Cys Gly Gly Tyr Cys Asn Val
                245                 250                 255

Val Met Gln Gly Cys Met Ala Gly Val Val Glu Ile Asp Lys Tyr Trp
            260                 265                 270

Arg Glu Tyr Ile Leu Ser Leu Glu Glu Leu Val Asn Gly Met Tyr Arg
            275                 280                 285

Ile Tyr Asp Met Glu Asn Val Leu Leu Gly Leu Phe Ser Thr Ile His
            290                 295                 300

Asp Ser Ile Gln Tyr Val Gln Lys Asn Ala Gly Lys Leu Thr Thr Thr
305                 310                 315                 320

Ile Gly Lys Leu Cys Ala His Ser Gln Gln Arg Gln Tyr Arg Ser Ala
            325                 330                 335

Tyr Tyr Pro Glu Asp Leu Phe Ile Asp Lys Lys Val Leu Lys Val Ala
            340                 345                 350

His Val Glu His Glu Thr Leu Ser Ser Arg Arg Arg Glu Leu Ile
            355                 360                 365

Gln Lys Leu Lys Ser Phe Ile Ser Phe Tyr Ser Ala Leu Pro Gly Tyr
            370                 375                 380

Ile Cys Ser His Ser Pro Val Ala Glu Asn Asp Thr Leu Cys Trp Asn
385                 390                 395                 400

Gly Gln Glu Leu Val Glu Arg Tyr Ser Gln Lys Ala Ala Arg Asn Gly
                405                 410                 415

Met Lys Asn Gln Phe Asn Leu His Glu Leu Lys Met Lys Gly Pro Glu
```

```
                420             425             430
Pro Val Val Ser Gln Ile Ile Asp Lys Leu Lys His Ile Asn Gln Leu
                435             440             445
Leu Arg Thr Met Ser Met Pro Lys Gly Arg Val Leu Asp Lys Asn Leu
                450             455             460
Asp Glu Glu Gly Phe Glu Ser Gly Asp Cys Gly Asp Asp Glu Asp Glu
465             470             475             480
Cys Ile Gly Gly Ser Gly Asp Gly Met Ile Lys Val Lys Asn Gln Leu
                485             490             495
Arg Phe Leu Ala Glu Leu Ala Tyr Asp Leu Asp Val Asp Asp Ala Pro
                500             505             510
Gly Asn Ser Gln Gln Ala Thr Pro Lys Asp Asn Glu Ile Ser Thr Phe
                515             520             525
His Asn Leu Gly Asn Val His
                530             535
```

<210> SEQ ID NO 7
<211> LENGTH: 232
<212> TYPE: PRT
<213> ORGANISM: human

<400> SEQUENCE: 7

```
Leu Gln Asp Pro Cys Ser Asn Cys Pro Ala Gly Thr Phe Cys Asp Asn
1               5                   10                  15
Asn Arg Asn Gln Ile Cys Ser Pro Cys Pro Pro Asn Ser Phe Ser Ser
                20                  25                  30
Ala Gly Gly Gln Arg Thr Cys Asp Ile Cys Arg Gln Cys Lys Gly Val
                35                  40                  45
Phe Arg Thr Arg Lys Glu Cys Ser Ser Thr Ser Asn Ala Glu Cys Asp
50                  55                  60
Cys Thr Pro Gly Phe His Cys Leu Gly Ala Gly Cys Ser Met Cys Glu
65                  70                  75                  80
Gln Asp Cys Lys Gln Gly Gln Glu Leu Thr Lys Lys Gly Cys Lys Asp
                85                  90                  95
Cys Cys Phe Gly Thr Phe Asn Asp Gln Lys Arg Gly Ile Cys Arg Pro
                100                 105                 110
Trp Thr Asn Cys Ser Leu Asp Gly Lys Ser Val Leu Val Asn Gly Thr
                115                 120                 125
Lys Glu Arg Asp Val Val Cys Gly Pro Ser Pro Ala Asp Leu Ser Pro
130                 135                 140
Gly Ala Ser Ser Val Thr Pro Pro Ala Pro Ala Arg Glu Pro Gly His
145                 150                 155                 160
Ser Pro Gln Ile Ile Ser Phe Phe Leu Ala Leu Thr Ser Thr Ala Leu
                165                 170                 175
Leu Phe Leu Leu Phe Phe Leu Thr Leu Arg Phe Ser Val Val Lys Arg
                180                 185                 190
Gly Arg Lys Lys Leu Leu Tyr Ile Phe Lys Gln Pro Phe Met Arg Pro
                195                 200                 205
Val Gln Thr Thr Gln Glu Glu Asp Gly Cys Ser Cys Arg Phe Pro Glu
                210                 215                 220
Glu Glu Glu Gly Gly Cys Glu Leu
225                 230
```

<210> SEQ ID NO 8
<211> LENGTH: 535

```
<212> TYPE: PRT
<213> ORGANISM: Macaca fascicularis

<400> SEQUENCE: 8
```

| | | | | | | | | | | | | | | |
|---|---|---|---|---|---|---|---|---|---|---|---|---|---|---|
|Gln|Pro|Pro|Pro|Pro|Pro|Asp|Ala|Thr|Cys|His|Gln|Val|Arg|Ser|
|1| | | |5| | | | |10| | | | |15|

Phe Phe Gln Arg Leu Gln Pro Gly Leu Lys Trp Val Pro Glu Thr Pro
            20                  25                  30

Val Pro Gly Ser Asp Leu Gln Val Cys Leu Pro Lys Gly Pro Thr Cys
            35                  40                  45

Cys Ser Arg Lys Met Glu Glu Lys Tyr Gln Leu Thr Ala Arg Leu Asn
        50                  55                  60

Met Glu Gln Leu Leu Gln Ser Ala Ser Met Glu Leu Lys Phe Leu Ile
65                  70                  75                  80

Ile Gln Asn Ala Ala Val Phe Gln Glu Ala Phe Glu Ile Val Val Arg
                85                  90                  95

His Ala Lys Asn Tyr Thr Asn Ala Met Phe Lys Asn Asn Tyr Pro Ser
            100                 105                 110

Leu Thr Pro Gln Ala Phe Glu Phe Val Gly Glu Phe Phe Thr Asp Val
            115                 120                 125

Ser Leu Tyr Ile Leu Gly Ser Asp Ile Asn Val Asp Asp Met Val Asn
130                 135                 140

Glu Leu Phe Asp Ser Leu Phe Pro Val Ile Tyr Thr Gln Leu Met Asn
145                 150                 155                 160

Pro Gly Leu Pro Asp Ser Ala Leu Asp Ile Asn Glu Cys Leu Arg Gly
                165                 170                 175

Ala Arg Arg Asp Leu Lys Val Phe Gly Asn Phe Pro Lys Leu Ile Met
            180                 185                 190

Thr Gln Val Ser Lys Ser Leu Gln Val Thr Arg Ile Phe Leu Gln Ala
            195                 200                 205

Leu Asn Leu Gly Ile Glu Val Ile Asn Thr Thr Asp His Leu Lys Phe
210                 215                 220

Ser Lys Asp Cys Gly Arg Met Leu Thr Arg Met Trp Tyr Cys Ser Tyr
225                 230                 235                 240

Cys Gln Gly Leu Met Met Val Lys Pro Cys Gly Gly Tyr Cys Asn Val
                245                 250                 255

Val Met Gln Gly Cys Met Ala Gly Val Val Glu Ile Asp Lys Tyr Trp
            260                 265                 270

Arg Glu Tyr Ile Leu Ser Leu Glu Glu Leu Val Asn Gly Met Tyr Arg
            275                 280                 285

Ile Tyr Asp Met Glu Asn Val Leu Leu Gly Leu Phe Ser Thr Ile His
290                 295                 300

Asp Ser Ile Gln Tyr Val Gln Lys Asn Ala Gly Lys Leu Thr Thr Thr
305                 310                 315                 320

Ile Gly Lys Leu Cys Ala His Ser Gln Gln Arg Gln Tyr Arg Ser Ala
                325                 330                 335

Tyr Tyr Pro Glu Asp Leu Phe Ile Asp Lys Lys Val Leu Lys Val Ala
            340                 345                 350

His Val Glu His Glu Glu Thr Leu Ser Ser Arg Arg Arg Glu Leu Ile
            355                 360                 365

Gln Lys Leu Lys Ser Phe Ile Ser Phe Tyr Ser Ala Leu Pro Gly Tyr
            370                 375                 380

Ile Cys Ser His Ser Pro Val Ala Glu Asn Asp Thr Leu Cys Trp Asn
385                 390                 395                 400

```
Gly Gln Glu Leu Val Glu Arg Tyr Ser Gln Lys Ala Ala Arg Asn Gly
            405                 410                 415

Met Lys Asn Gln Phe Asn Leu His Glu Leu Lys Met Lys Gly Pro Glu
            420                 425                 430

Pro Val Val Ser Gln Ile Ile Asp Lys Leu Lys His Ile Asn Gln Leu
            435                 440                 445

Leu Arg Thr Met Ser Val Pro Lys Gly Arg Val Leu Asp Lys Asn Leu
            450                 455                 460

Asp Glu Glu Gly Phe Glu Ser Gly Asp Cys Gly Asp Asp Glu Asp Glu
465                 470                 475                 480

Cys Ile Gly Gly Ser Gly Asp Gly Met Met Lys Val Lys Asn Gln Leu
            485                 490                 495

Arg Phe Leu Ala Glu Leu Ala Tyr Asp Leu Asp Val Asp Val Asp Pro
            500                 505                 510

Gly Asn Asn Gln Gln Ala Thr Pro Lys Asp Asn Glu Ile Ser Thr Phe
            515                 520                 525

His Asn Leu Gly Asn Val His
            530                 535

<210> SEQ ID NO 9
<211> LENGTH: 231
<212> TYPE: PRT
<213> ORGANISM: Macaca fascicularis

<400> SEQUENCE: 9

Leu Gln Asp Leu Cys Ser Asn Cys Pro Ala Gly Thr Phe Cys Asp Asn
1               5                   10                  15

Asn Arg Ser Gln Ile Cys Ser Pro Cys Pro Pro Asn Ser Phe Ser Ser
            20                  25                  30

Ala Gly Gly Gln Arg Thr Cys Asp Ile Cys Arg Gln Cys Lys Gly Val
        35                  40                  45

Phe Lys Thr Arg Lys Glu Cys Ser Ser Thr Ser Asn Ala Glu Cys Asp
    50                  55                  60

Cys Ile Ser Gly Tyr His Cys Leu Gly Ala Glu Cys Ser Met Cys Glu
65                  70                  75                  80

Gln Asp Cys Lys Gln Gly Gln Glu Leu Thr Lys Lys Gly Cys Lys Asp
                85                  90                  95

Cys Cys Phe Gly Thr Phe Asn Asp Gln Lys Arg Gly Ile Cys Arg Pro
            100                 105                 110

Trp Thr Asn Cys Ser Leu Asp Gly Lys Ser Val Leu Val Asn Gly Thr
            115                 120                 125

Lys Glu Arg Asp Val Val Cys Gly Pro Ser Pro Ala Asp Leu Ser Pro
        130                 135                 140

Gly Ala Ser Ser Ala Thr Pro Pro Ala Pro Ala Arg Glu Pro Gly His
145                 150                 155                 160

Ser Pro Gln Ile Ile Phe Phe Leu Ala Leu Thr Ser Thr Val Val Leu
                165                 170                 175

Phe Leu Leu Phe Phe Leu Val Leu Arg Phe Ser Val Val Lys Arg Ser
            180                 185                 190

Arg Lys Lys Leu Leu Tyr Ile Phe Lys Gln Pro Phe Met Arg Pro Val
        195                 200                 205

Gln Thr Thr Gln Glu Glu Asp Gly Cys Ser Cys Arg Phe Pro Glu Glu
    210                 215                 220

Glu Glu Gly Gly Cys Glu Leu
```

```
                       225                 230

<210> SEQ ID NO 10
<211> LENGTH: 4
<212> TYPE: PRT
<213> ORGANISM: Artificial Sequence
<220> FEATURE:
<223> OTHER INFORMATION: cleavage site

<400> SEQUENCE: 10

Ile Glu Gly Arg
1

<210> SEQ ID NO 11
<211> LENGTH: 10
<212> TYPE: PRT
<213> ORGANISM: Artificial Sequence
<220> FEATURE:
<223> OTHER INFORMATION: fusion peptide

<400> SEQUENCE: 11

Ser Ala Trp Ser His Pro Gln Phe Glu Lys
1               5                   10

<210> SEQ ID NO 12
<211> LENGTH: 8
<212> TYPE: PRT
<213> ORGANISM: Artificial Sequence
<220> FEATURE:
<223> OTHER INFORMATION: strep tag II peptide

<400> SEQUENCE: 12

Trp Ser His Pro Gln Phe Glu Lys
1               5

<210> SEQ ID NO 13
<211> LENGTH: 15
<212> TYPE: PRT
<213> ORGANISM: Artificial Sequence
<220> FEATURE:
<223> OTHER INFORMATION: linker

<400> SEQUENCE: 13

Gly Gly Gly Gly Ser Gly Gly Gly Ser Gly Gly Gly Gly Ser
1               5                   10                  15

<210> SEQ ID NO 14
<211> LENGTH: 18
<212> TYPE: PRT
<213> ORGANISM: Artificial Sequence
<220> FEATURE:
<223> OTHER INFORMATION: linker

<400> SEQUENCE: 14

Pro Ser Thr Pro Pro Thr Asn Ser Ser Ser Thr Pro Pro Thr Pro Ser
1               5                   10                  15

Pro Ser

<210> SEQ ID NO 15
<211> LENGTH: 14
<212> TYPE: PRT
<213> ORGANISM: Artificial Sequence
<220> FEATURE:
<223> OTHER INFORMATION: linker

<400> SEQUENCE: 15
```

```
Gly Gly Ser Gly Asn Ser Ser Gly Ser Gly Ser Pro Val
1               5                   10
```

<210> SEQ ID NO 16
<211> LENGTH: 20
<212> TYPE: PRT
<213> ORGANISM: Artificial Sequence
<220> FEATURE:
<223> OTHER INFORMATION: linker

<400> SEQUENCE: 16

```
Ala Ser Pro Ala Ala Pro Ala Pro Ala Ser Pro Ala Ala Pro Ala Pro
1               5                   10                  15

Ser Ala Pro Ala
            20
```

<210> SEQ ID NO 17
<211> LENGTH: 66
<212> TYPE: PRT
<213> ORGANISM: Artificial Sequence
<220> FEATURE:
<223> OTHER INFORMATION: linker

<400> SEQUENCE: 17

```
Ala Gly Ser Gly Gly Ser Gly Gly Ser Gly Ser Pro Val Pro Ser
1               5                   10                  15

Thr Pro Pro Thr Pro Ser Pro Ser Thr Pro Pro Thr Pro Ser Pro Ser
            20                  25                  30

Gly Gly Ser Gly Asn Ser Ser Gly Ser Gly Ser Pro Val Pro Ser
        35                  40                  45

Thr Pro Pro Thr Pro Ser Pro Ser Thr Pro Pro Thr Pro Ser Pro Ser
        50                  55                  60

Ala Ser
65
```

<210> SEQ ID NO 18
<211> LENGTH: 32
<212> TYPE: PRT
<213> ORGANISM: Artificial Sequence
<220> FEATURE:
<223> OTHER INFORMATION: linker

<400> SEQUENCE: 18

```
Pro Ser Thr Pro Pro Thr Pro Ser Pro Ser Thr Pro Pro Thr Pro Ser
1               5                   10                  15

Pro Ser Gly Gly Ser Gly Asn Ser Ser Gly Ser Gly Ser Pro Val
                20                  25                  30
```

<210> SEQ ID NO 19
<211> LENGTH: 74
<212> TYPE: PRT
<213> ORGANISM: Artificial Sequence
<220> FEATURE:
<223> OTHER INFORMATION: linker

<400> SEQUENCE: 19

```
Ala Gly Ser Gly Gly Ser Gly Gly Ser Gly Ser Pro Val Pro Ser
1               5                   10                  15

Thr Pro Pro Thr Asn Ser Ser Ser Thr Pro Pro Thr Pro Ser Pro Ser
            20                  25                  30

Pro Val Pro Ser Thr Pro Pro Thr Asn Ser Ser Ser Thr Pro Pro Thr
            35                  40                  45
```

-continued

```
Pro Ser Pro Ser Pro Val Pro Ser Thr Pro Pro Thr Asn Ser Ser Ser
    50                  55                  60

Thr Pro Pro Thr Pro Ser Pro Ser Ala Ser
65                  70
```

<210> SEQ ID NO 20
<211> LENGTH: 40
<212> TYPE: PRT
<213> ORGANISM: Artificial Sequence
<220> FEATURE:
<223> OTHER INFORMATION: linker

<400> SEQUENCE: 20

```
Ala Ser Pro Ala Ala Pro Ala Pro Ala Ser Pro Ala Ala Pro Ala Pro
1               5                   10                  15

Ser Ala Pro Ala Ala Ser Pro Ala Ala Pro Ala Pro Ser Pro Ala
                20                  25                  30

Ala Pro Ala Pro Ser Ala Pro Ala
            35                  40
```

<210> SEQ ID NO 21
<211> LENGTH: 10
<212> TYPE: PRT
<213> ORGANISM: Artificial Sequence
<220> FEATURE:
<223> OTHER INFORMATION: linker

<400> SEQUENCE: 21

```
Val Asp Asp Ile Glu Gly Arg Met Asp Glu
1               5                   10
```

<210> SEQ ID NO 22
<211> LENGTH: 11
<212> TYPE: PRT
<213> ORGANISM: Artificial Sequence
<220> FEATURE:
<223> OTHER INFORMATION: linker

<400> SEQUENCE: 22

```
Glu Asn Leu Tyr Phe Gln Gly Arg Met Asp Glu
1               5                   10
```

<210> SEQ ID NO 23
<211> LENGTH: 10
<212> TYPE: PRT
<213> ORGANISM: Artificial Sequence
<220> FEATURE:
<223> OTHER INFORMATION: linker

<400> SEQUENCE: 23

```
Gly Gly Gly Gly Ser Gly Gly Gly Gly Ser
1               5                   10
```

<210> SEQ ID NO 24
<211> LENGTH: 327
<212> TYPE: PRT
<213> ORGANISM: Artificial Sequence
<220> FEATURE:
<223> OTHER INFORMATION: antibody heavy chain

<400> SEQUENCE: 24

```
Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
                20                  25                  30
```

```
Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Leu Gly Thr Lys Thr
 65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Ser Cys Pro Ala Pro
            100                 105                 110

Glu Phe Leu Gly Gly Pro Ser Val Phe Leu Phe Pro Pro Lys Pro Lys
            115                 120                 125

Asp Thr Leu Met Ile Ser Arg Thr Pro Glu Val Thr Cys Val Val Val
        130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
210                 215                 220

Glu Pro Gln Val Tyr Thr Leu Pro Pro Ser Gln Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 25
<211> LENGTH: 214
<212> TYPE: PRT
<213> ORGANISM: Artificial Sequence
<220> FEATURE:
<223> OTHER INFORMATION: antibody light chain

<400> SEQUENCE: 25

Glu Ile Val Leu Thr Gln Ser Pro Ala Thr Leu Ser Leu Ser Pro Gly
 1               5                  10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60
```

```
Ser Gly Ser Gly Thr Asp Phe Thr Leu Thr Ile Ser Ser Leu Glu Pro
 65                  70                  75                  80

Glu Asp Phe Ala Val Tyr Tyr Cys Gln Gln Ser Ser Asn Trp Pro Arg
                 85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 26
<211> LENGTH: 448
<212> TYPE: PRT
<213> ORGANISM: Artificial Sequence
<220> FEATURE:
<223> OTHER INFORMATION: antibody heavy chain

<400> SEQUENCE: 26

Gln Val Gln Leu Gln Gln Trp Gly Ala Gly Leu Leu Lys Pro Ser Glu
  1               5                  10                  15

Thr Leu Ser Leu Thr Cys Ala Val Tyr Gly Gly Ser Phe Ser Gly Tyr
                 20                  25                  30

Tyr Trp Ser Trp Ile Arg Gln Ser Pro Glu Lys Gly Leu Glu Trp Ile
             35                  40                  45

Gly Glu Ile Asn His Gly Gly Tyr Val Thr Tyr Asn Pro Ser Leu Glu
     50                  55                  60

Ser Arg Val Thr Ile Ser Val Asp Thr Ser Lys Asn Gln Phe Ser Leu
 65                  70                  75                  80

Lys Leu Ser Ser Val Thr Ala Ala Asp Thr Ala Val Tyr Tyr Cys Ala
                 85                  90                  95

Arg Asp Tyr Gly Pro Gly Asn Tyr Asp Trp Tyr Phe Asp Leu Trp Gly
            100                 105                 110

Arg Gly Thr Leu Val Thr Val Ser Ser Ala Ser Thr Lys Gly Pro Ser
        115                 120                 125

Val Phe Pro Leu Ala Pro Cys Ser Arg Ser Thr Ser Glu Ser Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Lys Thr Tyr Thr Cys Asn Val Asp His
        195                 200                 205
```

```
Lys Pro Ser Asn Thr Lys Val Asp Lys Arg Val Glu Ser Lys Tyr Gly
    210                 215                 220

Pro Pro Cys Pro Pro Cys Pro Ala Pro Glu Phe Leu Gly Gly Pro Ser
225                 230                 235                 240

Val Phe Leu Phe Pro Pro Lys Pro Lys Asp Thr Leu Met Ile Ser Arg
            245                 250                 255

Thr Pro Glu Val Thr Cys Val Val Val Asp Val Ser Gln Glu Asp Pro
        260                 265                 270

Glu Val Gln Phe Asn Trp Tyr Val Asp Gly Val Glu Val His Asn Ala
    275                 280                 285

Lys Thr Lys Pro Arg Glu Glu Gln Phe Asn Ser Thr Tyr Arg Val Val
290                 295                 300

Ser Val Leu Thr Val Leu His Gln Asp Trp Leu Asn Gly Lys Glu Tyr
305                 310                 315                 320

Lys Cys Lys Val Ser Asn Lys Gly Leu Pro Ser Ser Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Gln Glu Glu Met Thr Lys Asn Gln Val Ser Leu Thr Cys
        355                 360                 365

Leu Val Lys Gly Phe Tyr Pro Ser Asp Ile Ala Val Glu Trp Glu Ser
370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Arg Leu Thr Val Asp Lys Ser
                405                 410                 415

Arg Trp Gln Glu Gly Asn Val Phe Ser Cys Ser Val Met His Glu Ala
            420                 425                 430

Leu His Asn His Tyr Thr Gln Lys Ser Leu Ser Leu Ser Leu Gly Lys
        435                 440                 445

<210> SEQ ID NO 27
<211> LENGTH: 216
<212> TYPE: PRT
<213> ORGANISM: Artificial Sequence
<220> FEATURE:
<223> OTHER INFORMATION: antibody light chain

<400> SEQUENCE: 27

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Pro
                85                  90                  95

Ala Leu Thr Phe Gly Gly Gly Thr Lys Val Glu Ile Lys Arg Thr Val
            100                 105                 110

Ala Ala Pro Ser Val Phe Ile Phe Pro Pro Ser Asp Glu Gln Leu Lys
        115                 120                 125
```

```
Ser Gly Thr Ala Ser Val Val Cys Leu Leu Asn Asn Phe Tyr Pro Arg
    130                 135                 140
Glu Ala Lys Val Gln Trp Lys Val Asp Asn Ala Leu Gln Ser Gly Asn
145                 150                 155                 160
Ser Gln Glu Ser Val Thr Glu Gln Asp Ser Lys Asp Ser Thr Tyr Ser
                165                 170                 175
Leu Ser Ser Thr Leu Thr Leu Ser Lys Ala Asp Tyr Glu Lys His Lys
            180                 185                 190
Val Tyr Ala Cys Glu Val Thr His Gln Gly Leu Ser Ser Pro Val Thr
        195                 200                 205
Lys Ser Phe Asn Arg Gly Glu Cys
    210                 215

<210> SEQ ID NO 28
<211> LENGTH: 228
<212> TYPE: PRT
<213> ORGANISM: Artificial Sequence
<220> FEATURE:
<223> OTHER INFORMATION: antibody Fc region

<400> SEQUENCE: 28

Glu Ser Lys Tyr Gly Pro Pro Cys Pro Pro Cys Pro Ala Pro Glu Ala
1               5                   10                  15
Ala Gly Gly Pro Ser Val Phe Leu Phe Pro Pro Lys Pro Lys Asp Thr
            20                  25                  30
Leu Met Ile Ser Arg Thr Pro Glu Val Thr Cys Val Val Val Asp Val
        35                  40                  45
Ser Gln Glu Asp Pro Glu Val Gln Phe Asn Trp Tyr Val Asp Gly Val
50                  55                  60
Glu Val His Asn Ala Lys Thr Lys Pro Arg Glu Gln Phe Asn Ser
65                  70                  75                  80
Thr Tyr Arg Val Val Ser Val Leu Thr Val Leu His Gln Asp Trp Leu
                85                  90                  95
Asn Gly Lys Glu Tyr Lys Cys Lys Val Ser Asn Lys Gly Leu Pro Ser
            100                 105                 110
Ser Ile Glu Lys Thr Ile Ser Lys Ala Lys Gly Gln Pro Arg Glu Pro
        115                 120                 125
Gln Val Tyr Thr Leu Pro Pro Ser Gln Glu Glu Met Thr Lys Asn Gln
    130                 135                 140
Val Ser Leu Thr Cys Leu Val Lys Gly Phe Tyr Pro Ser Asp Ile Ala
145                 150                 155                 160
Val Glu Trp Glu Ser Asn Gly Gln Pro Glu Asn Asn Tyr Lys Thr Thr
                165                 170                 175
Pro Pro Val Leu Asp Ser Asp Gly Ser Phe Phe Leu Tyr Ser Arg Leu
            180                 185                 190
Thr Val Asp Lys Ser Arg Trp Gln Glu Gly Asn Val Phe Ser Cys Ser
        195                 200                 205
Val Met His Glu Ala Leu His Asn His Tyr Thr Gln Lys Ser Leu Ser
    210                 215                 220
Leu Ser Leu Gly
225

<210> SEQ ID NO 29
<211> LENGTH: 228
<212> TYPE: PRT
<213> ORGANISM: Artificial Sequence
```

<220> FEATURE:
<223> OTHER INFORMATION: antibody Fc region

<400> SEQUENCE: 29

Glu Ser Lys Tyr Gly Pro Pro Cys Pro Pro Cys Pro Ala Pro Glu Phe
1               5                   10                  15

Leu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
    210                 215                 220

Leu Ser Leu Gly
225

<210> SEQ ID NO 30
<211> LENGTH: 228
<212> TYPE: PRT
<213> ORGANISM: Artificial Sequence
<220> FEATURE:
<223> OTHER INFORMATION: antibody Fc region

<400> SEQUENCE: 30

Glu Ser Lys Tyr Gly Pro Pro Cys Pro Pro Cys Pro Ala Pro Glu Phe
1               5                   10                  15

Leu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser

```
                100                 105                 110
Ser Ile Glu Lys Thr Ile Ser Lys Ala Lys Gly Gln Pro Arg Glu Pro
            115                 120                 125

Gln Val Tyr Thr Leu Pro Pro Ser Gln Glu Glu Met Thr Lys Asn Gln
            130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
            165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
            195                 200                 205

Val Leu His Glu Ala Leu His Ser His Tyr Thr Gln Lys Ser Leu Ser
            210                 215                 220

Leu Ser Leu Gly
225

<210> SEQ ID NO 31
<211> LENGTH: 228
<212> TYPE: PRT
<213> ORGANISM: Artificial Sequence
<220> FEATURE:
<223> OTHER INFORMATION: antibody Fc region

<400> SEQUENCE: 31

Glu Ser Lys Tyr Gly Pro Pro Cys Pro Pro Cys Pro Ala Pro Glu Phe
1                   5                   10                  15

Leu Gly Gly Pro Ser Val Phe Leu Phe Pro Pro Lys Pro Lys Asp Thr
            20                  25                  30

Leu Tyr Ile Thr Arg Glu Pro Glu Val Thr Cys Val Val Val Asp Val
            35                  40                  45

Ser Gln Glu Asp Pro Glu Val Gln Phe Asn Trp Tyr Val Asp Gly Val
            50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
            85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
            115                 120                 125

Gln Val Tyr Thr Leu Pro Pro Ser Gln Glu Glu Met Thr Lys Asn Gln
            130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
            165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
            195                 200                 205

Val Met His Glu Ala Leu His Asn His Tyr Thr Gln Lys Ser Leu Ser
            210                 215                 220

Leu Ser Leu Gly
```

<210> SEQ ID NO 32
<211> LENGTH: 152
<212> TYPE: PRT
<213> ORGANISM: Artificial Sequence
<220> FEATURE:
<223> OTHER INFORMATION: lipocalin mutein

<400> SEQUENCE: 32

```
Ala Ser Asp Glu Glu Ile Gln Asp Val Ser Gly Thr Trp Tyr Leu Lys
1               5                   10                  15

Ala Met Thr Val Asp Glu Gly Cys Arg Pro Trp Asn Ile Phe Ser Val
            20                  25                  30

Thr Pro Met Thr Leu Thr Thr Leu Glu Gly Gly Asn Leu Glu Ala Lys
        35                  40                  45

Val Thr Met Ala Ile Asp Gly Pro Ala Gln Glu Val Lys Ala Val Leu
    50                  55                  60

Glu Lys Thr Asp Glu Pro Gly Lys Tyr Thr Ala Asp Gly Gly Lys His
65                  70                  75                  80

Val Ala Tyr Ile Ile Arg Ser His Val Lys Asp His Tyr Ile Phe Tyr
                85                  90                  95

Ser Glu Gly Val Cys Asp Gly Ser Pro Val Pro Gly Val Trp Leu Val
            100                 105                 110

Gly Arg Asp Pro Lys Asn Asn Leu Glu Ala Leu Glu Asp Phe Glu Lys
        115                 120                 125

Ala Ala Gly Ala Arg Gly Leu Ser Thr Glu Ser Ile Leu Ile Pro Arg
    130                 135                 140

Gln Ser Glu Thr Ser Ser Pro Gly
145                 150
```

<210> SEQ ID NO 33
<211> LENGTH: 152
<212> TYPE: PRT
<213> ORGANISM: Artificial Sequence
<220> FEATURE:
<223> OTHER INFORMATION: lipocalin mutein

<400> SEQUENCE: 33

```
Thr Ser Asp Glu Glu Ile Gln Asp Val Ser Gly Thr Trp Tyr Leu Lys
1               5                   10                  15

Ala Met Thr Val Asp Glu Gly Cys Arg Pro Trp Asn Ile Phe Ser Val
            20                  25                  30

Thr Pro Met Thr Leu Thr Thr Leu Glu Gly Gly Asn Leu Glu Ala Lys
        35                  40                  45

Val Thr Met Ala Ile Asp Gly Pro Ala Gln Glu Val Arg Ala Val Leu
    50                  55                  60

Glu Lys Thr Asp Glu Pro Gly Lys Tyr Thr Ala Asp Gly Gly Lys His
65                  70                  75                  80

Asp Ala Tyr Ile Ile Arg Ser His Val Lys Asp His Tyr Ile Phe Tyr
                85                  90                  95

Ser Glu Gly Val Cys Asp Gly Ser Pro Val Pro Gly Val Trp Leu Val
            100                 105                 110

Gly Arg Asp Pro Glu Asn Asn Leu Glu Ala Leu Glu Asp Phe Glu Lys
        115                 120                 125

Thr Ala Gly Ala Arg Gly Leu Ser Thr Glu Ser Ile Leu Ile Pro Arg
    130                 135                 140
```

Gln Ser Glu Thr Ser Ser Pro Gly
145                 150

<210> SEQ ID NO 34
<211> LENGTH: 152
<212> TYPE: PRT
<213> ORGANISM: Artificial Sequence
<220> FEATURE:
<223> OTHER INFORMATION: lipocalin mutein

<400> SEQUENCE: 34

Ala Ser Asp Glu Glu Ile Gln Asp Val Ser Gly Thr Trp Tyr Leu Lys
1               5                   10                  15

Ala Met Thr Val Asp Glu Gly Cys Arg Pro Trp Asn Ile Phe Ser Val
            20                  25                  30

Thr Pro Met Thr Leu Thr Thr Leu Glu Gly Gly Asn Leu Glu Ala Lys
        35                  40                  45

Val Thr Met Ala Ile Asp Gly Pro Ala Gln Glu Val Asn Ala Val Leu
    50                  55                  60

Glu Lys Thr Asp Glu Pro Gly Lys Tyr Thr Ala Asp Gly Gly Lys His
65                  70                  75                  80

Val Ala Tyr Ile Ile Arg Ser His Val Arg Asp His Tyr Ile Phe Tyr
                85                  90                  95

Ser Glu Gly Val Cys Asp Gly Ser Pro Val Pro Gly Val Trp Leu Val
            100                 105                 110

Gly Arg Asp Pro Glu Asn Asn Leu Glu Ala Leu Glu Asp Phe Glu Lys
        115                 120                 125

Thr Ala Gly Ala Arg Gly Leu Ser Thr Glu Ser Ile Leu Ile Pro Arg
    130                 135                 140

Gln Ser Glu Thr Ser Ser Pro Gly
145                 150

<210> SEQ ID NO 35
<211> LENGTH: 152
<212> TYPE: PRT
<213> ORGANISM: Artificial Sequence
<220> FEATURE:
<223> OTHER INFORMATION: lipocalin mutein

<400> SEQUENCE: 35

Val Ser Asp Glu Glu Ile Gln Asp Val Ser Gly Thr Trp Tyr Leu Lys
1               5                   10                  15

Ala Met Thr Val Asp Glu Gly Cys Arg Pro Trp Asn Ile Phe Ser Val
            20                  25                  30

Thr Pro Met Thr Leu Thr Thr Leu Glu Gly Gly Asn Leu Glu Ala Lys
        35                  40                  45

Val Thr Met Ala Ile Asp Gly Pro Ala Gln Glu Val Arg Ala Val Leu
    50                  55                  60

Glu Lys Thr Asp Glu Pro Gly Lys Tyr Thr Ala Asp Gly Gly Lys His
65                  70                  75                  80

Val Ala Tyr Ile Ile Arg Ser His Val Glu Asp His Tyr Ile Phe Tyr
                85                  90                  95

Ser Glu Gly Val Cys Asp Gly Ser Pro Val Pro Gly Val Trp Leu Val
            100                 105                 110

Gly Arg Asp Pro Glu Asn Asn Leu Glu Ala Leu Glu Asp Phe Glu Lys
        115                 120                 125

Thr Ala Gly Ala Arg Gly Leu Ser Thr Glu Ser Ile Leu Ile Pro Arg
    130                 135                 140

```
Gln Ser Glu Thr Ser Ser Pro Gly
145                 150

<210> SEQ ID NO 36
<211> LENGTH: 152
<212> TYPE: PRT
<213> ORGANISM: Artificial Sequence
<220> FEATURE:
<223> OTHER INFORMATION: lipocalin mutein

<400> SEQUENCE: 36

Ala Ser Asp Glu Glu Ile Gln Asp Val Ser Gly Thr Trp Tyr Leu Lys
1               5                   10                  15

Ala Met Thr Val Asp Glu Gly Cys Arg Pro Trp Asn Ile Phe Ser Val
            20                  25                  30

Thr Pro Met Thr Leu Ser Thr Leu Glu Gly Gly Asn Leu Glu Ala Lys
        35                  40                  45

Val Thr Met Ala Ile Asp Gly Pro Ala Gln Glu Val Lys Ala Val Leu
    50                  55                  60

Glu Lys Thr Asp Glu Pro Gly Lys Tyr Thr Ala Asp Gly Gly Lys His
65                  70                  75                  80

Val Ala Tyr Ile Ile Arg Ser His Val Lys Asp His Tyr Ile Phe Tyr
                85                  90                  95

Ser Glu Gly Val Cys Asp Gly Ser Pro Val Pro Gly Val Trp Leu Val
            100                 105                 110

Gly Arg Asp Pro Lys Asn Asn Leu Glu Ala Leu Glu Asp Phe Glu Lys
        115                 120                 125

Ala Ala Gly Ala Arg Gly Leu Ser Thr Glu Ser Ile Leu Ile Pro Arg
    130                 135                 140

Gln Ile Glu Thr Ser Ser Pro Gly
145                 150

<210> SEQ ID NO 37
<211> LENGTH: 152
<212> TYPE: PRT
<213> ORGANISM: Artificial Sequence
<220> FEATURE:
<223> OTHER INFORMATION: lipocalin mutein

<400> SEQUENCE: 37

Ala Ser Asp Glu Glu Ile Gln Asp Val Ser Gly Thr Trp Tyr Leu Lys
1               5                   10                  15

Ala Met Thr Val Asp Glu Gly Cys Arg Pro Trp Asn Ile Phe Ser Val
            20                  25                  30

Thr Pro Met Thr Leu Thr Thr Leu Glu Gly Gly Asn Leu Glu Ala Glu
        35                  40                  45

Val Thr Met Ala Ile Asp Gly Pro Ala Gln Glu Val Lys Ala Val Leu
    50                  55                  60

Glu Lys Ala Asp Glu Pro Gly Lys Tyr Thr Ala Asp Gly Gly Lys His
65                  70                  75                  80

Val Ala Tyr Ile Ile Arg Ser His Val Lys Asp His Tyr Ile Phe Tyr
                85                  90                  95

Ser Glu Gly Val Cys Asp Gly Ser Pro Val Pro Gly Val Trp Leu Val
            100                 105                 110

Gly Arg Asp Pro Lys Asn Asn Leu Glu Ala Leu Glu Asp Phe Glu Lys
        115                 120                 125

Thr Ala Gly Ala Arg Gly Leu Ser Thr Glu Ser Ile Leu Ile Pro Ser
```

Gln Ile Glu Thr Ser Ser Pro Gly
145                 150

<210> SEQ ID NO 38
<211> LENGTH: 152
<212> TYPE: PRT
<213> ORGANISM: Artificial Sequence
<220> FEATURE:
<223> OTHER INFORMATION: lipocalin mutein

<400> SEQUENCE: 38

Thr Ser Asp Glu Glu Ile Gln Asp Val Ser Gly Thr Trp Tyr Leu Lys
1               5                   10                  15

Ala Met Thr Val Asp Glu Gly Cys Arg Pro Trp Asn Ile Phe Ser Val
            20                  25                  30

Thr Pro Met Thr Leu Thr Thr Leu Glu Asp Gly Asn Leu Glu Ala Lys
        35                  40                  45

Val Thr Met Ala Ile Asp Gly Pro Ala Gln Glu Val Lys Ala Val Leu
    50                  55                  60

Glu Lys Ala Asp Glu Pro Gly Lys Tyr Thr Ala Asp Gly Gly Lys His
65                  70                  75                  80

Val Ala Tyr Ile Ile Arg Ser His Val Lys Asp His Tyr Ile Phe Tyr
                85                  90                  95

Ser Glu Gly Val Cys Asp Gly Ser Pro Val Pro Gly Val Trp Leu Val
            100                 105                 110

Gly Arg Asp Pro Lys Asn Asn Leu Glu Ala Leu Glu Asp Phe Glu Lys
        115                 120                 125

Ala Ala Gly Ala Arg Gly Leu Ser Thr Glu Ser Ile Leu Ile Pro Arg
    130                 135                 140

Gln Ile Glu Thr Ser Ser Pro Gly
145                 150

<210> SEQ ID NO 39
<211> LENGTH: 178
<212> TYPE: PRT
<213> ORGANISM: Artificial Sequence
<220> FEATURE:
<223> OTHER INFORMATION: lipocalin mutein

<400> SEQUENCE: 39

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe His Gly Lys Trp Tyr
            20                  25                  30

Val Val Gly Gln Ala Gly Asn Ile Lys Leu Arg Glu Asp Lys Asp Pro
        35                  40                  45

Asn Lys Met Met Ala Thr Ile Tyr Glu Leu Lys Glu Asp Lys Ser Tyr
    50                  55                  60

Asn Val Thr Gly Val Thr Phe Asp Asp Lys Lys Cys Thr Tyr Ala Ile
65                  70                  75                  80

Ser Thr Phe Val Pro Gly Ser Gln Pro Gly Glu Phe Thr Leu Gly Lys
                85                  90                  95

Ile Lys Ser Phe Pro Gly His Thr Ser Ser Leu Val Arg Val Val Ser
            100                 105                 110

Thr Asn Tyr Asn Gln His Ala Met Val Phe Phe Lys Phe Val Phe Gln
        115                 120                 125

Asn Arg Glu Glu Phe Tyr Ile Thr Leu Tyr Gly Arg Thr Lys Glu Leu
            130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 40
<211> LENGTH: 178
<212> TYPE: PRT
<213> ORGANISM: Artificial Sequence
<220> FEATURE:
<223> OTHER INFORMATION: lipocalin mutein

<400> SEQUENCE: 40

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe His Gly Lys Trp Tyr
            20                  25                  30

Val Val Gly Gln Ala Gly Asn Ile Arg Leu Arg Glu Asp Lys Asp Pro
        35                  40                  45

Ile Lys Met Met Ala Thr Ile Tyr Glu Leu Lys Glu Asp Lys Ser Tyr
    50                  55                  60

Asp Val Thr Met Val Lys Phe Asp Asp Lys Lys Cys Met Tyr Asp Ile
65                  70                  75                  80

Trp Thr Phe Val Pro Gly Ser Gln Pro Gly Glu Phe Thr Leu Gly Lys
                85                  90                  95

Ile Lys Ser Phe Pro Gly His Thr Ser Ser Leu Val Arg Val Val Ser
            100                 105                 110

Thr Asn Tyr Asn Gln His Ala Met Val Phe Phe Lys Phe Val Phe Gln
        115                 120                 125

Asn Arg Glu Glu Phe Tyr Ile Thr Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 41
<211> LENGTH: 178
<212> TYPE: PRT
<213> ORGANISM: Artificial Sequence
<220> FEATURE:
<223> OTHER INFORMATION: lipocalin mutein

<400> SEQUENCE: 41

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe His Gly Lys Trp Tyr
            20                  25                  30

Val Val Gly Gln Ala Gly Asn Ile Arg Leu Arg Glu Asp Lys Asp Pro
        35                  40                  45

Asn Lys Met Met Ala Thr Ile Tyr Glu Leu Lys Glu Asp Lys Ser Tyr
    50                  55                  60

Asp Val Thr Ala Val Ala Phe Asp Asp Lys Lys Cys Thr Tyr Asp Ile

```
                65                  70                  75                  80
Trp Thr Phe Val Pro Gly Ser Gln Pro Gly Glu Phe Thr Leu Gly Lys
                    85                  90                  95

Ile Lys Ser Phe Pro Gly His Thr Ser Ser Leu Val Arg Val Val Ser
                100                 105                 110

Thr Asn Tyr Asn Gln His Ala Met Val Phe Phe Lys Phe Val Phe Gln
                115                 120                 125

Asn Arg Glu Glu Phe Tyr Ile Thr Leu Tyr Gly Arg Thr Lys Glu Leu
            130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 42
<211> LENGTH: 178
<212> TYPE: PRT
<213> ORGANISM: Artificial Sequence
<220> FEATURE:
<223> OTHER INFORMATION: lipocalin mutein

<400> SEQUENCE: 42

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe His Gly Lys Trp Tyr
                20                  25                  30

Val Val Gly Gln Ala Gly Asn Ile Lys Leu Arg Glu Asp Lys Asp Pro
            35                  40                  45

Asn Lys Met Met Ala Thr Ile Tyr Glu Leu Lys Glu Asp Lys Ser Tyr
    50                  55                  60

Asp Val Thr Ala Val Ala Phe Asp Asp Lys Lys Cys Thr Tyr Asp Ile
65                  70                  75                  80

Trp Thr Phe Val Pro Gly Ser Gln Pro Gly Glu Phe Thr Leu Gly Lys
                    85                  90                  95

Ile Lys Ser Phe Pro Gly His Thr Ser Ser Leu Val Arg Val Val Ser
                100                 105                 110

Thr Asn Tyr Asn Gln His Ala Met Val Phe Phe Lys Phe Val Phe Gln
                115                 120                 125

Asn Arg Glu Glu Phe Tyr Ile Thr Leu Tyr Gly Arg Thr Lys Glu Leu
            130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 43
<211> LENGTH: 175
<212> TYPE: PRT
<213> ORGANISM: Artificial Sequence
<220> FEATURE:
<223> OTHER INFORMATION: lipocalin mutein

<400> SEQUENCE: 43

Gln Asp Ser Thr Ser Asp Leu Ile Pro Ala Pro Pro Leu Ser Lys Val
1               5                   10                  15
```

```
Pro Leu Gln Gln Asn Phe Gln Asp Asn Gln Phe His Gly Lys Trp Tyr
            20                  25                  30

Val Val Gly Gln Ala Gly Asn Ile Lys Leu Arg Glu Asp Ser Lys Met
        35                  40                  45

Met Ala Thr Ile Tyr Glu Leu Lys Glu Asp Lys Ser Tyr Asp Val Thr
 50                  55                  60

Gly Val Ser Phe Asp Asp Lys Lys Cys Thr Tyr Ala Ile Met Thr Phe
 65                  70                  75                  80

Val Pro Gly Ser Gln Pro Gly Glu Phe Thr Leu Gly Lys Ile Lys Ser
                85                  90                  95

Phe Pro Gly His Thr Ser Ser Leu Val Arg Val Ser Thr Asn Tyr
                100                 105                 110

Asn Gln His Ala Met Val Phe Phe Lys Phe Val Phe Gln Asn Arg Glu
            115                 120                 125

Glu Phe Tyr Ile Thr Leu Tyr Gly Arg Thr Lys Glu Leu Thr Ser Glu
130                 135                 140

Leu Lys Glu Asn Phe Ile Arg Phe Ser Lys Ser Leu Gly Leu Pro Glu
145                 150                 155                 160

Asn His Ile Val Phe Pro Val Pro Ile Asp Gln Cys Ile Asp Gly
                165                 170                 175

<210> SEQ ID NO 44
<211> LENGTH: 178
<212> TYPE: PRT
<213> ORGANISM: Artificial Sequence
<220> FEATURE:
<223> OTHER INFORMATION: lipocalin mutein

<400> SEQUENCE: 44

Gln Asp Ser Thr Ser Asp Leu Ile Pro Ala Pro Pro Leu Ser Lys Val
 1               5                  10                  15

Pro Leu Gln Gln Asn Phe Gln Asp Asn Gln Phe His Gly Lys Trp Tyr
            20                  25                  30

Val Val Gly Gln Ala Gly Asn Ile Lys Leu Arg Glu Asp Lys Asp Pro
        35                  40                  45

Val Lys Met Met Ala Thr Ile Tyr Glu Leu Lys Glu Asp Lys Ser Tyr
 50                  55                  60

Asp Val Thr Gly Val Thr Phe Asp Lys Lys Cys Arg Tyr Asp Ile
 65                  70                  75                  80

Ser Thr Phe Val Pro Gly Ser Gln Pro Gly Glu Phe Thr Phe Gly Lys
                85                  90                  95

Ile Lys Ser Phe Pro Gly His Thr Ser Ser Leu Val Arg Val Val Ser
                100                 105                 110

Thr Asn Tyr Asn Gln His Ala Met Val Phe Phe Lys Val Phe Gln
            115                 120                 125

Asn Arg Glu Glu Phe Tyr Ile Thr Leu Tyr Gly Arg Thr Lys Glu Leu
            130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 45
<211> LENGTH: 178
```

```
<212> TYPE: PRT
<213> ORGANISM: Artificial Sequence
<220> FEATURE:
<223> OTHER INFORMATION: lipocalin mutein

<400> SEQUENCE: 45
```

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe His Gly Lys Trp Tyr
            20                  25                  30

Val Val Gly Gln Ala Gly Asn Ile Arg Leu Arg Glu Asp Lys Asp Pro
        35                  40                  45

His Lys Met Met Ala Thr Ile Tyr Glu Leu Lys Glu Asp Lys Ser Tyr
    50                  55                  60

Asp Val Thr Gly Val Thr Phe Asp Asp Lys Lys Cys Thr Tyr Ala Ile
65                  70                  75                  80

Ser Thr Phe Val Pro Gly Ser Gln Pro Gly Glu Phe Thr Leu Gly Lys
                85                  90                  95

Ile Lys Ser Phe Pro Gly His Thr Ser Ser Leu Val Arg Val Val Ser
            100                 105                 110

Thr Asn Tyr Asn Gln His Ala Met Val Phe Phe Lys Phe Val Phe Gln
        115                 120                 125

Asn Arg Glu Glu Phe Tyr Ile Thr Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

```
<210> SEQ ID NO 46
<211> LENGTH: 178
<212> TYPE: PRT
<213> ORGANISM: Artificial Sequence
<220> FEATURE:
<223> OTHER INFORMATION: lipocalin mutein

<400> SEQUENCE: 46
```

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe His Gly Lys Trp Tyr
            20                  25                  30

Val Val Gly Gln Ala Gly Asn Ile Lys Leu Arg Glu Asp Lys Asp Pro
        35                  40                  45

Asn Lys Met Met Ala Thr Ile Tyr Glu Leu Lys Glu Asp Lys Ser Tyr
    50                  55                  60

Asp Val Thr Gly Val Thr Phe Asp Asp Lys Lys Cys Thr Tyr Ala Ile
65                  70                  75                  80

Ser Thr Leu Val Pro Gly Ser Gln Pro Gly Glu Phe Thr Phe Gly Lys
                85                  90                  95

Ile Lys Ser Phe Pro Gly His Thr Ser Ser Leu Val Arg Val Val Ser
            100                 105                 110

Thr Asn Tyr Asn Gln His Ala Met Val Phe Phe Lys Phe Val Phe Gln
        115                 120                 125

Asn Arg Glu Glu Phe Tyr Ile Thr Leu Tyr Gly Arg Thr Lys Glu Leu
    130                 135                 140

```
Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly
```

<210> SEQ ID NO 47
<211> LENGTH: 178
<212> TYPE: PRT
<213> ORGANISM: Artificial Sequence
<220> FEATURE:
<223> OTHER INFORMATION: lipocalin mutein

<400> SEQUENCE: 47

```
Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe His Gly Lys Trp Tyr
                20                  25                  30

Val Val Gly Gln Ala Gly Asn Ile Arg Leu Arg Glu Asp Lys Asp Pro
            35                  40                  45

Ser Lys Met Met Ala Thr Ile Tyr Glu Leu Lys Glu Asp Lys Ser Tyr
50                  55                  60

Asp Val Thr Ala Val Thr Phe Asp Asp Lys Lys Cys Asn Tyr Ala Ile
65                  70                  75                  80

Ser Thr Phe Val Pro Gly Ser Gln Pro Gly Glu Phe Thr Leu Gly Lys
                85                  90                  95

Ile Lys Ser Phe Pro Gly His Thr Ser Ser Leu Val Arg Val Val Ser
            100                 105                 110

Thr Asn Tyr Asn Gln His Ala Met Val Phe Phe Lys Phe Val Phe Gln
        115                 120                 125

Asn Arg Glu Glu Phe Tyr Ile Thr Leu Tyr Gly Arg Thr Lys Glu Leu
130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly
```

<210> SEQ ID NO 48
<211> LENGTH: 178
<212> TYPE: PRT
<213> ORGANISM: Artificial Sequence
<220> FEATURE:
<223> OTHER INFORMATION: lipocalin mutein

<400> SEQUENCE: 48

```
Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe His Gly Lys Trp Tyr
                20                  25                  30

Val Val Gly Met Ala Gly Asn Asn Leu Leu Arg Glu Asp Lys Asp Pro
            35                  40                  45

His Lys Met Ser Ala Thr Ile Tyr Glu Leu Lys Glu Asp Lys Ser Tyr
            50                  55                  60

Asn Val Thr Asp Val Met Phe Leu Asp Lys Lys Cys Gln Tyr Ile Ile
65                  70                  75                  80

Trp Thr Phe Val Pro Gly Ser Gln Pro Gly Glu Phe Thr Leu Gly Phe
```

```
                    85                  90                  95
Ile Lys Ser Asp Pro Gly His Thr Ser Tyr Leu Val Arg Val Val Ser
                100                 105                 110

Thr Asn Tyr Asn Gln His Ala Met Val Phe Phe Lys Ser Val Ile Gln
            115                 120                 125

Asn Arg Glu Trp Phe Gly Ile Thr Leu Tyr Gly Arg Thr Lys Glu Leu
        130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 49
<211> LENGTH: 178
<212> TYPE: PRT
<213> ORGANISM: Artificial Sequence
<220> FEATURE:
<223> OTHER INFORMATION: lipocalin mutein

<400> SEQUENCE: 49

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
            20                  25                  30

Val Val Gly Met Ala Gly Asn Asn Leu Leu Arg Glu Asp Lys Asp Pro
        35                  40                  45

His Lys Met Ser Ala Thr Ile Tyr Glu Leu Lys Glu Asp Lys Ser Tyr
    50                  55                  60

Asn Val Thr Asp Val Met Phe Leu Asp Lys Lys Cys Gln Tyr Ile Ile
65                  70                  75                  80

Trp Thr Phe Val Pro Gly Ser Gln Pro Gly Glu Leu Thr Leu Gly Phe
                85                  90                  95

Ile Arg Ser Asp Leu Gly His Thr Ser Tyr Leu Val Arg Val Val Ser
                100                 105                 110

Thr Asn Tyr Asn Gln His Ala Met Val Phe Phe Lys Ser Val Ile Gln
            115                 120                 125

Asn Arg Glu Trp Phe Gly Ile Thr Leu Tyr Gly Arg Thr Lys Glu Leu
        130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 50
<211> LENGTH: 178
<212> TYPE: PRT
<213> ORGANISM: Artificial Sequence
<220> FEATURE:
<223> OTHER INFORMATION: lipocalin mutein

<400> SEQUENCE: 50

Gln Asp Ser Thr Ser Asp Leu Ile Pro Ala Pro Pro Leu Ser Lys Val
1               5                   10                  15

Pro Leu Gln Gln Asn Phe Gln Asp Tyr Gln Phe Gln Gly Lys Trp Tyr
            20                  25                  30
```

```
Val Val Gly Met Ala Gly Asn Asn Leu Leu Arg Glu Asp Lys Asp Pro
            35                  40                  45

His Lys Met Gly Ala Thr Ile Tyr Glu Leu Lys Glu Asp Lys Ser Tyr
 50                  55                  60

Asn Val Thr Asp Val Met Leu Leu Asp Lys Lys Cys Gln Tyr Ile Ile
 65                  70                  75                  80

Gln Thr Phe Val Pro Gly Ser Gln Pro Gly Glu Ser Thr Leu Gly Phe
                 85                  90                  95

Ile Lys Ser Asp Pro Gly His Thr Ser Tyr Leu Val Arg Val Val Ser
                100                 105                 110

Thr Asn Tyr Asn Gln His Ala Met Val Phe Phe Lys Ser Val Ile Gln
            115                 120                 125

Asn Arg Glu Trp Phe Gly Ile Thr Leu Tyr Gly Arg Thr Lys Glu Leu
        130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 51
<211> LENGTH: 178
<212> TYPE: PRT
<213> ORGANISM: Artificial Sequence
<220> FEATURE:
<223> OTHER INFORMATION: lipocalin mutein

<400> SEQUENCE: 51

Gln Asp Ser Thr Ser Asp Leu Ile Pro Ala Pro Pro Leu Ser Lys Val
 1               5                  10                  15

Pro Leu Gln Gln Asn Phe Gln Asp Asn Gln Phe Gln Gly Lys Trp Tyr
                 20                  25                  30

Val Val Gly Met Ala Gly Asn Asn Leu Leu Arg Glu Asp Lys Asp Pro
            35                  40                  45

His Lys Met Gly Ala Thr Ile Tyr Glu Leu Lys Glu Asp Lys Ser Tyr
 50                  55                  60

Asn Val Thr Asp Val Met Phe Leu Asp Lys Lys Cys Gln His Ile Ile
 65                  70                  75                  80

Trp Thr Phe Val Pro Gly Ser Gln Pro Gly Glu Leu Thr Leu Gly Phe
                 85                  90                  95

Ile Lys Ser Asp Pro Gly His Thr Ser Tyr Leu Val Arg Val Val Ser
                100                 105                 110

Thr Asn Tyr Asn Gln His Ala Met Val Phe Phe Lys Ser Val Ile Gln
            115                 120                 125

Asn Arg Glu Trp Phe Gly Ile Thr Leu Tyr Gly Arg Thr Lys Glu Leu
        130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 52
<211> LENGTH: 178
<212> TYPE: PRT
```

<213> ORGANISM: Artificial Sequence
<220> FEATURE:
<223> OTHER INFORMATION: lipocalin mutein

<400> SEQUENCE: 52

Gln Asp Ser Thr Ser Asp Leu Ile Pro Ala Pro Pro Leu Ser Lys Val
1               5                   10                  15

Pro Leu Gln Gln Asn Phe Gln Asp Asp Gln Phe Gln Gly Lys Trp Tyr
            20                  25                  30

Val Val Gly Met Ala Gly Asn Asn Leu Leu Arg Glu Asp Lys Asp Pro
        35                  40                  45

His Lys Met Gly Ala Thr Ile Tyr Glu Leu Lys Glu Asp Lys Ser Tyr
50                  55                  60

Asn Val Thr Asp Val Met Phe Leu Asp Lys Lys Cys Gln Tyr Ile Ile
65                  70                  75                  80

Trp Thr Phe Val Pro Gly Ser Gln Pro Gly Glu Leu Thr Leu Gly Phe
                85                  90                  95

Ile Lys Ser Asp Pro Gly His Thr Ser Tyr Leu Val Arg Val Val Ser
            100                 105                 110

Thr Asn Tyr Asn Gln His Ala Met Val Phe Phe Lys Ser Val Ile Gln
        115                 120                 125

Asn Arg Glu Trp Phe Gly Ile Thr Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 53
<211> LENGTH: 178
<212> TYPE: PRT
<213> ORGANISM: Artificial Sequence
<220> FEATURE:
<223> OTHER INFORMATION: lipocalin mutein

<400> SEQUENCE: 53

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
            20                  25                  30

Ile Val Gly Met Ala Gly Asn Asn Leu Leu Arg Glu Asp Lys Asp Pro
        35                  40                  45

His Lys Met Gly Ala Thr Ile Tyr Glu Leu Lys Glu Asp Lys Ser Tyr
50                  55                  60

Asn Val Thr Asp Val Met Phe Leu Asp Lys Lys Cys Gln Tyr Ile Ile
65                  70                  75                  80

Trp Thr Phe Val Pro Gly Ser Gln Pro Gly Glu Leu Thr Leu Gly Phe
                85                  90                  95

Ile Lys Ser Asp Pro Gly His Thr Ser Tyr Leu Val Arg Val Val Ser
            100                 105                 110

Thr Asn Tyr Asn Gln His Ala Met Val Phe Phe Lys Ser Val Ile Gln
        115                 120                 125

Asn Arg Glu Trp Phe Gly Ile Thr Leu Tyr Gly Arg Thr Lys Glu Leu
    130                 135                 140

Thr Ser Glu Leu Lys Glu Asn Phe Ile Arg Phe Ser Lys Ser Leu Gly

```
                145                 150                 155                 160
Leu Pro Glu Asn His Ile Val Phe Pro Val Pro Ile Asp Gln Cys Ile
                165                 170                 175

Asp Gly

<210> SEQ ID NO 54
<211> LENGTH: 178
<212> TYPE: PRT
<213> ORGANISM: Artificial Sequence
<220> FEATURE:
<223> OTHER INFORMATION: lipocalin mutein

<400> SEQUENCE: 54

Gln Asp Ser Thr Ser Asp Leu Ile Pro Ala Pro Pro Leu Ser Lys Val
1               5                   10                  15

Pro Leu Gln Arg Asn Phe Gln Asp Asn Gln Phe Gln Gly Lys Trp Tyr
                20                  25                  30

Val Val Gly Met Ala Gly Asn Asn Leu Leu Arg Val Asp Lys Asp Pro
            35                  40                  45

His Lys Met Gly Ala Thr Ile Tyr Glu Leu Lys Glu Asp Lys Ser Tyr
        50                  55                  60

Asn Val Thr Asp Val Met Phe Leu Asp Lys Lys Cys Gln Tyr Ile Ile
65                  70                  75                  80

Trp Thr Phe Val Pro Gly Ser Gln Pro Gly Glu Leu Thr Leu Gly Phe
                85                  90                  95

Ile Lys Ser Asp Pro Gly His Thr Ser Tyr Leu Val Arg Val Val Ser
                100                 105                 110

Thr Asn Tyr Asn Gln His Ala Met Val Tyr Phe Lys Ser Val Ile Gln
            115                 120                 125

Asn Arg Glu Trp Phe Gly Ile Thr Leu Tyr Gly Arg Thr Lys Glu Leu
        130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 55
<211> LENGTH: 178
<212> TYPE: PRT
<213> ORGANISM: Artificial Sequence
<220> FEATURE:
<223> OTHER INFORMATION: lipocalin mutein

<400> SEQUENCE: 55

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
                20                  25                  30

Val Val Gly Met Ala Gly Asn Asn Leu Leu Arg Glu Asp Lys Asp Pro
            35                  40                  45

His Lys Met Ser Ala Thr Ile Tyr Glu Leu Lys Glu Asp Lys Ser Tyr
        50                  55                  60

Asn Val Thr Asp Val Met Phe Leu Asp Lys Lys Cys Gln Tyr Ile Asn
65                  70                  75                  80

Trp Pro Phe Val Pro Gly Ser Gln Pro Gly Glu Phe Thr Leu Gly Phe
                85                  90                  95
```

Ile Lys Ser Asp Leu Gly Pro Thr Ser Tyr Leu Val Arg Val Ser
            100                 105                 110

Thr Asn Tyr Asn Gln His Ala Met Val Phe Phe Lys Ser Val Ile Gln
            115                 120                 125

Asn Arg Glu Trp Phe Gly Ile Thr Leu Tyr Gly Arg Thr Lys Glu Leu
        130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 56
<211> LENGTH: 178
<212> TYPE: PRT
<213> ORGANISM: Artificial Sequence
<220> FEATURE:
<223> OTHER INFORMATION: lipocalin mutein

<400> SEQUENCE: 56

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
            20                  25                  30

Val Val Gly Met Ala Gly Asn Asn Leu Leu Arg Glu Asp Lys Asp Pro
        35                  40                  45

His Lys Met Gly Ala Thr Ile Tyr Glu Leu Asn Glu Asp Lys Ser Tyr
50                  55                  60

Asn Val Thr Asp Val Met Phe Leu Asp Lys Lys Cys Gln Tyr Ile Ile
65                  70                  75                  80

Trp Thr Phe Val Pro Gly Ser Gln Pro Gly Glu Leu Thr Leu Gly Phe
                85                  90                  95

Ile Lys Ser Asp Pro Gly His Thr Ser Tyr Leu Val Arg Val Val Ser
            100                 105                 110

Thr Asn Tyr Asn Gln His Ala Met Val Phe Phe Lys Ser Val Ile Gln
            115                 120                 125

Asn Arg Glu Trp Phe Gly Ile Thr Leu Tyr Gly Arg Thr Lys Glu Leu
        130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 57
<211> LENGTH: 178
<212> TYPE: PRT
<213> ORGANISM: Artificial Sequence
<220> FEATURE:
<223> OTHER INFORMATION: lipocalin mutein

<400> SEQUENCE: 57

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
            20                  25                  30

Val Val Gly Met Ala Gly Asn Asn Leu Leu Arg Asp Asp Lys Asp Pro
        35                  40                  45

His Lys Met Ser Ala Thr Ile Tyr Glu Leu Lys Glu Asp Lys Ser Tyr
 50                  55                  60

Asn Val Thr Asp Val Met Leu Leu Asp Lys Lys Cys His Tyr Ile Ile
 65                  70                  75                  80

Trp Thr Phe Val Pro Gly Ser Gln Pro Gly Glu Leu Thr Leu Gly Phe
                 85                  90                  95

Ile Lys Ser Asp Pro Gly His Thr Ser Tyr Leu Val Arg Val Val Ser
                100                 105                 110

Thr Asn Tyr Asn Gln His Ala Met Val Phe Phe Lys Ser Val Ile Gln
                115                 120                 125

Asn Arg Glu Trp Phe Gly Ile Thr Leu Tyr Gly Arg Thr Lys Glu Leu
        130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 58
<211> LENGTH: 178
<212> TYPE: PRT
<213> ORGANISM: Artificial Sequence
<220> FEATURE:
<223> OTHER INFORMATION: lipocalin mutein

<400> SEQUENCE: 58

Gln Asp Ser Thr Ser Asp Leu Ile Pro Ala Pro Pro Leu Ser Lys Val
 1               5                  10                  15

Pro Leu Gln Gln Asn Phe Gln Asp Asn Gln Phe His Gly Lys Trp Tyr
                20                  25                  30

Val Val Gly Val Ala Gly Asn Ala Met Leu Arg Glu Asp Lys Asp Pro
        35                  40                  45

Leu Lys Met Arg Ala Thr Ile Tyr Glu Leu Lys Glu Asp Lys Ser Tyr
 50                  55                  60

Asn Val Thr Gly Val Ser Phe Trp Arg Lys Lys Cys His Tyr Lys Ile
 65                  70                  75                  80

Gly Thr Phe Val Pro Gly Ser Gln Pro Gly Glu Phe Thr Leu Gly Asp
                 85                  90                  95

Ile Lys Ser Gly Pro Gly Gln Thr Ser Asn Leu Val Arg Val Val Ser
                100                 105                 110

Thr Asn Tyr Asn Gln His Ala Met Val Phe Phe Lys Glu Val Arg Gln
                115                 120                 125

Asn Arg Glu Trp Phe Ala Ile Thr Leu Tyr Gly Arg Thr Lys Glu Leu
        130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 59
<211> LENGTH: 178
<212> TYPE: PRT
<213> ORGANISM: Artificial Sequence -continued

```
<220> FEATURE:
<223> OTHER INFORMATION: lipocalin mutein

<400> SEQUENCE: 59
```

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe His Gly Lys Trp Tyr
            20                  25                  30

Val Val Gly Arg Ala Gly Asn Val Ala Leu Arg Glu Asp Lys Asp Pro
        35                  40                  45

Pro Lys Met Arg Ala Thr Ile Tyr Glu Leu Lys Glu Asp Lys Ser Tyr
    50                  55                  60

Asn Val Thr Asn Val Arg Phe Ala Met Lys Lys Cys Met Tyr Ser Ile
65                  70                  75                  80

Gly Thr Phe Val Pro Gly Ser Gln Pro Gly Glu Phe Thr Leu Gly Gln
                85                  90                  95

Ile Lys Ser Glu Pro Gly Asn Thr Ser Asn Leu Val Arg Val Val Ser
            100                 105                 110

Thr Asn Tyr Asn Gln His Ala Met Val Phe Phe Lys Glu Val Tyr Gln
        115                 120                 125

Asn Arg Glu Ile Phe Phe Ile Thr Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

```
<210> SEQ ID NO 60
<211> LENGTH: 178
<212> TYPE: PRT
<213> ORGANISM: Artificial Sequence
<220> FEATURE:
<223> OTHER INFORMATION: lipocalin mutein

<400> SEQUENCE: 60
```

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
            20                  25                  30

Val Val Gly Val Ala Gly Asn Ala Leu Leu Arg Glu Asp Lys Asp Pro
        35                  40                  45

Leu Lys Met Arg Ala Thr Ile Tyr Glu Leu Lys Glu Asp Lys Ser Tyr
    50                  55                  60

Asp Val Thr Val Val Ser Phe Trp Arg Lys Lys Cys His Tyr Lys Ile
65                  70                  75                  80

Gly Thr Phe Val Pro Gly Ser Gln Pro Gly Glu Phe Thr Leu Gly Asp
                85                  90                  95

Ile Lys Ser Gly Pro Gly Gln Thr Ser Asn Leu Val Arg Val Val Ser
            100                 105                 110

Thr Asn Tyr Asn Gln His Ala Met Val Phe Phe Lys Glu Val Arg Gln
        115                 120                 125

Asn Arg Glu Trp Phe Ala Ile Thr Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

```
Leu Pro Glu Asn His Ile Val Phe Pro Val Pro Ile Asp Gln Cys Ile
                165                 170                 175

Asp Gly

<210> SEQ ID NO 61
<211> LENGTH: 178
<212> TYPE: PRT
<213> ORGANISM: Artificial Sequence
<220> FEATURE:
<223> OTHER INFORMATION: lipocalin mutein

<400> SEQUENCE: 61

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
                20                  25                  30

Val Val Gly Val Ala Gly Asn Val Arg Leu Arg Glu Asp Lys Asp Pro
                35                  40                  45

Pro Lys Met Arg Ala Thr Ile Tyr Glu Leu Lys Glu Asp Lys Ser Tyr
        50                  55                  60

Asp Val Thr Gly Val Ser Phe Arg Gly Lys Lys Cys His Tyr Lys Ile
65                  70                  75                  80

Gly Thr Phe Val Pro Gly Ser Gln Pro Gly Glu Phe Thr Leu Gly Asp
                85                  90                  95

Ile Lys Ser Gly Pro Gly Glu Thr Ser Asn Leu Val Arg Val Val Ser
                100                 105                 110

Thr Asn Tyr Asn Gln His Ala Met Val Phe Phe Lys Val Arg Gln
                115                 120                 125

Asn Arg Glu Trp Phe Phe Ile Thr Leu Tyr Gly Arg Thr Lys Glu Leu
        130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 62
<211> LENGTH: 178
<212> TYPE: PRT
<213> ORGANISM: Artificial Sequence
<220> FEATURE:
<223> OTHER INFORMATION: lipocalin mutein

<400> SEQUENCE: 62

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
                20                  25                  30

Val Val Gly Val Ala Gly Asn Gly Met Leu Arg Glu Asp Lys Asp Pro
                35                  40                  45

Leu Lys Met Arg Ala Thr Ile Tyr Glu Leu Lys Glu Asp Lys Ser Tyr
        50                  55                  60

Asp Val Thr Ser Val Ala Phe Arg Asn Lys Lys Cys His Tyr Lys Ile
65                  70                  75                  80

Gly Thr Phe Val Pro Gly Ser Gln Pro Gly Glu Phe Thr Leu Gly Gln
                85                  90                  95
```

Ile Lys Ser Gly Pro Gly Glu Thr Ser Asn Leu Val Arg Val Val Ser
              100                 105                 110

Thr Asn Tyr Asn Gln His Ala Met Val Phe Phe Lys Glu Val Arg Gln
              115                 120                 125

Asn Arg Glu Trp Phe Phe Ile Thr Leu Tyr Gly Arg Thr Lys Glu Leu
              130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
              165                 170                 175

Asp Gly

<210> SEQ ID NO 63
<211> LENGTH: 178
<212> TYPE: PRT
<213> ORGANISM: Artificial Sequence
<220> FEATURE:
<223> OTHER INFORMATION: lipocalin mutein

<400> SEQUENCE: 63

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
              20                  25                  30

Val Val Gly Arg Ala Gly Asn Val Gly Leu Arg Glu Asp Lys Asp Pro
              35                  40                  45

Pro Lys Met Trp Ala Thr Ile Tyr Glu Leu Lys Glu Asp Lys Ser Tyr
50                  55                  60

Asp Val Thr Asn Val Arg Phe Ala Arg Lys Lys Cys Leu Tyr Ser Ile
65                  70                  75                  80

Gly Thr Phe Val Pro Gly Ser Gln Pro Gly Glu Phe Thr Leu Gly Gln
              85                  90                  95

Ile Lys Ser Glu Pro Gly Asn Thr Ala Asn Leu Val Arg Val Val Ser
              100                 105                 110

Thr Asn Tyr Asn Gln His Ala Met Val Phe Phe Lys Glu Val Tyr Gln
              115                 120                 125

Asn Arg Glu Ile Phe Phe Ile Ile Leu Tyr Gly Arg Thr Lys Glu Leu
              130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
              165                 170                 175

Asp Gly

<210> SEQ ID NO 64
<211> LENGTH: 178
<212> TYPE: PRT
<213> ORGANISM: Artificial Sequence
<220> FEATURE:
<223> OTHER INFORMATION: lipocalin mutein

<400> SEQUENCE: 64

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
              20                  25                  30

Val Val Gly Arg Ala Gly Asn Val Gly Leu Arg Glu Asp Lys Asp Pro

```
                35                  40                  45
Pro Lys Met Trp Ala Thr Ile Tyr Glu Leu Lys Glu Asp Lys Ser Tyr
 50                  55                  60

Asp Val Thr Asn Val Arg Phe Ala Arg Lys Lys Cys Thr Tyr Ser Ile
 65                  70                  75                  80

Gly Thr Phe Val Pro Gly Ser Gln Pro Gly Glu Phe Thr Leu Gly Gln
                 85                  90                  95

Ile Lys Ser Glu Pro Gly Gly Thr Ala Asn Leu Val Arg Val Val Ser
                100                 105                 110

Thr Asn Tyr Asn Gln His Ala Met Val Phe Phe Lys Glu Val Tyr Gln
                115                 120                 125

Asn Arg Glu Ile Phe Phe Ile Ile Leu Tyr Gly Arg Thr Lys Glu Leu
            130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 65
<211> LENGTH: 178
<212> TYPE: PRT
<213> ORGANISM: Artificial Sequence
<220> FEATURE:
<223> OTHER INFORMATION: lipocalin mutein

<400> SEQUENCE: 65

Gln Asp Ser Thr Ser Asp Leu Ile Pro Ala Pro Pro Leu Ser Lys Val
 1               5                  10                  15

Pro Leu Gln Gln Asn Phe Gln Asp Asn Gln Phe Gln Gly Lys Trp Tyr
                 20                  25                  30

Val Val Gly Arg Ala Gly Asn Gly Ala Leu Arg Glu Asp Lys Asp Pro
             35                  40                  45

Pro Lys Met Trp Ala Thr Ile Tyr Glu Leu Lys Glu Asp Lys Ser Tyr
 50                  55                  60

Asp Val Thr Asn Val Arg Phe Ala Arg Lys Lys Cys Val Tyr Ser Ile
 65                  70                  75                  80

Gly Thr Phe Val Pro Gly Ser Gln Pro Gly Glu Phe Thr Leu Gly Pro
                 85                  90                  95

Ile Lys Ser Glu Pro Gly Asn Thr Ala Ser Leu Val Arg Val Val Ser
                100                 105                 110

Thr Asn Tyr Asn Gln His Ala Met Val Phe Phe Lys Glu Val Tyr Gln
                115                 120                 125

Asn Arg Glu Ile Phe Phe Ile Ile Leu Tyr Gly Arg Thr Lys Glu Leu
            130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 66
<211> LENGTH: 178
<212> TYPE: PRT
<213> ORGANISM: Artificial Sequence
<220> FEATURE:
```

<223> OTHER INFORMATION: lipocalin mutein

<400> SEQUENCE: 66

Gln Asp Ser Thr Ser Asp Leu Ile Pro Ala Pro Pro Leu Ser Lys Val
1               5                   10                  15
Pro Leu Gln Gln Asn Phe Gln Asp Asn Gln Phe Gln Gly Lys Trp Tyr
            20                  25                  30
Val Val Gly Arg Ala Gly Asn Val Ala Leu Arg Glu Asp Lys Asp Pro
        35                  40                  45
Pro Lys Met Arg Ala Thr Ile Tyr Glu Leu Lys Glu Asp Lys Ser Tyr
    50                  55                  60
Asp Val Thr Ala Val Arg Phe Ala Arg Lys Lys Cys Leu Tyr Ser Ile
65                  70                  75                  80
Gly Thr Phe Val Pro Gly Ser Gln Pro Gly Glu Phe Thr Leu Gly Arg
                85                  90                  95
Ile Lys Ser Glu Pro Gly Tyr Thr Ala Asn Leu Val Arg Val Val Ser
            100                 105                 110
Thr Asn Tyr Asn Gln His Ala Met Val Phe Phe Lys Glu Val Tyr Gln
        115                 120                 125
Asn Arg Glu Ile Phe Phe Ile Ile Leu Tyr Gly Arg Thr Lys Glu Leu
    130                 135                 140
Thr Ser Glu Leu Lys Glu Asn Phe Ile Arg Phe Ser Lys Ser Leu Gly
145                 150                 155                 160
Leu Pro Glu Asn His Ile Val Phe Pro Val Pro Ile Asp Gln Cys Ile
                165                 170                 175
Asp Gly

<210> SEQ ID NO 67
<211> LENGTH: 178
<212> TYPE: PRT
<213> ORGANISM: Artificial Sequence
<220> FEATURE:
<223> OTHER INFORMATION: lipocalin mutein

<400> SEQUENCE: 67

Gln Asp Ser Thr Ser Asp Leu Ile Pro Ala Pro Pro Leu Ser Lys Val
1               5                   10                  15
Pro Leu Gln Gln Asn Phe Gln Asp Asn Gln Phe Gln Gly Lys Trp Tyr
            20                  25                  30
Val Val Gly Arg Ala Gly Asn Val Ala Leu Arg Glu Asp Lys Asp Pro
        35                  40                  45
Pro Lys Met Arg Ala Thr Ile Tyr Glu Leu Lys Glu Asp Lys Ser Tyr
    50                  55                  60
Asp Val Thr Asn Val Val Phe Ala Gly Lys Lys Cys Lys Tyr Ser Ile
65                  70                  75                  80
Gly Thr Phe Val Pro Gly Ser Gln Pro Gly Glu Phe Thr Leu Gly Arg
                85                  90                  95
Ile Lys Ser Pro Pro Gly Asn Thr Ala Asn Leu Val Arg Val Val Ser
            100                 105                 110
Thr Asn Tyr Asn Gln His Ala Met Val Phe Phe Lys Glu Val Tyr Gln
        115                 120                 125
Asn Arg Glu Ile Phe Phe Ile Ile Leu Tyr Gly Arg Thr Lys Glu Leu
    130                 135                 140
Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 68
<211> LENGTH: 178
<212> TYPE: PRT
<213> ORGANISM: Artificial Sequence
<220> FEATURE:
<223> OTHER INFORMATION: lipocalin mutein

<400> SEQUENCE: 68

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
                20                  25                  30

Val Val Gly Arg Ala Gly Asn Leu Gly Leu Arg Glu Asp Lys Asp Pro
            35                  40                  45

Pro Lys Met Trp Ala Thr Ile Tyr Glu Leu Lys Glu Asp Lys Ser Tyr
    50                  55                  60

Asp Val Thr Asn Val Arg Phe Ala Arg Lys Lys Cys Met Tyr Ser Ile
65                  70                  75                  80

Gly Thr Phe Val Pro Gly Ser Gln Pro Gly Glu Phe Thr Leu Gly Gln
                85                  90                  95

Ile Lys Ser Glu Pro Gly Ser Thr Ala Asn Leu Val Arg Val Val Ser
                100                 105                 110

Thr Asn Tyr Asn Gln His Ala Met Val Phe Phe Lys Glu Val Tyr Gln
            115                 120                 125

Asn Arg Glu Ile Phe Phe Ile Thr Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly

<210> SEQ ID NO 69
<211> LENGTH: 178
<212> TYPE: PRT
<213> ORGANISM: Artificial Sequence
<220> FEATURE:
<223> OTHER INFORMATION: lipocalin mutein

<400> SEQUENCE: 69

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
                20                  25                  30

Val Val Gly Arg Ala Gly Asn Val Gly Leu Arg Glu Asp Lys Asp Pro
            35                  40                  45

Pro Lys Met Trp Ala Thr Ile Tyr Glu Leu Lys Glu Asp Lys Ser Tyr
    50                  55                  60

Asp Val Thr Asn Val Arg Phe Ala Gly Lys Lys Val Lys Tyr Thr Ile
65                  70                  75                  80

Gly Thr Phe Val Pro Gly Ser Gln Pro Gly Glu Phe Thr Leu Gly Gln
                85                  90                  95

Ile Lys Ser Glu Pro Gly Asn Thr Ala Thr Leu Val Arg Val Val Ser

```
                   100                 105                 110
Thr Asn Tyr Asn Gln His Ala Met Val Phe Phe Lys Glu Val Tyr Gln
            115                 120                 125

Asn Arg Glu Ile Phe Phe Ile Thr Leu Tyr Gly Arg Thr Lys Glu Leu
        130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Ala Ile
                165                 170                 175

Asp Gly

<210> SEQ ID NO 70
<211> LENGTH: 178
<212> TYPE: PRT
<213> ORGANISM: Artificial Sequence
<220> FEATURE:
<223> OTHER INFORMATION: lipocalin mutein

<400> SEQUENCE: 70

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
            20                  25                  30

Val Val Gly Arg Ala Gly Asn Val Gly Leu Arg Glu Asp Lys Asp Pro
        35                  40                  45

Pro Lys Met Arg Ala Thr Ile Tyr Glu Leu Lys Glu Asp Lys Ser Tyr
    50                  55                  60

Asp Val Thr Gly Val Arg Phe Gly Glu Lys Lys Ile Lys Tyr Ser Ile
65                  70                  75                  80

Gly Thr Phe Val Pro Gly Ser Gln Pro Gly Glu Phe Thr Leu Gly Gln
                85                  90                  95

Ile Lys Ser Gln Pro Gly Asp Thr Ala Asn Leu Val Arg Val Val Ser
            100                 105                 110

Thr Asn Tyr Asn Gln His Ala Met Val Phe Phe Lys Glu Val Tyr Gln
        115                 120                 125

Asn Arg Glu Ile Phe Phe Ile Ile Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Ala Ile
                165                 170                 175

Asp Gly

<210> SEQ ID NO 71
<211> LENGTH: 178
<212> TYPE: PRT
<213> ORGANISM: Artificial Sequence
<220> FEATURE:
<223> OTHER INFORMATION: lipocalin mutein

<400> SEQUENCE: 71

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
            20                  25                  30

Val Val Gly Arg Ala Gly Asn Val Gly Leu Arg Glu Asp Lys Asp Pro
        35                  40                  45
```

```
Pro Lys Met Arg Ala Thr Ile Tyr Glu Leu Lys Glu Asp Lys Ser Tyr
    50                  55                  60

Asp Val Thr Gly Val Arg Phe Asp Ser Lys Lys Val Thr Tyr Ser Ile
65                  70                  75                  80

Gly Thr Phe Val Pro Gly Ser Gln Pro Gly Glu Phe Thr Leu Gly Gln
                85                  90                  95

Ile Lys Ser Glu Pro Gly Asn Thr Ala Asn Leu Val Arg Val Val Ser
            100                 105                 110

Thr Asn Tyr Asn Gln His Ala Met Val Phe Phe Lys Glu Val Tyr Gln
        115                 120                 125

Asn Arg Glu Ile Phe Phe Ile Ile Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Ala Ile
                165                 170                 175

Asp Gly
```

```
<210> SEQ ID NO 72
<211> LENGTH: 8
<212> TYPE: PRT
<213> ORGANISM: Artificial Sequence
<220> FEATURE:
<223> OTHER INFORMATION: antibody heavy chain CDR1

<400> SEQUENCE: 72

Gly Tyr Thr Phe Thr Asp Tyr Glu
1               5

<210> SEQ ID NO 73
<211> LENGTH: 8
<212> TYPE: PRT
<213> ORGANISM: Artificial Sequence
<220> FEATURE:
<223> OTHER INFORMATION: antibody heavy chain CDR2

<400> SEQUENCE: 73

Leu Asp Pro Lys Thr Gly Asp Thr
1               5

<210> SEQ ID NO 74
<211> LENGTH: 8
<212> TYPE: PRT
<213> ORGANISM: Artificial Sequence
<220> FEATURE:
<223> OTHER INFORMATION: antibody heavy chain CDR3

<400> SEQUENCE: 74

Thr Arg Phe Tyr Ser Tyr Thr Tyr
1               5

<210> SEQ ID NO 75
<211> LENGTH: 11
<212> TYPE: PRT
<213> ORGANISM: Artificial Sequence
<220> FEATURE:
<223> OTHER INFORMATION: antibody light chain CDR1

<400> SEQUENCE: 75

Gln Ser Leu Val His Ser Asn Arg Asn Thr Tyr
1               5                   10
```

<210> SEQ ID NO 76
<211> LENGTH: 11
<212> TYPE: PRT
<213> ORGANISM: Artificial Sequence
<220> FEATURE:
<223> OTHER INFORMATION: antibody light chain CDR1

<400> SEQUENCE: 76

Gln Ser Leu Val His Ser Asn Arg Asn Thr Tyr
1               5                   10

<210> SEQ ID NO 77
<211> LENGTH: 9
<212> TYPE: PRT
<213> ORGANISM: Artificial Sequence
<220> FEATURE:
<223> OTHER INFORMATION: antibody light chain CDR3

<400> SEQUENCE: 77

Ser Gln Asn Thr His Val Pro Pro Thr
1               5

<210> SEQ ID NO 78
<211> LENGTH: 116
<212> TYPE: PRT
<213> ORGANISM: Artificial Sequence
<220> FEATURE:
<223> OTHER INFORMATION: antibody heavy chain variable region

<400> SEQUENCE: 78

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
                20                  25                  30

Glu Met His Trp Val Arg Gln Ala Pro Gly Gln Gly Leu Glu Trp Met
            35                  40                  45

Gly Ala Leu Asp Pro Lys Thr Gly Asp Thr Ala Tyr Ser Gln Lys Phe
        50                  55                  60

Lys Gly Arg Val Thr Leu Thr Ala Asp Lys Ser Thr Ser Thr Ala Tyr
65                  70                  75                  80

Met Glu Leu Ser Ser Leu Thr Ser Glu Asp Thr Ala Val Tyr Tyr Cys
                85                  90                  95

Thr Arg Phe Tyr Ser Tyr Thr Tyr Trp Gly Gln Gly Thr Leu Val Thr
            100                 105                 110

Leu Val Ser Ser
        115

<210> SEQ ID NO 79
<211> LENGTH: 112
<212> TYPE: PRT
<213> ORGANISM: Artificial Sequence
<220> FEATURE:
<223> OTHER INFORMATION: antibody light chain variable region

<400> SEQUENCE: 79

Asp Val Val Met Thr Gln Ser Pro Leu Ser Leu Pro Val Thr Pro Gly
1               5                   10                  15

Glu Pro Ala Ser Ile Ser Cys Arg Ser Ser Gln Ser Leu Val His Ser
                20                  25                  30

Asn Arg Asn Thr Tyr Leu His Trp Tyr Leu Gln Lys Pro Gly Gln Ser
            35                  40                  45

Pro Gln Leu Leu Ile Tyr Lys Val Ser Asn Arg Phe Ser Gly Val Pro
50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Ser Gln Asn
                85                  90                  95

Thr His Val Pro Pro Thr Phe Gly Gln Gly Thr Lys Leu Glu Ile Lys
                100                 105                 110

<210> SEQ ID NO 80
<211> LENGTH: 445
<212> TYPE: PRT
<213> ORGANISM: Artificial Sequence
<220> FEATURE:
<223> OTHER INFORMATION: antibody heavy chain

<400> SEQUENCE: 80

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
                20                  25                  30

Glu Met His Trp Val Arg Gln Ala Pro Gly Gln Gly Leu Glu Trp Met
            35                  40                  45

Gly Ala Leu Asp Pro Lys Thr Gly Asp Thr Ala Tyr Ser Gln Lys Phe
    50                  55                  60

Lys Gly Arg Val Thr Leu Thr Ala Asp Lys Ser Thr Ser Thr Ala Tyr
65                  70                  75                  80

Met Glu Leu Ser Ser Leu Thr Ser Glu Asp Thr Ala Val Tyr Tyr Cys
                85                  90                  95

Thr Arg Phe Tyr Ser Tyr Thr Tyr Trp Gly Gln Gly Thr Leu Val Thr
                100                 105                 110

Val Ser Ser Ala Ser Thr Lys Gly Pro Ser Val Phe Pro Leu Ala Pro
            115                 120                 125

Ser Ser Lys Ser Thr Ser Gly Gly Thr Ala Ala Leu Gly Cys Leu Val
    130                 135                 140

Lys Asp Tyr Phe Pro Glu Pro Val Thr Val Ser Trp Asn Ser Gly Ala
145                 150                 155                 160

Leu Thr Ser Gly Val His Thr Phe Pro Ala Val Leu Gln Ser Ser Gly
                165                 170                 175

Leu Tyr Ser Leu Ser Ser Val Val Thr Val Pro Ser Ser Ser Leu Gly
            180                 185                 190

Thr Gln Thr Tyr Ile Cys Asn Val Asn His Lys Pro Ser Asn Thr Lys
        195                 200                 205

Val Asp Lys Lys Val Glu Pro Lys Ser Cys Asp Lys Thr His Thr Cys
    210                 215                 220

Pro Pro Cys Pro Ala Pro Glu Leu Leu Gly Gly Pro Ser Val Phe Leu
225                 230                 235                 240

Phe Pro Pro Lys Pro Lys Asp Thr Leu Met Ile Ser Arg Thr Pro Glu
                245                 250                 255

Val Thr Cys Val Val Val Asp Val Ser His Glu Asp Pro Glu Val Lys
            260                 265                 270

Phe Asn Trp Tyr Val Asp Gly Val Glu Val His Asn Ala Lys Thr Lys
        275                 280                 285

Pro Arg Glu Glu Gln Tyr Asn Ser Thr Tyr Arg Val Val Ser Val Leu
    290                 295                 300

Thr Val Leu His Gln Asp Trp Leu Asn Gly Lys Glu Tyr Lys Cys Lys
305                 310                 315                 320

Val Ser Asn Lys Ala Leu Pro Ala Pro Ile Glu Lys Thr Ile Ser Lys
            325                 330                 335

Ala Lys Gly Gln Pro Arg Glu Pro Gln Val Tyr Thr Leu Pro Pro Ser
        340                 345                 350

Arg Asp Glu Leu Thr Lys Asn Gln Val Ser Leu Thr Cys Leu Val Lys
    355                 360                 365

Gly Phe Tyr Pro Ser Asp Ile Ala Val Glu Trp Glu Ser Asn Gly Gln
370                 375                 380

Pro Glu Asn Asn Tyr Lys Thr Thr Pro Pro Val Leu Asp Ser Asp Gly
385                 390                 395                 400

Ser Phe Phe Leu Tyr Ser Lys Leu Thr Val Asp Lys Ser Arg Trp Gln
            405                 410                 415

Gln Gly Asn Val Phe Ser Cys Ser Val Met His Glu Ala Leu His Asn
        420                 425                 430

His Tyr Thr Gln Lys Ser Leu Ser Leu Ser Pro Gly Lys
    435                 440                 445

<210> SEQ ID NO 81
<211> LENGTH: 442
<212> TYPE: PRT
<213> ORGANISM: Artificial Sequence
<220> FEATURE:
<223> OTHER INFORMATION: antibody heavy chain

<400> SEQUENCE: 81

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Glu Met His Trp Val Arg Gln Ala Pro Gly Gln Gly Leu Glu Trp Met
        35                  40                  45

Gly Ala Leu Asp Pro Lys Thr Gly Asp Thr Ala Tyr Ser Gln Lys Phe
    50                  55                  60

Lys Gly Arg Val Thr Leu Thr Ala Asp Lys Ser Thr Ser Thr Ala Tyr
65                  70                  75                  80

Met Glu Leu Ser Ser Leu Thr Ser Glu Asp Thr Ala Val Tyr Tyr Cys
            85                  90                  95

Thr Arg Phe Tyr Ser Tyr Thr Tyr Trp Gly Gln Gly Thr Leu Val Thr
        100                 105                 110

Leu Val Ser Ser Ala Ser Thr Lys Gly Pro Ser Val Phe Pro Leu Ala
    115                 120                 125

Pro Cys Ser Arg Ser Thr Ser Glu Ser Thr Ala Ala Leu Gly Cys Leu
130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
            165                 170                 175

Gly Leu Tyr Ser Leu Ser Ser Val Val Thr Val Pro Ser Ser Ser Leu
        180                 185                 190

Gly Thr Lys Thr Tyr Thr Cys Asn Val Asp His Lys Pro Ser Asn Thr
    195                 200                 205

Lys Val Asp Lys Arg Val Glu Ser Lys Tyr Gly Pro Pro Cys Pro Pro
210                 215                 220

Cys Pro Ala Pro Glu Ala Ala Gly Gly Pro Ser Val Phe Leu Phe Pro
225                 230                 235                 240

Pro Lys Pro Lys Asp Thr Leu Met Ile Ser Arg Thr Pro Glu Val Thr
        245                 250                 255

Cys Val Val Val Asp Val Ser Gln Glu Asp Pro Glu Val Gln Phe Asn
            260                 265                 270

Trp Tyr Val Asp Gly Val Glu Val His Asn Ala Lys Thr Lys Pro Arg
        275                 280                 285

Glu Glu Gln Phe Asn Ser Thr Tyr Arg Val Val Ser Val Leu Thr Val
290                 295                 300

Leu His Gln Asp Trp Leu Asn Gly Lys Glu Tyr Lys Cys Lys Val Ser
305                 310                 315                 320

Asn Lys Gly Leu Pro Ser Ser Ile Glu Lys Thr Ile Ser Lys Ala Lys
            325                 330                 335

Gly Gln Pro Arg Glu Pro Gln Val Tyr Thr Leu Pro Pro Ser Gln Glu
            340                 345                 350

Glu Met Thr Lys Asn Gln Val Ser Leu Thr Cys Leu Val Lys Gly Phe
        355                 360                 365

Tyr Pro Ser Asp Ile Ala Val Glu Trp Glu Ser Asn Gly Gln Pro Glu
        370                 375                 380

Asn Asn Tyr Lys Thr Thr Pro Pro Val Leu Asp Ser Asp Gly Ser Phe
385                 390                 395                 400

Phe Leu Tyr Ser Arg Leu Thr Val Asp Lys Ser Arg Trp Gln Glu Gly
                405                 410                 415

Asn Val Phe Ser Cys Ser Val Met His Glu Ala Leu His Asn His Tyr
            420                 425                 430

Thr Gln Lys Ser Leu Ser Leu Ser Leu Gly
        435                 440

<210> SEQ ID NO 82
<211> LENGTH: 219
<212> TYPE: PRT
<213> ORGANISM: Artificial Sequence
<220> FEATURE:
<223> OTHER INFORMATION: antibody light chain

<400> SEQUENCE: 82

Asp Val Val Met Thr Gln Ser Pro Leu Ser Leu Pro Val Thr Pro Gly
1               5                   10                  15

Glu Pro Ala Ser Ile Ser Cys Arg Ser Ser Gln Ser Leu Val His Ser
            20                  25                  30

Asn Arg Asn Thr Tyr Leu His Trp Tyr Leu Gln Lys Pro Gly Gln Ser
        35                  40                  45

Pro Gln Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Ser Gln Asn
                85                  90                  95

Thr His Val Pro Pro Thr Phe Gly Gln Gly Thr Lys Leu Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

```
Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
            195                 200                 205

Pro Val Thr Lys Ser Phe Asn Arg Gly Glu Cys
    210                 215
```

<210> SEQ ID NO 83
<211> LENGTH: 615
<212> TYPE: PRT
<213> ORGANISM: Artificial Sequence
<220> FEATURE:
<223> OTHER INFORMATION: fusion protein

<400> SEQUENCE: 83

```
Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
                20                  25                  30

Val Val Gly Arg Ala Gly Asn Val Gly Leu Arg Glu Asp Lys Asp Pro
            35                  40                  45

Pro Lys Met Trp Ala Thr Ile Tyr Glu Leu Lys Glu Asp Lys Ser Tyr
    50                  55                  60

Asp Val Thr Asn Val Arg Phe Ala Arg Lys Lys Cys Thr Tyr Ser Ile
65                  70                  75                  80

Gly Thr Phe Val Pro Gly Ser Gln Pro Gly Glu Phe Thr Leu Gly Gln
                85                  90                  95

Ile Lys Ser Glu Pro Gly Gly Thr Ala Asn Leu Val Arg Val Val Ser
                100                 105                 110

Thr Asn Tyr Asn Gln His Ala Met Val Phe Phe Lys Glu Val Tyr Gln
            115                 120                 125

Asn Arg Glu Ile Phe Phe Ile Ile Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly Gly Gly Gly Ser Gly Gly Gly Ser Gly Gly Gly Gly
                180                 185                 190

Ser Glu Ser Lys Tyr Gly Pro Pro Cys Pro Cys Pro Ala Pro Glu
            195                 200                 205

Ala Ala Gly Gly Pro Ser Val Phe Leu Phe Pro Pro Lys Pro Lys Asp
    210                 215                 220

Thr Leu Met Ile Ser Arg Thr Pro Glu Val Thr Cys Val Val Val Asp
225                 230                 235                 240

Val Ser Gln Glu Asp Pro Glu Val Gln Phe Asn Trp Tyr Val Asp Gly
                245                 250                 255

Val Glu Val His Asn Ala Lys Thr Lys Pro Arg Glu Glu Gln Phe Asn
            260                 265                 270

Ser Thr Tyr Arg Val Val Ser Val Leu Thr Val Leu His Gln Asp Trp
    275                 280                 285
```

Leu Asn Gly Lys Glu Tyr Lys Cys Lys Val Ser Asn Lys Gly Leu Pro
            290                 295                 300

Ser Ser Ile Glu Lys Thr Ile Ser Lys Ala Lys Gly Gln Pro Arg Glu
305                 310                 315                 320

Pro Gln Val Tyr Thr Leu Pro Pro Ser Gln Glu Glu Met Thr Lys Asn
                325                 330                 335

Gln Val Ser Leu Thr Cys Leu Val Lys Gly Phe Tyr Pro Ser Asp Ile
            340                 345                 350

Ala Val Glu Trp Glu Ser Asn Gly Gln Pro Glu Asn Asn Tyr Lys Thr
        355                 360                 365

Thr Pro Pro Val Leu Asp Ser Asp Gly Ser Phe Phe Leu Tyr Ser Arg
370                 375                 380

Leu Thr Val Asp Lys Ser Arg Trp Gln Glu Gly Asn Val Phe Ser Cys
385                 390                 395                 400

Ser Val Met His Glu Ala Leu His Asn His Tyr Thr Gln Lys Ser Leu
                405                 410                 415

Ser Leu Ser Leu Gly Lys Gly Gly Gly Ser Gly Gly Gly Gly Ser
            420                 425                 430

Gly Gly Gly Gly Ser Gln Asp Ser Thr Ser Asp Leu Ile Pro Ala Pro
        435                 440                 445

Pro Leu Ser Lys Val Pro Leu Gln Gln Asn Phe Gln Asp Asn Gln Phe
450                 455                 460

His Gly Lys Trp Tyr Val Val Gly Gln Ala Gly Asn Ile Arg Leu Arg
465                 470                 475                 480

Glu Asp Lys Asp Pro Ile Lys Met Met Ala Thr Ile Tyr Glu Leu Lys
                485                 490                 495

Glu Asp Lys Ser Tyr Asp Val Thr Met Val Lys Phe Asp Asp Lys Lys
            500                 505                 510

Cys Met Tyr Asp Ile Trp Thr Phe Val Pro Gly Ser Gln Pro Gly Glu
        515                 520                 525

Phe Thr Leu Gly Lys Ile Lys Ser Phe Pro Gly His Thr Ser Ser Leu
530                 535                 540

Val Arg Val Val Ser Thr Asn Tyr Asn Gln His Ala Met Val Phe Phe
545                 550                 555                 560

Lys Phe Val Phe Gln Asn Arg Glu Glu Phe Tyr Ile Thr Leu Tyr Gly
                565                 570                 575

Arg Thr Lys Glu Leu Thr Ser Glu Leu Lys Glu Asn Phe Ile Arg Phe
            580                 585                 590

Ser Lys Ser Leu Gly Leu Pro Glu Asn His Ile Val Phe Pro Val Pro
        595                 600                 605

Ile Asp Gln Cys Ile Asp Gly
    610                 615

<210> SEQ ID NO 84
<211> LENGTH: 610
<212> TYPE: PRT
<213> ORGANISM: Artificial Sequence
<220> FEATURE:
<223> OTHER INFORMATION: fusion protein

<400> SEQUENCE: 84

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
            20                  25                  30

```
Val Val Gly Arg Ala Gly Asn Val Gly Leu Arg Glu Asp Lys Asp Pro
            35                  40                  45

Pro Lys Met Trp Ala Thr Ile Tyr Glu Leu Lys Glu Asp Lys Ser Tyr
 50                  55                  60

Asp Val Thr Asn Val Arg Phe Ala Arg Lys Lys Cys Thr Tyr Ser Ile
 65                  70                  75                  80

Gly Thr Phe Val Pro Gly Ser Gln Pro Gly Glu Phe Thr Leu Gly Gln
                 85                  90                  95

Ile Lys Ser Glu Pro Gly Gly Thr Ala Asn Leu Val Arg Val Val Ser
                100                 105                 110

Thr Asn Tyr Asn Gln His Ala Met Val Phe Phe Lys Glu Val Tyr Gln
            115                 120                 125

Asn Arg Glu Ile Phe Phe Ile Ile Leu Tyr Gly Arg Thr Lys Glu Leu
130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly Gly Gly Gly Gly Ser Gly Gly Gly Ser Gln Asp Ser Thr
                180                 185                 190

Ser Asp Leu Ile Pro Ala Pro Pro Leu Ser Lys Val Pro Leu Gln Gln
            195                 200                 205

Asn Phe Gln Asp Asn Gln Phe His Gly Lys Trp Tyr Val Val Gly Gln
            210                 215                 220

Ala Gly Asn Ile Arg Leu Arg Glu Asp Lys Asp Pro Ile Lys Met Met
225                 230                 235                 240

Ala Thr Ile Tyr Glu Leu Lys Glu Asp Lys Ser Tyr Asp Val Thr Met
                245                 250                 255

Val Lys Phe Asp Asp Lys Lys Cys Met Tyr Asp Ile Trp Thr Phe Val
                260                 265                 270

Pro Gly Ser Gln Pro Gly Glu Phe Thr Leu Gly Lys Ile Lys Ser Phe
            275                 280                 285

Pro Gly His Thr Ser Ser Leu Val Arg Val Val Ser Thr Asn Tyr Asn
290                 295                 300

Gln His Ala Met Val Phe Phe Lys Phe Val Phe Gln Asn Arg Glu Glu
305                 310                 315                 320

Phe Tyr Ile Thr Leu Tyr Gly Arg Thr Lys Glu Leu Thr Ser Glu Leu
                325                 330                 335

Lys Glu Asn Phe Ile Arg Phe Ser Lys Ser Leu Gly Leu Pro Glu Asn
            340                 345                 350

His Ile Val Phe Pro Val Pro Ile Asp Gln Cys Ile Asp Gly Gly Gly
            355                 360                 365

Gly Gly Ser Gly Gly Gly Ser Gly Gly Gly Ser Glu Ser Lys
            370                 375                 380

Tyr Gly Pro Pro Cys Pro Pro Cys Pro Ala Pro Glu Ala Ala Gly Gly
385                 390                 395                 400

Pro Ser Val Phe Leu Phe Pro Pro Lys Pro Lys Asp Thr Leu Met Ile
                405                 410                 415

Ser Arg Thr Pro Glu Val Thr Cys Val Val Asp Val Ser Gln Glu
            420                 425                 430

Asp Pro Glu Val Gln Phe Asn Trp Tyr Val Asp Gly Val Glu Val His
            435                 440                 445

Asn Ala Lys Thr Lys Pro Arg Glu Glu Gln Phe Asn Ser Thr Tyr Arg
```

```
                450               455               460
Val Val Ser Val Leu Thr Val Leu His Gln Asp Trp Leu Asn Gly Lys
465                     470                 475                 480

Glu Tyr Lys Cys Lys Val Ser Asn Lys Gly Leu Pro Ser Ser Ile Glu
                    485                 490                 495

Lys Thr Ile Ser Lys Ala Lys Gly Gln Pro Arg Glu Pro Gln Val Tyr
                500                 505                 510

Thr Leu Pro Pro Ser Gln Glu Glu Met Thr Lys Asn Gln Val Ser Leu
            515                 520                 525

Thr Cys Leu Val Lys Gly Phe Tyr Pro Ser Asp Ile Ala Val Glu Trp
530                 535                 540

Glu Ser Asn Gly Gln Pro Glu Asn Asn Tyr Lys Thr Thr Pro Pro Val
545                 550                 555                 560

Leu Asp Ser Asp Gly Ser Phe Phe Leu Tyr Ser Arg Leu Thr Val Asp
                565                 570                 575

Lys Ser Arg Trp Gln Glu Gly Asn Val Phe Ser Cys Ser Val Met His
                580                 585                 590

Glu Ala Leu His Asn His Tyr Thr Gln Lys Ser Leu Ser Leu Ser Leu
                595                 600                 605

Gly Lys
    610

<210> SEQ ID NO 85
<211> LENGTH: 366
<212> TYPE: PRT
<213> ORGANISM: Artificial Sequence
<220> FEATURE:
<223> OTHER INFORMATION: fusion protein

<400> SEQUENCE: 85

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
            20                  25                  30

Val Val Gly Val Ala Gly Asn Gly Met Leu Arg Glu Asp Lys Asp Pro
        35                  40                  45

Leu Lys Met Arg Ala Thr Ile Tyr Glu Leu Lys Glu Asp Lys Ser Tyr
50                  55                  60

Asp Val Thr Ser Val Ala Phe Arg Asn Lys Lys Cys His Tyr Lys Ile
65                  70                  75                  80

Gly Thr Phe Val Pro Gly Ser Gln Pro Gly Glu Phe Thr Leu Gly Gln
                85                  90                  95

Ile Lys Ser Gly Pro Gly Glu Thr Ser Asn Leu Val Arg Val Val Ser
            100                 105                 110

Thr Asn Tyr Asn Gln His Ala Met Val Phe Phe Lys Glu Val Arg Gln
        115                 120                 125

Asn Arg Glu Trp Phe Phe Ile Thr Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly Gly Gly Gly Ser Gly Gly Gly Gly Ser Gln Asp Ser Thr
            180                 185                 190

Ser Asp Leu Ile Pro Ala Pro Pro Leu Ser Lys Val Pro Leu Gln Gln
```

195                 200                 205
Asn Phe Gln Asp Asn Gln Phe His Gly Lys Trp Tyr Val Val Gly Gln
    210                 215                 220

Ala Gly Asn Ile Arg Leu Arg Glu Asp Lys Asp Pro Ile Lys Met Met
225                 230                 235                 240

Ala Thr Ile Tyr Glu Leu Lys Glu Asp Lys Ser Tyr Asp Val Thr Met
                245                 250                 255

Val Lys Phe Asp Asp Lys Lys Cys Met Tyr Asp Ile Trp Thr Phe Val
                260                 265                 270

Pro Gly Ser Gln Pro Gly Glu Phe Thr Leu Gly Lys Ile Lys Ser Phe
            275                 280                 285

Pro Gly His Thr Ser Ser Leu Val Arg Val Val Ser Thr Asn Tyr Asn
    290                 295                 300

Gln His Ala Met Val Phe Phe Lys Phe Val Phe Gln Asn Arg Glu Glu
305                 310                 315                 320

Phe Tyr Ile Thr Leu Tyr Gly Arg Thr Lys Glu Leu Thr Ser Glu Leu
                325                 330                 335

Lys Glu Asn Phe Ile Arg Phe Ser Lys Ser Leu Gly Leu Pro Glu Asn
                340                 345                 350

His Ile Val Phe Pro Val Pro Ile Asp Gln Cys Ile Asp Gly
            355                 360                 365

<210> SEQ ID NO 86
<211> LENGTH: 554
<212> TYPE: PRT
<213> ORGANISM: Artificial Sequence
<220> FEATURE:
<223> OTHER INFORMATION: fusion protein

<400> SEQUENCE: 86

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
                20                  25                  30

Val Val Gly Val Ala Gly Asn Gly Met Leu Arg Glu Asp Lys Asp Pro
            35                  40                  45

Leu Lys Met Arg Ala Thr Ile Tyr Glu Leu Lys Glu Asp Lys Ser Tyr
50                  55                  60

Asp Val Thr Ser Val Ala Phe Arg Asn Lys Lys Cys His Tyr Lys Ile
65                  70                  75                  80

Gly Thr Phe Val Pro Gly Ser Gln Pro Gly Glu Phe Thr Leu Gly Gln
                85                  90                  95

Ile Lys Ser Gly Pro Gly Glu Thr Ser Asn Leu Val Arg Val Val Ser
            100                 105                 110

Thr Asn Tyr Asn Gln His Ala Met Val Phe Phe Lys Glu Val Arg Gln
        115                 120                 125

Asn Arg Glu Trp Phe Phe Ile Thr Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly Gly Gly Gly Ser Gly Gly Gly Ser Gln Asp Ser Thr
            180                 185                 190

Ser Asp Leu Ile Pro Ala Pro Pro Leu Ser Lys Val Pro Leu Gln Gln

```
                    195                 200                 205
Asn Phe Gln Asp Asn Gln Phe His Gly Lys Trp Tyr Val Val Gly Gln
210                 215                 220

Ala Gly Asn Ile Arg Leu Arg Glu Asp Lys Asp Pro Ile Lys Met Met
225                 230                 235                 240

Ala Thr Ile Tyr Glu Leu Lys Glu Asp Lys Ser Tyr Asp Val Thr Met
                    245                 250                 255

Val Lys Phe Asp Asp Lys Lys Cys Met Tyr Asp Ile Trp Thr Phe Val
                260                 265                 270

Pro Gly Ser Gln Pro Gly Glu Phe Thr Leu Gly Lys Ile Lys Ser Phe
            275                 280                 285

Pro Gly His Thr Ser Ser Leu Val Arg Val Val Ser Thr Asn Tyr Asn
290                 295                 300

Gln His Ala Met Val Phe Phe Lys Phe Val Phe Gln Asn Arg Glu Glu
305                 310                 315                 320

Phe Tyr Ile Thr Leu Tyr Gly Arg Thr Lys Glu Leu Thr Ser Glu Leu
                    325                 330                 335

Lys Glu Asn Phe Ile Arg Phe Ser Lys Ser Leu Gly Leu Pro Glu Asn
                340                 345                 350

His Ile Val Phe Pro Val Pro Ile Asp Gln Cys Ile Asp Gly Gly Gly
            355                 360                 365

Gly Gly Ser Gly Gly Gly Ser Gln Asp Ser Thr Ser Asp Leu Ile
370                 375                 380

Pro Ala Pro Pro Leu Ser Lys Val Pro Leu Gln Gln Asn Phe Gln Asp
385                 390                 395                 400

Asn Gln Phe His Gly Lys Trp Tyr Val Val Gly Gln Ala Gly Asn Ile
                    405                 410                 415

Arg Leu Arg Glu Asp Lys Asp Pro Ile Lys Met Met Ala Thr Ile Tyr
                420                 425                 430

Glu Leu Lys Glu Asp Lys Ser Tyr Asp Val Thr Met Val Lys Phe Asp
            435                 440                 445

Asp Lys Lys Cys Met Tyr Asp Ile Trp Thr Phe Val Pro Gly Ser Gln
450                 455                 460

Pro Gly Glu Phe Thr Leu Gly Lys Ile Lys Ser Phe Pro Gly His Thr
465                 470                 475                 480

Ser Ser Leu Val Arg Val Val Ser Thr Asn Tyr Asn Gln His Ala Met
                    485                 490                 495

Val Phe Phe Lys Phe Val Phe Gln Asn Arg Glu Glu Phe Tyr Ile Thr
                500                 505                 510

Leu Tyr Gly Arg Thr Lys Glu Leu Thr Ser Glu Leu Lys Glu Asn Phe
            515                 520                 525

Ile Arg Phe Ser Lys Ser Leu Gly Leu Pro Glu Asn His Ile Val Phe
530                 535                 540

Pro Val Pro Ile Asp Gln Cys Ile Asp Gly
545                 550

<210> SEQ ID NO 87
<211> LENGTH: 635
<212> TYPE: PRT
<213> ORGANISM: Artificial Sequence
<220> FEATURE:
<223> OTHER INFORMATION: fusion protein

<400> SEQUENCE: 87

Gln Val Gln Leu Val Gln Ser Gly Ala Glu Val Lys Lys Pro Gly Ala
```

-continued

```
1               5                   10                  15
Ser Val Lys Val Ser Cys Lys Ala Ser Gly Tyr Thr Phe Thr Asp Tyr
            20                  25                  30
Glu Met His Trp Val Arg Gln Ala Pro Gly Gln Gly Leu Glu Trp Met
            35                  40                  45
Gly Ala Leu Asp Pro Lys Thr Gly Asp Thr Ala Tyr Ser Gln Lys Phe
 50                  55                  60
Lys Gly Arg Val Thr Leu Thr Ala Asp Lys Ser Thr Ser Thr Ala Tyr
 65                  70                  75                  80
Met Glu Leu Ser Ser Leu Thr Ser Glu Asp Thr Ala Val Tyr Tyr Cys
                85                  90                  95
Thr Arg Phe Tyr Ser Tyr Thr Tyr Trp Gly Gln Gly Thr Leu Val Thr
                100                 105                 110
Leu Val Ser Ser Ala Ser Thr Lys Gly Pro Ser Val Phe Pro Leu Ala
                115                 120                 125
Pro Cys Ser Arg Ser Thr Ser Glu Ser Thr Ala Ala Leu Gly Cys Leu
 130                 135                 140
Val Lys Asp Tyr Phe Pro Glu Pro Val Thr Val Ser Trp Asn Ser Gly
 145                 150                 155                 160
Ala Leu Thr Ser Gly Val His Thr Phe Pro Ala Val Leu Gln Ser Ser
                165                 170                 175
Gly Leu Tyr Ser Leu Ser Ser Val Val Thr Val Pro Ser Ser Ser Leu
                180                 185                 190
Gly Thr Lys Thr Tyr Thr Cys Asn Val Asp His Lys Pro Ser Asn Thr
                195                 200                 205
Lys Val Asp Lys Arg Val Glu Ser Lys Tyr Gly Pro Pro Cys Pro Pro
 210                 215                 220
Cys Pro Ala Pro Glu Ala Ala Gly Gly Pro Ser Val Phe Leu Phe Pro
 225                 230                 235                 240
Pro Lys Pro Lys Asp Thr Leu Met Ile Ser Arg Thr Pro Glu Val Thr
                245                 250                 255
Cys Val Val Val Asp Val Ser Gln Glu Asp Pro Glu Val Gln Phe Asn
                260                 265                 270
Trp Tyr Val Asp Gly Val Glu Val His Asn Ala Lys Thr Lys Pro Arg
                275                 280                 285
Glu Glu Gln Phe Asn Ser Thr Tyr Arg Val Val Ser Val Leu Thr Val
 290                 295                 300
Leu His Gln Asp Trp Leu Asn Gly Lys Glu Tyr Lys Cys Lys Val Ser
 305                 310                 315                 320
Asn Lys Gly Leu Pro Ser Ser Ile Glu Lys Thr Ile Ser Lys Ala Lys
                325                 330                 335
Gly Gln Pro Arg Glu Pro Gln Val Tyr Thr Leu Pro Pro Ser Gln Glu
                340                 345                 350
Glu Met Thr Lys Asn Gln Val Ser Leu Thr Cys Leu Val Lys Gly Phe
                355                 360                 365
Tyr Pro Ser Asp Ile Ala Val Glu Trp Glu Ser Asn Gly Gln Pro Glu
                370                 375                 380
Asn Asn Tyr Lys Thr Thr Pro Pro Val Leu Asp Ser Asp Gly Ser Phe
 385                 390                 395                 400
Phe Leu Tyr Ser Arg Leu Thr Val Asp Lys Ser Arg Trp Gln Glu Gly
                405                 410                 415
Asn Val Phe Ser Cys Ser Val Met His Glu Ala Leu His Asn His Tyr
                420                 425                 430
```

-continued

```
Thr Gln Lys Ser Leu Ser Leu Ser Leu Gly Gly Gly Gly Ser Gly
        435                 440                 445
Gly Gly Gly Ser Gly Gly Gly Ser Gln Asp Ser Thr Ser Asp Leu
    450                 455                 460
Ile Pro Ala Pro Leu Ser Lys Val Pro Leu Gln Gln Asn Phe Gln
465                 470                 475                 480
Asp Asn Gln Phe His Gly Lys Trp Tyr Val Gly Gln Ala Gly Asn
                485                 490                 495
Ile Arg Leu Arg Glu Asp Lys Asp Pro Ile Lys Met Met Ala Thr Ile
                500                 505                 510
Tyr Glu Leu Lys Glu Asp Lys Ser Tyr Asp Val Thr Met Val Lys Phe
                515                 520                 525
Asp Asp Lys Lys Cys Met Tyr Asp Ile Trp Thr Phe Val Pro Gly Ser
                530                 535                 540
Gln Pro Gly Glu Phe Thr Leu Gly Lys Ile Lys Ser Phe Pro Gly His
545                 550                 555                 560
Thr Ser Ser Leu Val Arg Val Val Ser Thr Asn Tyr Asn Gln His Ala
                565                 570                 575
Met Val Phe Phe Lys Phe Val Phe Gln Asn Arg Glu Glu Phe Tyr Ile
                580                 585                 590
Thr Leu Tyr Gly Arg Thr Lys Glu Leu Thr Ser Glu Leu Lys Glu Asn
                595                 600                 605
Phe Ile Arg Phe Ser Lys Ser Leu Gly Leu Pro Glu Asn His Ile Val
                610                 615                 620
Phe Pro Val Pro Ile Asp Gln Cys Ile Asp Gly
625                 630                 635

<210> SEQ ID NO 88
<211> LENGTH: 828
<212> TYPE: PRT
<213> ORGANISM: Artificial Sequence
<220> FEATURE:
<223> OTHER INFORMATION: fusion protein

<400> SEQUENCE: 88

Gln Asp Ser Thr Ser Asp Leu Ile Pro Ala Pro Leu Ser Lys Val
1               5                   10                  15
Pro Leu Gln Gln Asn Phe Gln Asp Asn Gln Phe His Gly Lys Trp Tyr
                20                  25                  30
Val Val Gly Gln Ala Gly Asn Ile Arg Leu Arg Glu Asp Lys Asp Pro
            35                  40                  45
Ile Lys Met Met Ala Thr Ile Tyr Glu Leu Lys Glu Asp Lys Ser Tyr
50                  55                  60
Asp Val Thr Met Val Lys Phe Asp Lys Lys Cys Met Tyr Asp Ile
65                  70                  75                  80
Trp Thr Phe Val Pro Gly Ser Gln Pro Gly Glu Phe Thr Leu Gly Lys
                85                  90                  95
Ile Lys Ser Phe Pro Gly His Thr Ser Ser Leu Val Arg Val Val Ser
                100                 105                 110
Thr Asn Tyr Asn Gln His Ala Met Val Phe Phe Lys Phe Val Phe Gln
            115                 120                 125
Asn Arg Glu Glu Phe Tyr Ile Thr Leu Tyr Gly Arg Thr Lys Glu Leu
    130                 135                 140
Thr Ser Glu Leu Lys Glu Asn Phe Ile Arg Phe Ser Lys Ser Leu Gly
145                 150                 155                 160
```

```
Leu Pro Glu Asn His Ile Val Phe Pro Val Pro Ile Asp Gln Cys Ile
                165                 170                 175

Asp Gly Gly Gly Gly Ser Gly Gly Gly Ser Gly Gly Gly Gly
            180                 185                 190

Ser Gln Val Gln Leu Val Gln Ser Gly Ala Glu Val Lys Lys Pro Gly
                195                 200                 205

Ala Ser Val Lys Val Ser Cys Lys Ala Ser Gly Tyr Thr Phe Thr Asp
            210                 215                 220

Tyr Glu Met His Trp Val Arg Gln Ala Pro Gly Gln Gly Leu Glu Trp
225                 230                 235                 240

Met Gly Ala Leu Asp Pro Lys Thr Gly Asp Thr Ala Tyr Ser Gln Lys
                245                 250                 255

Phe Lys Gly Arg Val Thr Leu Thr Ala Asp Lys Ser Thr Ser Thr Ala
                260                 265                 270

Tyr Met Glu Leu Ser Ser Leu Thr Ser Glu Asp Thr Ala Val Tyr Tyr
                275                 280                 285

Cys Thr Arg Phe Tyr Ser Tyr Thr Tyr Trp Gly Gln Gly Thr Leu Val
            290                 295                 300

Thr Leu Val Ser Ser Ala Ser Thr Lys Gly Pro Ser Val Phe Pro Leu
305                 310                 315                 320

Ala Pro Cys Ser Arg Ser Thr Ser Glu Ser Thr Ala Ala Leu Gly Cys
                325                 330                 335

Leu Val Lys Asp Tyr Phe Pro Glu Pro Val Thr Val Ser Trp Asn Ser
            340                 345                 350

Gly Ala Leu Thr Ser Gly Val His Thr Phe Pro Ala Val Leu Gln Ser
                355                 360                 365

Ser Gly Leu Tyr Ser Leu Ser Ser Val Val Thr Val Pro Ser Ser Ser
            370                 375                 380

Leu Gly Thr Lys Thr Tyr Thr Cys Asn Val Asp His Lys Pro Ser Asn
385                 390                 395                 400

Thr Lys Val Asp Lys Arg Val Glu Ser Lys Tyr Gly Pro Pro Cys Pro
                405                 410                 415

Pro Cys Pro Ala Pro Glu Ala Ala Gly Gly Pro Ser Val Phe Leu Phe
            420                 425                 430

Pro Pro Lys Pro Lys Asp Thr Leu Met Ile Ser Arg Thr Pro Glu Val
            435                 440                 445

Thr Cys Val Val Val Asp Val Ser Gln Glu Asp Pro Glu Val Gln Phe
            450                 455                 460

Asn Trp Tyr Val Asp Gly Val Glu Val His Asn Ala Lys Thr Lys Pro
465                 470                 475                 480

Arg Glu Glu Gln Phe Asn Ser Thr Tyr Arg Val Val Ser Val Leu Thr
                485                 490                 495

Val Leu His Gln Asp Trp Leu Asn Gly Lys Glu Tyr Lys Cys Lys Val
            500                 505                 510

Ser Asn Lys Gly Leu Pro Ser Ser Ile Glu Lys Thr Ile Ser Lys Ala
            515                 520                 525

Lys Gly Gln Pro Arg Glu Pro Gln Val Tyr Thr Leu Pro Pro Ser Gln
            530                 535                 540

Glu Glu Met Thr Lys Asn Gln Val Ser Leu Thr Cys Leu Val Lys Gly
545                 550                 555                 560

Phe Tyr Pro Ser Asp Ile Ala Val Glu Trp Glu Ser Asn Gly Gln Pro
                565                 570                 575
```

```
Glu Asn Asn Tyr Lys Thr Thr Pro Pro Val Leu Asp Ser Asp Gly Ser
                580                 585                 590

Phe Phe Leu Tyr Ser Arg Leu Thr Val Asp Lys Ser Arg Trp Gln Glu
        595                 600                 605

Gly Asn Val Phe Ser Cys Ser Val Met His Glu Ala Leu His Asn His
    610                 615                 620

Tyr Thr Gln Lys Ser Leu Ser Leu Ser Leu Gly Gly Gly Gly Ser
625                 630                 635                 640

Gly Gly Gly Gly Ser Gly Gly Gly Ser Gln Asp Ser Thr Ser Asp
                645                 650                 655

Leu Ile Pro Ala Pro Pro Leu Ser Lys Val Pro Leu Gln Gln Asn Phe
                660                 665                 670

Gln Asp Asn Gln Phe His Gly Lys Trp Tyr Val Val Gly Gln Ala Gly
        675                 680                 685

Asn Ile Arg Leu Arg Glu Asp Lys Asp Pro Ile Lys Met Met Ala Thr
    690                 695                 700

Ile Tyr Glu Leu Lys Glu Asp Lys Ser Tyr Asp Val Thr Met Val Lys
705                 710                 715                 720

Phe Asp Asp Lys Lys Cys Met Tyr Asp Ile Trp Thr Phe Val Pro Gly
                725                 730                 735

Ser Gln Pro Gly Glu Phe Thr Leu Gly Lys Ile Lys Ser Phe Pro Gly
                740                 745                 750

His Thr Ser Ser Leu Val Arg Val Ser Thr Asn Tyr Asn Gln His
        755                 760                 765

Ala Met Val Phe Phe Lys Phe Val Phe Gln Asn Arg Glu Glu Phe Tyr
    770                 775                 780

Ile Thr Leu Tyr Gly Arg Thr Lys Glu Leu Thr Ser Glu Leu Lys Glu
785                 790                 795                 800

Asn Phe Ile Arg Phe Ser Lys Ser Leu Gly Leu Pro Glu Asn His Ile
                805                 810                 815

Val Phe Pro Val Pro Ile Asp Gln Cys Ile Asp Gly
            820                 825

<210> SEQ ID NO 89
<211> LENGTH: 412
<212> TYPE: PRT
<213> ORGANISM: Artificial Sequence
<220> FEATURE:
<223> OTHER INFORMATION: fusion protein

<400> SEQUENCE: 89

Asp Val Val Met Thr Gln Ser Pro Leu Ser Leu Pro Val Thr Pro Gly
1               5                   10                  15

Glu Pro Ala Ser Ile Ser Cys Arg Ser Ser Gln Ser Leu Val His Ser
            20                  25                  30

Asn Arg Asn Thr Tyr Leu His Trp Tyr Leu Gln Lys Pro Gly Gln Ser
        35                  40                  45

Pro Gln Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Ser Gln Asn
                85                  90                  95

Thr His Val Pro Pro Thr Phe Gly Gln Gly Thr Lys Leu Glu Ile Lys
            100                 105                 110
```

Arg Thr Val Ala Ala Pro Ser Val Phe Ile Phe Pro Ser Asp Glu
            115                 120                 125
Gln Leu Lys Ser Gly Thr Ala Ser Val Val Cys Leu Leu Asn Asn Phe
    130                 135                 140
Tyr Pro Arg Glu Ala Lys Val Gln Trp Lys Val Asp Asn Ala Leu Gln
145                 150                 155                 160
Ser Gly Asn Ser Gln Glu Ser Val Thr Glu Gln Asp Ser Lys Asp Ser
                165                 170                 175
Thr Tyr Ser Leu Ser Ser Thr Leu Thr Leu Ser Lys Ala Asp Tyr Glu
            180                 185                 190
Lys His Lys Val Tyr Ala Cys Glu Val Thr His Gln Gly Leu Ser Ser
        195                 200                 205
Pro Val Thr Lys Ser Phe Asn Arg Gly Glu Cys Gly Gly Gly Gly Ser
    210                 215                 220
Gly Gly Gly Gly Ser Gly Gly Gly Ser Gln Asp Ser Thr Ser Asp
225                 230                 235                 240
Leu Ile Pro Ala Pro Pro Leu Ser Lys Val Pro Leu Gln Gln Asn Phe
                245                 250                 255
Gln Asp Asn Gln Phe His Gly Lys Trp Tyr Val Val Gly Gln Ala Gly
            260                 265                 270
Asn Ile Arg Leu Arg Glu Asp Lys Asp Pro Ile Lys Met Met Ala Thr
        275                 280                 285
Ile Tyr Glu Leu Lys Glu Asp Lys Ser Tyr Asp Val Thr Met Val Lys
    290                 295                 300
Phe Asp Asp Lys Lys Cys Met Tyr Asp Ile Trp Thr Phe Val Pro Gly
305                 310                 315                 320
Ser Gln Pro Gly Glu Phe Thr Leu Gly Lys Ile Lys Ser Phe Pro Gly
                325                 330                 335
His Thr Ser Ser Leu Val Arg Val Val Ser Thr Asn Tyr Asn Gln His
            340                 345                 350
Ala Met Val Phe Phe Lys Phe Val Phe Gln Asn Arg Glu Glu Phe Tyr
        355                 360                 365
Ile Thr Leu Tyr Gly Arg Thr Lys Glu Leu Thr Ser Glu Leu Lys Glu
    370                 375                 380
Asn Phe Ile Arg Phe Ser Lys Ser Leu Gly Leu Pro Glu Asn His Ile
385                 390                 395                 400
Val Phe Pro Val Pro Ile Asp Gln Cys Ile Asp Gly
                405                 410

<210> SEQ ID NO 90
<211> LENGTH: 412
<212> TYPE: PRT
<213> ORGANISM: Artificial Sequence
<220> FEATURE:
<223> OTHER INFORMATION: fusion protein

<400> SEQUENCE: 90

Gln Asp Ser Thr Ser Asp Leu Ile Pro Ala Pro Pro Leu Ser Lys Val
1               5                   10                  15
Pro Leu Gln Gln Asn Phe Gln Asp Asn Gln Phe His Gly Lys Trp Tyr
            20                  25                  30
Val Val Gly Gln Ala Gly Asn Ile Arg Leu Arg Glu Asp Lys Asp Pro
        35                  40                  45
Ile Lys Met Met Ala Thr Ile Tyr Glu Leu Lys Glu Asp Lys Ser Tyr
    50                  55                  60

Asp Val Thr Met Val Lys Phe Asp Asp Lys Lys Cys Met Tyr Asp Ile
65                  70                  75                  80

Trp Thr Phe Val Pro Gly Ser Gln Pro Gly Glu Phe Thr Leu Gly Lys
                85                  90                  95

Ile Lys Ser Phe Pro Gly His Thr Ser Ser Leu Val Arg Val Ser
            100                 105                 110

Thr Asn Tyr Asn Gln His Ala Met Val Phe Phe Lys Phe Val Phe Gln
            115                 120                 125

Asn Arg Glu Glu Phe Tyr Ile Thr Leu Tyr Gly Arg Thr Lys Glu Leu
            130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly Gly Gly Gly Ser Gly Gly Gly Ser Gly Gly Gly
            180                 185                 190

Ser Asp Val Val Met Thr Gln Ser Pro Leu Ser Leu Pro Val Thr Pro
            195                 200                 205

Gly Glu Pro Ala Ser Ile Ser Cys Arg Ser Ser Gln Ser Leu Val His
    210                 215                 220

Ser Asn Arg Asn Thr Tyr Leu His Trp Tyr Leu Gln Lys Pro Gly Gln
225                 230                 235                 240

Ser Pro Gln Leu Leu Ile Tyr Lys Val Ser Asn Arg Phe Ser Gly Val
                245                 250                 255

Pro Asp Arg Phe Ser Gly Ser Gly Ser Gly Thr Asp Phe Thr Leu Lys
            260                 265                 270

Ile Ser Arg Val Glu Ala Glu Asp Val Gly Val Tyr Tyr Cys Ser Gln
            275                 280                 285

Asn Thr His Val Pro Pro Thr Phe Gly Gln Gly Thr Lys Leu Glu Ile
            290                 295                 300

Lys Arg Thr Val Ala Ala Pro Ser Val Phe Ile Phe Pro Pro Ser Asp
305                 310                 315                 320

Glu Gln Leu Lys Ser Gly Thr Ala Ser Val Val Cys Leu Leu Asn Asn
                325                 330                 335

Phe Tyr Pro Arg Glu Ala Lys Val Gln Trp Lys Val Asp Asn Ala Leu
            340                 345                 350

Gln Ser Gly Asn Ser Gln Glu Ser Val Thr Glu Gln Asp Ser Lys Asp
            355                 360                 365

Ser Thr Tyr Ser Leu Ser Ser Thr Leu Thr Leu Ser Lys Ala Asp Tyr
    370                 375                 380

Glu Lys His Lys Val Tyr Ala Cys Glu Val Thr His Gln Gly Leu Ser
385                 390                 395                 400

Ser Pro Val Thr Lys Ser Phe Asn Arg Gly Glu Cys
                405                 410

<210> SEQ ID NO 91
<211> LENGTH: 635
<212> TYPE: PRT
<213> ORGANISM: Artificial Sequence
<220> FEATURE:
<223> OTHER INFORMATION: fusion protein

<400> SEQUENCE: 91

Gln Val Gln Leu Val Gln Ser Gly Ala Glu Val Lys Lys Pro Gly Ala
1               5                   10                  15

-continued

Ser Val Lys Val Ser Cys Lys Ala Ser Gly Tyr Thr Phe Thr Asp Tyr
            20                  25                  30

Glu Met His Trp Val Arg Gln Ala Pro Gly Gln Gly Leu Glu Trp Met
        35                  40                  45

Gly Ala Leu Asp Pro Lys Thr Gly Asp Thr Ala Tyr Ser Gln Lys Phe
    50                  55                  60

Lys Gly Arg Val Thr Leu Thr Ala Asp Lys Ser Thr Ser Thr Ala Tyr
65                  70                  75                  80

Met Glu Leu Ser Ser Leu Thr Ser Glu Asp Thr Ala Val Tyr Tyr Cys
                85                  90                  95

Thr Arg Phe Tyr Ser Tyr Thr Tyr Trp Gly Gln Gly Thr Leu Val Thr
            100                 105                 110

Leu Val Ser Ser Ala Ser Thr Lys Gly Pro Ser Val Phe Pro Leu Ala
        115                 120                 125

Pro Cys Ser Arg Ser Thr Ser Glu Ser Thr Ala Ala Leu Gly Cys Leu
    130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Lys Thr Tyr Thr Cys Asn Val Asp His Lys Pro Ser Asn Thr
        195                 200                 205

Lys Val Asp Lys Arg Val Glu Ser Lys Tyr Gly Pro Pro Cys Pro Pro
210                 215                 220

Cys Pro Ala Pro Glu Ala Ala Gly Gly Pro Ser Val Phe Leu Phe Pro
225                 230                 235                 240

Pro Lys Pro Lys Asp Thr Leu Met Ile Ser Arg Thr Pro Glu Val Thr
                245                 250                 255

Cys Val Val Val Asp Val Ser Gln Glu Asp Pro Glu Val Gln Phe Asn
            260                 265                 270

Trp Tyr Val Asp Gly Val Glu Val His Asn Ala Lys Thr Lys Pro Arg
        275                 280                 285

Glu Glu Gln Phe Asn Ser Thr Tyr Arg Val Val Ser Val Leu Thr Val
290                 295                 300

Leu His Gln Asp Trp Leu Asn Gly Lys Glu Tyr Lys Cys Lys Val Ser
305                 310                 315                 320

Asn Lys Gly Leu Pro Ser Ser Ile Glu Lys Thr Ile Ser Lys Ala Lys
                325                 330                 335

Gly Gln Pro Arg Glu Pro Gln Val Tyr Thr Leu Pro Pro Ser Gln Glu
            340                 345                 350

Glu Met Thr Lys Asn Gln Val Ser Leu Thr Cys Leu Val Lys Gly Phe
        355                 360                 365

Tyr Pro Ser Asp Ile Ala Val Glu Trp Glu Ser Asn Gly Gln Pro Glu
    370                 375                 380

Asn Asn Tyr Lys Thr Thr Pro Pro Val Leu Asp Ser Asp Gly Ser Phe
385                 390                 395                 400

Phe Leu Tyr Ser Arg Leu Thr Val Asp Lys Ser Arg Trp Gln Glu Gly
                405                 410                 415

Asn Val Phe Ser Cys Ser Val Met His Glu Ala Leu His Asn His Tyr
            420                 425                 430

Thr Gln Lys Ser Leu Ser Leu Ser Leu Gly Gly Gly Gly Ser Gly

```
                435                 440                 445
    Gly Gly Gly Ser Gly Gly Gly Ser Gln Asp Ser Thr Ser Asp Leu
    450                 455                 460

Ile Pro Ala Pro Pro Leu Ser Lys Val Pro Leu Gln Gln Asn Phe Gln
465                 470                 475                 480

Asp Asn Gln Phe Gln Gly Lys Trp Tyr Val Val Gly Met Ala Gly Asn
                    485                 490                 495

Asn Leu Leu Arg Glu Asp Lys Asp Pro His Lys Met Ser Ala Thr Ile
                500                 505                 510

Tyr Glu Leu Lys Glu Asp Lys Ser Tyr Asn Val Thr Asp Val Met Phe
                515                 520                 525

Leu Asp Lys Lys Cys Gln Tyr Ile Ile Trp Thr Phe Val Pro Gly Ser
            530                 535                 540

Gln Pro Gly Glu Leu Thr Leu Gly Phe Ile Arg Ser Asp Leu Gly His
    545                 550                 555                 560

Thr Ser Tyr Leu Val Arg Val Val Ser Thr Asn Tyr Asn Gln His Ala
                    565                 570                 575

Met Val Phe Phe Lys Ser Val Ile Gln Asn Arg Glu Trp Phe Gly Ile
                580                 585                 590

Thr Leu Tyr Gly Arg Thr Lys Glu Leu Thr Ser Glu Leu Lys Glu Asn
                595                 600                 605

Phe Ile Arg Phe Ser Lys Ser Leu Gly Leu Pro Glu Asn His Ile Val
            610                 615                 620

Phe Pro Val Pro Ile Asp Gln Cys Ile Asp Gly
    625                 630                 635

<210> SEQ ID NO 92
<211> LENGTH: 635
<212> TYPE: PRT
<213> ORGANISM: Artificial Sequence
<220> FEATURE:
<223> OTHER INFORMATION: fusion protein

<400> SEQUENCE: 92

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
                20                  25                  30

Val Val Gly Met Ala Gly Asn Asn Leu Leu Arg Glu Asp Lys Asp Pro
                35                  40                  45

His Lys Met Ser Ala Thr Ile Tyr Glu Leu Lys Glu Asp Lys Ser Tyr
    50                  55                  60

Asn Val Thr Asp Val Met Phe Leu Asp Lys Lys Cys Gln Tyr Ile Ile
65                  70                  75                  80

Trp Thr Phe Val Pro Gly Ser Gln Pro Gly Glu Leu Thr Leu Gly Phe
                85                  90                  95

Ile Arg Ser Asp Leu Gly His Thr Ser Tyr Leu Val Arg Val Val Ser
                100                 105                 110

Thr Asn Tyr Asn Gln His Ala Met Val Phe Phe Lys Ser Val Ile Gln
                115                 120                 125

Asn Arg Glu Trp Phe Gly Ile Thr Leu Tyr Gly Arg Thr Lys Glu Leu
            130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
```

```
                165                 170                 175
Asp Gly Gly Gly Gly Ser Gly Gly Gly Ser Gly Gly Gly
            180                 185                 190
Ser Gln Val Gln Leu Val Gln Ser Gly Ala Glu Val Lys Lys Pro Gly
            195                 200                 205
Ala Ser Val Lys Val Ser Cys Lys Ala Ser Gly Tyr Thr Phe Thr Asp
            210                 215                 220
Tyr Glu Met His Trp Val Arg Gln Ala Pro Gly Gln Gly Leu Glu Trp
225                 230                 235                 240
Met Gly Ala Leu Asp Pro Lys Thr Gly Asp Thr Ala Tyr Ser Gln Lys
            245                 250                 255
Phe Lys Gly Arg Val Thr Leu Thr Ala Asp Lys Ser Thr Ser Thr Ala
            260                 265                 270
Tyr Met Glu Leu Ser Ser Leu Thr Ser Glu Asp Thr Ala Val Tyr Tyr
            275                 280                 285
Cys Thr Arg Phe Tyr Ser Tyr Thr Tyr Trp Gly Gln Gly Thr Leu Val
            290                 295                 300
Thr Leu Val Ser Ser Ala Ser Thr Lys Gly Pro Ser Val Phe Pro Leu
305                 310                 315                 320
Ala Pro Cys Ser Arg Ser Thr Ser Glu Ser Thr Ala Ala Leu Gly Cys
            325                 330                 335
Leu Val Lys Asp Tyr Phe Pro Glu Pro Val Thr Val Ser Trp Asn Ser
            340                 345                 350
Gly Ala Leu Thr Ser Gly Val His Thr Phe Pro Ala Val Leu Gln Ser
            355                 360                 365
Ser Gly Leu Tyr Ser Leu Ser Ser Val Val Thr Val Pro Ser Ser Ser
            370                 375                 380
Leu Gly Thr Lys Thr Tyr Thr Cys Asn Val Asp His Lys Pro Ser Asn
385                 390                 395                 400
Thr Lys Val Asp Lys Arg Val Glu Ser Lys Tyr Gly Pro Pro Cys Pro
            405                 410                 415
Pro Cys Pro Ala Pro Glu Ala Ala Gly Gly Pro Ser Val Phe Leu Phe
            420                 425                 430
Pro Pro Lys Pro Lys Asp Thr Leu Met Ile Ser Arg Thr Pro Glu Val
            435                 440                 445
Thr Cys Val Val Val Asp Val Ser Gln Glu Asp Pro Glu Val Gln Phe
            450                 455                 460
Asn Trp Tyr Val Asp Gly Val Glu Val His Asn Ala Lys Thr Lys Pro
465                 470                 475                 480
Arg Glu Glu Gln Phe Asn Ser Thr Tyr Arg Val Val Ser Val Leu Thr
            485                 490                 495
Val Leu His Gln Asp Trp Leu Asn Gly Lys Glu Tyr Lys Cys Lys Val
            500                 505                 510
Ser Asn Lys Gly Leu Pro Ser Ser Ile Glu Lys Thr Ile Ser Lys Ala
            515                 520                 525
Lys Gly Gln Pro Arg Glu Pro Gln Val Tyr Thr Leu Pro Pro Ser Gln
            530                 535                 540
Glu Glu Met Thr Lys Asn Gln Val Ser Leu Thr Cys Leu Val Lys Gly
545                 550                 555                 560
Phe Tyr Pro Ser Asp Ile Ala Val Glu Trp Glu Ser Asn Gly Gln Pro
            565                 570                 575
Glu Asn Asn Tyr Lys Thr Thr Pro Pro Val Leu Asp Ser Asp Gly Ser
            580                 585                 590
```

```
Phe Phe Leu Tyr Ser Arg Leu Thr Val Asp Lys Ser Arg Trp Gln Glu
        595                 600                 605

Gly Asn Val Phe Ser Cys Ser Val Met His Glu Ala Leu His Asn His
        610                 615                 620

Tyr Thr Gln Lys Ser Leu Ser Leu Ser Leu Gly
625                 630                 635

<210> SEQ ID NO 93
<211> LENGTH: 412
<212> TYPE: PRT
<213> ORGANISM: Artificial Sequence
<220> FEATURE:
<223> OTHER INFORMATION: fusion protein

<400> SEQUENCE: 93

Asp Val Val Met Thr Gln Ser Pro Leu Ser Leu Pro Val Thr Pro Gly
1               5                   10                  15

Glu Pro Ala Ser Ile Ser Cys Arg Ser Ser Gln Ser Leu Val His Ser
            20                  25                  30

Asn Arg Asn Thr Tyr Leu His Trp Tyr Leu Gln Lys Pro Gly Gln Ser
        35                  40                  45

Pro Gln Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Ser Gln Asn
                85                  90                  95

Thr His Val Pro Pro Thr Phe Gly Gln Gly Thr Lys Leu Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys Gly Gly Gly Gly Ser
    210                 215                 220

Gly Gly Gly Gly Ser Gly Gly Gly Ser Gln Asp Ser Thr Ser Asp
225                 230                 235                 240

Leu Ile Pro Ala Pro Pro Leu Ser Lys Val Pro Leu Gln Gln Asn Phe
                245                 250                 255

Gln Asp Asn Gln Phe Gln Gly Lys Trp Tyr Val Val Gly Met Ala Gly
            260                 265                 270

Asn Asn Leu Leu Arg Glu Asp Lys Asp Pro His Lys Met Ser Ala Thr
        275                 280                 285

Ile Tyr Glu Leu Lys Glu Asp Lys Ser Tyr Asn Val Thr Asp Val Met
    290                 295                 300

Phe Leu Asp Lys Lys Cys Gln Tyr Ile Ile Trp Thr Phe Val Pro Gly
305                 310                 315                 320
```

-continued

```
Ser Gln Pro Gly Glu Leu Thr Leu Gly Phe Ile Arg Ser Asp Leu Gly
                325                 330                 335

His Thr Ser Tyr Leu Val Arg Val Val Ser Thr Asn Tyr Asn Gln His
            340                 345                 350

Ala Met Val Phe Phe Lys Ser Val Ile Gln Asn Arg Glu Trp Phe Gly
        355                 360                 365

Ile Thr Leu Tyr Gly Arg Thr Lys Glu Leu Thr Ser Glu Leu Lys Glu
    370                 375                 380

Asn Phe Ile Arg Phe Ser Lys Ser Leu Gly Leu Pro Glu Asn His Ile
385                 390                 395                 400

Val Phe Pro Val Pro Ile Asp Gln Cys Ile Asp Gly
                405                 410

<210> SEQ ID NO 94
<211> LENGTH: 412
<212> TYPE: PRT
<213> ORGANISM: Artificial Sequence
<220> FEATURE:
<223> OTHER INFORMATION: fusion protein

<400> SEQUENCE: 94

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
            20                  25                  30

Val Val Gly Met Ala Gly Asn Asn Leu Leu Arg Glu Asp Lys Asp Pro
        35                  40                  45

His Lys Met Ser Ala Thr Ile Tyr Glu Leu Lys Glu Asp Lys Ser Tyr
    50                  55                  60

Asn Val Thr Asp Val Met Phe Leu Asp Lys Lys Cys Gln Tyr Ile Ile
65                  70                  75                  80

Trp Thr Phe Val Pro Gly Ser Gln Pro Gly Glu Leu Thr Leu Gly Phe
                85                  90                  95

Ile Arg Ser Asp Leu Gly His Thr Ser Tyr Leu Val Arg Val Val Ser
            100                 105                 110

Thr Asn Tyr Asn Gln His Ala Met Val Phe Phe Lys Ser Val Ile Gln
        115                 120                 125

Asn Arg Glu Trp Phe Gly Ile Thr Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly Gly Gly Gly Ser Gly Gly Gly Ser Gly Gly Gly Gly
            180                 185                 190

Ser Asp Val Val Met Thr Gln Ser Pro Leu Ser Leu Pro Val Thr Pro
        195                 200                 205

Gly Glu Pro Ala Ser Ile Ser Cys Arg Ser Ser Gln Ser Leu Val His
    210                 215                 220

Ser Asn Arg Asn Thr Tyr Leu His Trp Tyr Leu Gln Lys Pro Gly Gln
225                 230                 235                 240

Ser Pro Gln Leu Leu Ile Tyr Lys Val Ser Asn Arg Phe Ser Gly Val
                245                 250                 255

Pro Asp Arg Phe Ser Gly Ser Gly Ser Gly Thr Asp Phe Thr Leu Lys
            260                 265                 270
```

```
Ile Ser Arg Val Glu Ala Glu Asp Val Gly Val Tyr Tyr Cys Ser Gln
            275                 280                 285

Asn Thr His Val Pro Thr Phe Gly Gln Gly Thr Lys Leu Glu Ile
290                 295                 300

Lys Arg Thr Val Ala Ala Pro Ser Val Phe Ile Phe Pro Pro Ser Asp
305                 310                 315                 320

Glu Gln Leu Lys Ser Gly Thr Ala Ser Val Val Cys Leu Leu Asn Asn
            325                 330                 335

Phe Tyr Pro Arg Glu Ala Lys Val Gln Trp Lys Val Asp Asn Ala Leu
            340                 345                 350

Gln Ser Gly Asn Ser Gln Glu Ser Val Thr Glu Gln Asp Ser Lys Asp
            355                 360                 365

Ser Thr Tyr Ser Leu Ser Ser Thr Leu Thr Leu Ser Lys Ala Asp Tyr
            370                 375                 380

Glu Lys His Lys Val Tyr Ala Cys Glu Val Thr His Gln Gly Leu Ser
385                 390                 395                 400

Ser Pro Val Thr Lys Ser Phe Asn Arg Gly Glu Cys
            405                 410

<210> SEQ ID NO 95
<211> LENGTH: 640
<212> TYPE: PRT
<213> ORGANISM: Artificial Sequence
<220> FEATURE:
<223> OTHER INFORMATION: fusion protein

<400> SEQUENCE: 95

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Glu Met His Trp Val Arg Gln Ala Pro Gly Gln Gly Leu Glu Trp Met
        35                  40                  45

Gly Ala Leu Asp Pro Lys Thr Gly Asp Thr Ala Tyr Ser Gln Lys Phe
    50                  55                  60

Lys Gly Arg Val Thr Leu Thr Ala Asp Lys Ser Thr Ser Thr Ala Tyr
65                  70                  75                  80

Met Glu Leu Ser Ser Leu Thr Ser Glu Asp Thr Ala Val Tyr Tyr Cys
                85                  90                  95

Thr Arg Phe Tyr Ser Tyr Thr Tyr Trp Gly Gln Gly Thr Leu Val Thr
            100                 105                 110

Leu Val Ser Ser Ala Ser Thr Lys Gly Pro Ser Val Phe Pro Leu Ala
        115                 120                 125

Pro Cys Ser Arg Ser Thr Ser Glu Ser Thr Ala Ala Leu Gly Cys Leu
    130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Lys Thr Tyr Thr Cys Asn Val Asp His Lys Pro Ser Asn Thr
        195                 200                 205

Lys Val Asp Lys Arg Val Glu Ser Lys Tyr Gly Pro Pro Cys Pro Pro
    210                 215                 220
```

```
Cys Pro Ala Pro Glu Ala Ala Gly Gly Pro Ser Val Phe Leu Phe Pro
225                 230                 235                 240

Pro Lys Pro Lys Asp Thr Leu Met Ile Ser Arg Thr Pro Glu Val Thr
            245                 250                 255

Cys Val Val Asp Val Ser Gln Glu Asp Pro Glu Val Gln Phe Asn
        260                 265                 270

Trp Tyr Val Asp Gly Val Glu Val His Asn Ala Lys Thr Lys Pro Arg
        275                 280                 285

Glu Glu Gln Phe Asn Ser Thr Tyr Arg Val Val Ser Val Leu Thr Val
            290                 295                 300

Leu His Gln Asp Trp Leu Asn Gly Lys Glu Tyr Lys Cys Lys Val Ser
305                 310                 315                 320

Asn Lys Gly Leu Pro Ser Ser Ile Glu Lys Thr Ile Ser Lys Ala Lys
                325                 330                 335

Gly Gln Pro Arg Glu Pro Gln Val Tyr Thr Leu Pro Pro Ser Gln Glu
            340                 345                 350

Glu Met Thr Lys Asn Gln Val Ser Leu Thr Cys Leu Val Lys Gly Phe
            355                 360                 365

Tyr Pro Ser Asp Ile Ala Val Glu Trp Glu Ser Asn Gly Gln Pro Glu
370                 375                 380

Asn Asn Tyr Lys Thr Thr Pro Pro Val Leu Asp Ser Asp Gly Ser Phe
385                 390                 395                 400

Phe Leu Tyr Ser Arg Leu Thr Val Asp Lys Ser Arg Trp Gln Glu Gly
                405                 410                 415

Asn Val Phe Ser Cys Ser Val Met His Glu Ala Leu His Asn His Tyr
            420                 425                 430

Thr Gln Lys Ser Leu Ser Leu Ser Leu Gly Gly Gly Gly Ser Gly
            435                 440                 445

Gly Gly Gly Ser Gly Gly Gly Ser Gly Gly Gly Gly Ser Gln Asp
        450                 455                 460

Ser Thr Ser Asp Leu Ile Pro Ala Pro Pro Leu Ser Lys Val Pro Leu
465                 470                 475                 480

Gln Gln Asn Phe Gln Asp Asn Gln Phe Gln Gly Lys Trp Tyr Val Val
                485                 490                 495

Gly Met Ala Gly Asn Asn Leu Leu Arg Glu Asp Lys Asp Pro His Lys
            500                 505                 510

Met Ser Ala Thr Ile Tyr Glu Leu Lys Glu Lys Ser Tyr Asn Val
            515                 520                 525

Thr Asp Val Met Phe Leu Asp Lys Lys Cys Gln Tyr Ile Ile Trp Thr
530                 535                 540

Phe Val Pro Gly Ser Gln Pro Gly Glu Leu Thr Leu Gly Phe Ile Arg
545                 550                 555                 560

Ser Asp Leu Gly His Thr Ser Tyr Leu Val Arg Val Val Ser Thr Asn
                565                 570                 575

Tyr Asn Gln His Ala Met Val Phe Phe Lys Ser Val Ile Gln Asn Arg
            580                 585                 590

Glu Trp Phe Gly Ile Thr Leu Tyr Gly Arg Thr Lys Glu Leu Thr Ser
            595                 600                 605

Glu Leu Lys Glu Asn Phe Ile Arg Phe Ser Lys Ser Leu Gly Leu Pro
            610                 615                 620

Glu Asn His Ile Val Phe Pro Val Pro Ile Asp Gln Cys Ile Asp Gly
625                 630                 635                 640
```

```
<210> SEQ ID NO 96
<211> LENGTH: 645
<212> TYPE: PRT
<213> ORGANISM: Artificial Sequence
<220> FEATURE:
<223> OTHER INFORMATION: fusion protein

<400> SEQUENCE: 96

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Glu Met His Trp Val Arg Gln Ala Pro Gly Gln Gly Leu Glu Trp Met
        35                  40                  45

Gly Ala Leu Asp Pro Lys Thr Gly Asp Thr Ala Tyr Ser Gln Lys Phe
    50                  55                  60

Lys Gly Arg Val Thr Leu Thr Ala Asp Lys Ser Thr Ser Thr Ala Tyr
65                  70                  75                  80

Met Glu Leu Ser Ser Leu Thr Ser Glu Asp Thr Ala Val Tyr Tyr Cys
                85                  90                  95

Thr Arg Phe Tyr Ser Tyr Thr Tyr Trp Gly Gln Gly Thr Leu Val Thr
            100                 105                 110

Leu Val Ser Ser Ala Ser Thr Lys Gly Pro Ser Val Phe Pro Leu Ala
        115                 120                 125

Pro Cys Ser Arg Ser Thr Ser Glu Ser Thr Ala Ala Leu Gly Cys Leu
    130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Lys Thr Tyr Thr Cys Asn Val Asp His Lys Pro Ser Asn Thr
        195                 200                 205

Lys Val Asp Lys Arg Val Glu Ser Lys Tyr Gly Pro Pro Cys Pro Pro
    210                 215                 220

Cys Pro Ala Pro Glu Ala Ala Gly Gly Pro Ser Val Phe Leu Phe Pro
225                 230                 235                 240

Pro Lys Pro Lys Asp Thr Leu Met Ile Ser Arg Thr Pro Glu Val Thr
                245                 250                 255

Cys Val Val Val Asp Val Ser Gln Glu Asp Pro Glu Val Gln Phe Asn
            260                 265                 270

Trp Tyr Val Asp Gly Val Glu Val His Asn Ala Lys Thr Lys Pro Arg
        275                 280                 285

Glu Glu Gln Phe Asn Ser Thr Tyr Arg Val Val Ser Val Leu Thr Val
    290                 295                 300

Leu His Gln Asp Trp Leu Asn Gly Lys Glu Tyr Lys Cys Lys Val Ser
305                 310                 315                 320

Asn Lys Gly Leu Pro Ser Ser Ile Glu Lys Thr Ile Ser Lys Ala Lys
                325                 330                 335

Gly Gln Pro Arg Glu Pro Gln Val Tyr Thr Leu Pro Pro Ser Gln Glu
            340                 345                 350

Glu Met Thr Lys Asn Gln Val Ser Leu Thr Cys Leu Val Lys Gly Phe
        355                 360                 365
```

Tyr Pro Ser Asp Ile Ala Val Glu Trp Glu Ser Asn Gly Gln Pro Glu
370                 375                 380

Asn Asn Tyr Lys Thr Thr Pro Pro Val Leu Asp Ser Asp Gly Ser Phe
385                 390                 395                 400

Phe Leu Tyr Ser Arg Leu Thr Val Asp Lys Ser Arg Trp Gln Glu Gly
                405                 410                 415

Asn Val Phe Ser Cys Ser Val Met His Glu Ala Leu His Asn His Tyr
                420                 425                 430

Thr Gln Lys Ser Leu Ser Leu Ser Leu Gly Gly Gly Gly Ser Gly
            435                 440                 445

Gly Gly Gly Ser Gly Gly Gly Ser Gly Gly Gly Ser Gly Gly
450                 455                 460

Gly Gly Ser Gln Asp Ser Thr Ser Asp Leu Ile Pro Ala Pro Pro Leu
465                 470                 475                 480

Ser Lys Val Pro Leu Gln Gln Asn Phe Gln Asp Asn Gln Phe Gln Gly
                485                 490                 495

Lys Trp Tyr Val Val Gly Met Ala Gly Asn Asn Leu Leu Arg Glu Asp
                500                 505                 510

Lys Asp Pro His Lys Met Ser Ala Thr Ile Tyr Glu Leu Lys Glu Asp
                515                 520                 525

Lys Ser Tyr Asn Val Thr Asp Val Met Phe Leu Asp Lys Lys Cys Gln
530                 535                 540

Tyr Ile Ile Trp Thr Phe Val Pro Gly Ser Gln Pro Gly Glu Leu Thr
545                 550                 555                 560

Leu Gly Phe Ile Arg Ser Asp Leu Gly His Thr Ser Tyr Leu Val Arg
                565                 570                 575

Val Val Ser Thr Asn Tyr Asn Gln His Ala Met Val Phe Phe Lys Ser
                580                 585                 590

Val Ile Gln Asn Arg Glu Trp Phe Gly Ile Thr Leu Tyr Gly Arg Thr
                595                 600                 605

Lys Glu Leu Thr Ser Glu Leu Lys Glu Asn Phe Ile Arg Phe Ser Lys
                610                 615                 620

Ser Leu Gly Leu Pro Glu Asn His Ile Val Phe Pro Val Pro Ile Asp
625                 630                 635                 640

Gln Cys Ile Asp Gly
                645

<210> SEQ ID NO 97
<211> LENGTH: 421
<212> TYPE: PRT
<213> ORGANISM: Artificial Sequence
<220> FEATURE:
<223> OTHER INFORMATION: fusion protein

<400> SEQUENCE: 97

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
                20                  25                  30

Val Val Gly Arg Ala Gly Asn Val Gly Leu Arg Glu Asp Lys Asp Pro
                35                  40                  45

Pro Lys Met Trp Ala Thr Ile Tyr Glu Leu Lys Glu Asp Lys Ser Tyr
                50                  55                  60

Asp Val Thr Asn Val Arg Phe Ala Arg Lys Lys Cys Thr Tyr Ser Ile
65              70                  75                  80

Gly Thr Phe Val Pro Gly Ser Gln Pro Gly Glu Phe Thr Leu Gly Gln
                85                  90                  95

Ile Lys Ser Glu Pro Gly Gly Thr Ala Asn Leu Val Arg Val Val Ser
            100                 105                 110

Thr Asn Tyr Asn Gln His Ala Met Val Phe Phe Lys Glu Val Tyr Gln
            115                 120                 125

Asn Arg Glu Ile Phe Phe Ile Ile Leu Tyr Gly Arg Thr Lys Glu Leu
            130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly Gly Gly Gly Ser Gly Gly Gly Ser Gly Gly Gly Gly
                180                 185                 190

Ser Glu Ser Lys Tyr Gly Pro Pro Cys Pro Cys Pro Ala Pro Glu
            195                 200                 205

Ala Ala Gly Gly Pro Ser Val Phe Leu Phe Pro Lys Pro Lys Asp
            210                 215                 220

Thr Leu Met Ile Ser Arg Thr Pro Glu Val Thr Cys Val Val Val Asp
225                 230                 235                 240

Val Ser Gln Glu Asp Pro Glu Val Gln Phe Asn Trp Tyr Val Asp Gly
                245                 250                 255

Val Glu Val His Asn Ala Lys Thr Lys Pro Arg Glu Glu Gln Phe Asn
                260                 265                 270

Ser Thr Tyr Arg Val Val Ser Val Leu Thr Val Leu His Gln Asp Trp
            275                 280                 285

Leu Asn Gly Lys Glu Tyr Lys Cys Lys Val Ser Asn Lys Gly Leu Pro
290                 295                 300

Ser Ser Ile Glu Lys Thr Ile Ser Lys Ala Lys Gly Gln Pro Arg Glu
305                 310                 315                 320

Pro Gln Val Tyr Thr Leu Pro Pro Ser Gln Glu Glu Met Thr Lys Asn
                325                 330                 335

Gln Val Ser Leu Thr Cys Leu Val Lys Gly Phe Tyr Pro Ser Asp Ile
            340                 345                 350

Ala Val Glu Trp Glu Ser Asn Gly Gln Pro Glu Asn Asn Tyr Lys Thr
            355                 360                 365

Thr Pro Pro Val Leu Asp Ser Asp Gly Ser Phe Phe Leu Tyr Ser Arg
            370                 375                 380

Leu Thr Val Asp Lys Ser Arg Trp Gln Glu Gly Asn Val Phe Ser Cys
385                 390                 395                 400

Ser Val Met His Glu Ala Leu His Asn His Tyr Thr Gln Lys Ser Leu
                405                 410                 415

Ser Leu Ser Leu Gly
                420

<210> SEQ ID NO 98
<211> LENGTH: 422
<212> TYPE: PRT
<213> ORGANISM: Artificial Sequence
<220> FEATURE:
<223> OTHER INFORMATION: fusion protein

<400> SEQUENCE: 98

Glu Ser Lys Tyr Gly Pro Pro Cys Pro Cys Pro Ala Pro Glu Ala
1               5                   10                  15

```
Ala Gly Gly Pro Ser Val Phe Leu Phe Pro Lys Pro Lys Asp Thr
         20                  25                  30

Leu Met Ile Ser Arg Thr Pro Glu Val Thr Cys Val Val Asp Val
         35                  40                  45

Ser Gln Glu Asp Pro Glu Val Gln Phe Asn Trp Tyr Val Asp Gly Val
 50                      55                  60

Glu Val His Asn Ala Lys Thr Lys Pro Arg Glu Gln Phe Asn Ser
 65                  70                  75                  80

Thr Tyr Arg Val Val Ser Val Leu Thr Val Leu His Gln Asp Trp Leu
                 85                  90                  95

Asn Gly Lys Glu Tyr Lys Cys Lys Val Ser Asn Lys Gly Leu Pro Ser
                100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
        130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205

Val Met His Glu Ala Leu His Asn His Tyr Thr Gln Lys Ser Leu Ser
210                 215                 220

Leu Ser Leu Gly Lys Gly Gly Gly Ser Gly Gly Gly Ser Gly
225                 230                 235                 240

Gly Gly Gly Ser Gln Asp Ser Thr Ser Asp Leu Ile Pro Ala Pro Pro
                245                 250                 255

Leu Ser Lys Val Pro Leu Gln Gln Asn Phe Gln Asp Asn Gln Phe His
        260                 265                 270

Gly Lys Trp Tyr Val Val Gly Gln Ala Gly Asn Ile Arg Leu Arg Glu
        275                 280                 285

Asp Lys Asp Pro Ile Lys Met Met Ala Thr Ile Tyr Glu Leu Lys Glu
290                 295                 300

Asp Lys Ser Tyr Asp Val Thr Met Val Lys Phe Asp Lys Lys Cys
305                 310                 315                 320

Met Tyr Asp Ile Trp Thr Phe Val Pro Gly Ser Gln Pro Gly Glu Phe
                325                 330                 335

Thr Leu Gly Lys Ile Lys Ser Phe Pro Gly His Thr Ser Ser Leu Val
            340                 345                 350

Arg Val Val Ser Thr Asn Tyr Asn Gln His Ala Met Val Phe Phe Lys
        355                 360                 365

Phe Val Phe Gln Asn Arg Glu Glu Phe Tyr Ile Thr Leu Tyr Gly Arg
        370                 375                 380

Thr Lys Glu Leu Thr Ser Glu Leu Lys Glu Asn Phe Ile Arg Phe Ser
385                 390                 395                 400

Lys Ser Leu Gly Leu Pro Glu Asn His Ile Val Phe Pro Val Pro Ile
                405                 410                 415

Asp Gln Cys Ile Asp Gly
                420
```

<210> SEQ ID NO 99
<211> LENGTH: 641
<212> TYPE: PRT
<213> ORGANISM: Artificial Sequence
<220> FEATURE:
<223> OTHER INFORMATION: fusion protein

<400> SEQUENCE: 99

```
Gln Val Gln Leu Gln Gln Trp Gly Ala Gly Leu Leu Lys Pro Ser Glu
1               5                   10                  15

Thr Leu Ser Leu Thr Cys Ala Val Tyr Gly Gly Ser Phe Ser Gly Tyr
            20                  25                  30

Tyr Trp Ser Trp Ile Arg Gln Ser Pro Glu Lys Gly Leu Glu Trp Ile
        35                  40                  45

Gly Glu Ile Asn His Gly Gly Tyr Val Thr Tyr Asn Pro Ser Leu Glu
    50                  55                  60

Ser Arg Val Thr Ile Ser Val Asp Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Asp Tyr Gly Pro Gly Asn Tyr Asp Trp Tyr Phe Asp Leu Trp Gly
            100                 105                 110

Arg Gly Thr Leu Val Thr Val Ser Ser Ala Ser Thr Lys Gly Pro Ser
        115                 120                 125

Val Phe Pro Leu Ala Pro Cys Ser Arg Ser Thr Ser Glu Ser Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Lys Thr Tyr Thr Cys Asn Val Asp His
        195                 200                 205

Lys Pro Ser Asn Thr Lys Val Asp Lys Arg Val Glu Ser Lys Tyr Gly
    210                 215                 220

Pro Pro Cys Pro Pro Cys Pro Ala Pro Glu Phe Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser Gln Glu Asp Pro
            260                 265                 270

Glu Val Gln Phe Asn Trp Tyr Val Asp Gly Val Glu Val His Asn Ala
        275                 280                 285

Lys Thr Lys Pro Arg Glu Glu Gln Phe Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Gly Leu Pro Ser Ser Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Gln Glu Glu Met Thr Lys Asn Gln Val Ser Leu Thr Cys
        355                 360                 365

Leu Val Lys Gly Phe Tyr Pro Ser Asp Ile Ala Val Glu Trp Glu Ser
```

```
                370             375             380
Asn Gly Gln Pro Glu Asn Asn Tyr Lys Thr Thr Pro Pro Val Leu Asp
385                 390                 395                 400

Ser Asp Gly Ser Phe Phe Leu Tyr Ser Arg Leu Thr Val Asp Lys Ser
                405                 410                 415

Arg Trp Gln Glu Gly Asn Val Phe Ser Cys Ser Val Met His Glu Ala
                420                 425                 430

Leu His Asn His Tyr Thr Gln Lys Ser Leu Ser Leu Ser Leu Gly Lys
                435                 440                 445

Gly Gly Gly Gly Ser Gly Gly Gly Ser Gly Gly Gly Gly Ser Gln
                450                 455                 460

Asp Ser Thr Ser Asp Leu Ile Pro Ala Pro Pro Leu Ser Lys Val Pro
465                 470                 475                 480

Leu Gln Gln Asn Phe Gln Asp Asn Gln Phe Gln Gly Lys Trp Tyr Val
                485                 490                 495

Val Gly Arg Ala Gly Asn Val Gly Leu Arg Glu Asp Lys Asp Pro Pro
                500                 505                 510

Lys Met Trp Ala Thr Ile Tyr Glu Leu Lys Glu Asp Lys Ser Tyr Asp
                515                 520                 525

Val Thr Asn Val Arg Phe Ala Arg Lys Lys Cys Thr Tyr Ser Ile Gly
                530                 535                 540

Thr Phe Val Pro Gly Ser Gln Pro Gly Glu Phe Thr Leu Gly Gln Ile
545                 550                 555                 560

Lys Ser Glu Pro Gly Gly Thr Ala Asn Leu Val Arg Val Val Ser Thr
                565                 570                 575

Asn Tyr Asn Gln His Ala Met Val Phe Phe Lys Glu Val Tyr Gln Asn
                580                 585                 590

Arg Glu Ile Phe Phe Ile Ile Leu Tyr Gly Arg Thr Lys Glu Leu Thr
                595                 600                 605

Ser Glu Leu Lys Glu Asn Phe Ile Arg Phe Ser Lys Ser Leu Gly Leu
                610                 615                 620

Pro Glu Asn His Ile Val Phe Pro Val Pro Ile Asp Gln Cys Ile Asp
625                 630                 635                 640

Gly

<210> SEQ ID NO 100
<211> LENGTH: 641
<212> TYPE: PRT
<213> ORGANISM: Artificial Sequence
<220> FEATURE:
<223> OTHER INFORMATION: fusion protein

<400> SEQUENCE: 100

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
                20                  25                  30

Val Val Gly Arg Ala Gly Asn Val Gly Leu Arg Glu Asp Lys Asp Pro
                35                  40                  45

Pro Lys Met Trp Ala Thr Ile Tyr Glu Leu Lys Glu Asp Lys Ser Tyr
50                  55                  60

Asp Val Thr Asn Val Arg Phe Ala Arg Lys Lys Cys Thr Tyr Ser Ile
65                  70                  75                  80

Gly Thr Phe Val Pro Gly Ser Gln Pro Gly Glu Phe Thr Leu Gly Gln
                85                  90                  95
```

Ile Lys Ser Glu Pro Gly Gly Thr Ala Asn Leu Val Arg Val Val Ser
            100                 105                 110

Thr Asn Tyr Asn Gln His Ala Met Val Phe Lys Glu Val Tyr Gln
        115                 120                 125

Asn Arg Glu Ile Phe Phe Ile Ile Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly Gly Gly Gly Ser Gly Gly Gly Ser Gly Gly Gly Gly
            180                 185                 190

Ser Gln Val Gln Leu Gln Gln Trp Gly Ala Gly Leu Leu Lys Pro Ser
        195                 200                 205

Glu Thr Leu Ser Leu Thr Cys Ala Val Tyr Gly Gly Ser Phe Ser Gly
    210                 215                 220

Tyr Tyr Trp Ser Trp Ile Arg Gln Ser Pro Glu Lys Gly Leu Glu Trp
225                 230                 235                 240

Ile Gly Glu Ile Asn His Gly Gly Tyr Val Thr Tyr Asn Pro Ser Leu
                245                 250                 255

Glu Ser Arg Val Thr Ile Ser Val Asp Thr Ser Lys Asn Gln Phe Ser
        260                 265                 270

Leu Lys Leu Ser Ser Val Thr Ala Ala Asp Thr Ala Val Tyr Tyr Cys
    275                 280                 285

Ala Arg Asp Tyr Gly Pro Gly Asn Tyr Asp Trp Tyr Phe Asp Leu Trp
290                 295                 300

Gly Arg Gly Thr Leu Val Thr Val Ser Ser Ala Ser Thr Lys Gly Pro
305                 310                 315                 320

Ser Val Phe Pro Leu Ala Pro Cys Ser Arg Ser Thr Ser Glu Ser Thr
                325                 330                 335

Ala Ala Leu Gly Cys Leu Val Lys Asp Tyr Phe Pro Glu Pro Val Thr
        340                 345                 350

Val Ser Trp Asn Ser Gly Ala Leu Thr Ser Gly Val His Thr Phe Pro
    355                 360                 365

Ala Val Leu Gln Ser Ser Gly Leu Tyr Ser Leu Ser Ser Val Val Thr
    370                 375                 380

Val Pro Ser Ser Ser Leu Gly Thr Lys Thr Tyr Thr Cys Asn Val Asp
385                 390                 395                 400

His Lys Pro Ser Asn Thr Lys Val Asp Lys Arg Val Glu Ser Lys Tyr
                405                 410                 415

Gly Pro Pro Cys Pro Pro Cys Pro Ala Pro Glu Phe Leu Gly Gly Pro
        420                 425                 430

Ser Val Phe Leu Phe Pro Pro Lys Pro Lys Asp Thr Leu Met Ile Ser
    435                 440                 445

Arg Thr Pro Glu Val Thr Cys Val Val Val Asp Val Ser Gln Glu Asp
        450                 455                 460

Pro Glu Val Gln Phe Asn Trp Tyr Val Asp Gly Val Glu Val His Asn
465                 470                 475                 480

Ala Lys Thr Lys Pro Arg Glu Glu Gln Phe Asn Ser Thr Tyr Arg Val
                485                 490                 495

Val Ser Val Leu Thr Val Leu His Gln Asp Trp Leu Asn Gly Lys Glu
        500                 505                 510

```
Tyr Lys Cys Lys Val Ser Asn Lys Gly Leu Pro Ser Ser Ile Glu Lys
            515                 520                 525

Thr Ile Ser Lys Ala Lys Gly Gln Pro Arg Glu Pro Gln Val Tyr Thr
530                 535                 540

Leu Pro Pro Ser Gln Glu Glu Met Thr Lys Asn Gln Val Ser Leu Thr
545                 550                 555                 560

Cys Leu Val Lys Gly Phe Tyr Pro Ser Asp Ile Ala Val Glu Trp Glu
                565                 570                 575

Ser Asn Gly Gln Pro Glu Asn Asn Tyr Lys Thr Thr Pro Val Leu
            580                 585                 590

Asp Ser Asp Gly Ser Phe Phe Leu Tyr Ser Arg Leu Thr Val Asp Lys
            595                 600                 605

Ser Arg Trp Gln Glu Gly Asn Val Phe Ser Cys Ser Val Met His Glu
610                 615                 620

Ala Leu His Asn His Tyr Thr Gln Lys Ser Leu Ser Leu Ser Leu Gly
625                 630                 635                 640

Lys

<210> SEQ ID NO 101
<211> LENGTH: 409
<212> TYPE: PRT
<213> ORGANISM: Artificial Sequence
<220> FEATURE:
<223> OTHER INFORMATION: fusion protein

<400> SEQUENCE: 101

Gln Asp Ser Thr Ser Asp Leu Ile Pro Ala Pro Pro Leu Ser Lys Val
1               5                   10                  15

Pro Leu Gln Gln Asn Phe Gln Asp Asn Gln Phe Gln Gly Lys Trp Tyr
            20                  25                  30

Val Val Gly Arg Ala Gly Asn Val Gly Leu Arg Glu Asp Lys Asp Pro
        35                  40                  45

Pro Lys Met Trp Ala Thr Ile Tyr Glu Leu Lys Glu Asp Lys Ser Tyr
    50                  55                  60

Asp Val Thr Asn Val Arg Phe Ala Arg Lys Lys Cys Thr Tyr Ser Ile
65                  70                  75                  80

Gly Thr Phe Val Pro Gly Ser Gln Pro Gly Glu Phe Thr Leu Gly Gln
                85                  90                  95

Ile Lys Ser Glu Pro Gly Gly Thr Ala Asn Leu Val Arg Val Val Ser
            100                 105                 110

Thr Asn Tyr Asn Gln His Ala Met Val Phe Phe Lys Glu Val Tyr Gln
        115                 120                 125

Asn Arg Glu Ile Phe Phe Ile Ile Leu Tyr Gly Arg Thr Lys Glu Leu
    130                 135                 140

Thr Ser Glu Leu Lys Glu Asn Phe Ile Arg Phe Ser Lys Ser Leu Gly
145                 150                 155                 160

Leu Pro Glu Asn His Ile Val Phe Pro Val Pro Ile Asp Gln Cys Ile
                165                 170                 175

Asp Gly Gly Gly Gly Ser Gly Gly Gly Gly Ser Gly Gly Gly Gly
            180                 185                 190

Ser Glu Ile Val Leu Thr Gln Ser Pro Ala Thr Leu Ser Leu Ser Pro
        195                 200                 205

Gly Glu Arg Ala Thr Leu Ser Cys Arg Ala Ser Gln Ser Val Ser Ser
    210                 215                 220

Tyr Leu Ala Trp Tyr Gln Gln Lys Pro Gly Gln Ala Pro Arg Leu Leu
```

```
            225                 230                 235                 240
Ile Tyr Asp Ala Ser Asn Arg Ala Thr Gly Ile Pro Ala Arg Phe Ser
                245                 250                 255

Gly Ser Gly Ser Gly Thr Asp Phe Thr Leu Thr Ile Ser Ser Leu Glu
                260                 265                 270

Pro Glu Asp Phe Ala Val Tyr Tyr Cys Gln Gln Arg Ser Asn Trp Pro
                275                 280                 285

Pro Ala Leu Thr Phe Gly Gly Gly Thr Lys Val Glu Ile Lys Arg Thr
                290                 295                 300

Val Ala Ala Pro Ser Val Phe Ile Phe Pro Pro Ser Asp Glu Gln Leu
305                 310                 315                 320

Lys Ser Gly Thr Ala Ser Val Val Cys Leu Leu Asn Asn Phe Tyr Pro
                325                 330                 335

Arg Glu Ala Lys Val Gln Trp Lys Val Asp Asn Ala Leu Gln Ser Gly
                340                 345                 350

Asn Ser Gln Glu Ser Val Thr Glu Gln Asp Ser Lys Asp Ser Thr Tyr
                355                 360                 365

Ser Leu Ser Ser Thr Leu Thr Leu Ser Lys Ala Asp Tyr Glu Lys His
                370                 375                 380

Lys Val Tyr Ala Cys Glu Val Thr His Gln Gly Leu Ser Ser Pro Val
385                 390                 395                 400

Thr Lys Ser Phe Asn Arg Gly Glu Cys
                405

<210> SEQ ID NO 102
<211> LENGTH: 408
<212> TYPE: PRT
<213> ORGANISM: Artificial Sequence
<220> FEATURE:
<223> OTHER INFORMATION: fusion protein

<400> SEQUENCE: 102

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
                20                  25                  30

Leu Ala Trp Tyr Gln Gln Lys Pro Gly Gln Ala Pro Arg Leu Leu Ile
                35                  40                  45

Tyr Asp Ala Ser Asn Arg Ala Thr Gly Ile Pro Ala Arg Phe Ser Gly
                50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Pro
                85                  90                  95

Ala Leu Thr Phe Gly Gly Gly Thr Lys Val Glu Ile Lys Arg Thr Val
                100                 105                 110

Ala Ala Pro Ser Val Phe Ile Phe Pro Pro Ser Asp Glu Gln Leu Lys
                115                 120                 125

Ser Gly Thr Ala Ser Val Val Cys Leu Leu Asn Asn Phe Tyr Pro Arg
                130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
```

```
            180             185             190
Val Tyr Ala Cys Glu Val Thr His Gln Gly Leu Ser Ser Pro Val Thr
            195             200             205
Lys Ser Phe Asn Arg Gly Glu Cys Gly Gly Gly Ser Gly Gly Gly
            210             215             220
Gly Ser Gly Gly Gly Ser Gln Asp Ser Thr Ser Asp Leu Ile Pro
225             230             235             240
Ala Pro Pro Leu Ser Lys Val Pro Leu Gln Gln Asn Phe Gln Asp Asn
            245             250             255
Gln Phe Gln Gly Lys Trp Tyr Val Gly Arg Ala Gly Asn Val Gly
            260             265             270
Leu Arg Glu Asp Lys Asp Pro Pro Lys Met Trp Ala Thr Ile Tyr Glu
            275             280             285
Leu Lys Glu Asp Lys Ser Tyr Asp Val Thr Asn Val Arg Phe Ala Arg
            290             295             300
Lys Lys Cys Thr Tyr Ser Ile Gly Thr Phe Val Pro Gly Ser Gln Pro
305             310             315             320
Gly Glu Phe Thr Leu Gly Gln Ile Lys Ser Glu Pro Gly Gly Thr Ala
            325             330             335
Asn Leu Val Arg Val Val Ser Thr Asn Tyr Asn Gln His Ala Met Val
            340             345             350
Phe Phe Lys Glu Val Tyr Gln Asn Arg Glu Ile Phe Ile Ile Leu
            355             360             365
Tyr Gly Arg Thr Lys Glu Leu Thr Ser Glu Leu Lys Glu Asn Phe Ile
            370             375             380
Arg Phe Ser Lys Ser Leu Gly Leu Pro Glu Asn His Ile Val Phe Pro
385             390             395             400
Val Pro Ile Asp Gln Cys Ile Asp
            405

<210> SEQ ID NO 103
<211> LENGTH: 635
<212> TYPE: PRT
<213> ORGANISM: Artificial Sequence
<220> FEATURE:
<223> OTHER INFORMATION: fusion protein

<400> SEQUENCE: 103

Glu Val Gln Leu Val Gln Ser Gly Ala Glu Val Lys Lys Pro Gly Glu
1               5                   10                  15
Ser Leu Arg Ile Ser Cys Lys Gly Ser Gly Tyr Ser Phe Ser Thr Tyr
            20                  25                  30
Trp Ile Ser Trp Val Arg Gln Met Pro Gly Lys Gly Leu Glu Trp Met
            35                  40                  45
Gly Lys Ile Tyr Pro Gly Asp Ser Tyr Thr Asn Tyr Ser Pro Ser Phe
        50                  55                  60
Gln Gly Gln Val Thr Ile Ser Ala Asp Lys Ser Ile Ser Thr Ala Tyr
65              70                  75                  80
Leu Gln Trp Ser Ser Leu Lys Ala Ser Asp Thr Ala Met Tyr Tyr Cys
            85                  90                  95
Ala Arg Gly Tyr Gly Ile Phe Asp Tyr Trp Gly Gln Gly Thr Leu Val
            100                 105                 110
Thr Val Ser Ser Ala Ser Thr Lys Gly Pro Ser Val Phe Pro Leu Ala
            115                 120                 125
Pro Cys Ser Arg Ser Thr Ser Glu Ser Thr Ala Ala Leu Gly Cys Leu
```

```
              130                 135                 140
Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Asn Phe
                180                 185                 190

Gly Thr Gln Thr Tyr Thr Cys Asn Val Asp His Lys Pro Ser Asn Thr
                195                 200                 205

Lys Val Asp Lys Thr Val Glu Arg Lys Cys Cys Val Glu Cys Pro Pro
            210                 215                 220

Cys Pro Ala Pro Pro Val Ala Gly Pro Ser Val Phe Leu Phe Pro Pro
225                 230                 235                 240

Lys Pro Lys Asp Thr Leu Met Ile Ser Arg Thr Pro Glu Val Thr Cys
                245                 250                 255

Val Val Val Asp Val Ser His Glu Asp Pro Glu Val Gln Phe Asn Trp
                260                 265                 270

Tyr Val Asp Gly Val Glu Val His Asn Ala Lys Thr Lys Pro Arg Glu
            275                 280                 285

Glu Gln Phe Asn Ser Thr Phe Arg Val Val Ser Val Leu Thr Val Val
290                 295                 300

His Gln Asp Trp Leu Asn Gly Lys Glu Tyr Lys Cys Lys Val Ser Asn
305                 310                 315                 320

Lys Gly Leu Pro Ala Pro Ile Glu Lys Thr Ile Ser Lys Thr Lys Gly
                325                 330                 335

Gln Pro Arg Glu Pro Gln Val Tyr Thr Leu Pro Pro Ser Arg Glu Glu
                340                 345                 350

Met Thr Lys Asn Gln Val Ser Leu Thr Cys Leu Val Lys Gly Phe Tyr
                355                 360                 365

Pro Ser Asp Ile Ala Val Glu Trp Glu Ser Asn Gly Gln Pro Glu Asn
                370                 375                 380

Asn Tyr Lys Thr Thr Pro Pro Met Leu Asp Ser Asp Gly Ser Phe Phe
385                 390                 395                 400

Leu Tyr Ser Lys Leu Thr Val Asp Lys Ser Arg Trp Gln Gln Gly Asn
                405                 410                 415

Val Phe Ser Cys Ser Val Met His Glu Ala Leu His Asn His Tyr Thr
                420                 425                 430

Gln Lys Ser Leu Ser Leu Ser Pro Gly Lys Gly Gly Gly Ser Gly
                435                 440                 445

Gly Gly Gly Ser Gly Gly Gly Ser Gln Asp Ser Thr Ser Asp Leu
            450                 455                 460

Ile Pro Ala Pro Pro Leu Ser Lys Val Pro Leu Gln Gln Asn Phe Gln
465                 470                 475                 480

Asp Asn Gln Phe Gln Gly Lys Trp Tyr Val Val Gly Arg Ala Gly Asn
                485                 490                 495

Val Gly Leu Arg Glu Asp Lys Asp Pro Pro Lys Met Trp Ala Thr Ile
            500                 505                 510

Tyr Glu Leu Lys Glu Asp Lys Ser Tyr Asp Val Thr Asn Val Arg Phe
            515                 520                 525

Ala Arg Lys Lys Cys Thr Tyr Ser Ile Gly Thr Phe Val Pro Gly Ser
            530                 535                 540

Gln Pro Gly Glu Phe Thr Leu Gly Gln Ile Lys Ser Glu Pro Gly Gly
545                 550                 555                 560
```

```
Thr Ala Asn Leu Val Arg Val Ser Thr Asn Tyr Asn Gln His Ala
                565                 570                 575

Met Val Phe Phe Lys Glu Val Tyr Gln Asn Arg Glu Ile Phe Ile
                580                 585                 590

Ile Leu Tyr Gly Arg Thr Lys Glu Leu Thr Ser Glu Leu Lys Glu Asn
                595                 600                 605

Phe Ile Arg Phe Ser Lys Ser Leu Gly Leu Pro Glu Asn His Ile Val
                610                 615                 620

Phe Pro Val Pro Ile Asp Gln Cys Ile Asp Gly
625                 630                 635

<210> SEQ ID NO 104
<211> LENGTH: 442
<212> TYPE: PRT
<213> ORGANISM: Artificial Sequence
<220> FEATURE:
<223> OTHER INFORMATION: antibody heavy chain

<400> SEQUENCE: 104

Glu Val Gln Leu Val Gln Ser Gly Ala Glu Val Lys Lys Pro Gly Glu
1               5                   10                  15

Ser Leu Arg Ile Ser Cys Lys Gly Ser Gly Tyr Ser Phe Ser Thr Tyr
                20                  25                  30

Trp Ile Ser Trp Val Arg Gln Met Pro Gly Lys Gly Leu Glu Trp Met
            35                  40                  45

Gly Lys Ile Tyr Pro Gly Asp Ser Tyr Thr Asn Tyr Ser Pro Ser Phe
        50                  55                  60

Gln Gly Gln Val Thr Ile Ser Ala Asp Lys Ser Ile Ser Thr Ala Tyr
65                  70                  75                  80

Leu Gln Trp Ser Ser Leu Lys Ala Ser Asp Thr Ala Met Tyr Tyr Cys
                85                  90                  95

Ala Arg Gly Tyr Gly Ile Phe Asp Tyr Trp Gly Gln Gly Thr Leu Val
                100                 105                 110

Thr Val Ser Ser Ala Ser Thr Lys Gly Pro Ser Val Phe Pro Leu Ala
            115                 120                 125

Pro Cys Ser Arg Ser Thr Ser Glu Ser Thr Ala Ala Leu Gly Cys Leu
        130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Asn Phe
                180                 185                 190

Gly Thr Gln Thr Tyr Thr Cys Asn Val Asp His Lys Pro Ser Asn Thr
            195                 200                 205

Lys Val Asp Lys Thr Val Glu Arg Lys Cys Cys Val Glu Cys Pro Pro
        210                 215                 220

Cys Pro Ala Pro Pro Val Ala Gly Pro Ser Val Phe Leu Phe Pro Pro
225                 230                 235                 240

Lys Pro Lys Asp Thr Leu Met Ile Ser Arg Thr Pro Glu Val Thr Cys
                245                 250                 255

Val Val Val Asp Val Ser His Glu Asp Pro Glu Val Gln Phe Asn Trp
                260                 265                 270

Tyr Val Asp Gly Val Glu Val His Asn Ala Lys Thr Lys Pro Arg Glu
            275                 280                 285
```

```
Glu Gln Phe Asn Ser Thr Phe Arg Val Val Ser Val Leu Thr Val Val
    290                 295                 300

His Gln Asp Trp Leu Asn Gly Lys Glu Tyr Lys Cys Lys Val Ser Asn
305                 310                 315                 320

Lys Gly Leu Pro Ala Pro Ile Glu Lys Thr Ile Ser Lys Thr Lys Gly
                325                 330                 335

Gln Pro Arg Glu Pro Gln Val Tyr Thr Leu Pro Pro Ser Arg Glu Glu
            340                 345                 350

Met Thr Lys Asn Gln Val Ser Leu Thr Cys Leu Val Lys Gly Phe Tyr
        355                 360                 365

Pro Ser Asp Ile Ala Val Glu Trp Glu Ser Asn Gly Gln Pro Glu Asn
370                 375                 380

Asn Tyr Lys Thr Thr Pro Pro Met Leu Asp Ser Asp Gly Ser Phe Phe
385                 390                 395                 400

Leu Tyr Ser Lys Leu Thr Val Asp Lys Ser Arg Trp Gln Gln Gly Asn
                405                 410                 415

Val Phe Ser Cys Ser Val Met His Glu Ala Leu His Asn His Tyr Thr
            420                 425                 430

Gln Lys Ser Leu Ser Leu Ser Pro Gly Lys
        435                 440

<210> SEQ ID NO 105
<211> LENGTH: 214
<212> TYPE: PRT
<213> ORGANISM: Artificial Sequence
<220> FEATURE:
<223> OTHER INFORMATION: antibody light chain

<400> SEQUENCE: 105

Ser Tyr Glu Leu Thr Gln Pro Pro Ser Val Ser Val Ser Pro Gly Gln
1               5                   10                  15

Thr Ala Ser Ile Thr Cys Ser Gly Asp Asn Ile Gly Asp Gln Tyr Ala
            20                  25                  30

His Trp Tyr Gln Gln Lys Pro Gly Gln Ser Pro Val Leu Val Ile Tyr
        35                  40                  45

Gln Asp Lys Asn Arg Pro Ser Gly Ile Pro Glu Arg Phe Ser Gly Ser
    50                  55                  60

Asn Ser Gly Asn Thr Ala Thr Leu Thr Ile Ser Gly Thr Gln Ala Met
65                  70                  75                  80

Asp Glu Ala Asp Tyr Tyr Cys Ala Thr Tyr Thr Gly Phe Gly Ser Leu
                85                  90                  95

Ala Val Phe Gly Gly Gly Thr Lys Leu Thr Val Leu Gly Gln Pro Lys
            100                 105                 110

Ala Ala Pro Ser Val Thr Leu Phe Pro Pro Ser Ser Glu Glu Leu Gln
        115                 120                 125

Ala Asn Lys Ala Thr Leu Val Cys Leu Ile Ser Asp Phe Tyr Pro Gly
    130                 135                 140

Ala Val Thr Val Ala Trp Lys Ala Asp Ser Ser Pro Val Lys Ala Gly
145                 150                 155                 160

Val Glu Thr Thr Thr Pro Ser Lys Gln Ser Asn Asn Lys Tyr Ala Ala
                165                 170                 175

Ser Ser Tyr Leu Ser Leu Thr Pro Glu Gln Trp Lys Ser His Arg Ser
            180                 185                 190

Tyr Ser Cys Gln Val Thr His Glu Gly Ser Thr Val Glu Lys Thr Val
        195                 200                 205
```

Ala Pro Thr Glu Cys Ser
    210

<210> SEQ ID NO 106
<211> LENGTH: 439
<212> TYPE: PRT
<213> ORGANISM: Artificial Sequence
<220> FEATURE:
<223> OTHER INFORMATION: antibody heavy chain

<400> SEQUENCE: 106

Gln Val Gln Leu Val Glu Ser Gly Gly Val Val Gln Pro Gly Arg
1               5                   10                  15

Ser Leu Arg Leu Asp Cys Lys Ala Ser Gly Ile Thr Phe Ser Asn Ser
            20                  25                  30

Gly Met His Trp Val Arg Gln Ala Pro Gly Lys Gly Leu Glu Trp Val
        35                  40                  45

Ala Val Ile Trp Tyr Asp Gly Ser Lys Arg Tyr Tyr Ala Asp Ser Val
    50                  55                  60

Lys Gly Arg Phe Thr Ile Ser Arg Asp Asn Ser Lys Asn Thr Leu Phe
65                  70                  75                  80

Leu Gln Met Asn Ser Leu Arg Ala Glu Asp Thr Ala Val Tyr Tyr Cys
                85                  90                  95

Ala Thr Asn Asp Asp Tyr Trp Gly Gln Gly Thr Leu Val Thr Val Ser
            100                 105                 110

Ser Ala Ser Thr Lys Gly Pro Ser Val Phe Pro Leu Ala Pro Cys Ser
        115                 120                 125

Arg Ser Thr Ser Glu Ser Thr Ala Ala Leu Gly Cys Leu Val Lys Asp
    130                 135                 140

Tyr Phe Pro Glu Pro Val Thr Val Ser Trp Asn Ser Gly Ala Leu Thr
145                 150                 155                 160

Ser Gly Val His Thr Phe Pro Ala Val Leu Gln Ser Ser Gly Leu Tyr
                165                 170                 175

Ser Leu Ser Ser Val Val Thr Val Pro Ser Ser Ser Leu Gly Thr Lys
            180                 185                 190

Thr Tyr Thr Cys Asn Val Asp His Lys Pro Ser Asn Thr Lys Val Asp
        195                 200                 205

Lys Arg Val Glu Ser Lys Tyr Gly Pro Pro Cys Pro Pro Cys Pro Ala
    210                 215                 220

Pro Glu Phe Leu Gly Gly Pro Ser Val Phe Leu Phe Pro Pro Lys Pro
225                 230                 235                 240

Lys Asp Thr Leu Met Ile Ser Arg Thr Pro Glu Val Thr Cys Val Val
                245                 250                 255

Val Asp Val Ser Gln Glu Asp Pro Glu Val Gln Phe Asn Trp Tyr Val
            260                 265                 270

Asp Gly Val Glu Val His Asn Ala Lys Thr Lys Pro Arg Glu Glu Gln
        275                 280                 285

Phe Asn Ser Thr Tyr Arg Val Val Ser Val Leu Thr Val Leu His Gln
    290                 295                 300

Asp Trp Leu Asn Gly Lys Glu Tyr Lys Cys Lys Val Ser Asn Lys Gly
305                 310                 315                 320

Leu Pro Ser Ser Ile Glu Lys Thr Ile Ser Lys Ala Lys Gly Gln Pro
                325                 330                 335

Arg Glu Pro Gln Val Tyr Thr Leu Pro Pro Ser Gln Glu Glu Met Thr
            340                 345                 350

-continued

```
Lys Asn Gln Val Ser Leu Thr Cys Leu Val Lys Gly Phe Tyr Pro Ser
        355                 360                 365

Asp Ile Ala Val Glu Trp Glu Ser Asn Gly Gln Pro Glu Asn Asn Tyr
    370                 375                 380

Lys Thr Thr Pro Pro Val Leu Asp Ser Asp Gly Ser Phe Phe Leu Tyr
385                 390                 395                 400

Ser Arg Leu Thr Val Asp Lys Ser Arg Trp Gln Gln Gly Asn Val Phe
                405                 410                 415

Ser Cys Ser Val Met His Glu Ala Leu His Asn His Tyr Thr Gln Lys
            420                 425                 430

Ser Leu Ser Leu Ser Leu Gly
        435
```

<210> SEQ ID NO 107
<211> LENGTH: 214
<212> TYPE: PRT
<213> ORGANISM: Artificial Sequence
<220> FEATURE:
<223> OTHER INFORMATION: antibody light chain

<400> SEQUENCE: 107

```
Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Ser Ser Asn Trp Pro Arg
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210
```

<210> SEQ ID NO 108
<211> LENGTH: 8
<212> TYPE: PRT
<213> ORGANISM: Artificial Sequence
<220> FEATURE:
<223> OTHER INFORMATION: antibody heavy chain CDR1

```
<400> SEQUENCE: 108

Gly Phe Thr Phe Asn Lys Asn Ala
1               5

<210> SEQ ID NO 109
<211> LENGTH: 10
<212> TYPE: PRT
<213> ORGANISM: Artificial Sequence
<220> FEATURE:
<223> OTHER INFORMATION: antibody heavy chain CDR2

<400> SEQUENCE: 109

Ile Arg Asn Lys Thr Asn Asn Tyr Ala Thr
1               5                   10

<210> SEQ ID NO 110
<211> LENGTH: 8
<212> TYPE: PRT
<213> ORGANISM: Artificial Sequence
<220> FEATURE:
<223> OTHER INFORMATION: antibody heavy chain CDR3

<400> SEQUENCE: 110

Val Ala Gly Asn Ser Phe Ala Tyr
1               5

<210> SEQ ID NO 111
<211> LENGTH: 12
<212> TYPE: PRT
<213> ORGANISM: Artificial Sequence
<220> FEATURE:
<223> OTHER INFORMATION: antibody light chain CDR1

<400> SEQUENCE: 111

Gln Ser Leu Leu Tyr Ser Ser Asn Gln Lys Asn Tyr
1               5                   10

<210> SEQ ID NO 112
<211> LENGTH: 12
<212> TYPE: PRT
<213> ORGANISM: Artificial Sequence
<220> FEATURE:
<223> OTHER INFORMATION: antibody light chain CDR1

<400> SEQUENCE: 112

Gln Ser Leu Leu Tyr Ser Ser Asn Gln Lys Asn Tyr
1               5                   10

<210> SEQ ID NO 113
<211> LENGTH: 9
<212> TYPE: PRT
<213> ORGANISM: Artificial Sequence
<220> FEATURE:
<223> OTHER INFORMATION: antibody light chain CDR

<400> SEQUENCE: 113

Gln Gln Tyr Tyr Asn Tyr Pro Leu Thr
1               5

<210> SEQ ID NO 114
<211> LENGTH: 116
<212> TYPE: PRT
<213> ORGANISM: Artificial Sequence
<220> FEATURE:
<223> OTHER INFORMATION: antibody heavy chain variable region

<400> SEQUENCE: 114
```

Glu Val Gln Leu Val Glu Ser Gly Gly Leu Val Gln Pro Gly Gly
1               5                   10                  15

Ser Leu Arg Leu Ser Cys Ala Ala Ser Gly Phe Thr Phe Asn Lys Asn
            20                  25                  30

Ala Met Asn Trp Val Arg Gln Ala Pro Gly Lys Gly Leu Glu Trp Val
                35                  40                  45

Gly Arg Ile Arg Asn Lys Thr Asn Asn Tyr Ala Thr Tyr Tyr Ala Asp
        50                  55                  60

Ser Val Lys Ala Arg Phe Thr Ile Ser Arg Asp Asp Ser Lys Asn Ser
65                  70                  75                  80

Leu Tyr Leu Gln Met Asn Ser Leu Lys Thr Asp Thr Ala Val Tyr
                85                  90                  95

Tyr Cys Val Ala Gly Asn Ser Phe Ala Tyr Trp Gly Gln Gly Thr Leu
                100                 105                 110

Val Thr Val Ser
        115

<210> SEQ ID NO 115
<211> LENGTH: 113
<212> TYPE: PRT
<213> ORGANISM: Artificial Sequence
<220> FEATURE:
<223> OTHER INFORMATION: antibody light chain variable region

<400> SEQUENCE: 115

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Tyr Ser
            20                  25                  30

Ser Asn Gln Lys Asn Tyr Leu Ala Trp Tyr Gln Gln Lys Pro Gly Gln
        35                  40                  45

Pro Pro Lys Leu Leu Ile Tyr Trp Ala Ser Ser Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Gln Gln
                85                  90                  95

Tyr Tyr Asn Tyr Pro Leu Thr Phe Gly Gln Gly Thr Lys Leu Glu Ile
                100                 105                 110

Lys

<210> SEQ ID NO 116
<211> LENGTH: 8
<212> TYPE: PRT
<213> ORGANISM: Artificial Sequence
<220> FEATURE:
<223> OTHER INFORMATION: antibody heavy chain CDR1

<400> SEQUENCE: 116

Tyr Phe Asp Phe Asp Ser Tyr Glu
1               5

<210> SEQ ID NO 117
<211> LENGTH: 7
<212> TYPE: PRT
<213> ORGANISM: Artificial Sequence
<220> FEATURE:
<223> OTHER INFORMATION: antibody heavy chain CDR2

```
<400> SEQUENCE: 117

Ile Tyr His Ser Gly Ser Thr
1               5

<210> SEQ ID NO 118
<211> LENGTH: 10
<212> TYPE: PRT
<213> ORGANISM: Artificial Sequence
<220> FEATURE:
<223> OTHER INFORMATION: antibody heavy chain CDR3

<400> SEQUENCE: 118

Ala Arg Val Asn Met Asp Arg Phe Asp Tyr
1               5                   10

<210> SEQ ID NO 119
<211> LENGTH: 117
<212> TYPE: PRT
<213> ORGANISM: Artificial Sequence
<220> FEATURE:
<223> OTHER INFORMATION: antibody heavy chain variable region

<400> SEQUENCE: 119

Gln Val Gln Leu Val Gln Ser Gly Gly Gly Leu Val Gln Pro Gly Gly
1               5                   10                  15

Ser Leu Arg Leu Ser Cys Ala Ala Ser Tyr Phe Asp Phe Asp Ser Tyr
            20                  25                  30

Glu Met Ser Trp Val Arg Gln Ala Pro Gly Lys Gly Leu Glu Trp Ile
        35                  40                  45

Gly Ser Ile Tyr His Ser Gly Ser Thr Tyr Tyr Asn Pro Ser Leu Lys
    50                  55                  60

Ser Arg Val Thr Ile Ser Arg Asp Asn Ser Lys Asn Thr Leu Tyr Leu
65                  70                  75                  80

Gln Met Asn Thr Leu Arg Ala Glu Asp Thr Ala Thr Tyr Tyr Cys Ala
                85                  90                  95

Arg Val Asn Met Asp Arg Phe Asp Tyr Trp Gly Gln Gly Thr Leu Val
            100                 105                 110

Thr Val Ser Ser Ser
        115

<210> SEQ ID NO 120
<211> LENGTH: 8
<212> TYPE: PRT
<213> ORGANISM: Artificial Sequence
<220> FEATURE:
<223> OTHER INFORMATION: antibody heavy chain CDR1

<400> SEQUENCE: 120

Gly Phe Thr Phe Ser Ser Tyr Ala
1               5

<210> SEQ ID NO 121
<211> LENGTH: 8
<212> TYPE: PRT
<213> ORGANISM: Artificial Sequence
<220> FEATURE:
<223> OTHER INFORMATION: antibody heavy chain CDR2

<400> SEQUENCE: 121

Ile Gln Lys Gln Gly Leu Pro Thr
1               5
```

```
<210> SEQ ID NO 122
<211> LENGTH: 9
<212> TYPE: PRT
<213> ORGANISM: Artificial Sequence
<220> FEATURE:
<223> OTHER INFORMATION: antibody heavy chain CDR3

<400> SEQUENCE: 122

Ala Lys Asn Arg Ala Lys Phe Asp Tyr
1               5

<210> SEQ ID NO 123
<211> LENGTH: 6
<212> TYPE: PRT
<213> ORGANISM: Artificial Sequence
<220> FEATURE:
<223> OTHER INFORMATION: antibody light chain CDR1

<400> SEQUENCE: 123

Gln Ser Ile Ser Ser Tyr
1               5

<210> SEQ ID NO 124
<211> LENGTH: 6
<212> TYPE: PRT
<213> ORGANISM: Artificial Sequence
<220> FEATURE:
<223> OTHER INFORMATION: antibody light chain CDR1

<400> SEQUENCE: 124

Gln Ser Ile Ser Ser Tyr
1               5

<210> SEQ ID NO 125
<211> LENGTH: 9
<212> TYPE: PRT
<213> ORGANISM: Artificial Sequence
<220> FEATURE:
<223> OTHER INFORMATION: antibody light chain CDR3

<400> SEQUENCE: 125

Gln Gln Asn Arg Gly Phe Pro Leu Thr
1               5

<210> SEQ ID NO 126
<211> LENGTH: 116
<212> TYPE: PRT
<213> ORGANISM: Artificial Sequence
<220> FEATURE:
<223> OTHER INFORMATION: antibody heavy chain variable region

<400> SEQUENCE: 126

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Ser Tyr
                20                  25                  30

Ala Met Ser Trp Val Arg Gln Ala Pro Gly Lys Gly Leu Glu Trp Val
            35                  40                  45

Ser Thr Ile Gln Lys Gln Gly Leu Pro Thr Gln Tyr Ala Asp Ser Val
        50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95
```

Ala Lys Asn Arg Ala Lys Phe Asp Tyr Trp Gly Gln Gly Thr Leu Val
            100                 105                 110

Thr Val Ser Ser
        115

<210> SEQ ID NO 127
<211> LENGTH: 107
<212> TYPE: PRT
<213> ORGANISM: Artificial Sequence
<220> FEATURE:
<223> OTHER INFORMATION: antibody light chain variable region

<400> SEQUENCE: 127

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Asn Ala Ser Met Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Asn Arg Gly Phe Pro Leu
                85                  90                  95

Thr Phe Gly Gln Gly Thr Lys Val Glu Ile Lys
            100                 105

<210> SEQ ID NO 128
<211> LENGTH: 107
<212> TYPE: PRT
<213> ORGANISM: Artificial Sequence
<220> FEATURE:
<223> OTHER INFORMATION: antibody light chain variable region

<400> SEQUENCE: 128

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Ser Ile Ser Ser Tyr
            20                  25                  30

Leu Asn Trp Tyr Gln Gln Lys Pro Gly Lys Ala Pro Lys Leu Leu Ile
        35                  40                  45

Tyr Ala Ala Ser Met Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Asn Arg Gly Phe Pro Leu
                85                  90                  95

Thr Phe Gly Gln Gly Thr Lys Val Glu Ile Lys
            100                 105

<210> SEQ ID NO 129
<211> LENGTH: 115
<212> TYPE: PRT
<213> ORGANISM: Artificial Sequence
<220> FEATURE:
<223> OTHER INFORMATION: antibody heavy chain variable region

<400> SEQUENCE: 129

Gln Val Gln Leu Val Gln Ser Gly Ala Glu Val Lys Lys Pro Gly Ala

-continued

```
1               5                   10                  15
Ser Val Lys Val Ser Cys Lys Ala Ser Gly Tyr Thr Phe Thr Asp Tyr
            20              25              30

Glu Met His Trp Val Arg Gln Ala Pro Gly Gln Gly Leu Glu Trp Met
        35              40              45

Gly Ala Leu Asp Pro Lys Thr Gly Asp Thr Ala Tyr Ser Gln Lys Phe
        50              55              60

Lys Gly Arg Val Thr Leu Thr Ala Asp Lys Ser Thr Ser Thr Ala Tyr
65              70              75              80

Met Glu Leu Ser Ser Leu Thr Ser Glu Asp Thr Ala Val Tyr Tyr Cys
            85              90              95

Thr Arg Phe Tyr Ser Tyr Thr Tyr Trp Gly Gln Gly Thr Leu Val Thr
            100             105             110

Val Ser Ser
        115
```